US011555263B2

(12) United States Patent
Haverhals et al.

(10) Patent No.: US 11,555,263 B2
(45) Date of Patent: *Jan. 17, 2023

(54) METHODS, PROCESSES, AND APPARATUSES FOR PRODUCING DYED AND WELDED SUBSTRATES

(71) Applicant: Natural Fiber Welding, Inc., Peoria, IL (US)

(72) Inventors: Luke Michael Haverhals, Peoria, IL (US); Aaron Kenneth Amstutz, Peoria, IL (US); Jonglak Choi, Peoria, IL (US); Xiling Tang, Peoria, IL (US); Michael Molter, Peoria, IL (US); Spencer Jacob Null, Peoria, IL (US)

(73) Assignee: Natural Fiber Welding, Inc., Peoria, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/665,265

(22) Filed: Jul. 31, 2017

(65) Prior Publication Data
US 2017/0350050 A1     Dec. 7, 2017

Related U.S. Application Data

(63) Continuation of application No. 15/586,158, filed on May 3, 2017, now Pat. No. 10,011,931, which is a (Continued)

(51) Int. Cl.
*D02G 3/40* (2006.01)
*D06P 3/60* (2006.01)
(Continued)

(52) U.S. Cl.
CPC .................. *D04H 3/14* (2013.01); *C09J 5/00* (2013.01); *D02G 3/402* (2013.01); *D02J 11/00* (2013.01);
(Continued)

(58) Field of Classification Search
CPC .......... D06P 1/445; D06P 1/22; D06P 3/6025; D06P 1/228; D06P 1/224; D06P 3/3025;
(Continued)

(56) References Cited

U.S. PATENT DOCUMENTS

| 114,880 A | 5/1871 | Taylor |
| 1,943,176 A | 1/1934 | Charles |

(Continued)

FOREIGN PATENT DOCUMENTS

| CA | 2943716 A1 | 10/2015 |
| CN | 1380110 A | 11/2002 |

(Continued)

OTHER PUBLICATIONS

Aspland, J.R., Chapter 3: Vat Dyes and Their Application, School of Textiles, Clemsen University vol. 24, No. 1, Jan. 1992 (Year: 1992).*

(Continued)

*Primary Examiner* — Jennifer A Steele
(74) *Attorney, Agent, or Firm* — Hamilton IP Law, PC; Jay R. Hamilton; Charles A. Damschen

(57) ABSTRACT

A dyeing and welding process may be configured to convert a substrate into a welded substrate having at least some color imparted thereto via a dye and/or coloring agent by applying a process solvent having a dye and/or coloring agent therein to the substrate, wherein the process solvent interrupts one or more intermolecular force between one or more component in the substrate. The substrate may be configured as a natural fiber, such as cellulose, hemicelluloses, and silk. The process solvent may include a binder, such as dissolved biopolymer (e.g., cellulose). After application of a process solvent comprised of a dye and/or coloring agent, the substrate may be exposed to a second application of a process solvent comprised of a binder, which second appli- (Continued)

cation may occur before or after a process temperature/pressure zone, process solvent recovery zone, and/or drying zone.

9 Claims, 67 Drawing Sheets

Related U.S. Application Data continuation-in-part of application No. 15/470,529, filed on Mar. 27, 2017, now Pat. No. 10,982,381, which is a continuation-in-part of application No. 14/876,351, filed on Oct. 6, 2015, now abandoned.

(60) Provisional application No. 62/455,504, filed on Feb. 6, 2017, provisional application No. 62/446,646, filed on Jan. 6, 2017, provisional application No. 62/365,752, filed on Jul. 22, 2016, provisional application No. 62/331,256, filed on May 3, 2016, provisional application No. 62/313,291, filed on Mar. 25, 2016, provisional application No. 62/061,665, filed on Oct. 8, 2014, provisional application No. 62/060,524, filed on Oct. 6, 2014.

(51) Int. Cl.
| | |
|---|---|
| *D06P 1/50* | (2006.01) |
| *D06P 1/22* | (2006.01) |
| *D04H 3/14* | (2012.01) |
| *C09J 5/00* | (2006.01) |
| *D02J 11/00* | (2006.01) |
| *D04H 3/015* | (2012.01) |
| *D04H 1/645* | (2012.01) |
| *D04H 1/425* | (2012.01) |
| *D06P 1/44* | (2006.01) |
| *D06P 1/92* | (2006.01) |
| *D06M 13/00* | (2006.01) |

(52) U.S. Cl.
CPC ............ *D04H 1/425* (2013.01); *D04H 1/645* (2013.01); *D04H 3/015* (2013.01); *D06M 13/00* (2013.01); *D06P 1/22* (2013.01); *D06P 1/228* (2013.01); *D06P 1/445* (2013.01); *D06P 1/928* (2013.01); *D06P 1/50* (2013.01); *D06P 3/6025* (2013.01)

(58) Field of Classification Search
CPC ....... D06P 1/46–1/50; D06P 3/34–3/50; D06P 5/225; C09J 5/00; D06M 13/00; D06M 17/02; D06M 14/02; D06M 14/04; D06M 15/03–15/11; D06M 2101/06; D04H 1/645; D04H 3/015; D04H 1/425; D02J 11/00

See application file for complete search history.

(56) References Cited

U.S. PATENT DOCUMENTS

| | | |
|---|---|---|
| 3,447,956 A | 6/1969 | Johnson |
| 3,510,390 A | 5/1970 | Bjorksten et al. |
| 3,711,316 A * | 1/1973 | Angliss et al. ..... D06M 15/263 427/322 |
| 4,187,332 A | 2/1980 | Fouche |
| 4,522,934 A | 6/1985 | Shum et al. |
| 4,562,107 A | 12/1985 | Daniels |
| 4,586,934 A | 5/1986 | Blalock et al. |
| 4,597,798 A | 7/1986 | Kamata et al. |
| 4,622,238 A | 11/1986 | Franz et al. |
| 4,705,523 A | 11/1987 | Hussamy |
| 4,832,864 A | 5/1989 | Olson |
| 4,926,626 A | 5/1990 | Andonov |
| 4,938,832 A | 7/1990 | Schmalz et al. |
| 4,970,156 A | 11/1990 | Avrameas et al. |
| 5,077,414 A | 12/1991 | Arduengo |
| 5,369,861 A | 12/1994 | Ball et al. |
| 5,378,246 A | 1/1995 | Gurley |
| 5,471,720 A | 12/1995 | Ball et al. |
| 5,626,952 A | 5/1997 | McAbee et al. |
| 5,679,146 A | 10/1997 | Kalt et al. |
| 5,683,832 A | 11/1997 | Bonhote et al. |
| 5,714,536 A | 2/1998 | Ziolo et al. |
| 5,747,125 A | 5/1998 | Markulin |
| 5,749,923 A | 5/1998 | Olip et al. |
| 5,792,399 A | 8/1998 | Meister et al. |
| 5,827,602 A | 10/1998 | Koch et al. |
| 5,856,513 A | 1/1999 | Ue et al. |
| 5,928,380 A | 7/1999 | Winkler et al. |
| 5,951,719 A * | 9/1999 | Cooper ..................... D06P 5/08 427/324 |
| 6,004,358 A | 12/1999 | Kruger et al. |
| 6,042,890 A | 3/2000 | Ruf et al. |
| 6,065,277 A | 5/2000 | Foil, Jr. |
| 6,123,741 A | 9/2000 | Girbaud et al. |
| 6,180,234 B1 | 1/2001 | Hashemzadeh |
| 6,258,928 B1 | 7/2001 | Baird et al. |
| 6,376,712 B2 | 4/2002 | Narizuka et al. |
| 6,451,220 B1 | 9/2002 | Ziolo et al. |
| 6,494,925 B1 | 12/2002 | Child et al. |
| 6,613,310 B1 | 9/2003 | Campbell et al. |
| 6,808,557 B2 | 10/2004 | Holbrey et al. |
| 6,824,599 B2 | 11/2004 | Swatloski et al. |
| 6,997,962 B2 | 2/2006 | Alpert |
| 7,097,344 B2 | 8/2006 | Kwon et al. |
| 7,198,695 B2 | 4/2007 | Kettenbach et al. |
| 7,253,289 B2 | 8/2007 | Ren et al. |
| 7,472,536 B2 | 1/2009 | Schwartz et al. |
| 7,549,281 B2 | 6/2009 | Kuwano et al. |
| 7,550,520 B2 | 6/2009 | Daly et al. |
| 7,671,178 B1 | 3/2010 | Phillips et al. |
| 7,731,762 B2 | 6/2010 | Inagaki |
| 7,754,002 B2 | 7/2010 | Maase et al. |
| 7,908,894 B2 | 3/2011 | Ronchi |
| 7,913,524 B2 | 3/2011 | Aurich et al. |
| 8,030,030 B2 | 10/2011 | Varanasi et al. |
| 8,038,840 B2 | 10/2011 | Li |
| 8,044,120 B2 | 10/2011 | D'Andola et al. |
| 8,110,667 B2 | 2/2012 | Zhang et al. |
| 8,178,629 B2 | 5/2012 | Sotzing et al. |
| 8,182,552 B2 | 5/2012 | Janssen et al. |
| 8,182,557 B2 | 5/2012 | Argyropoulos |
| 8,187,354 B2 | 5/2012 | Lim et al. |
| 8,202,379 B1 * | 6/2012 | DeLong ................. D04H 3/015 156/83 |
| 8,464,728 B2 | 6/2013 | Marshall et al. |
| 8,518,319 B2 | 8/2013 | Scott et al. |
| 8,545,770 B2 | 10/2013 | Viovy et al. |
| 8,784,503 B2 | 7/2014 | Costard |
| 8,871,054 B2 | 10/2014 | Sealey |
| 8,871,418 B2 | 10/2014 | Sugiura et al. |
| 9,091,021 B2 | 7/2015 | Heller |
| 9,096,743 B2 | 8/2015 | Qin et al. |
| 9,155,251 B2 | 10/2015 | Chou et al. |
| 9,242,023 B2 | 1/2016 | Krieg et al. |
| 9,359,721 B2 | 6/2016 | Harris et al. |
| 9,573,308 B2 | 2/2017 | Chou et al. |
| 9,587,114 B2 | 3/2017 | Williamson et al. |
| 9,644,290 B2 | 5/2017 | Yu et al. |
| 9,745,673 B2 | 8/2017 | Chou et al. |
| 9,745,680 B2 | 8/2017 | Chou et al. |
| 9,868,240 B2 | 1/2018 | Chou et al. |
| 9,920,454 B2 | 3/2018 | Sutti et al. |
| 9,956,927 B2 | 5/2018 | Kim et al. |
| 10,011,931 B2 | 7/2018 | Haverhals et al. |
| 10,071,345 B2 | 9/2018 | Berchtold et al. |
| 10,190,242 B2 | 1/2019 | Chou et al. |
| 10,266,986 B2 | 4/2019 | Haggquist |
| 10,723,849 B2 | 7/2020 | Kalb et al. |
| 10,836,923 B2 | 11/2020 | Aoki et al. |
| 11,085,133 B2 | 8/2021 | Haverhals et al. |

(56) References Cited

U.S. PATENT DOCUMENTS

| | | |
|---|---|---|
| 2002/0010291 A1 | 1/2002 | Murphy |
| 2002/0115193 A1 | 8/2002 | Hsieh et al. |
| 2003/0059604 A1 | 3/2003 | Hattori et al. |
| 2003/0157351 A1 | 8/2003 | Swatloski et al. |
| 2003/0165445 A1 | 9/2003 | Malnou et al. |
| 2003/0233742 A1 | 12/2003 | Jones et al. |
| 2004/0038031 A1 | 2/2004 | Holbrey et al. |
| 2004/0048541 A1* | 3/2004 | Offord .............. D06M 15/09 442/364 |
| 2004/0077519 A1 | 4/2004 | Price et al. |
| 2005/0061457 A1 | 3/2005 | Skuratowicz |
| 2005/0123851 A1 | 6/2005 | Shinbori et al. |
| 2005/0177960 A1* | 8/2005 | Alpert .............. D06P 1/228 8/518 |
| 2005/0194561 A1 | 9/2005 | Davis |
| 2005/0196671 A1 | 9/2005 | Paonessa et al. |
| 2005/0285073 A1 | 12/2005 | Singh et al. |
| 2005/0288484 A1 | 12/2005 | Holbrey et al. |
| 2006/0090271 A1 | 5/2006 | Price et al. |
| 2006/0118755 A1 | 6/2006 | Fujioka et al. |
| 2006/0128996 A1 | 6/2006 | Vaultier et al. |
| 2006/0194197 A1 | 8/2006 | Spangler et al. |
| 2006/0241287 A1 | 10/2006 | Hecht et al. |
| 2007/0006774 A1 | 1/2007 | Rogers et al. |
| 2007/0093462 A1 | 4/2007 | Rogers et al. |
| 2007/0112185 A1 | 5/2007 | Myllymaki et al. |
| 2007/0161095 A1 | 7/2007 | Gurin |
| 2007/0215300 A1 | 9/2007 | Upfal et al. |
| 2007/0225191 A1 | 9/2007 | Scheibel et al. |
| 2008/0023162 A1 | 1/2008 | Myllymaki et al. |
| 2008/0104776 A1 | 5/2008 | Nusser et al. |
| 2008/0164440 A1 | 7/2008 | Maase et al. |
| 2008/0190013 A1 | 8/2008 | Argyropoulos |
| 2008/0227162 A1 | 9/2008 | Varanasi et al. |
| 2008/0241536 A1 | 10/2008 | Luo et al. |
| 2009/0022775 A1 | 1/2009 | Champ et al. |
| 2009/0088564 A1 | 4/2009 | Luo et al. |
| 2009/0221813 A1 | 9/2009 | Moellmann et al. |
| 2009/0319075 A1 | 12/2009 | Tian et al. |
| 2010/0048829 A1 | 2/2010 | D'Andola et al. |
| 2010/0081798 A1 | 4/2010 | Balensiefer et al. |
| 2010/0112646 A1 | 5/2010 | Balensiefer et al. |
| 2010/0170504 A1 | 7/2010 | Zhang |
| 2010/0176354 A1 | 7/2010 | Costard |
| 2010/0196967 A1 | 8/2010 | Edye et al. |
| 2010/0249432 A1 | 9/2010 | Siemer et al. |
| 2010/0287826 A1 | 11/2010 | Hoffman et al. |
| 2010/0319862 A1 | 12/2010 | Rahman |
| 2011/0009021 A1 | 1/2011 | Schoots et al. |
| 2012/0046244 A1 | 2/2012 | Rogers et al. |
| 2012/0088104 A1 | 4/2012 | Hashimoto et al. |
| 2012/0088291 A1 | 4/2012 | Vermeersch et al. |
| 2012/0115729 A1 | 5/2012 | Qin et al. |
| 2012/0245336 A1 | 9/2012 | Daly et al. |
| 2012/0291773 A1 | 11/2012 | O'Connor |
| 2013/0056165 A1 | 3/2013 | Kilpelainen et al. |
| 2013/0087552 A1 | 4/2013 | Lee et al. |
| 2013/0192489 A1 | 8/2013 | Cockcroft et al. |
| 2013/0219635 A1 | 8/2013 | Schools et al. |
| 2014/0186579 A1 | 7/2014 | Botelho et al. |
| 2015/0053345 A1 | 2/2015 | Schröer et al. |
| 2015/0218748 A1 | 8/2015 | Chappell et al. |
| 2015/0274982 A1 | 10/2015 | Howland |
| 2015/0275423 A1 | 10/2015 | Finley |
| 2015/0299949 A1 | 10/2015 | Sutherland et al. |
| 2016/0082141 A1 | 3/2016 | Rogers et al. |
| 2016/0106160 A1* | 4/2016 | Carneiro .............. D05B 1/06 2/227 |
| 2016/0208430 A1 | 7/2016 | Duffy et al. |
| 2017/0038322 A1 | 2/2017 | Cobanoglu et al. |
| 2017/0051443 A1* | 2/2017 | Morrissey ............. D04H 1/587 |
| 2017/0190850 A1 | 7/2017 | Haverhals et al. |
| 2018/0105965 A1 | 4/2018 | Pourdeyhimi et al. |
| 2018/0155857 A1 | 6/2018 | Schniepp et al. |
| 2018/0371644 A1 | 12/2018 | Chien |
| 2019/0024263 A1 | 1/2019 | Jin et al. |
| 2019/0055675 A1* | 2/2019 | Haverhals ............... D02J 11/00 |
| 2019/0106814 A1 | 4/2019 | Haverhals et al. |
| 2019/0292683 A1 | 9/2019 | Sun et al. |
| 2019/0292722 A1 | 9/2019 | Lin et al. |
| 2019/0358913 A1 | 11/2019 | Haverhals et al. |
| 2019/0381462 A1 | 12/2019 | Keller et al. |
| 2020/0079925 A1 | 3/2020 | Haslinger et al. |
| 2020/0087850 A1 | 3/2020 | Wu et al. |
| 2020/0140574 A1 | 5/2020 | English et al. |
| 2020/0299869 A1 | 9/2020 | Gallo |
| 2020/0313175 A1 | 10/2020 | Shin et al. |
| 2021/0054567 A1 | 2/2021 | Flynn et al. |
| 2021/0101362 A1 | 4/2021 | Carlyle et al. |

FOREIGN PATENT DOCUMENTS

| | | | |
|---|---|---|---|
| CN | 101476166 A | 7/2009 | |
| CN | 101275293 B | 7/2011 | |
| CN | 102409557 A | 4/2012 | |
| CN | 102747504 A | 10/2012 | |
| CN | 103603123 A | 2/2014 | |
| CN | 103114351 B | 5/2014 | |
| CN | 104822875 A | 8/2015 | |
| CN | 106232895 A | 12/2016 | |
| CN | 109072542 A | 12/2018 | |
| DE | 902427 | 4/1955 | |
| DE | 102006040075 A1 | 3/2008 | |
| DE | 102015218510 * | 3/2017 | .............. D06P 1/228 |
| EP | 0780391 A2 | 6/1997 | |
| EP | 1222918 A1 | 7/2002 | |
| EP | 1854786 A1 | 11/2007 | |
| EP | 2712955 A1 | 4/2014 | |
| GB | 191412374 A | 7/1915 | |
| GB | 448272 A | 6/1936 | |
| JP | 2002290011 A | 10/2002 | |
| JP | 2003171144 A | 6/2003 | |
| JP | 2003335887 A | 11/2003 | |
| JP | 2005126872 A | 5/2005 | |
| JP | 2007303033 A | 11/2007 | |
| JP | 2008516106 A | 5/2008 | |
| JP | 2008248466 A | 10/2008 | |
| JP | 2016132841 A | 7/2016 | |
| WO | 1993003213 A1 | 2/1993 | |
| WO | 1994020521 A1 | 9/1994 | |
| WO | 1995021871 A1 | 8/1995 | |
| WO | 1996006593 A1 | 3/1996 | |
| WO | 2000032658 A1 | 6/2000 | |
| WO | 0153600 A1 | 7/2001 | |
| WO | 2001081436 A1 | 11/2001 | |
| WO | 2002059404 A2 | 8/2002 | |
| WO | 2002079269 A1 | 10/2002 | |
| WO | 2002100360 A1 | 12/2002 | |
| WO | 2002102586 A2 | 12/2002 | |
| WO | 2003041692 A1 | 5/2003 | |
| WO | 2003029329 A3 | 7/2003 | |
| WO | 2003074031 A1 | 9/2003 | |
| WO | 2002059404 A3 | 2/2004 | |
| WO | 2004027897 A1 | 4/2004 | |
| WO | 2005017252 A1 | 2/2005 | |
| WO | 2006041480 A1 | 4/2006 | |
| WO | 2006097571 A1 | 9/2006 | |
| WO | 2006116126 A2 | 11/2006 | |
| WO | 2007005388 A3 | 3/2007 | |
| WO | 2007032022 A2 | 3/2007 | |
| WO | 2007063327 A1 | 6/2007 | |
| WO | 2007032022 A3 | 7/2007 | |
| WO | 2007085624 A1 | 8/2007 | |
| WO | 2007111605 A1 | 10/2007 | |
| WO | 2008095252 A1 | 8/2008 | |
| WO | 2009024766 A2 | 2/2009 | |
| WO | 2009024766 A3 | 5/2009 | |
| WO | 2009105236 A1 | 8/2009 | |
| WO | 2010056790 A1 | 5/2010 | |
| WO | 2010128049 A2 | 11/2010 | |
| WO | 2012033973 A1 | 3/2012 | |
| WO | 2013079729 A1 | 6/2013 | |
| WO | 2014049134 A1 | 4/2014 | |
| WO | 2015097047 A1 | 7/2015 | |

(56) References Cited

FOREIGN PATENT DOCUMENTS

| WO | 2015167815 | A1 | | 11/2015 | |
|---|---|---|---|---|---|
| WO | 2016044817 | A1 | | 3/2016 | |
| WO | 2016067189 | A1 | | 5/2016 | |
| WO | 2016188853 | A1 | | 12/2016 | |
| WO | 2017025457 | A1 | | 2/2017 | |
| WO | WO-2017050646 | A1 | * | 3/2017 | .............. D06P 1/228 |
| WO | 2017097953 | A1 | | 6/2017 | |
| WO | 2017192779 | A1 | | 11/2017 | |
| WO | 2021015078 | A1 | | 1/2021 | |

OTHER PUBLICATIONS

Hauser, Peter, Ph.D., Cationic Pretreatments of Cotton, Emerging Technologies and Trends in Garment Wet Processing Symposium, New Orleans, Oct. 2000.

Haverhals LM, et al., (2009) Ionic liquids in the preparation of biopolymer composite materials. ECS Trans 16(49):129-139.

Haverhals LM, et al., (2010a) Natural fiber welding. Macromol Mater Eng 295:425-430.

Haverhals LM, et al., (2010b) Process variables that control natural fiber welding. ECS Trans 33(7):79-90.

Haverhals LM, et al., (2010c) Characterization of polymer movement in fiber welded cellulose composites. ECS Trans 33(7):91-98.

Haverhals, Luke M., et al., Natural Fiber Welding: Ionic Liquid Facilitated Biopolymer Mobilization and Reorganization, Ionic Liquids: Science and Applications, Chapter 6, pp. 145-166. Publication Date (Web): Dec. 18, 2012., Copyright © 2012 American Chemical Society.

Haverhals, Luke M., et al., Process variables that control natural fiber welding: time, temperature, and amount of ionic liquid, Cellulose Feb. 2012, vol. 19, Issue 1, pp. 13-22., Springer Netherlands.

ISA/RU, International Search Report & Opinion PCT?US2017/030926, dated Sep. 28, 2017.

ISA/RU, International Search Report and Opinion, dated Aug. 14, 2017, PCT/US2017/024351.

Pawlak K, et al., Blue natural organic dyestuffs—from textile dyeing to mural painting. Separation and characterization of coloring matters present in elderberry, logwood and indigo. Journal of mass spectrometry. May 2006;41(5):613-22. Warsaw University of Technology, Faculty of Chemistry, Department of Analytical Chemistry, Warsaw, Poland.

Uddin, Mohammad Gias, Indigo Ring Dyeing of Cotton Warp Yarns for Denim Fabric, Chemical and Materials Engineering 2(7): 149-154, 2014, Horizon Research Publishing.

International Bureau, International Preliminary Report on Patentability (Chapter 1 of the Patent Cooperation Treaty), dated Oct. 4, 2018, PCT/US2017/024351.

Centexbel study results from project: "IL-Dyeing: Dyeing of textile materials in ionic liquids", http://www.innovatienetwerk.be/projects/1797&prev=search.

Ferreira et al., "Complete removal of textile dyes from aqueous media using ionic-liquid-based aqueous two-phase systems", Separation and Purification Technology, 128 (2014) 58-66.

Fukaya, et al., Cellulose dissolution with polar ionic liquids under mild conditions: required factors for anions, Green Chem., 2008, 10, 44-46.

Heinze et al, Effective preparation of cellulose derivatives in a new simple cellulose solvent, Macromol. Chem. Phys. 201, No. 6, 627-631 (2000).

Huddleston et al., Characterization and Comparison of Hydrophilic and Hydrophobic Room Temperature Ionic Liquids Incorporating the Imidazolium Cation, Green Chem., 3:156-164 (2001).

Husemann et al., N-Athyl-pyridinium-chlorid als Losungsmittel und Reaktionsmedium fiir Cellulose, 288-291 (1969).

Kristy Jost, et al., "Natural Fiber Welded Electrode Yarns for Knittable Textile Supercapacitors", Advanced Energy Materials, 2015, 5, 1401286.

Luke M. Haverhals, et al., "Ionic Liquid Facilitated Introduction of Functional Materials into Biopolymer Polymer Substrates", ECS Transactions, 2012, 50, 631-640.

Ngo et al., Thermal Properties of Imidazolium Ionic Liquids, Thermochimica Acta, 357-358:97-102 (2000), Woburn, MA.

Nishino et al., All-Cellulose Composite, Macromolecules 2004, 37, 7683-7687.

Perrier et al., Reversible Additon-Fragmentation Chain Transfer Poylmerization of Methacrylate, Acrylate and Styrene Monomers in 1-Alkyl-3-Methylimidazolium Hexfluorophosphate, European Polymer J., 39(3):417-422 (2003).

Pu et al., Ionic liquid as a green solvent for lignin, J. Wood Chem. Technol, 27:23-33 (2007).

Ren et al., Synthesis of 1-Allyl-3-Methylimidazolium-Based Room Temperature Ionic Liquid and Preliminary Study of its Dissolving Cellulose, Acta Polymerica Sinica, 3:448-451 (2003) (abstract).

Ribeiro et al., "Sustainable Textile Dyeing Alternative with Ionic Fluid", 4th International Workshop Advances in Cleaner Production, Sao Paulo, Brazil, 2013.

Stepnowski, Solid-phase extraction of room-temperature imidazolium ionic liquids from aqueous environmental samples, Anal. Bioanal. Chem., 381:189-193 (2005).

Suarez et al., Synthesis and Physical-Chemical Properties of Ionic Liquids Based on 1-n-butyl-3-methylimidazolium Cation, J Chim. Phys., 95:1626-1639 (1998).

Sun et al., Complete dissolution and partial delignification of wood in the ionic liquid 1-ethyl-3-methylimidazolium acetate, Green Chem., 11:646-655 (2009).

Sun et al., Magnetite-Embedded Cellulose Fibers Prepared From Ionic Liquid, J. Mat. Chem., 18:283-290 (2008).

Swatloski et al., Dissolution of Cellulose with Ionic Liquids, J. Am. Chem. Soc., 124:4974-4975 (2002).

Swatloski et al., Ionic Liquids for the Dissolution and Regeneration of Cellulose, in Molten Salts XIII: Proceedings of the International Symposium, Trulove, P.C., DeLong, H.C., Mantz, R.A., Stafford, G.R., Matsunaga, M., Eds., The Electrochemical Society: Pennington, NJ, 19:155-164 (2002).

Visser et al., Task Specific Ionic Liquids for the Extraction of Metal Ions from Aqueous Solutions, Chem. Commun., 135-136 (2001).

Gale et al, Directed Discovery of Greener Cosolvents: New Cosolvents for Use in Ionic Liquid Base Organic Electrolyte Solutions for Cellulose Dissolution, ACS Publications, ACS Sustainable Chemistry & Engineering, 2016, 4, 6200-6207.

International Searching Authority/RU, International Search Report & Written Opinion, dated Apr. 18, 2019.

Definition of staple fiber by Complete Textile Glossary, Celanese Acetate, 2001 (Year: 2001).

Cai et al., Unique Gelation Behavior of Cellulose in NaOH/Urea Aqueous Solution, Biomacromolecules, 2006, 7, 189-189.

Haverhals et al, Natural Fiber Welding, Macromolecular Journals, 2010, 295, 425-430.

International Preliminary Report on Patentabity, dated Dec. 26, 2019, International Breau.

Luke M Haverhals et al: "Natural Fiber Welding", Macromolecular Materials and Engineering, Wiley VCH Verlag, Weinheim, DE, vol. 295, Jan. 1, 2010 (Jan. 1, 2010), pp. 425-430, XP007913214, ISSN: 1438-7492, DOI: 10.1002/MAME.201000005.

Luo et al, New solvents and functional material prepared from cellulose solutions in alkali/urea aqueous system, Food Research International, 2013, 52, 387-400.

Ma et al, Green composite films composed of nanocrystalline cellulose and a cellulose matrix regenerated from functionalized ionic liquid solution, Carbohydrate Polymers, 2011, 84, 383-389.

Qi et al, Properties of Films Composed of Cellulose Nanowhiskers and a Cellulose Matrix Regenerated from Alkali/Urea Solution, Biomacromolecules, 2009, 10, 1597-1602.

Supplementary European Search Report, European Patent Office, dated Feb. 4, 2020.

Supplementary European Search Report, European Patent Office, PCT/US2017/017254, dated Oct. 9, 2019.

Supplementary Partial European Search Report, European Patent Office, dated Oct. 14, 2019.

(56) References Cited

OTHER PUBLICATIONS

Supplementary Partial European Search Report, European Patent Office, App No. EP 17793295, dated Dec. 2, 2019.
Short Staple Fiber Definition, Introduction to Technical Textiles, Arete Materials, Jun. 6, 2018.
Supplementary Partial European Search Report, European Patent Office, App No. EP 17793295, dated Apr. 7, 2020.
Haverhals, et al, Natural Fiber Welding, Macromolecular Materials and Engineering, 2010, 295, 425-430.
Haverhals, et al, Process variables that control natural fiber welding: time, temperature, and amount of iconic liquid, Cellulose, 2012, 19, 13-22.
CN Office Action, dated Feb. 11, 2022.
Mexican Patent Office, Official Action, dated Mar. 31, 2022.
Stale Cotton, "The differences between short and long staple cotton," HomeGrown, Jun. 2018.
European Patent Office, Supplemental Partial European Search Report, dated Nov. 11, 2021.

* cited by examiner

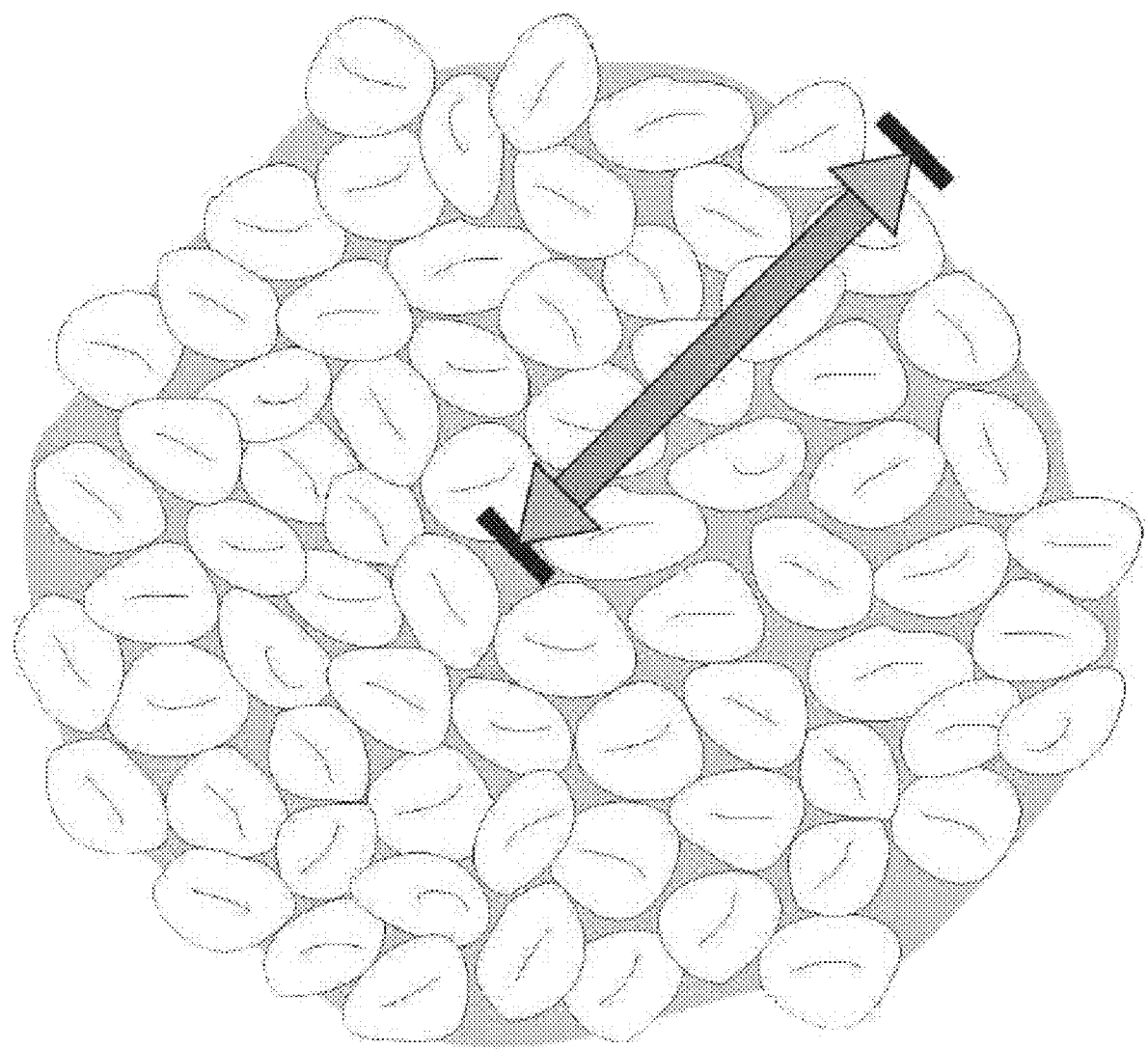
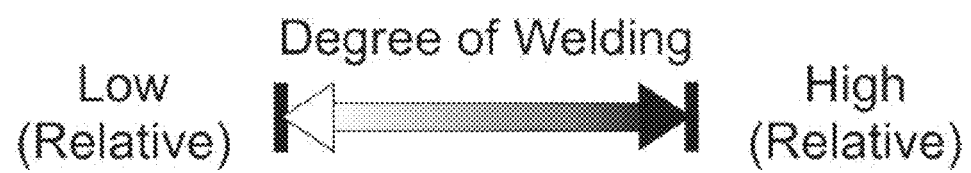
FIG. 19A

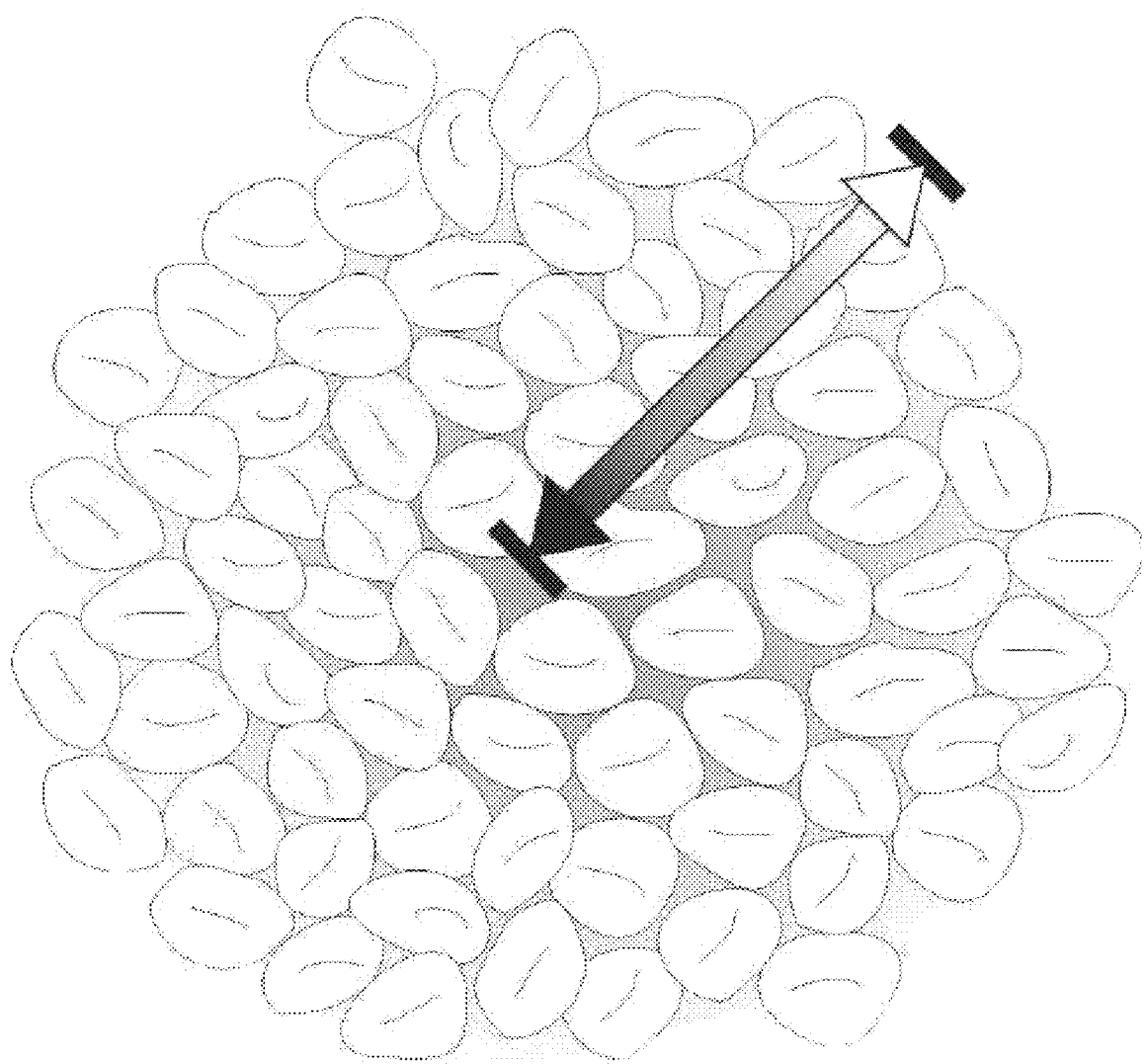
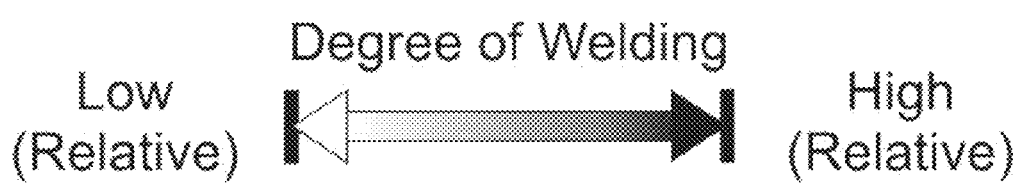
FIG. 19C

METHODS, PROCESSES, AND APPARATUSES FOR PRODUCING DYED AND WELDED SUBSTRATES

CROSS REFERENCE TO RELATED APPLICATIONS

The present application is a continuation of and claims priority from U.S. patent application Ser. No. 15/586,158 filed on May 3, 2017, which application is a continuation-in-part of and claims priority from U.S. patent application Ser. No. 15/470,529 filed on Mar. 27, 2017 (and which application also claimed priority to provisional U.S. Pat. App. No. 62/331,256 filed on May 3, 2016), which claimed priority from provisional U.S. Pat. App. Nos. 62/313,291 filed on Mar. 25, 2016, 62/365,752 filed on Jul. 22, 2016, and 62/446,646 filed on Jan. 16, 2017, which non-provisional application is also a continuation-in-part of and claims priority from U.S. patent application Ser. No. 14/876,351 filed on Oct. 6, 2015, which claimed the benefit of U.S. provisional App. Nos. 62/060,524 filed on Oct. 6, 2014 and 62/061,665 filed on Oct. 8, 2014, all of which are incorporated by reference herein in their entireties. The U.S. patent application Ser. No. 15/586,158 filed on May 3, 2017 also claims priority to U.S. provisional App. Nos. 62/446,646 filed on Jan. 16, 2017 and 62/455,504 filed on Feb. 6, 2017, all of which are incorporated by reference herein in their entireties.

FIELD OF THE INVENTION

The present disclosure related to methods for producing fiber composites and products that may be made from those fiber composites as well as methods for producing colored welded substrates.

STATEMENT REGARDING FEDERALLY SPONSORED RESEARCH OR DEVELOPMENT

No federal funds were used to develop or create the invention disclosed and described in the patent application.

BACKGROUND

Synthetic polymers such as polystyrene are routinely welded using solvents such as dichloromethane. Ionic liquids (e.g., 1-ethyl-3-methylimidazolium acetate) can dissolve natural fiber biopolymers (e.g., cellulose and silk) without derivatization. Natural fiber welding is a process by which biopolymer fibers are fused in a manner roughly analogous to traditional plastic welding.

As disclosed in U.S. Pat. No. 8,202,379, which is incorporated by reference herein in its entirety, one type of process solvent that may be used for partially dissolving a natural fiber for structural and chemical modifications is ionic liquid-based solvents. This patent discloses basic principles developed using bench top equipment and materials. However, among various other things, this patent fails to disclose processes and apparatuses for making composite materials at a commercial scale.

There are examples of natural fibers biopolymer solutions that are cast into molds to create a desired generally two-dimensional shape. In these cases, the biopolymer is fully dissolved so that the original structure is disrupted and biopolymers are denatured. By contrast, with fiber welding, the fiber interior (the core of each individual fiber) is intentionally left in its native state. This is advantageous because the final structure composed of biopolymers retains some of the original material properties for creating robust materials from biopolymers such as silk, cellulose, chitin, chitosan, other polysaccharides and combinations thereof.

Traditional methods of using biopolymer solutions are also disadvantaged in that there is a physical limit to how much polymer can be dissolved in solution. For example, solutions that are 10% by mass cotton (cellulose) with 90% by mass ionic liquid solvent are viscous and difficult to handle, even at elevated temperatures. The fiber welding process allows fiber bundles to be manipulated into the desired shape before welding commences. The use and handling of natural fibers often grants control over the engineering of the final product that is not possible for solution-based technologies.

BRIEF DESCRIPTION OF THE DRAWINGS

The accompanying drawings, which are incorporated in and constitute a part of this specification, illustrate embodiments and together with the description, serve to explain the principles of the methods and systems.

FIGS. 9I & 9J provide images of a welded substrate that may be considered a shell welded substrate.

FIG. 19A provides a depiction of a cross-section of a welded yarn substrate that may be produced via a welding process.

FIG. 19C provides a depiction of a cross-section of a welded yarn substrate that may be produced via another welding process.

DETAILED DESCRIPTION

Figure 1:
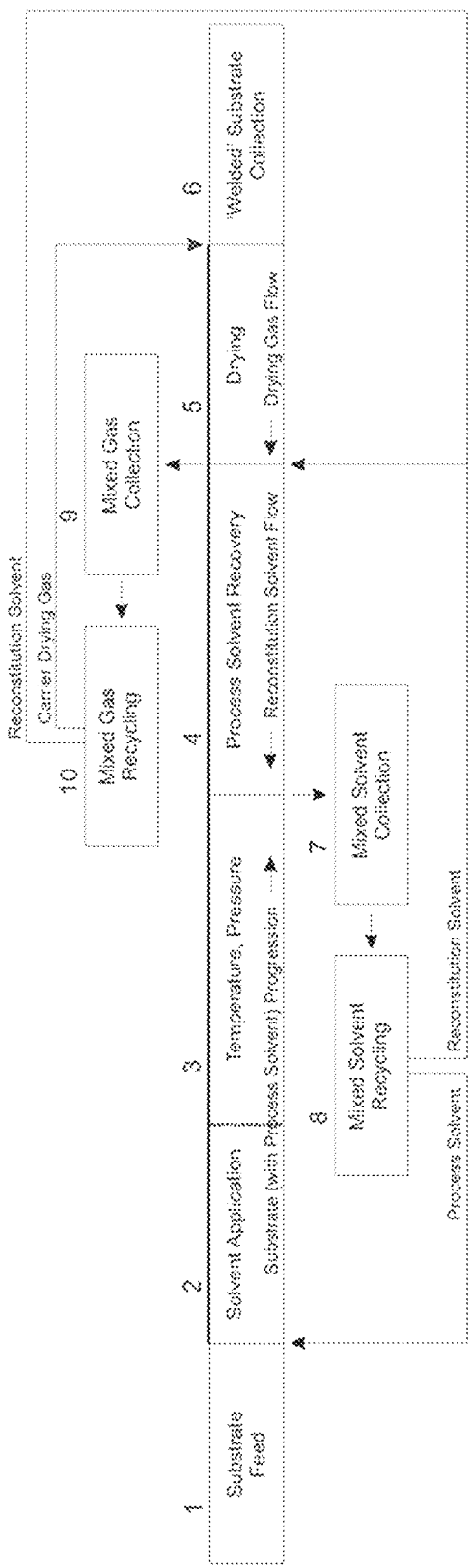
FIG. 1 provides a schematic view of various aspects of a process for producing welded substrates.

| | Element Number |
|---|---|
| Element Description (FIGS. 1 & 2) | |
| Substrate feed zone | 1 |
| Process solvent application zone | 2 |
| Process temperature/pressure zone | 3 |
| Process solvent recovery zone | 4 |
| Drying zone | 5 |
| Welded substrate collection zone | 6 |
| Solvent collection zone | 7 |

-continued

| | Element Number |
|---|---|
| Solvent recycling | 8 |
| Mixed gas collection | 9 |
| Mixed gas recycling | 10 |
| Element Description (FIGS. 3A-19C) | |
| Natural fiber substrate | 10 |
| Swollen natural fiber substrate | 11, 112 |
| Welded substrate | 12 |
| Functional material | 20 |
| Bonded functional material | 21 |
| Entrapped functional material | 22 |
| IL-based process solvent | 30 |
| Process solvent/functional material mixture | 32 |
| Welded fiber | 40, 42 |
| Polymer | 53 |
| Injector | 60 |
| Substrate input | 61 |
| Process solvent input | 62 |
| Application interface | 63 |
| Substrate outlet | 64 |
| Tray | 70 |
| Substrate groove | 72 |
| First plate | 82 |
| Second plate | 84 |
| Undyed yarn substrate | 90 |
| Undyed fiber substrate | 92 |
| Dyed yarn substrate | 90' |
| Dyed fiber substrate | 92' |
| Welded yarn substrate | 100 |
| Native substrate fiber | 102 |
| Lightly welded substrate fiber | 103 |
| Moderately welded substrate fiber | 104 |
| Highly welded substrate fiber | 105 |
| Binder | 106 |
| Binder shell | 108 |
| Pigment particle | 109 |

Before the present methods and apparatuses are disclosed and described, it is to be understood that the methods and apparatuses are not limited to specific methods, specific components, or to particular implementations. It is also to be understood that the terminology used herein is for the purpose of describing particular embodiments/aspects only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Aspect" when referring to a method, apparatus, and/or component thereof does not mean that limitation, functionality, component etc. referred to as an aspect is required, but rather that it is one part of a particular illustrative disclosure and not limiting to the scope of the method, apparatus, and/or component thereof unless so indicated in the following claims.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

It is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

1. Definitions

Throughout this disclosure, various terms may be used to describe certain components of process, apparatuses, and/or other components that may be used in conjunction with the present disclosure. For clarity, definitions of some of those terms are provided immediately below. However, when used to describe such components, these terms and the definitions thereof are not meant to be limiting in scope unless so indicated in the following claims, but instead are meant to be illustrative of one or more aspects of the present disclosure. Additionally, the inclusion of any term and/or definition thereof is not meant to require a manifestation of that component in any specific process or apparatus disclosed herein unless so indicated in the following claims.

A. Substrate Materials "Substrate" as used herein may include either a pure biomaterial (e.g., cotton yarn, etc.), a plurality of biomaterials (e.g., lignocellulosic fibers mixed with silk fibers), or a material containing a known amount of a biomaterial. In one aspect, a substrate may contain natural materials that contain at least one biopolymer component that is held together by hydrogen bonding (e.g., cellulose). In certain aspects, the term "substrate" may refer to synthetic materials, such as polyester, nylon, etc.; however, instances in which the term "substrate" refers to synthetic materials typically will be specifically noted throughout. The fusion or welding process may be performed in a way that limits the denaturation of at least one component of the substrate. For example, a limited amount of a process solvent may be added at moderate temperatures and pressures and for a controlled time to limit the denaturation of lignocellulosic fibers.

"Cellulosic-based substrate" may include cotton, pulp, and/or other refined cellulosic fiber and/or particles, etc.

"Lignocellulosic-based substrate" may include wood, hemp, corn stover, bean straw, grass, etc.

"Other sugar-based biopolymer substrates" may include chitin, chitosan, etc.

"Protein-based substrates" may include keratin (e.g., wool, hooves, horns, nails), silk, collagen, elastin, tissues, etc.

"Raw substrate" as used herein may include any substrate that has a not been subjected to any welding process.

B. Substrate Format Types

Substrate formats can be a variety of commercially available or customized products. 'Loose,' one-dimensional (1D), two-dimensional (2D), and/or three-dimensional (3D) substrates are all possible for use in various processes according to the present disclosure. Finished welded substrates or composites may be shaped in 1D, 2D, and/or 3D, respectively. The following definitions are applicable to both substrates and welded substrates (as defined further below).

"Loose" may include any natural fiber and/or particles or mixture of natural fibers and/or particles that is fed into the welding process in a loose, and/or relatively untangled format (e.g., mixtures of loose cotton with wood fibers and/or particles).

"1D" may include yarn and thread, both non-piled singled and piled yarns and threads.

"2D" may include paper substitute (e.g., cardboard alternatives, packaging paper, etc.), board substitute (e.g., alternatives to hardboard, plywood, OSB, MDF, dimensional lumber, etc.).

"3D" may include automotive parts, structural building components (e.g., extruded beams, joists, walls, etc.), furniture parts, toys, electronics cases and/or components, etc.

Generally, a resulting welded substrate or composite material may be composed of significant amounts of natural material (e.g., material produced by lifeforms and/or enzymes), wherein the natural material may be held together by the fusion or welding of the biopolymers of the natural materials rather than glues, resins, and/or other adhesives.

C. Process Solvent System

"Process solvent" may include a material capable of disrupting intermolecular forces of the substrate (e.g., hydrogen bonds), and includes materials that can swell, mobilize, and/or dissolve at least one biopolymer component within the substrate and/or otherwise disrupt the forces that may bind one biopolymer component to another.

"Pure process solvents" may include a process solvent without additional additives, and may include ionic liquids, 3-ethyl-1-methylimidizolium acetate, 3-butyl-1-methylimidizolium chloride, and other similar salts currently known or later developed that serve to disrupt intermolecular forces of a substrate.

"Deep eutectic process solvents" may include ionic solvents that incorporate one or more compound in a mixture form to give a eutectic with a melting point lower than one or more of the components that make up the mixture, and may further include a pure ionic liquid process solvent mixed with other ionic liquids and/or molecular species.

"Mixed organic process solvents" may include ionic liquids (e.g., 3-ethyl-1-methylimidizolium acetate) mixed with polar protic (e.g., methanol) and/or polar aprotic solvents (e.g., acetonitrile) as well as solutions containing 4-methylmorpholine 4-oxide (also known as N-methylmorpholine N-oxide, NMMO).

"Mixed inorganic process solvents" may include aqueous salt solutions (e.g., aqueous solutions of LiOH and/or NAOH that may be mixed with urea or other molecular additives, aqueous guanidinium chloride, LiCl in N, N-dimethylacetamide (DMAc), etc.).

In an aspect, process solvents may contain additional functional materials such as a relatively small amount (e.g., less than 10% by mass) fully solubilized natural polymer(s) (e.g., cellulose), but may also contain selected synthetic polymers (e.g. meta-aramid), as well as other functional materials.

D. Functional Material

"Functional material" may include natural or synthetic inorganic materials (e.g., magnetic or conductive materials, magnetic microparticles, catalysts, etc.), natural or synthetic organic materials (e.g., carbon, dyes (including but not limited to florescent and phosphorescent), enzymes, catalysts, polymer, etc.), and/or devices (e.g., RFID tags, MEMS devices, integrated circuits) that may add features, functionality, and/or benefits to a substrate. Additionally, functional materials may be placed in substrates and/or process solvents.

E. Process Wetted Substrate

"Process wetted substrate" may refer to a substrate of any combination of format and type that is wetted with a process solvent applied to all or a part of the substrate. Accordingly, a process wetted substrate may contain some partially dissolved, mobilized natural polymer.

F. Reconstitution Solvent System

"Reconstitution solvent" may include a liquid that has a non-zero vapor pressure and may be capable of forming mixtures with ions from the process solvent system. In an aspect, one characteristic of a reconstitution solvent system may be that it is not be capable of dissolving natural materials substrates on its own. Generally, the reconstitution solvent may be used to separate and remove process solvent ions from substrates. That is to say, in one aspect reconstitution solvent removes process solvent from a process wetted substrate. In so doing, the process wetted substrate may be transformed to a reconstituted wetted substrate as defined below.

Reconstitution solvents may include polar protic solvents (e.g., water, alcohols, etc.) and/or polar aprotic solvents (e.g., acetone, acetonitrile, ethyl acetate, etc.). Reconstitution solvents may be mixtures of molecular components and may include ionic components. In an aspect, a reconstitution solvent may be used to help control the distribution of functional materials within a substrate. A reconstitution solvent may be configured to be chemically similar to or substantially chemically identical to a molecular additive in a process solvent system.

In an aspect, a (pure) reconstitution solvent may be mixed with ionic components to form a process solvent. A reconstitution solvent may be configured to be chemically similar to or substantially chemically identical to a molecular additive in a process solvent system. For example, acetonitrile is a polar aprotic molecular liquid with a non-zero vapor pressure that is not capable of dissolving cellulose when pure. Acetonitrile may be mixed with a sufficient amount of 3-ethyl-1-methylimidizolium acetate to form a solution that is capable of disrupting hydrogen bonding, and acetonitrile may be used as the reconstitution solvent. Mixtures that contain the sufficient concentration (ionic strength) of the appropriate ions are thus able to serve as a process solvent. Within the present disclosure, any mixtures of 3-ethyl-1-methylimidizolium acetate in acetonitrile that do not contain sufficient ionic strength to dissolve or mobilize polymer of a natural substrate are considered to be a reconstitution solvent.

G. Reconstituted Wetted Substrate

"Reconstituted wetted substrate" may refer a process wetted substrate of any combination of format and type that is wetted with the reconstitution solvent applied to all or part of the process wetted substrate. Generally, a reconstitution wetted substrate does not contain partially dissolved, mobilized natural polymer, which may be due to the removal of the process solvent via the application of the reconstitution solvent.

H. Drying Gas Systems

"Drying gas" may include a material that is a gas at room temperature and atmospheric pressure, but may be a supercritical fluid. In an aspect, the drying gas may be capable of mixing with and carrying the non-zero vapor pressure components (e.g., all or a portion of the reconstitution solvent) from both a process wetted substrate and/or a reconstituted wetted substrate. Drying gas may be pure gases (e.g., nitrogen, argon, etc.) or mixtures of gases (e.g., air).

I. Welded Substrate

"Welded substrate" may be used to refer to a finished composite comprised of at least one natural substrate in which one or more individual fibers and/or particles have been fused or welded together via a process solvent acting upon biopolymers from either those fibers and/or particles and/or action upon another natural material within the substrate. Generally, welded substrates may include "finished composites" and/or "fiber-matrix composites." Specifically, "fiber-matrix composite" may be used to refer to a welded substrate having a natural substrate acting as both the fiber and the matrix of the welded substrate.

J. Welding

"Welding" as used herein may refer to joining and/or fusion of materials by intimate intermolecular association of polymer.

K. Biopolymer

"Biopolymer" as used herein refers to naturally occurring polymer (produced by life processes) as opposed to all polymers that may be synthetically derived from naturally occurring materials.

2. General Welding Processes

The present disclosure provides various processes and/or apparatuses for converting biopolymer containing fibrous and/or particulate substrate into welded substrates (one example of which is a composite material), and also discloses various products that may be manufactured from the welded substrate(s). Generally, the process steps and/or combination of process steps for converting biopolymer containing fibrous and/or particulate substrate into welded substrates may be referred to herein as the "welding process" without limitation unless so indicated in the following claims. In one aspect of a process, a process solvent may be applied to one or more substrates containing natural materials. In an aspect, the process solvent may disrupt one or more intermolecular force (which intermolecular force may include but is not limited to hydrogen bonding) within at least one component of the substrate(s) containing natural material(s).

Upon removal of a portion of the process solvent (which may be accomplished with a reconstitution solvent as described in further detail below), the fibers and/or particles within the substrate(s) may become fused or welded together, which may result in a welded substrate. Through testing it has been determined that the welded substrate may have enhanced physical properties (e.g., enhanced tensile strength) over the original substrate(s) (prior to being subjected to processing). The welded substrate may also be imparted with enhanced chemical properties (e.g., hydrophobicity) or other features/functionality because of either the parameters selected for the welding process itself or the inclusion of functional materials to the substrate(s) before or during the welding process that converts the substrate(s) into a welded substrate.

The various processes and/or apparatuses disclosed herein may be generalized such that the process and/or apparatuses may be configured for use with any number of process solvents and/or substrates (including process solvents and/or substrates that are either known in academic or patent literature as capable of fully dissolving the biopolymers of natural materials or those later developed). In an aspect of the present disclosure, the welding process may be configured such that biopolymer-containing substrate(s) are not fully dissolved in the treatment process. In another aspect, robust composite materials of various compositions and shapes may be produced without glue and/or resin (even in processes configured to not fully dissolve a biopolymer-containing substrate).

Generally, the welding process and/or apparatuses may be configured to carefully and intentionally control the amount of process solvent, the temperature, pressure, duration of process solvent exposure to natural materials, and/or other parameters without limitation unless so indicated in the following claims. Additionally, the means by which a process solvent, reconstitution solvent, and/or drying gas can be recycled efficiently for reuse may be optimized for commercialization. As such, disclosed herein is a collection of innovative concepts and features that are not obvious based on prior art. Given that natural materials are generally abundant, inexpensive, and can be produced sustainably, the processes and apparatuses disclosed herein may be the archetype for a transformative and sustainable means to manufacture trillions of dollars per year worth of materials. This technology may allow humankind to move forward in a way that is not restricted by limiting resources such as petroleum and petroleum-containing materials. In an aspect, the present disclosure may achieve this result using novel and non-obvious processes and/or apparatuses configured for use with substrates, process solvents, and/or reconstitution not disclosed in the prior art, which may result in various novel and non-obvious end products.

A. Substrate Feed Zone

Referring now to the figures, wherein like reference numerals designate identical or corresponding parts throughout the several views, FIG. 1 provides schematic depiction showing various aspects of one welding process that may be configured to produce a welded substrate. This general welding process may be modified and/or optimized based on at least a specific substrate, specific process solvent system, specific welded substrate to be produced, functional materials utilized, and/or combinations thereof. The welding process schematically depicted in FIG. 1 is not meant to be limiting, and is for illustrative purposes only unless so indicated in the following claims. Additional details for certain aspects of a welding process for producing welded substrates (e.g., specific equipment, processing parameters, process solvent systems, etc.) are provided further below, and the immediately following example of a welding process is intended to provide an overarching framework highlighting certain aspects of the present disclosure that may be applicable to a wide range of substrates, process solvent system, reconstitution solvent systems, welded substrates, functional materials, substrate formats, welded substrate formats, and/or combinations thereof.

Generally, a welding process may be configured such that a substrate feed zone 1 comprises a portion of the welding process at which a substrate format(s) may be controllably fed to (enter) the welding process and/or apparatuses associated therewith. The substrate feed zone 1 may include equipment that creates a particular substrate format(s) from a particular substrate material or mixture of substrate materials. Alternatively, the substrate feed may be configured to deliver rolls of premade substrate formats. Substrates may be pushed or pulled through the substrate feed zone 1. Substrate may ride a powered conveyor system. Substrates may be fed through the substrate feed zone 1 by an extrusion-type screw. Accordingly, the scope of the present disclosure is not limited by whether, and/or how the substrate moves in the substrate feed zone 1, and/or whether the substrate remains stationary and the equipment and/or other components of the welding process move with respect to the substrate unless so indicated in the following claims.

Substrates may contain additional functional materials that may be added to the substrate within the substrate feed zone 1. Equipment and instrumentation may be utilized to monitor and control at least the temperature, pressure, composition, and/or feed rate of materials within the substrate feed zone 1. Generally, the substrate or multiple substrates may move from the substrate feed zone 1 to the process solvent application zone 2.

In an aspect of a welding process according to the present disclosure configured for use with certain 1D substrates (e.g., yarn and/or similar substrates), it may be advantageous to include an apparatus that applies a stress to the substrate before it enters the welding process. By applying a predetermined stress to the substrate in advance of entering the fiber welding process, weak sections of the substrate may be broken and exposed. The apparatus may also be configured with a mechanism that ties a knot to reestablish a continuous substrate. The net result is that a welding process so configured may locate and fix weak sections of substrate so as to limit down time. This apparatus may be a standalone machine to improve certain substrates long in advance of performing welding processes. Alternatively, this apparatus can be integrated directly into the substrate feed zone 1.

B. Process Solvent Application

In a process solvent application zone 2, one or more process solvents may be applied to a substrate(s) by immersion, wicking, painting, inkjet printing, spraying, etc. or by any combination thereof as the substrate moves through the process solvent application zone 2. Process solvent may include functional materials and/or molecular additives, both of which are described in further detail below.

In an aspect, a process solvent application zone 2 may be configured with additional equipment that adds functional material(s) to the substrate separately from the process solvent. Equipment and instrumentation may be utilized to monitor and control at least the temperature and/or pressure of process solvent, the substrate, and/or the atmosphere during process solvent application. Equipment and instrumentation that monitors and controls the composition, amount, and/or rate of process solvent applied may be utilized. Process solvent may be applied to specific locations or to the entire substrate depending on the method of process solvent application.

In aspects of a welding process for producing a welded substrate using extrusion, a die may terminate the process solvent application zone 2. A welding process so configured may also include equipment that forms a 1D, 2D, or 3D shape from loose substrate to which process solvent has been applied as the substrate moves through the process solvent application zone 2. Generally, the optimal configuration of a solvent application zone 2 may be dependent at least upon the substrate format, choice of process solvent and/or process solvent system, and apparatuses used to apply the process solvent. These parameters may be configured to achieve a desired amount of viscous drag. "Viscous drag" as used herein denotes the balance between process solvent and/or process solvent system viscosity and mechanical (e.g., pressure, frictions, shear, etc.) forces that apply the process solvent and/or process solvent system into the substrate. In some cases, the optimal viscous drag is configured to result in a welded substrate having consistent properties throughout, and in other cases the optimal viscous drag is configured to result in a modulated welded substrate as discussed in further detail below.

In an aspect of a welding process according to the present disclosure configured for use with certain 1D substrates (e.g., yarn and/or similar substrates), it may be advantageous to employ a properly sized, needle-like orifice that may be designed to properly apply process solvent (and thereby affect the viscous drag) to the substrate to produce the desired properties of a welded substrate. Process solvent may be controllably metered into the device while substrate simultaneously may be moved through the orifice. At least the temperature, flow rate and flow characteristics of process solvent, and/or substrate feed rate may be monitored and/or controlled to impart desired properties in the finished welded substrate. The orifice size, shape, and configuration (e.g., diameter, length, slope, etc.) may be designed to limit or add to the stress to the substrate as process solvent is applied thereto as discussed in further detail below regarding FIGS. 6A-6C. This design consideration may be particularly important for fine yarns or yarns that have not been combed to remove short fiber.

The specific configuration of the process solvent application zone 2 may be dependent at least on the specific chemistry used for the process solvent and/or process solvent system. For example, some process solvents and/or process solvent systems are efficacious to swell and mobilize biopolymers at relatively cold temperatures (i.e., LiOH-urea at approximately −5° C. or below) others (i.e., ionic liquids, NMMO, etc.) are efficacious at relatively high temperatures. Certain ionic liquids become efficacious above 50 C while NMMO may require temperatures greater than 90 C. Additionally, the viscosity of many process solvents and/or process solvent systems may be a function of temperature, such that the optimal configuration of various aspects of a process solvent application zone 2 (or other aspects of welding process) may be dependent on the temperature of the process solvent application zone 2, process solvent itself, and/or process solvent system. That is, when a specific process solvent and/or process solvent system is efficacious at a low temperature and is also relatively viscous at that low temperature, the equipment used to apply the process solvent and/or process solvent system to the substrate must be designed to accommodate those temperatures and viscosity. Within the efficacious temperature range of a given process solvent and/or process solvent system, further refinement of the temperature within that range, chemistry (e.g., addition and/or ratio of co-solvents, etc.) of the process solvent and/or process solvent system, configuration of apparatuses associated with the process solvent application zone 2, etc. may be made to result in the appropriate amount of viscous drag which appropriately applies process solvent to the substrate in way that results in a wetted substrate having the desired properties for remaining steps in the welding process. However, the specific operating temperature in the process solvent application zone 2 in no way limits the scope of the present disclosure unless so indicated in the following claims.

C. Process Temperature/Pressure Zone

Upon the application of process solvent to substrate, the wetted substrate may enter a welding process zone of at least controlled temperature, pressure, and/or atmosphere (composition) for a controlled amount of time. Equipment and instrumentation may be utilized to monitor, modulate, and/or control at least the temperature, pressure, composition, and/or feed rate of process wetted substrate within the substrate feed zone 1. In particular, temperature may be controlled and/or modulated by utilizing chillers, convective ovens, microwave, infrared, or any number of other suitable methods or apparatuses.

In one aspect, the process solvent application zone 2 may be discrete from the process temperature/pressure zone 2. However, in another aspect according to the present disclosure, the welding process may be configured such that these two zones 2, 3 into one contiguous segment. For example, a welding process configured such that a substrate may be immersed in and moving through a process solvent bath for a particular time and under controlled temperature and pressure conditions would combine the process solvent application zone 2 and the process temperature/pressure zone 3. Generally, the process solvent application zone 2 and process temperature/pressure zone 3 together may be considered a welding zone.

In aspects of a welding process according to the present disclosure where extrusion is performed, a die may be included within or at the end of the process temperature/pressure zone 3. Other aspects of a welding process according to the present disclosure may also include equipment that forms a 1D, 2D, or 3D shape from loose substrate to which process solvent has been applied and which has moved through the process temperature/pressure zone 3.

D. Process Solvent Recovery Zone

Process solvents may be separated from the substrate within the process solvent recovery zone 4. In an aspect, a process solvent may contain salt that has little or no vapor pressure. To remove process solvent (at least a portion of which process solvent may be comprised of ions) from the substrate, a reconstitution solvent may be introduced. Upon application of a reconstitution solvent to the process wetted substrate, process solvent may move out of the substrate and into the reconstitution solvent. Although not required, in some aspects the reconstitution solvent may flow in a direction opposite to the movement of substrate so that the minimal amount of reconstitution solvent is required to recover process solvent using minimal time, space, and energy where applicable.

In an aspect of a welding process configured according to the present disclosure, the process solvent recovery zone 4 may also be a bath, a series of baths, or series of segments where reconstitution solvent flows opposed or across the process wetted substrate. Equipment and instrumentation may be utilized to monitor and control at least the temperature, pressure, composition, and/or flow rate of reconstitution solvent within the process solvent recovery zone 4. Upon exiting this zone 4, the substrate may be wetted with the reconstitution solvent.

In an aspect, it may be optimal to configure a process solvent system with an ionic liquid process solvent in combination with a molecular additive and to configure the reconstitution solvent such that it is chemically similar to or chemically identical to the molecular additive. For process solvents comprised of ionic liquids, it may be beneficial to select a molecular additive comprised having a relatively low boiling point but a relatively high vapor pressure. Additionally, it may be beneficial for such molecular additives to be generally polar aprotic (as polar protic solvents generally may be more difficult to separate from ionic liquids and also tend to decrease the efficacy of ionic liquid-containing solvent systems), such as, but not limited to unless indicated in the following claims, acetonitrile, acetone, and ethyl acetate. For process solvents comprised of aqueous hydroxides (e.g., LiOH), it may be advantageous to select a reconstitution solvent that is comprised of water, which is polar protic. Configuring a welding process with a molecular additive that is chemically similar to or chemically identical to the reconstitution solvent may be beneficial to the economics of the welding process as it may simply the equipment and/or energy and/or time required for at least the process solvent recovery zone 4, solvent collection zone 7, and solvent recycling 8. Additionally, as you raise the temperature of the reconstitution solvent and/or process solvent recovery zone 4, the time required for reconstitution may be greatly reduced, which may result in smaller overall length of the welding process and associated equipment, which may in turn reduce the complexity and/or variation in substrate tension and ability to control volume consolidation (as explained in further detail below).

Alternatively, a welding process may be configured with a reconstitution solvent makeup and temperature that yields a welded substrate having specific attributes. For example, in one welding process utilizing a process solvent comprised of EMIm OAc and a reconstitution solvent comprised of water, the temperature of the water may affect the attributes of the welded yarn substrate as described in further detail below.

E. Drying Zone

Reconstitution solvent may be separated from the substrate within the drying zone 5. That is, the reconstituted wetted substrate may be converted into a finished (dried) welded substrate in the drying zone 5. Although not required, in one aspect, the drying gas may flow in a direction opposite to the movement of the reconstituted wetted substrate so that the minimal amount of drying gas may be required while drying the reconstituted wetted substrate via removal of the reconstitution solvent using minimal time, space, and/or energy where applicable. Equipment and instrumentation may be utilized to monitor and control at least the temperature, pressure, composition, and/or flow rate of gas within the drying zone 5.

The drying zone 5 may be configured such that during the drying process step, "controlled volume consolidation" is observed in the substrate, process wetted substrate, reconstituted substrate, and/or welded substrate. "Controlled volume consolidation" as used herein denotes the particular way in which the finished welded substrate shrinks in volume and/or conforms to a specific form factor upon drying and/or reconstitution. For example, in one dimensional substrates such as a yarn, controlled volume consolidation can happen either as the diameter of the yarn is reduced and/or as the length of the yarn is reduced.

Controlled volume consolidation can be limited in one or multiple directions/dimensions by appropriately constraining at least the reconstituted wetted substrate during the drying process. Moreover, the amount and type of process and/or reconstitution solvent utilized, the method of process and/or reconstitution solvent application (including degree and type of viscous drag, etc.) can affect the degree to which a reconstituted wetted substrate will attempt to shrink upon drying. For example, in a 1D substrate (e.g., yarn, thread), controlled volume consolidation can be limited to only reduction of the diameter by configuring the draying zone 5 such that the substrate is subjected to an appropriate amount of tension during one or more steps of the welding process (particularly the process solvent recovery zone 4, drying zone 5, and/or welded substrate collection zone 6). In similar manner, in the example of a two-dimensional, sheet-type substrate, proper tension and pinning of the substrate at one or more steps of the welding process (particularly the process solvent recovery zone 4, drying zone 5, and/or welded substrate collection zone 6) can constrain the controlled volume consolidation to only effect substrate thickness and not change the area (length and/or width) of the substrate. Alternatively, the sheet-type substrate may be allowed to undergo controlled volume reduction in one or more dimensional directions.

Controlled volume consolidation may be facilitated and/or limited by specialized equipment in the drying zone 5 that holds the reconstituted wetted substrate as it dries in order to control the directionality by which the substrate shrinks or to force the finished welded substrate to physically comply with a particular shape or form. For example, a series of rollers that prevent a cardboard-substitute type product from shrinking along the length or width of the roll, but that allow the material to contract in thickness. Another example is a mold onto which a reconstituted wetted substrate may be pressed so that it may take on and hold a particular 3D shape as it dries.

In one aspect of a welding process according to the present disclosure, the drying zone 5 may be configured such that the reconstituted wetted substrate may experience a pressure less than ambient pressure, and may be exposed to a relatively low amount of drying gas. In such a configuration, reconstituted wetted substrate may be freeze dried. This type of drying may be advantageous for preventing or minimizing the amount of shrinkage that occurs as the reconstitution solvent sublimes.

In an aspect of a welding process according to the present disclosure wherein the reconstitution solvent employed is benign (e.g., water), then the drying zone 5 may be omitted such that the reconstituted wetted substrate may move straight to collection. For example, reconstituted wetted substrate configured as yarn might be rolled up on a collection reel and then air dried after and/or during collection.

F. Welded Substrate Collection Zone

The welded substrate collection zone 6 may be the portion of the welding process where welded substrates (e.g., finished composites) are collected. In certain aspects of the present disclosure, the welded substrate collection zone 6 may be configured as a roll of materials (e.g., a coil of yarn, cardboard-substitute, etc.). The welded substrate collection zone 6 may employ saws or stamps that cut sheets and/or shapes from, for example, welded substrate configured as a composite extrusion. In an aspect, automated stacking equipment may be utilized to package bundles of finished composites. Additionally, in the example of a 1D welded substrate that is wound and packaged, the method of winding and packaging may be configured to affect one or more variables affecting the viscous drag of the welding process.

In an aspect of a welding process according to the present disclosure configured for use with certain 1D substrates (e.g., yarn and/or similar substrates), it may be advantageous to employ an apparatus that may roll the welded substrate into a coil over a cylindrical or tube-like structure either immediately after the process solvent application zone 2 or immediately after the process temperature/pressure zone. The apparatus may be used to produce a three-dimensional, tube-like structure from a one-dimensional substrate prior to the substrate entering the process solvent recovery zone 4. In so doing, the substrate may conform to the new tube-like shape. It is contemplated that such an apparatus may be especially useful when employed in a welding process configured at least in part to produce functional composite materials from yarn substrates that contain functional materials (e.g., catalysts embedded within yarns) without limitation unless so indicated in the following claims.

In another aspect of a welding process according to the present disclosure configured for use with certain 1D substrates (e.g., yarn and/or similar substrates), it may be advantageous to employ an apparatus that may knit or weave the substrate immediately after the process solvent application zone 2 or immediately after the process temperature/pressure zone 3. The apparatus may be configured to produce a fabric structure from the substrate prior to entering the process solvent recovery zone 4. Such an apparatus may be configured such that the welding process may produce 2D fabrics with unique properties that cannot be achieved through other means of manufacturing.

In yet another aspect of a welding process according to the present disclosure configured for use with certain 1D substrates (e.g., yarn and/or similar substrates), it may be advantageous to employ an apparatus that may produce a coiled package of yarn (e.g., a traverse cam). Such an apparatus may be configured to roll welded substrate into coil-like packages that may be unwound at a later time without becoming entangled.

G. Solvent Collection Zone

As described above, process solvent may be washed from the process wetted substrate by the reconstitution solvent within the process solvent recovery zone 4. Accordingly, in one aspect the reconstitution solvent may mix with various portions of the process solvent (e.g., ions and/or any molecular constituents, etc.). This mixture (or relatively pure process solvent or reconstitution solvent) may be collected at an appropriate point within the solvent collection zone 7. In one aspect, the collection point may be positioned near the entry point of the process wetted substrate. Such a configuration may be especially useful for configurations utilizing counter flow of reconstitution solvent with respect to process wetted substrate due to the concentration of process solvent constituents within the process wetted substrate being lowest at a point wherein the concentration thereof in the reconstitution solvent is lowest. This configuration may result in less reconstitution solvent usage as well as ease separating and recycling the process and reconstitution solvents.

In the solvent collection zone 7, various equipment and instrumentation may be utilized to monitor and control at least the temperature, pressure, composition, and flow rate of reconstitution solvent, process wetted substrate, and/or reconstitution wetted substrate.

H. Solvent Recycling

In an aspect, a welding process according to the present disclosure may be configured to collect the mixed solvent (e.g., part reconstitution solvent and part process solvent), relatively pure process solvent, and/or relatively pure reconstitution solvent may be collected and recycled. Various equipment and/or methods may be used to separate, purify, and/or recycle reconstitution solvent and process solvent.

Any know method(s) and/or apparatus(es) or those later developed may be used to separate the reconstitution solvent and the process solvent, and the optimal equipment for such separation will depend at least on the chemical compositions of the two solvents. Accordingly, the scope of the present disclosure is in no way limited by the specific apparatus(es) and/or method(s) used to separate the reconstitution solvent and process solvent, which apparatuses and/or methods may include but are not limited to simple distillation of a co-solvent and/or ionic liquid (e.g., the method disclosed in U.S. Pat. No. 8,382,926), fractional distillation, membrane-based separations (such as pervaporation and electrochemical cross-flow separation), and supercritical $CO_2$ phase. After the reconstitution solvent and process solvent have been adequately separated, the respective solvents may be recycled to the appropriate zone within the process.

I. Mixed Gas Collection

As previously described above, reconstitution solvent engaged with the reconstituted wetted substrate may be removed therefrom in the drying zone 5. In an aspect, either mixed gas comprised of a carrier drying gas with a portion of reconstitution solvent gas therein or reconstitution solvent gas may be collected from the drying zone 5. Equipment and/or instrumentation may be used to monitor and control at least the temperature, pressure, composition, and flow rate of gases collected.

J. Mixed Gas Recycling

As gas(es) are collected, they may be sent to equipment that separates and recycles either the carrier drying gas, reconstitution solvent, or both. In one aspect, this equipment may be a single or multiple stage condenser technology. Separation and recycling may also include gas permeable membranes and other technologies without limitation unless so indicated in the following claims. Depending on the choice of carrier gas, it may be vented to the atmosphere or returned to the drying zone 5. Depending on the choice of reconstitution solvent it may be either disposed of, or recycled to the process solvent recovery zone 4.

Generally, a welding process configured according to aspects of the preceding description may be configured to convert a natural fiber and/or particle containing substrate into a finished, welded substrate in a continuous and/or batch welding process utilizing a substrate feed zone 1, process solvent application zone 2, process temperature/pressure zone 3, process solvent recovery zone 4, drying zone 5, and welded substrate collection zone 6. In certain aspects, it may be critical to monitor and control the amount, composition, time, temperature, and pressure of the process solvent relative to the substrate.

Figure 2:
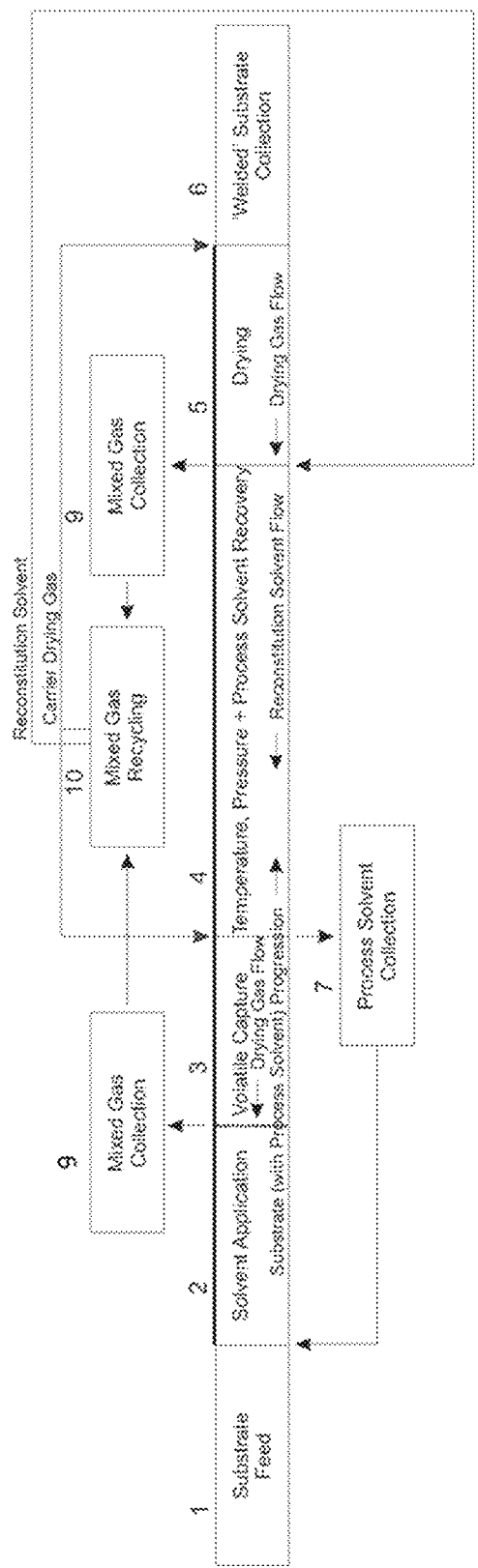
FIG. 2 provides a schematic view of various aspects of another process for producing welded substrates.

3. Welding Process Examples (FIGS. 1 & 2)

Referring to FIG. 1, a substrate may move with a controlled rate by any suitable method and/or apparatus (e.g., pushing, pulling, conveyor system, screw extrusion system etc.). In an aspect, a substrate may move through the substrate feed zone 1, process solvent application zone 2, process temperature/pressure zone 3, process solvent recovery zone 4, drying zone 5, and/or welded substrate collection zone 6 in a continuous fashion. However, the specific order in which a substrate passes from one zone 1, 2, 3, 4, 5, 6 to another may vary from one welding process to the next, and as mentioned previously in some aspects of a welding process according to the present disclosure a substrate may move through a welded substrate collection zone 6 prior to moving to a drying zone 5. Additionally, in some aspects the substrate may remain relatively stationary while solvents and/or other welding process components and/or apparatuses move. At any point in a welding process configured according to the present disclosure automation, instrumentation, and/or equipment may be employed to monitor, control, report, manipulate, and/or otherwise interact with one or more component of the welding process and/or equipment thereof. Such automation, instrumentation, and/or equipment includes but is not limited to (unless otherwise indicated in the following claims) those that may monitor and control forces (e.g., tension) exerted on the substrate, process wetted substrate, reconstituted substrate, and/or the finished welded substrate. Generally, the various process parameters and apparatuses employed for a welding process may be configured to control the amount of viscous drag for the desired process solvent application. The various process parameters and apparatuses employed for a welding process may be configured to perform controlled volume consolidation to yield a welded substrate having the desired attributes, form factor, etc.

Still referring to FIG. 1, in an aspect of a welding process depicted therein, a process solvent loop may be defined as process solvent application zone 2, process temperature/pressure zone 3, process solvent recovery zone 4, solvent collection zone 7, and solvent recycling 8, after which the process solvent may again move to the process solvent application zone 2.

In another aspect of a welding process depicted in FIG. 1, a reconstitution solvent loop may be defined as two separate loops—one for reconstitution solvent in the liquid state and another for reconstitution solvent in a gaseous state. The liquid reconstitution solvent loop may be comprised of the recovery zone 4, solvent collection zone 7, and solvent recycling 8, after which the reconstitution solvent may again move to the process solvent recovery zone 4. The gaseous reconstitution solvent loop may be comprised of the process solvent recovery zone 4, drying zone 5, mixed gas collection 9, and mixed gas recycling 10, after which the reconstitution solvent may again move to the process solvent recovery zone 4. In an aspect of a gaseous reconstitution solvent loop, a portion of the reconstitution solvent may be carried into the drying zone 5 by the reconstituted wetted substrate.

In a welding process according to the present disclosure wherein a carrier gas is used, the carrier gas may be recycled in a loop comprised of drying zone 5, mixed gas collection 9, and mixed gas recycling 10, after which the drying gas may again move to the drying zone 5.

For commercialization, recycling process solvent, reconstitution solvent, carrier gas, and/or other welding process components may be critical. Further, any loop for a process solvent, reconstitution solvent, carrier gas, and/or other welding process component may include a buffer tank, storage vessel, and/or the like without limitation unless so indicated in the following claims. As described in further detail below, the specific choice of substrate, process solvent, reconstitution solvent, drying gas, and/or desired finished welded substrate may greatly impact at least the optimal welding process steps, order thereof, welding process parameters, and/or equipment to be used therewith.

In light of the foregoing description, it will be apparent that a welding process according to the present disclosure may be separated into discrete processing steps. For example, one welding process may be configured in the order of substrate feed zone 1, process solvent application zone 2, process temperature/pressure zone 3, and welded substrate collection zone 6, followed by storing or aging the process wetted substrate for some time and then at a later time performing the functions of the process solvent recovery zone 4 and/or drying zone 5. Again, in certain aspects one or more processing steps may be omitted (e.g., the drying zone 5 when water is used as the reconstitution solvent). Furthermore, in certain aspects of a welding process according to the present disclosure, some processing steps may occur simultaneously, or the end of one processing step may naturally flow into the beginning of another processing step as described in further detail below.

Figure 2A:
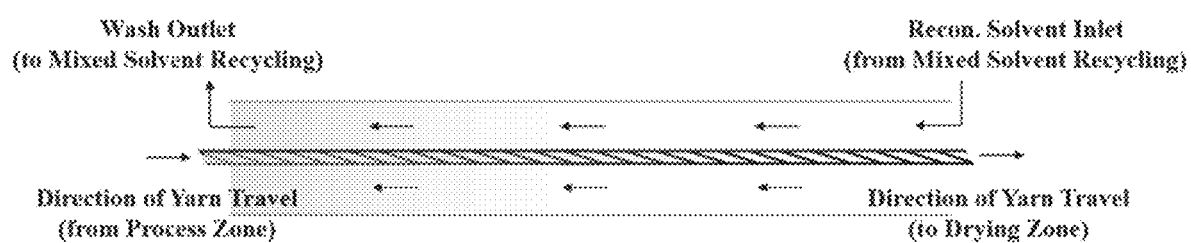
FIG. 2A provides a schematic view of one type of process solvent recovery zone that may be used with a welding process.

Referring now to FIG. 2, which provides a schematic depiction showing various aspects of another welding process that may be configured to produce a welded substrate, the welding process depicted therein is similar to that depicted in FIG. 1, but in FIG. 2 the process temperature/pressure zone 3 and process solvent recovery zone 4 may be blended into one contiguous welding process step rather than constitute discrete welding process steps. Additionally, the welding process depicted in FIG. 2 may employ two mixed gas collection zones 9 and the solvent collection zone 7 may primarily collect process solvent such that the solvent recycling may be primarily adapted for process solvent (as opposed to a mixture of process solvent and reconstitution solvent). It is contemplated that such a configuration may provide certain advantages related to equipment simplification and/or consolidation. In various welding processes according to the present disclosure, a process solvent recovery zone 4 may be configured such that the reconstitution solvent and process wetted substrate move opposite with respect to one another as depicted schematically in FIG. 2A.

In an aspect of a welding process configured according to FIG. 2, the welding process may be adapted for use wherein the reconstitution solvent is a component of the process solvent (e.g., a process solvent comprised of a mixture of 3-ethyl-1-methylimidizolium acetate with acetonitrile and a reconstitution solvent of acetonitrile). In such a configuration, some advantages of which are described in further detail below, a portion of the volatile acetonitrile could be captured and separated from the process solvent at any point in the welding process at which process solvent is present via any suitable method and/or apparatus including but not limited to a controlled low pressure environment, carrier gas, and/or combinations thereof without limitation unless so indicated in the following claims. Generally, 3-ethyl-1-methylimidizolium acetate in sufficient concentration may disrupt intermolecular forces in certain substrates (e.g., the hydrogen bonding in cellulose). Accordingly, the combination of the process temperature/pressure zone 3 and process solvent recovery zone 4 may constitute a general welding process zone at any location therein where the mole ratio of 3-ethyl-1-methylimidizolium acetate to acetonitrile is appropriate to cause the desired characteristics of disruption of intermolecular forces in the substrate. This general welding process zone may also constitute all or a portion of a reconstitution and recycling zone if proper flow rates, temperatures, pressures, other welding process parameters, etc. are properly designed and/or controlled.

Still referring to FIG. 2, the substrate may again move through a welding process with a controlled rate using any suitable method and/or apparatus (e.g., pushing, pulling, conveyor system, screw extrusion system, etc.) without limitation unless so indicated in the following claims. In an aspect, the substrate may move through the substrate feed zone 1, process solvent application zone 2, a combination of a process temperature/pressure zone 3 and a process solvent recovery zone 4, drying zone 5, and/or welded substrate collection zone 6 in a continuous fashion. However, the specific order in which a substrate passes from one zone 1, 2, 3, 4, 5, 6 to another may vary from one welding process to the next, and as mentioned previously in some aspects of a welding process according to the present disclosure a substrate may move through a welded substrate collection zone 6 prior to moving to a drying zone 5. Additionally, in some aspects the substrate may remain relatively stationary while solvents and/or other welding process components and/or apparatuses move. At any point in a welding process configured according to the present disclosure automation, instrumentation, and/or equipment may be employed to monitor, control, report, manipulate, and/or otherwise interact with one or more component of the welding process and/or equipment thereof. Such automation, instrumentation, and/or equipment includes but is not limited to (unless otherwise indicated in the following claims) those that may monitor and control forces (e.g., tension) exerted on the substrate, process wetted substrate, reconstituted substrate, and/or the finished welded substrate.

Still referring to FIG. 2, in an aspect of a welding process depicted therein, a process solvent loop may be defined as process solvent application zone 2, a combination of a process temperature/pressure zone 3 and a process solvent recovery zone 4, (process) solvent collection zone 7, after which the process solvent may again move to the process solvent application zone 2.

In another aspect of a welding process depicted in FIG. 2, a reconstitution solvent loop may be defined as two separate loops—one for reconstitution solvent in the liquid state and another for process solvent in a gaseous state. The liquid reconstitution solvent loop may be comprised of a combination of a process temperature/pressure zone 3 and a process solvent recovery zone 4, and one or more mixed gas collection zones, and after which the reconstitution solvent may again move to the combination of a process temperature/pressure zone 3 and a process solvent recovery zone 4. The gaseous reconstitution solvent loop may be comprised of the drying zone 5, at least one mixed gas collection 9, and mixed gas recycling 10, after which the reconstitution solvent may again move to the combination of a process temperature/pressure zone 3 and a process solvent recovery zone 4. In an aspect of a gaseous reconstitution solvent loop, a portion of the reconstitution solvent may be carried into the drying zone 5 by the reconstituted wetted substrate.

In a welding process according to the present disclosure wherein a carrier gas is used, the carrier gas may be recycled in a loop comprised of drying zone 5, at least one mixed gas collection 8, and mixed gas recycling 10, after which the drying gas may again move to the drying zone 5.

In an aspect of the welding process depicted in FIG. 2, the welding process may also include a carrier volatile capture loop, which loop may be comprised of the combination of a process temperature/pressure zone 3 and a process solvent recovery zone 4, at least one mixed gas collection 8, and mixed gas recycling 10. In an aspect of a welding process according to the present disclosure wherein the reconstitution solvent may be present in the process solvent, the welding process may include more than one carrier gas loops. For example, if the process solvent were configured as a mixture of 3-ethyl-1-methylimidizolium acetate with acetonitrile, acetonitrile could serve as the reconstitution solvent.

It is contemplated that for certain welding processes, it may be advantageous to include one or more electronically controlled valves, drive wheels, and/or substrate guides (e.g., yarn guides that provide a new loose end or broken yarn end to be (re)threaded through an apparatus of a welding process with little or no human intervention). It is contemplated that a welding process so configured may reduce the both the amount of downtime for the welding process and the amount of human contact required for the welding process compared to a welding process not so configured.

In an aspect, a process solvent recovery zone 4 may be configured such that the process wetted substrate may be collected while reconstitution solvent is introduced to the process wetted substrate. For example, in a welding process configured to use yarn and/or thread as a substrate, a winding mechanism can be placed at the end of the process temperature/pressure zone 3. In an aspect, the winding mechanism can be enclosed such that as reconstitution solvent is introduced to the process wetted substrate (e.g., by spraying), the process wetted substrate may be washed continuously and converted into a reconstituted wetted substrate. Such a configuration can lead to a great simplification of the overall welding process in that the substrate need not run continuously from the process solvent recovery zone 4 to the drying zone 5. Instead, the reconstitution can happen more as a batch process, whereby a specific portion of substrate (e.g., cylinder or ball of yarn rolled into a continuous untangled entity) may be produced and reconstituted. At a certain point, the reconstituted wetted package can be transferred into a secondary reconstitution process and/or sent to the drying zone to remove the reconstitution solvent.

In another aspect, a welding process configured as a continuous process wherein the substrate may move continuously from the process temperature/pressure zone 3 to the process solvent recovery zone 4 to the drying zone 5. In such a configuration, the tension forces on the substrate may be additive, and can sometimes cause breakage, which may be highly problematic to the efficiency of the welding process. Accordingly, a welding process may be configured with rollers, pulleys, and/or other suitable methods and/or apparatuses to aid the movement of the substrate through the welding process to mitigate and/or eliminate breakage.

Additionally and/or alternatively, a welding process may be configured to reduce the amount of tension the substrate experiences during all or a portion of the welding process. In such a configuration, the substrate may move through a specified space in which reconstitution solvent may be applied to the process wetted substrate (e.g., via an applicator as described in further detail below) instead of moving the substrate through individual tubes (which also may be expensive and make rethreading more difficult). Such a configuration may be used with any substrate format, and it is contemplated that such a configuration may be especially useful for 1D substrates (e.g., yarns and/or threads) either alone or in a sheet-like configuration comprised of multiple individual substrates positioned adjacent one another and/or 2D substrates (e.g., fabrics and/or textiles). A process solvent recovery zone 4 so configured may mitigate and/or eliminate friction on the substrate and/or buildup of unnecessary tension, which may increase the throughput of substrate through the welding process.

4. Solvent Application Zone: Apparatuses/Methods

Figure 6A:
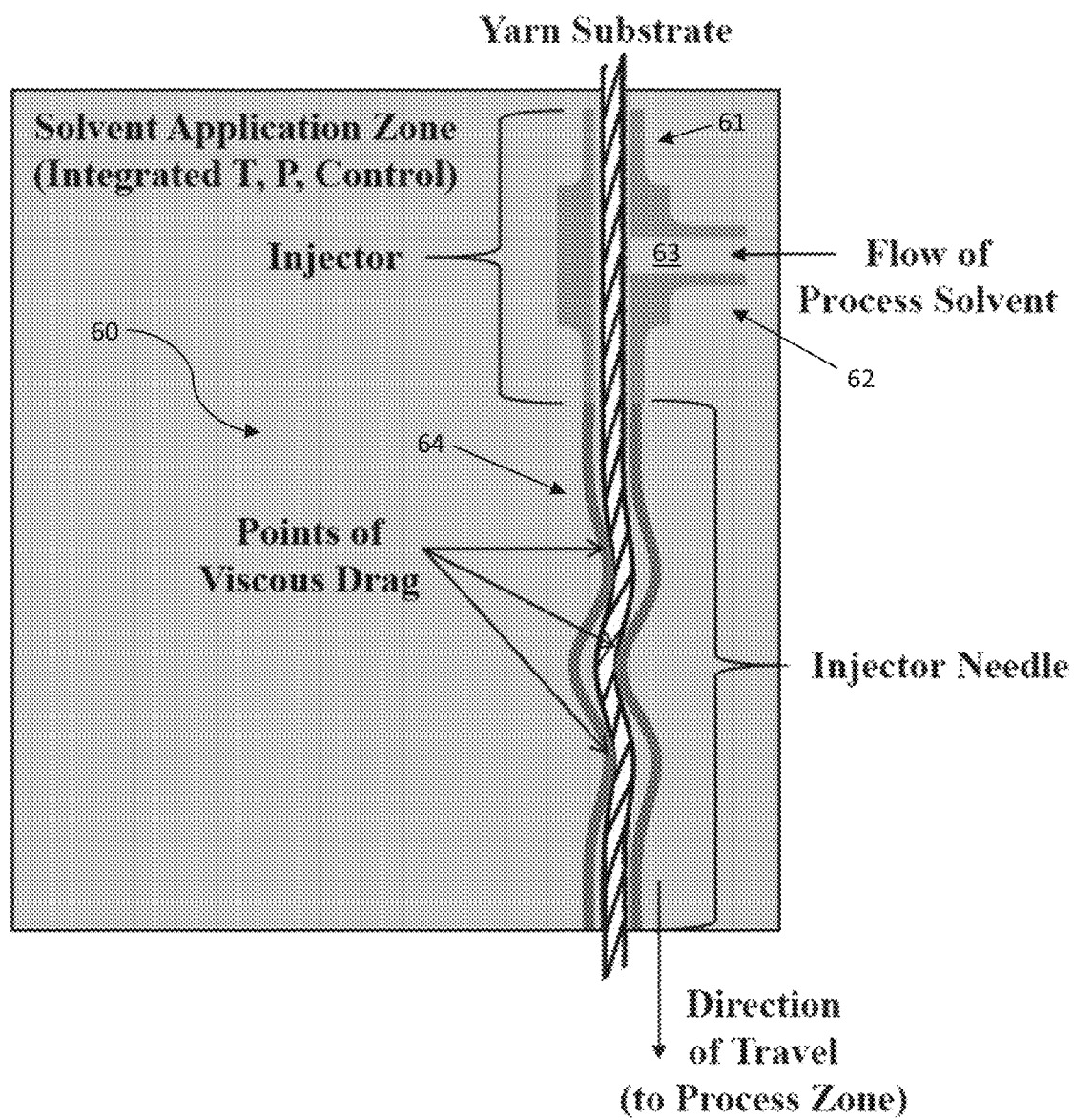
FIG. 6A provides a side, cutaway view of one configuration of a process solvent application zone.

Various aspects of the concept of viscous drag as it pertains to process solvent application are shown in FIG. 6A, which provides a cutaway view of an apparatus that may be used in a process solvent application zone 2. Note that natural fiber substrates may have variance in the density of fiber per unit cross-section and/or area. It is possible to modulate process solvent application to the substrate such that the ratio of mass of process solvent applied per unit mass of substrate is well controlled. This can be accomplished by actively monitoring the variance of the substrate with appropriate sensors and using this data to control the speed of process solvent pumps and/or the speed of the substrate through the process solvent application zone and/or the process solvent composition. Alternatively, it is possible to engineer points of viscous drag that apply the appropriate squeezing force and/or shear on a process wetted substrate in order to control the process solvent application. The design of viscous drag can include small volumes that allow process solvent to appropriately pool. In so doing, the process solvent can be applied such that the mass ratio of process solvent to substrate maybe either held at a stable value or modulated within a desired tolerance. (Modulated fiber welding processes are described in more detail below.)

In one aspect of a welding process (either modulated or non-modulated without limitation unless so indicated in the following claims), the welding process may be configured to apply a process solvent via an injector. In one configuration of the injector, the injector may be comprised of a narrow tube with two inlets and one outlet. Substrate comprised of yarn (or other 1D substrate) may enter one inlet and process solvent may flow into the other inlet. The process wetted substrate (yarn with process solvent applied thereto) may exit the outlet. An injector may be comprised of additional inlets for adding functional materials, additional process solvent, and/or other components. As previously described above herein, the process wetted substrate (e.g., yarn, thread, fabric, and/or textile with process solvent applied) may be passed to the process temperature/pressure zone 3 after the process solvent application zone 2.

As shown in FIG. 6A, an injector 60 may be configured for use with either a 1D or 2D substrate (e.g., yarn or fabric, respectively). An injector may include a substrate input 61 opposite a substrate outlet 64. An injector 60 may be configured to deliver controlled quantities of process solvent to one or more substrates (which substrates may be comprised of fabric, textiles, yarn, thread, etc.) and generally may be further configured to appropriately distribute that process solvent around and within the substrate. For example, in a non-modulated welding process it may be desirable to evenly distribute the process solvent throughout a given substrate, whereas in a modulated welding process it may be desirable to vary the distribution of process solvent in a given substrate.

One example of an injector 60 so configured may be comprised of a shell having T-shaped cross section, wherein a 1D or 2D substrate may enter and exit the injector through a relatively straight path. A process solvent may be pumped through a secondary input, which may be in a path generally perpendicular to that of the substrate. Such a configuration of an injector 60 is shown in FIG. 6A.

As shown in FIG. 6A, the injector 60 may include a substrate input 61 into which raw substrate (yarn, thread, fabric, textile, etc.) may be fed. The injector 60 may also include a process solvent input 62 that is in fluid communication with a portion of the substrate input 61. Accordingly, process solvent may flow into the injector 60 through the process solvent input 62 and engage the substrate adjacent an application interface 63. This portion of the injector 60 may constitute the process solvent application zone 2 as previously described above.

When configured for use with a 1D substrate, the portion of the injector 60 from the substrate input 61 to the substrate outlet 64 may be configured like a tube. When configured for use with a 2D substrate, that portion of the injector 60 may be configured as two plates spaced from one another (similar to the apparatus shown in FIG. 6C, which is described in further detail below). The substrate and/or process wetted substrate may be positioned in the space between the two plates 82, 84, and at least one plate 82, 84 may be formed with at least one process solvent inputs 63.

A substrate outlet 64 may be engaged with a portion of the injector 60 generally opposite the substrate input 61. In one configuration of an injector 60, a substrate outlet 64 may be non-linear, as shown in FIG. 6A. The non-linear substrate outlet 64 may be configured to physically contact the exterior of a process wetted substrate to direct the process solvent to a desired portion of the substrate, which physical contact may be accomplished at least at one or more inflection points, which may provide a shearing force and/or compression force to the substrate. Additionally, a non-linear substrate outlet 64 may be configured to physically contact the exterior of a process wetted substrate. This physical contact may be an aspect of achieving the desired viscous drag of a given welding process. Physical contact may be configured to add additional smoothness to the exterior of the process wetted substrate to eliminate and/or reduce the amount of short hair/fibers on the resulting welded substrate. Physical contact with a process wetted substrate may also improve heat transfer from a process solvent to a substrate and/or process wetted substrate, which heat transfer may shorten the required processing time (e.g., welding time), thereby shortening the length of the welding chamber and reducing the space required for the equipment associated with a given welding process. Physical contact with the substrate and/or process wetted substrate may be accomplished via a multitude of design considerations (to create inflection points in one, two, and/or three dimensions), including but not limited to varying the dimensions (e.g., diameter, width, etc.) and/or curvature of the substrate input 61, application interface 63, and/or substrate outlet 64, and/or combinations thereof, positioning another structure adjacent a substrate and/or process wetted substrate (e.g., wiper, baffle, roller, flexible orifice, etc.) without limitation unless so indicated in the following claims.

Alternatively, an injector may be configured such that it is Y-shaped, and/or one or more injectors may be configured with multiple stages to add process solvents, functional materials, and/or other components at specific locations and under specific conditions at one or more points during a welding process.

In one aspect, an injector may be utilized in conjunction with a yarn receiver, wherein both the injector and the yarn receiver may be configured to slide on a rail system and/or other suitable method and/or apparatus allowing selective placement of the injector and yarn receiver along one dimension. A welding process configured to allow selective manipulation of one or more injectors and/or yarn receivers in at least one dimension (e.g., by allowing them to slide along the length of a rail system) may reduce the time and/or resources required to re-thread yarn and/or thread at any point in the welding process (and in particular, through the process temperature/pressure zone 3) compared to welding processes without such selective manipulation, and may simultaneously enable a high(er) density of welding processes to be multiplexed within a relatively small space.

For example, in a welding process configured with 'n' number of yarns being processed simultaneously, only the outer yarns are relatively easy to access. In the event an individual yarn breaks, this can make rethreading difficult. By having a removable, track mounted injector at the start of the substrate feed zone 1, process solvent application zone 2, and/or process temperature/pressure zone 3, one (a person or automation) can easily remove the injector, and move it to the end of a group of substrates positioned in the welding process for rethreading. It is contemplated that for some applications it may be advantageous to configure the injector in a clam-shell design, but can also be an assembly of tubes without limitation unless so indicated in the following claims. That is, the injector can be designed in a 'clam-shell' configuration wherein at least two pieces of material enclose a yarn or group of yarns. This allows yarn to be initially loaded into the welding process machinery more easily and also is amenable to designing systems that provide appropriate viscous drag for multiple ends of yarn simultaneously. As any particular injector is removed, the other injectors may slide down one position to close the existing gap and create a new gap that is positioned at one edge of the apparatus(es) for the welding process. Working in concert, a series of receiving units positioned at or near the end of any given process zone may also move accordingly, such that individual yarns move into each of their new positions, respectively.

The optimal configuration of a receiving unit may vary from one aspect of a welding process to the next, and may depend on at least the size of the substrate, process solvent used, and/or type of substrate used. In one aspect, a receiving unit may be comprised of a simple pulley or yarn guide that directs yarn into the process solvent recovery zone 4 and/or drying zone 5. In another aspect, receiving units can be significantly more complex (i.e., winding mechanisms) depending on how the welding process is configured, such as the configuration of the process solvent application zone 2, process temperature/pressure zone 3, process solvent recovery zone 4, and/or drying zone 5.

Figure 6B:
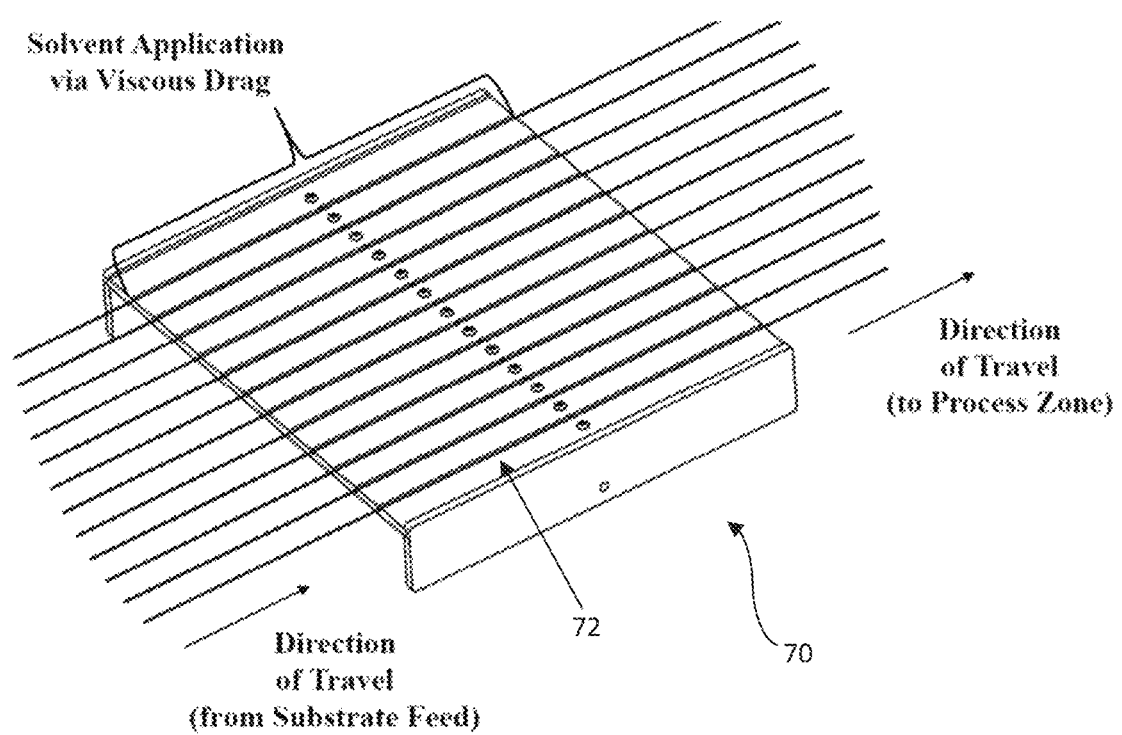
FIG. 6B provides a perspective view of another configuration of a process solvent application zone.

Another apparatus illustrating the concept of viscous drag as it pertains to process solvent application is shown in FIG. 6B. The apparatus, which may be configured as a tray 70, as shown in FIG. 6B may be configured for use with both 1D and 2D substrates. As shown, the tray 70 may be configured with one or more substrate grooves 72 formed in a surface of the tray 70. The tray 70 may have a plurality of grooves 72 such that process solvent may be applied to multiple substrates (1D substrates shown in FIG. 6B) simultaneously.

Figure 6C:
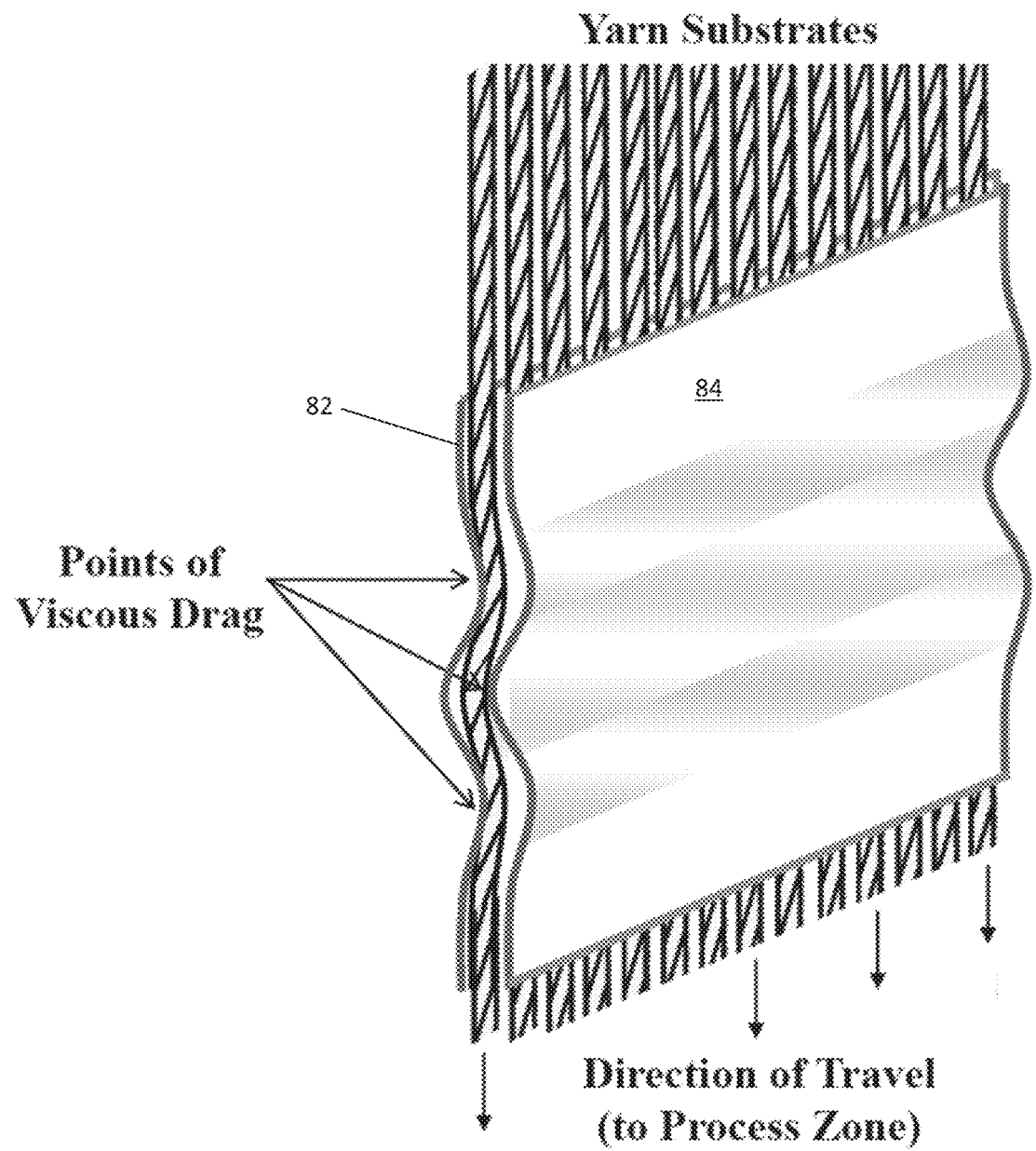
FIG. 6C provides a perspective view of another configuration of a process solvent application zone.

Although the grooves 72 shown in FIG. 6B may be linear, in other aspects of a tray 70 the grooves may be non-linear in a manner correlative to the injector 60 shown in FIG. 6A and the plates shown in FIG. 6C. That is, the tray 70 and grooves 72 thereof may be configured such that a portion of the tray 70 and/or grooves physically contact a portion of the substrate (which physical contact may constitute a consideration for optimizing viscous drag). Physical contact may be accomplished via a multitude of design considerations (to create inflection points, shear forces, compression, etc. in one, two, and/or three dimensions), including but not limited to varying the depth of a groove 72, cross-sectional shape of a groove 72, width of a groove 72, curvature of a groove 72, and/or combinations thereof, and/or positioning another structure adjacent a substrate and/or process wetted substrate (e.g., wiper, baffle, roller, flexible orifice, etc.) without limitation unless so indicated in the following claims. without limitation unless so indicated in the following claims.

In one configuration, the spacing of the 1D substrates can be reduced to the point where many substrates essentially move together in a two-dimensional plan or a 'sheet' as further illustrated in FIG. 6C. In another configuration, the width of a groove 72 may be selected to allow a generally two-dimensional sheet of fabric and/or textile to move with respect to the tray 70 through the groove 72.

Generally, the process solvent may be continuously supplied to each groove 72 and/or a portion thereof such that as the substrate moves along the groove 72, process solvent is applied thereto so as to create a process wetted substrate. A groove 72 may be flooded with process solvent (in which configuration the groove 72 may function similar to a process solvent bath), and/or process solvent may be applied to a substrate adjacent a leading edge of the groove 72 and then properly wiped along an exterior portion of the substrate as the substrate moves toward a trailing edge of the groove. In one configuration of a welding process, a tray 70 may be angled with respect to the horizontal to utilize gravitational force on the process solvent, and the optimal angle may depend at least on the speed and direction of substrate movement with respect to the tray 70.

The optimal configuration of each groove 72 will vary from one application of a welding process to the next, and is therefore in no way limiting to the scope of the present disclosure unless so indicated in the following claims. When configured for multiple 1D substrates that are laterally spaced from one another by a distance equal to or greater than the average diameter of each substrate, it is contemplated that the width of a groove 72 may be approximately equal to the depth there, and each dimension may be approximately 10% greater than the average diameter of the substrate.

The optimal cross-sectional shape of each groove 72 may also vary from one welding process to the next. For example, in some applications it may be optimal for the cross-sectional shape of a groove 72 (or at least the bottom portion thereof) to approximate and/or match the cross-sectional shape of the substrate (or at least a portion thereof). For example, when configured for use with a substrate comprised of a 1D yarn or thread, a groove 72 may be configured with a U-shaped cross-section. When configured for use with a substrate comprised of a 2D fabric or textile, a groove 72 may be configured with a width much greater (e.g., 10 times, 20 times, etc.) than its depth. However, the specific cross-sectional shape, depth, width, configuration, etc. of a groove 72 is in no way limiting to the scope of the present disclosure unless so indicated in the following claims.

A configuration of a process solvent application zone 2 configured for use with a plurality of 1D substrates (which may be comprised of threads and/or yarns) approximating a 2D sheet is shown in FIG. 6C. The process solvent application zone 2 may employ a first plate 82 and a second plate 84 with corresponding curvature to create at least three points of physical contact (i.e., inflection points) in at least one dimension. In other configurations, the plates 82, 84 may be differently configured to create greater or fewer inflection points in one or more dimensions, wherein the inflection points are configured to applying more resistance to the substrate and/or process wetted substrate or less resistance thereto. Physical contact may be accomplished via a multitude of design considerations (to create inflection points in one, two, and/or three dimensions), including but not limited to varying distance between the plates 82, 84, curvature of either plate 82, 84, whether the concavity of a curve in one plate 82, 84 corresponds to the convexity of a curve in the other plate 82, 84, and/or combinations thereof, and/or positioning another structure adjacent a substrate and/or process wetted substrate (e.g., wiper, baffle, roller, flexible orifice, etc.) without limitation unless so indicated in the following claims.

In another configuration, the viscous drag may be variable based at least on the relative positions of one or more structural components. For example, and referring specifically to FIGS. 6D, 6E, and 6F, plates may be configured such that inner edges thereof overlap with one another by an adjustable amount. When the inner edges overlap by a greater amount, such as shown in FIG. 6E, a substrate positioned between the corresponding plates may experience greater physical resistance to movement relative to the plates. When the inner edges overlap by a lesser amount, such as shown in FIG. 6E, a substrate positioned between the corresponding plates may experience less physical resistance to movement relative to the plates. Adjustable overlap of as applied to a welding process configured for use with multiple 1D substrates positioned adjacent one another is shown in FIG. Adjustability of the relative positions of the plates may allow for multiple process solvents to be used with a given apparatus and/or for a given apparatus to be employed in welding processes configured to produce welded substrates having differing attributes.

Figure 6D:
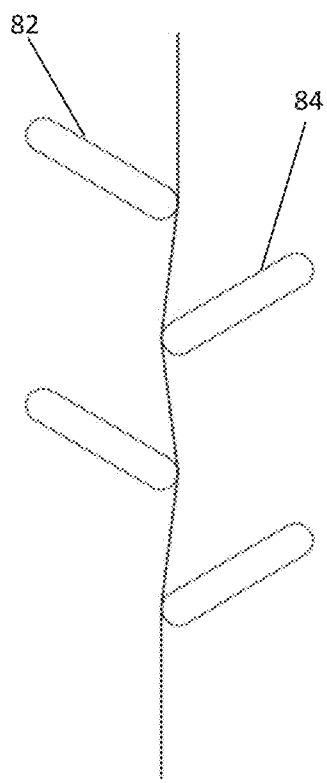
FIG. 6D provides a side view of an apparatus that may be used with various welding processes.
Figure 6E:
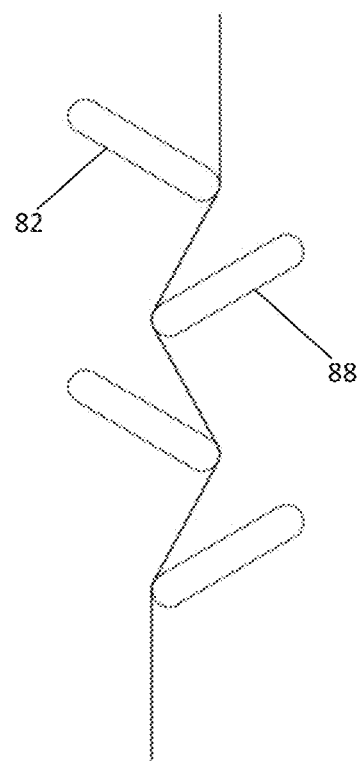
FIG. 6E provides a side view of the apparatus from FIG. 6D, wherein the plates are differently positioned with respect to one another.
Figure 6F:
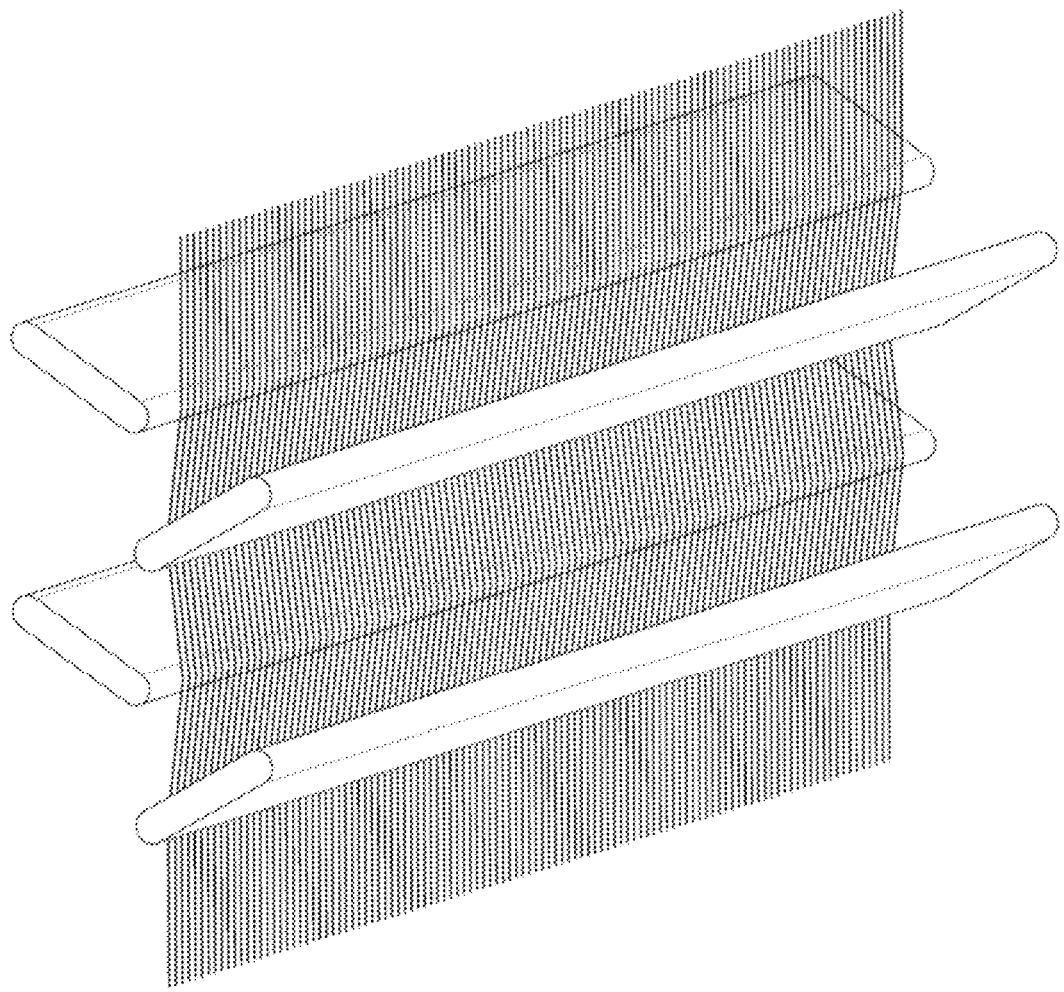
FIG. 6F provides a side view of an apparatus that may be used with various welding processes, wherein the apparatus may be configured for use with a plurality of 1D substrates positioned adjacent one another.

As described above relating to the concept of viscous drag and FIGS. 6A & 6B, the plates 82, 84 in FIGS. 6C, 6D, and 6E may be configured to control process solvent application. The designs shown in FIGS. 6A-6E are not meant to be limiting in any way unless so indicated in the following claims, and any suitable structure and/or method may be used to properly apply process solvent to a substrate and/or to properly interact with the substrate and/or process wetted substrate to achieve the desired attribute for the welded substrate. That is, the appropriate amount of viscous drag can be achieved by any number of structures (which structures can be moveable to preset tolerances to achieve the desired process solvent application effect) or methods, including and not limited to rollers, shaped edges, smooth surfaces, number and/or orientation of inflection points, resistance to relative movement, varying temperatures, etc. and unless otherwise indicated in the following claims. In another configuration of a welding process (either modulated or non-modulated without limitation unless so indicated in the following claims), the welding process may be configured to apply a process solvent via an applicator. In one configuration of the applicator, the application may be correlative to those used in inkjet printers, screen printing techniques, spray guns, nozzles, dip tanks, or inclined trays, and/or combinations thereof (some of which are shown at least in FIGS. 6A-6F and described in detail above) without limitation unless so indicated in the following claims. It is contemplated that the welding process may be configured such that when a substrate (e.g., yarn, thread, fabric, and/or textile) is properly positioned with respect to an applicator, the applicator directs process solvent to the substrate, thereby creating process wetted substrate. Such a welding process may be configured such that process solvent and/or functional materials may be applied in a multidimensional pattern, which may be useful for embossing a pattern into a textile and/or fabric using the welding process. Such a pattern may constitute a modulated welding process (as described in further detail below), wherein the modulation is a result of at least the application of process solvent to a substrate. As previously described above herein, the process wetted substrate (e.g., yarn, thread, fabric, and/or textile with process solvent applied) may be passed to the process temperature/pressure zone 3 after the process solvent application zone 2.

Figure 11A:
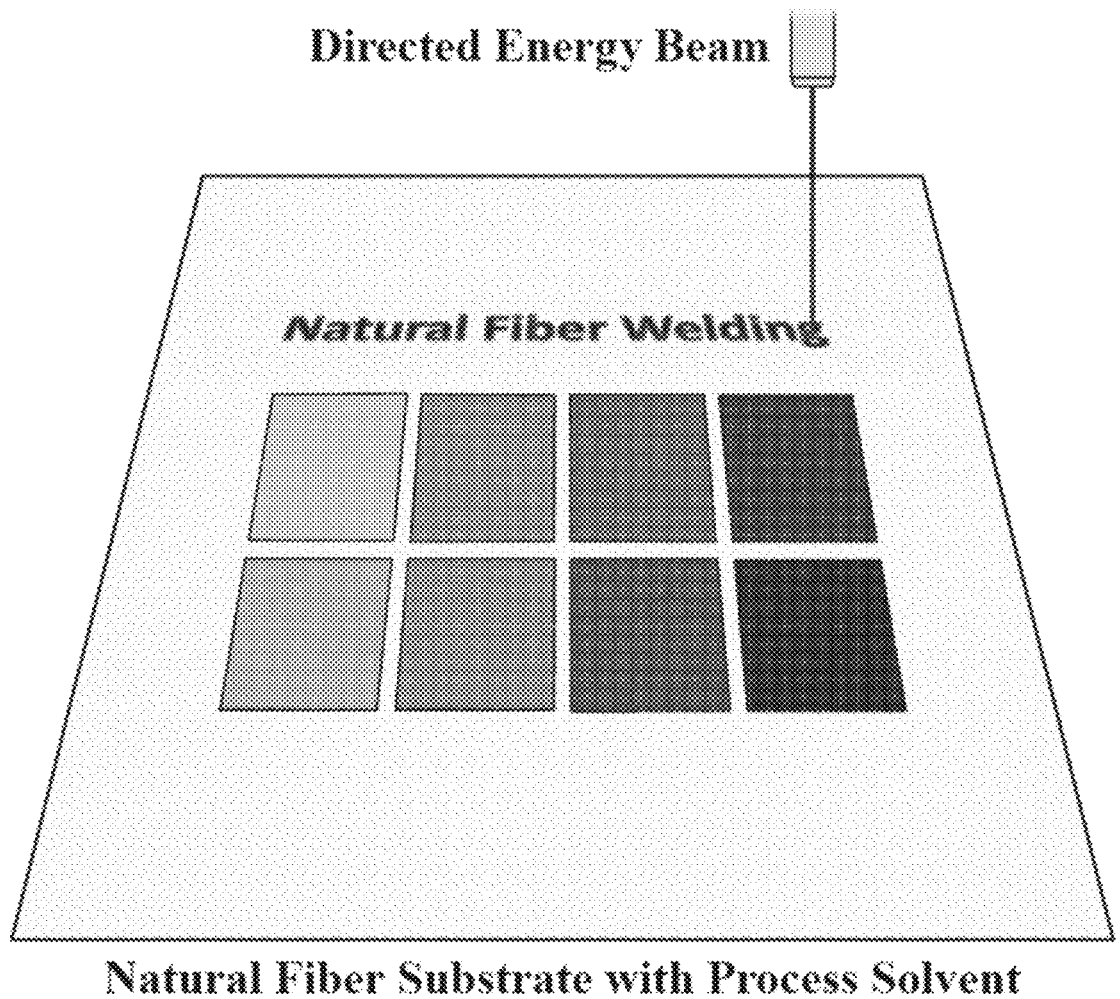
FIG. 11A provides a schematic representation showing various aspects of a modulated fiber welding process.
Figure 11B:
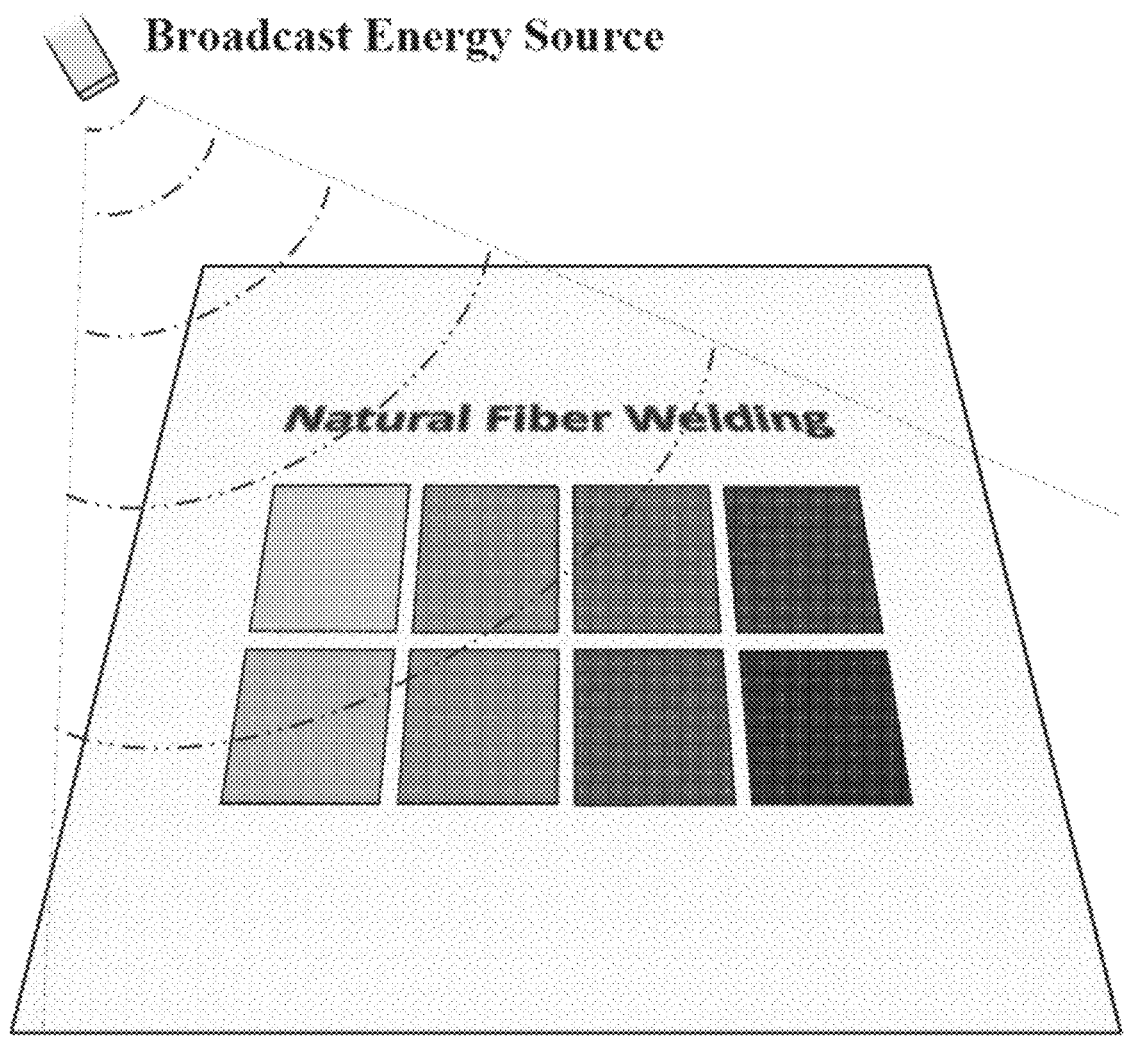
FIG. 11B provides a schematic representation showing other aspects of a modulated fiber welding process.
Figure 11C:
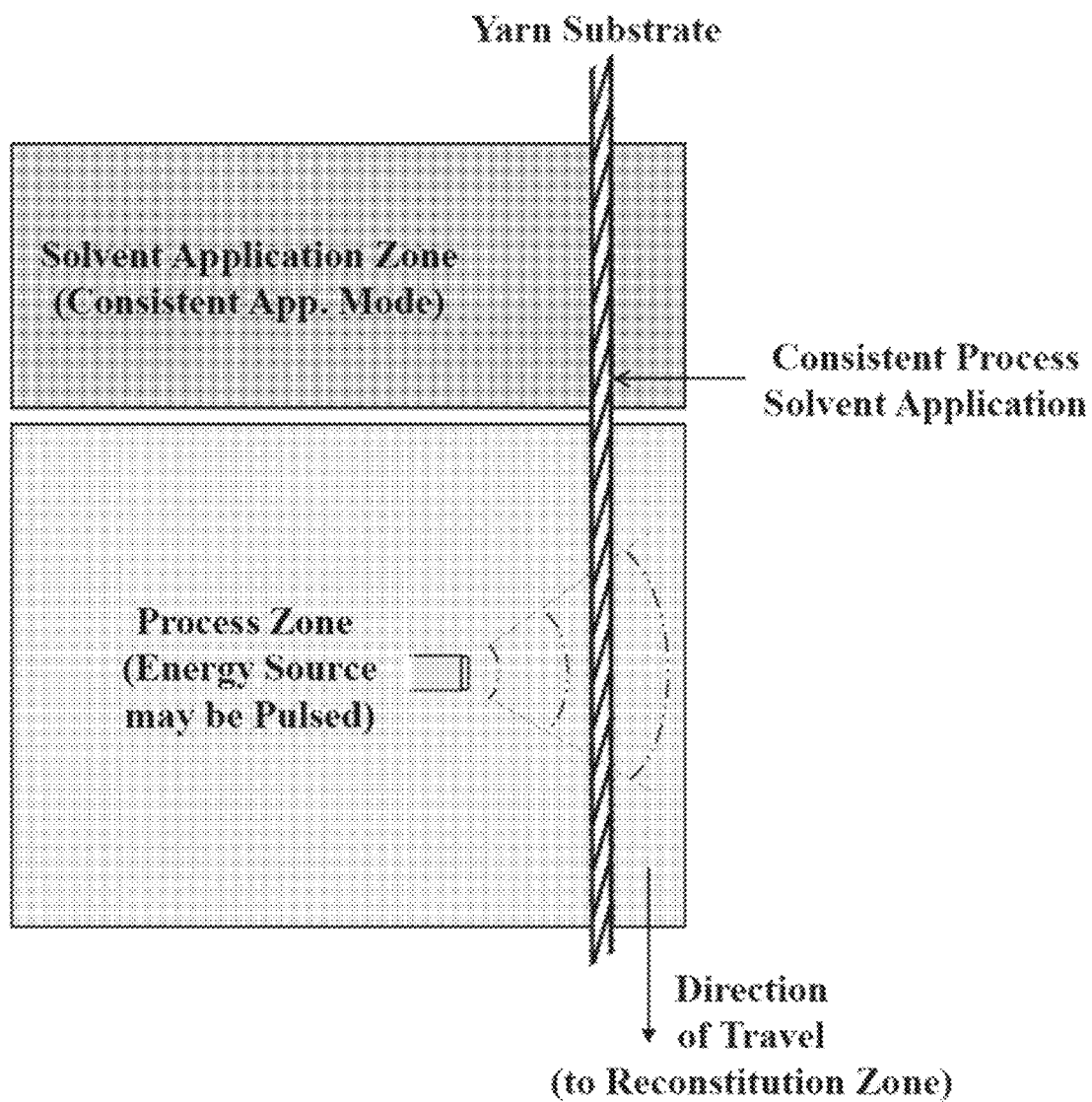
FIG. 11C provides a schematic representation showing other aspects of a modulated fiber welding process.
Figure 11D:
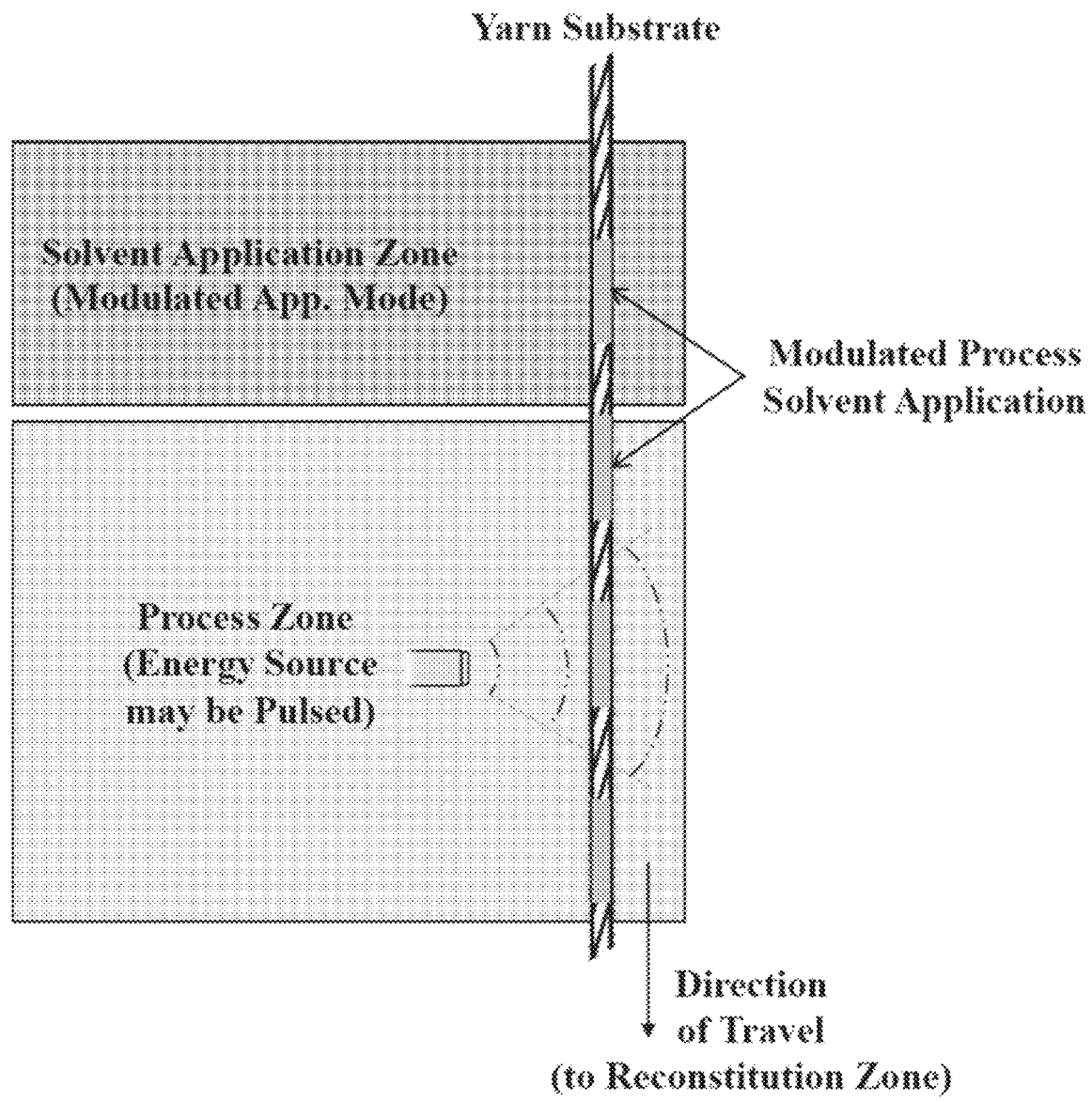
FIG. 11D provides a schematic representation showing other aspects of a modulated fiber welding process.

Referring generally to FIGS. 11A-11D, in a configuration of a modulated welding process using an injector or an applicator, the modulated welding process may allow for variation of the composition of the process solvent in real-time at least by controlling at least pump flow rate(s) of individual process solvent constituents. A modulated welding process may be configured to allow variation of the ratio of process solvent to substrate (either on a volume or mass basis) at least by controlling either the pump flow rate(s) of process solvent constituents and/or by variable rate of substrate movement through at least the process solvent application zone 2. A schematic overview for such a modulated welding process configured for use with a 2D substrate is shown in FIG. 11B and for use with a 1D substrate is shown in FIG. 11D, all of which are described in further detail below.

Referring now to FIGS. 11A (2D substrate) and 11C (1D substrate), a modulated welding process may be configured to allow the temperature to be modulated by any suitable method and/or apparatus, including but not limited to microwave heating, convection, conduction, radiation, and/or combinations thereof without limitation unless so indicated in the following claims. A modulated welding process may be configured to allow modulation of the pressure, tension, viscous drag, etc. experienced by the substrate and/or process wetted substrate. The combined effects of modulation of various parameters of a modulated welding process (including but not limited to the conditions previously mentioned) can produce unique welded substrates comprised of welded yarns that exhibit unique dye and/or coloration patterns as well as unique feel and/or finish.

Conversely, as previously described, a welding process may be configured to yield welded substrates with consistent characteristics (e.g., coloration, size, shape, feel, finish, etc.) throughout by configuring the welding process to run very consistently without modulation of various process parameters (e.g., process solvent composition, process solvent to substrate mass ratio, temperature, pressure, tension, etc.).

In one aspect of a welding process configured for scaled production of welded substrates from multiple 1D substrates positioned adjacent one another (e.g., a sheet-like structure comprised of multiple yarns positioned adjacent on another), multiple ends of yarn can be moved as a sheet, which may provide improved economies of scale for some welding processes. The same concepts and principles regarding welding processes configured for 2D substrates (e.g., fabrics, paper substrates, textiles, and/or composite mat substrates) as disclosed herein may be applicable to multiple 1D substrates positioned adjacent one another.

By way of analogy, a welding process configured to weld multiple 1D substrates in a sheet-like configuration may be similar as to a welding process configured to weld a 2D substrate (e.g., a fabric and/or textile), but it is contemplated that the welding process for 1D substrates may have some important differences. Such differences may include, but are not limited to, accommodations (e.g., yarn guides) to mitigate and/or eliminate the likelihood of one substrate becoming entangled with itself and/or another substrate (e.g., individual yarns), and process solvent application may utilize either injectors for individual yarns or groups of yarns. Alternatively, a welding process may be configured such that no injector is required if process solvent is applied directly to the 1D substrates in a sheet-like configuration by spraying, dropping, wicking, dunking, and/or otherwise introducing process solvent in a controlled rate onto the sheet-like configuration. Accordingly, in accordance with the present disclosure various apparatuses and/or methods may be configured to yield a highly multiplexed welding process that scales to mass production.

A. Low-Moisture Substrates

Cellulosic (i.e., cotton, linen, regenerated cellulose, etc.) and lignocellulosic (i.e., industrial hemp, agave, etc.) fibers are known to contain significant (5 to 10% by mass) moisture. Moisture levels in, for example, cotton can vary from roughly 6 to 9% depending on the environmental temperature and relative humidity. In addition, IL-based solvents such as 1-ethyl-3-methylimidazolium acetate ("EMIm OAc"), 1-butyl-3-methylimidizolum chloride ("BMIm Cl"), and 1,5-diaza-bicyclo[4.3.0]non-5-enium acetate ("DBNH OAc") are often contaminated with water either during syntheses and/or by absorption from the environment. Moreover, molecular component additives to the process solvent, such as acetonitrile (ACN) are also hydroscopic. Generally, the presence of water negatively impacts the efficacy of pure ionic liquids and IL-based solvents with molecular component additives to dissolve biopolymer substrates. However, it may be difficult and/or resource intensive to remove the last few percentage points (by mass) of water from these solutions. The cost of ionic liquids and IL-based solvents may be directly correlated with their purity, and in particular, with moisture content. Accordingly, a welding process may be configured to utilize low-moisture substrates to increase the performance of welded substrates as well as improve the overall economy of such a welding processes.

In addition to aiding welding processes using ionic liquid and IL-based process solvents, low-moisture substrate materials can also aid fiber welding processes that utilize N-methylmorpholine N-oxide (NMMO) as a process solvent as well. Generally, NMMO solutions that are 4% to 17% by mass water are capable of cellulose dissolution and may be utilized in Lyocell-type processes. Utilizing sufficiently dry biopolymer-containing substrate materials means that welding processes may be configured with process solvents having a water content at the upper end (~17% by mass) and still efficiently and economically produce the desired welded substrate. In a welding process configured to use a process solvent comprised of ionic liquids that are moisture sensitive (e.g., 1-butyl-3-methylimidizolium chloride ("BMIm") Cl, 1-ethyl-3-methylimidazolium acetate ("EMIm OAc"), 1,5-diaza-bicyclo[4.3.0]non-5-enium acetate ("DBNH OAc"), etc.), the amount of moisture in the substrate may affect the rate at which welding occurs, and therefore associated process parameters and apparatus design. In welding processes configured to use process solvents that are less moisture sensitive (e.g., NMMO, LiOH-urea, etc.) than certain ionic liquids disclosed above, the advantages of a relatively dry substrate are reduced and/or eliminated.

Accordingly, experiments have shown the surprising results of welding processes configured to use biopolymer substrates that have been artificially dried to low moisture states (<5% by mass) prior to welding. Low-moisture substrates may speed up the welding processes while simultaneously improving the quality (i.e., strength, lack of stray fiber, etc.) of welded substrates. Even more surprising is that water is removed from ionic liquids and IL-based process solvents by the strong desiccating nature of low-moisture biopolymer substrates. In one aspect, water may be removed from ionic liquids and IL-based process solvents that are reconstituted by non-aqueous media, for example, ACN. In fact, low-moisture substrates purify both process solvents and reconstitution solvents of water as they are continuously recycled through the fiber welding process.

Low-moisture substrate materials may be obtained by preconditioning materials in sufficiently dry (and sometimes warm, for example ~40 to 80° C.) atmospheres for controlled time prior to being introduced into a welding process that utilizes a process solvent comprised of, for example, moisture-sensitive ionic liquid. It may be important that biopolymer-containing substrates be held in controlled climates prior to and during a welding process. Furthermore, intentionally introducing water to specific regions of space within a biopolymer substrate may serve to retards welding in that location and may allow for another method to modulate a welding process, several methods for which are described herein below.

Generally, experiments have shown that a welding process configured to utilize an artificially dry substrate (e.g., a substrate that has been dried prior to introduction into the substrate feed zone 1 and/or a substrate that is dried in all or a portion of the substrate feed zone 1) yields surprising new synergies that improve the economics of the welding process and/or the welded substrates produced thereby. For example, drying cotton substrates to less than 5% moisture by mass can dramatically improve the consistency and/or control of welding when utilizing BMIm Cl+ACN solutions (or other moisture-sensitive process solvent systems). Moreover, upon continuously utilizing dry cotton substrates and upon recycling the process solvent multiple times, experiments have shown that the water content of both process solvents (e.g., BMIm Cl+ACN) and reconstitution solvents (e.g., ACN) may be decreased so long as equipment is appropriately sealed from external water (e.g., water in the atmosphere). The desiccating nature of the dried cotton substrate increases as the moisture content decreases. In other words, cotton that is 3% by mass water is more desiccating than cotton that is 4% by mass water.

5. Attributes of Welded Substrates Produced at Commercial Scale

The foregoing description discloses attributes of various new materials (which materials generally are referred to as 1D welded substrates and 2D welded substrates) that may be produced using a welding process according to the present disclosure. The following attributes are novel and non-obvious in light of the prior art because these attributes are only present in the following materials when those materials are manufactured in large quantities (e.g., on a commercial scale). The material attributes may allow for manufacturing cost reductions in textiles as well as enabling new uses for natural substrate (e.g., cotton) containing textiles.

It is well known that petroleum-based materials (e.g., polyester, etc.) may be configured to produce both filament-type yarns and staple fiber yarns. As used herein, the term "staple fiber yarns" denotes yarns that are spun from fibers having relatively short, discrete lengths (staple fiber). However, prior to the processes and apparatuses disclosed herein, there was no filament-type yarn derived from natural staple fibers wherein the natural staple fibers (and, consequently, a filament-type yarn derived therefrom) retain a measure of their original attributes, structure, etc. of the staple fiber. The processes and apparatuses disclosed herein may be differentiated from all prior teaching regarding Rayon, Modal, Tencel®, etc. wherein manmade staple fiber is produced via full dissolution and/or derivatization of cellulose and then extruded (which full dissolution may be accomplished using NMMO, ionic-liquid based systems, etc.). In the cases of Rayon, Modal, Tencel®, etc., cellulosic precursors are fully dissolved and denatured in such a way that it is virtually impossible to determine the cellulosic source (e.g., beechwood tree pulp, bamboo pulp, cotton fiber, etc.) from which the staple fiber was derived. By contrast, welded substrates produced according to the present disclosure retain certain attributes, characteristics, etc. of the staple fiber in the substrate as described in further detail below. In retaining these native attributes, characteristics, etc., the present methods and apparatuses use a relatively small amount of process solvent per unit of welded substrate relative to the prior art, and even while enabling new functionalities (e.g., decreased water retention, increased strength, etc.) traditionally associated with synthetic and/or petroleum-based filament-type yarns. These new welded substrates and functionalities thereof, in turn, enable entire new fabric applications not possible with the prior art. The degree to which welded substrates express and/or exhibit these functionalities may depend at least on the configuration of the welding process used to manufacture the welded substrate.

Included within 1D welded substrates that may be manufactured using a welding process according to the present disclosure are non-plied 'singles' and plied yarns and threads as well as "welded yarn substrates." Although the foregoing attributes and examples may be attributable to welded yarn substrates, the scope of the present disclosure is not so limited and the term "1D welded substrate" is not so limited unless indicated in the following claims.

Generally, welded yarn substrates are differentiated from conventional raw yarn substrates counterparts at least by: (1) the amount of empty space between the individual fibers that make up yarns, as welded yarn substrates are significantly more dense than conventional raw substrate counterparts having a mean diameter that is roughly 20% to 200% smaller than conventional yarns that have an equivalent weight of biopolymer substrate per unit length; and (2) welded yarn substrates do not generally have much if any loose fiber at their surface and thus do not shed (and the amount and characteristics of any loose fiber at their surface may be manipulated during the welding process). Specific empirical data for welded substrates and the corresponding natural fiber substrate are explained in detail below.

Generally, when loose fiber is present at the surface of a welded yarn substrate, at least some portion of the loose fiber is welded to the welded yarn substrate. That is to say, fiber is not really loose to be separated from the welded yarn substrate, but is instead anchored to a core of welded fibers within the middle of the welded yarn substrate. This may occur if the process solvent tends to migrate to the center of the substrate yarns during the welding process. However, the welding process may be configured to limit or promote welding within either the core or at the outside portion of a yarn substrate by varying at least the composition of process solvent and/or to adding multiple process solvent compositions at different times.

The two attributes listed above alone and/or in combination may be desirable/advantageous for a number of reasons. For example, a cotton yarn that does not shed can be knit with Spandex (also known as Lycra or elastane) or other synthetic fibers more efficiently because the amount of loose fiber (lint) is reduced and/or eliminated so that it does not cause problems with knitting machines. Lint and shedding is a known problem in the textile industry in that it causes imperfections in textiles and down time for equipment that must be cleaned and/or fixed because of lint build up. Static cling causes loose fiber to naturally adhere to synthetic fibers and is problematic. Welded yarn substrates significantly reduce these issues because shedding is eliminated and/or mitigated. Fabrics and/or textiles produced from a welded yarn substrate and Spandex (or Lycra, etc.) may be useful as active wear (e.g., shirts, pants, shorts, etc.) and/or undergarments (e.g., underwear, bras, etc.) without limitation unless so indicated in the following claims.

Welded yarn substrates may be manufactured such that they are stronger than their conventional raw substrate counterparts (of similar weight per unit length as well as per unit diameter). Welded yarn substrates can eliminate the need for "slashing" (or "sizing") during the production of woven materials (e.g., denim). Yarn slashing is the process by which sizing (e.g., starch) is applied to a yarn (most often prior to weaving) in order to make it strong enough to undergo the weaving process. Upon a woven textile being produced, the sizing must be washed away. Yarn slashing not only adds expense, but is also resource (e.g., water) intensive. Slashing is also not permanent in that upon removal of sizing, yarns return to their original (lessor) strength. In contrast, the welding process may be configured to strengthen the resulting welded yarn substrate compared to conventional yarn such that slashing is not required, thus saving expense and resources while adding a more permanent improvement of strength.

Skew is a fabric condition in which the warp and weft yarns, although straight, are not at right angles to each other. This originates from the fact that conventional yarns are twisted during manufacture and therefore biased to untwist (unravel). Fabrics manufactured from welded yarn substrates may have the attribute that they skew much less aggressively than fabrics manufactured from conventional raw substrate counterparts because welded yarn substrates may have the attribute that they cannot untwist (unravel) after the welding process because individual fibers may be fused/welded.

Welded yarn substrates may convert low-twist yarns, yarns with shorter fiber length, and/or yarns produced from lower-quality fiber (e.g., fiber of different denier) into higher-value, stronger welded yarn substrates. For example, in conventional yarns, the twist factor is strongly correlated with strength. More twists per unit length costs more money. Low-twist yarn used as a substrate for a welding process according to the present disclosure may result in a welded yarn substrate that is much stronger than the conventional yarn substrate because of how the welding process may be configured to fuse individual fibers.

Welded yarn substrates can convert uncombed yarns into higher value, stronger welded yarn substrates. In conventional yarns, the combing process removes short fiber from sliver to yield higher strength yarn further down the manufacturing chain. Combing is machine and energy intensive and adds cost to the manufacture of yarn. Welded yarn substrates produced from a substrate comprised of sliver that was not combed may result in a welded yarn substrate that is much stronger than the conventional yarn substrate because the welding process may be configured to fuse short and long fibers to enhance strength. The welding process may be configured to produce stronger yarn at significant cost savings.

Textiles produced from welded yarn substrates may have that attribute that they hold their shape and do not have the tendency and/or propensity to shrink as much as fabrics manufactured from conventional yarns. Because a welding process may be configured to result in welded yarn substrates having significantly less (little to no) loose fiber at their surfaces compared to conventional yarn, textiles can be produced from the welded yarn substrates with a much lower fill factor than those produced from conventional yarn, and in ways that are akin to what is done with single filament synthetic yarns (e.g., polyester).

Figure 12A:
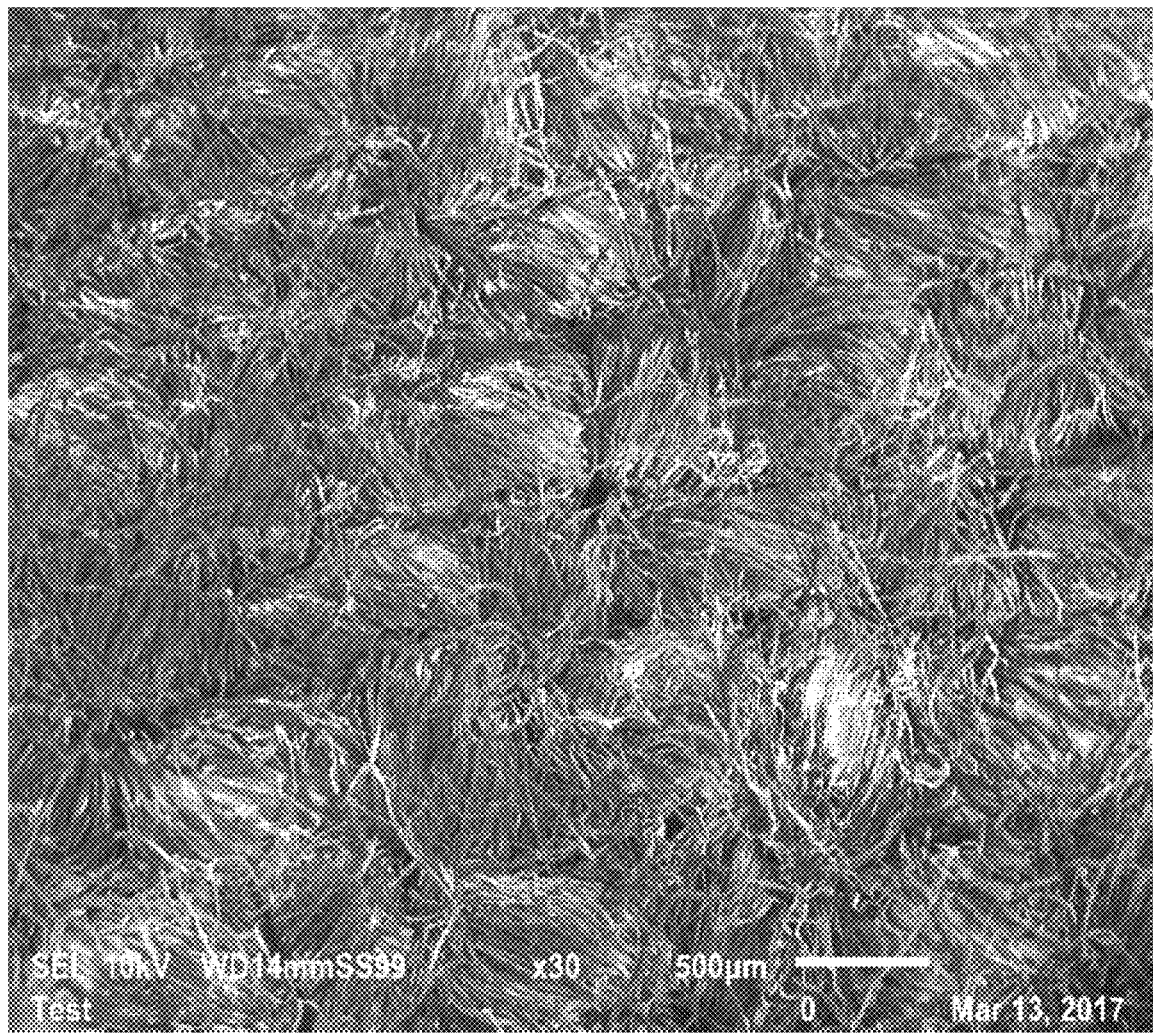
FIG. 12A provides scanning-electron microscope image of a raw, 2D substrate comprised of denim.
Figure 12B:
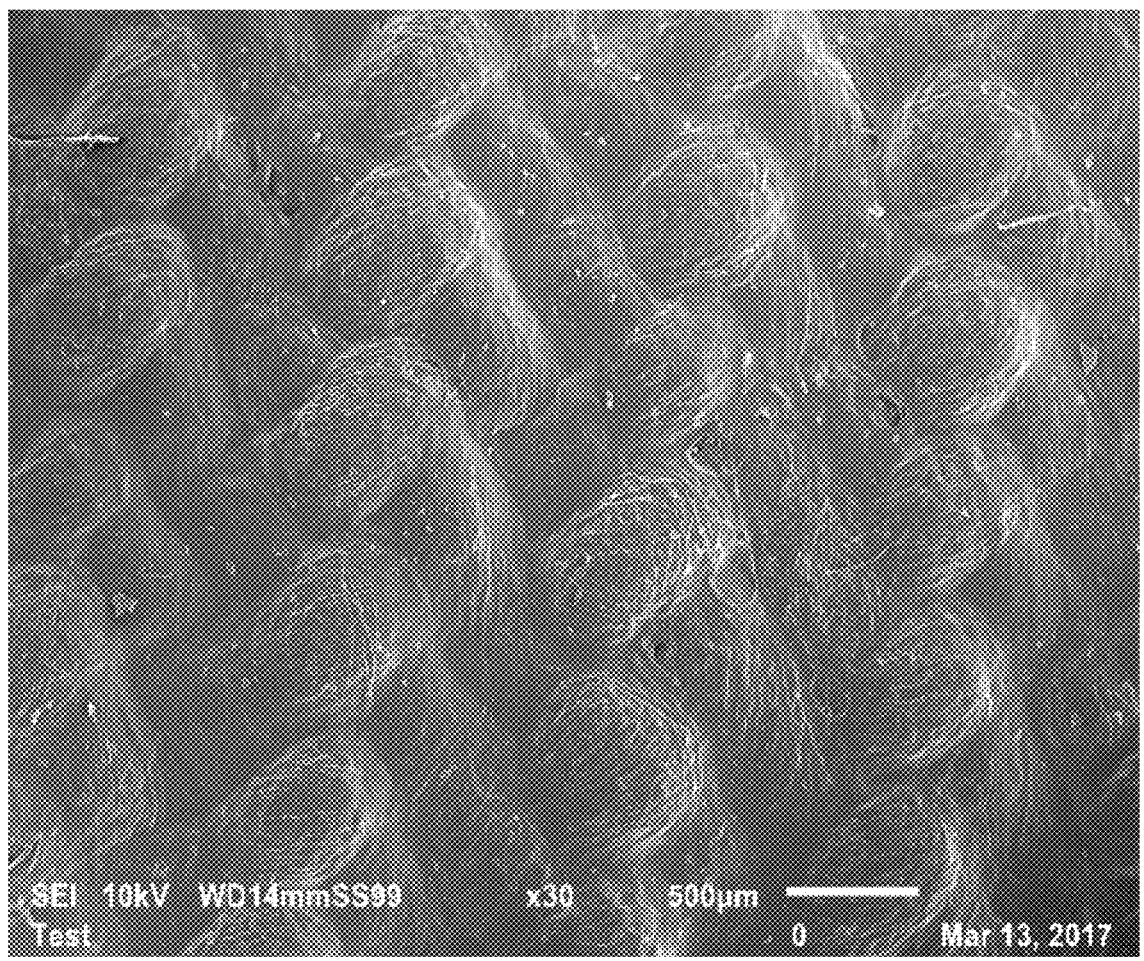
FIG. 12B provides a scanning-electron microscope image of raw substrate from FIG. 12A after it has been processed into a welded substrate that is highly welded.

Referring now to FIGS. 12A & 12B, which provide SEM images of a raw denim 2D substrate, and the resulting welded 2D substrate (using the raw substrate from FIG. 12A as a starting material), respectively, increased engagement between adjacent fibers may be readily visually observed for the welded substrate compared to the raw substrate. The increased engagement between adjacent fibers may provide various attributes to the welded substrate not present in the raw substrate, including but not limited to increased stiffness, lower moisture absorption, and/or increased rate of drying.

Figure 12C:
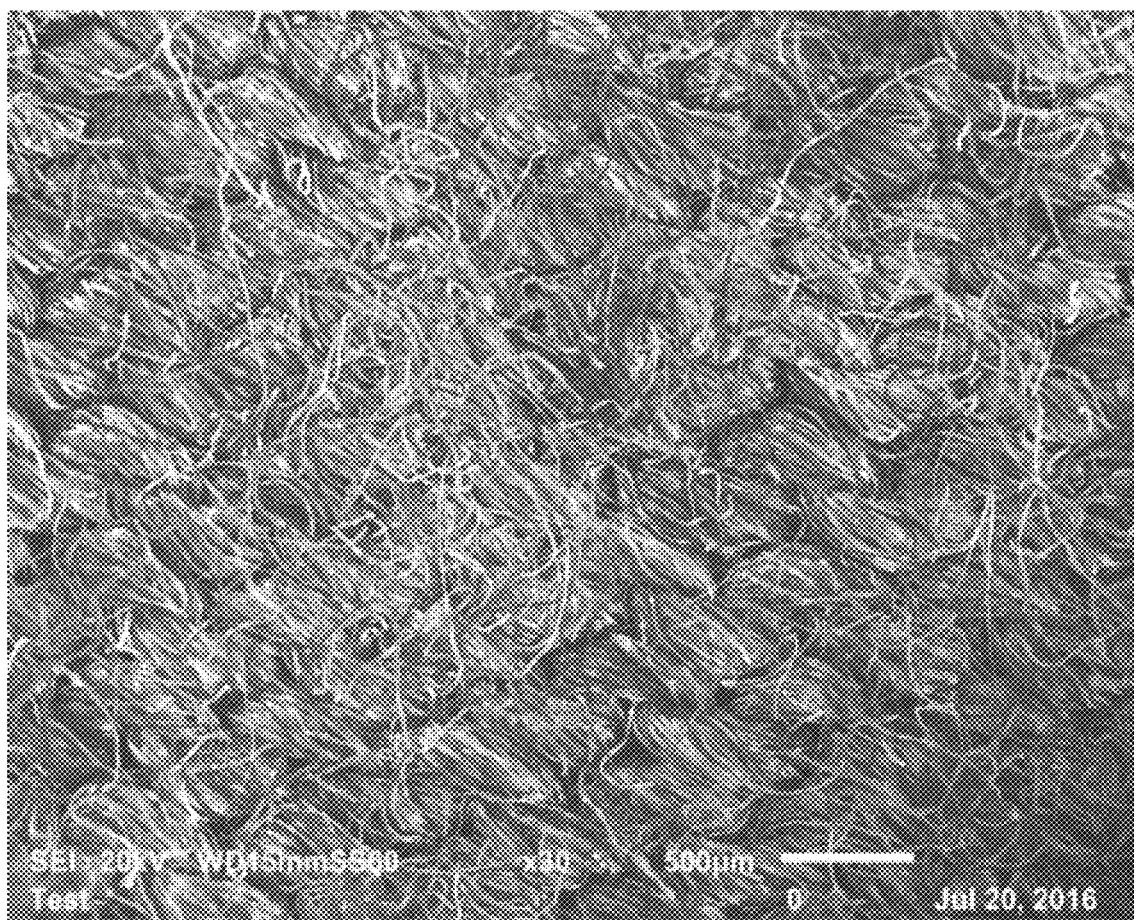
FIG. 12C provides scanning-electron microscope image of a raw, 2D substrate comprised of a knitted fabric.
Figure 12D:
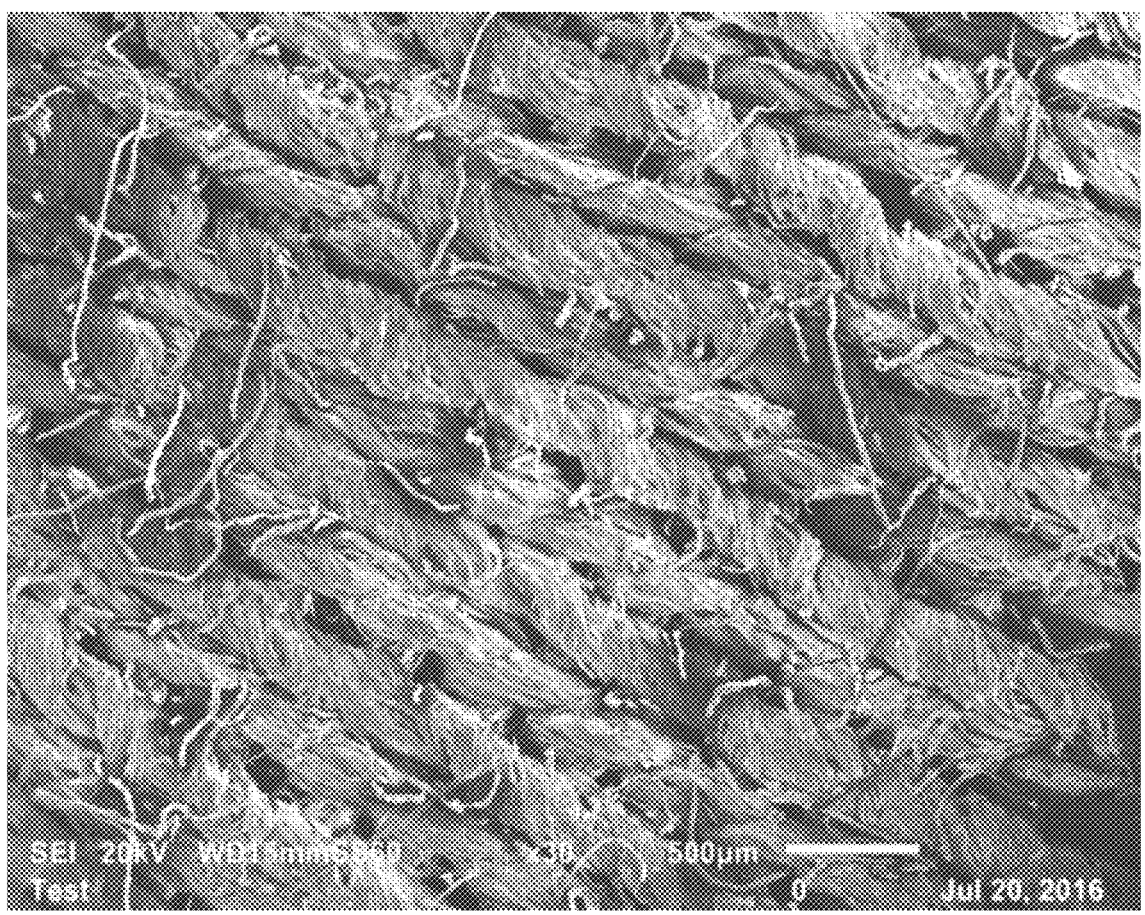
FIG. 12D provides a scanning-electron microscope image of raw substrate from FIG. 12C after it has been processed into a welded substrate that is moderately welded.

Referring now to FIGS. 12C & 12D, which provide SEM images of a raw knit 2D substrate, and the resulting welded 2D substrate (using the raw substrate from FIG. 12C as a starting material), respectively, increased engagement between adjacent fibers may be readily visually observed for the welded substrate compared to the raw substrate. The increased engagement between adjacent fibers may provide various attributes to the welded substrate not present in the raw substrate, including but not limited to increased stiffness, lower moisture absorption, and/or increased rate of drying.

In a welding process configured to act on a 2D substrate (e.g., a welding process configured to produce a welded substrate similar to that shown in FIG. 12B or 12D), adding solubilized polymer (to the substrate and/or process solvent) and/or increasing the pressure on the process wetted substrate during the process temperature/pressure zone 3 may promote increased interlayer adhesion when making multiple layered and/or laminate composites.

Generally, the degree to which the substrate is welded (e.g., high, moderate, low) may affect the flexibility of the resulting welded substrate.

In addition to increased burst strength, fabric such as that shown in FIGS. 12B and 12D may exhibit an enormous increase in the score of the fabric when tested using the Martindale Pill Test. For example, a fabric comprised of raw yarn substrate that would score 1.5 or 2 on this test increases to 5 if that fabric is subjected to a welding process that performed even a moderate amount of the appropriate welding on the substrate.

Welded yarn substrates may have superior moisture wicking and absorption properties compared to conventional yarns, specifically conventional cotton yarn. As such, welded yarn substrates may dry more quickly than conventional yarns and thereby provide associated cost and resource reduction. Coupled with less tendency and/or propensity to shrink, fabrics constructed of welded yarn substrates may have much greater utility in activewear (e.g., sportswear), intimate apparel (e.g., lingerie), etc. where the combination of water management and lack of shrinkage are important attributes.

Textiles produced from welded yarn substrates may be configured to be much stronger for their weight compared with textiles produced from conventional yarns. Because the mean diameters of welded yarn substrates may be less than the mean diameters of conventional yarns for a given weight yarn, the burst strength of textiles manufactured using welded yarn substrates is observed to increase significantly.

Additionally, textiles produced from welded yarn substrates may be configured to allow wide variations and controllable results in the "hand" of the textile (e.g., feel, texture, etc.) and finish because a welding process may be configured to add a coating to the substrate and/or adjust the depth of process solvent penetration in the substrate. For example, in an aspect of a welding process, the welding process may be configured to coat a yarn substrate with solubilized cellulose as a film, which may greatly change the smoothness of the outside of the resulting welded yarn substrate as compared to the conventional raw substrate counterpart.

Included within 2D welded substrates that may be manufactured using a welding process according to the present disclosure are welded substrate cardboard, welded substrate paper-type, and/or welded substrate paper-substitute materials. Although the foregoing attributes and examples may be attributable to welded substrate paper-substitute materials, the scope of the present disclosure is not so limited and the term "2D welded substrate" is not so limited unless indicated in the following claims. Generally, the materials and/or attributes thereof for 2D welded substrates may allow for manufacturing cost reductions of paper-type and construction materials as well as enabling new uses for these materials compared to conventional materials.

Generally, welded substrate paper-substitute materials may be differentiated from conventional raw substrate counterparts at least by the fact that welded substrate paper-substitute materials may contain significant amounts (e.g., greater than 10% by mass or volume) of lignocellulosic materials. Conversely, conventional cardboard and other paper material contain refined cellulose pulp with little or no lignocellulosic materials. A welding process according to the present disclosure may be configured to produce a welded substrate paper-substitute material containing significant amounts of lignocellulosic materials. Lignocellulosic materials may serve as both low cost filler and/or strengthening (reinforcement) agents. These welded substrate paper-substitute materials may allow for differentiation within the paper and cardboard industry that is not presently observed. For example, low-cost thermal sleeves for coffee cups, pizza, and other food delivery/packaging boxes, boxes for shipping applications, clothing hangers, etc. These welded substrate paper-substitute materials may be transformative in that the cost of pulping (e.g., Kraft pulping) is eliminated. Two-dimensional and/or three-dimensional welded substrates may be useful in applications utilizing paper and/or cardboard by providing stronger, and/or lighter materials such as diapers, cardboard substitute, paper substitute, etc. without limitation unless so indicated in the following claims.

Some of the standard textile/fabric tests that have been used to verify and quantify the superior attributes of welded substrates compared to their raw substrate counterparts include, but are not limited to: (1) AATCC 135 (laundering test fabric); (2) AATCC 150 (laundering test garment); (3) ASTM D2256 (single end yarn test); (4) ASTM D3512 (pilling random tumble); and (5) ASTM D4970 (Martindale pill test). This list is not exhaustive, and other tests may be mentioned herein. Accordingly, the scope of the present disclosure is not limited by the specific test and/or quantitative data for a particular raw substrate or welded substrate unless so indicated in the following claims.

6. Specific Aspects of Various Welding Processes and Properties of Resulting Welded Substrates.

What follows is data for welded substrates manufactured using various methods and apparatuses according to the present disclosure. However, nothing in the following specific examples (e.g., process parameters used for producing the various welded substrates, the attributes, dimensions, configuration, etc. of the welded substrate) disclosed below is meant to limit the scope of the present disclosure unless so indicated in the following claims, and rather are for illustrative purposes.

One process for producing a welded substrate may be configured to use a process solvent comprised of EMIm OAc with ACN for application to a substrate comprised of raw 30/1 ring spun cotton yarn ('30 single', tex=19.69 weight yarn). A scanning electron microscope (SEM) image of such a substrate is shown in FIG. 7B, and an SEM image the resulting welded substrate is shown in FIG. 7C. Table 1.1 shows some of the key processing parameters used to manufacture the welded substrate in FIG. 7C. In this configuration, process solvent application was accomplished via pulling the substrate through a 33-inch long tube, wherein the tube was filled with process solvent. Accordingly, such a configuration does not result in discrete process solvent application zone 2 At the end of tube, a flexible orifice (e.g., squeegee) was designed to physically contact the process wetted substrate to remove a portion of the process solvent from the exterior surface of the process wetted substrate and to distribute the process solvent properly with respect to the substrate.

Figure 7A:
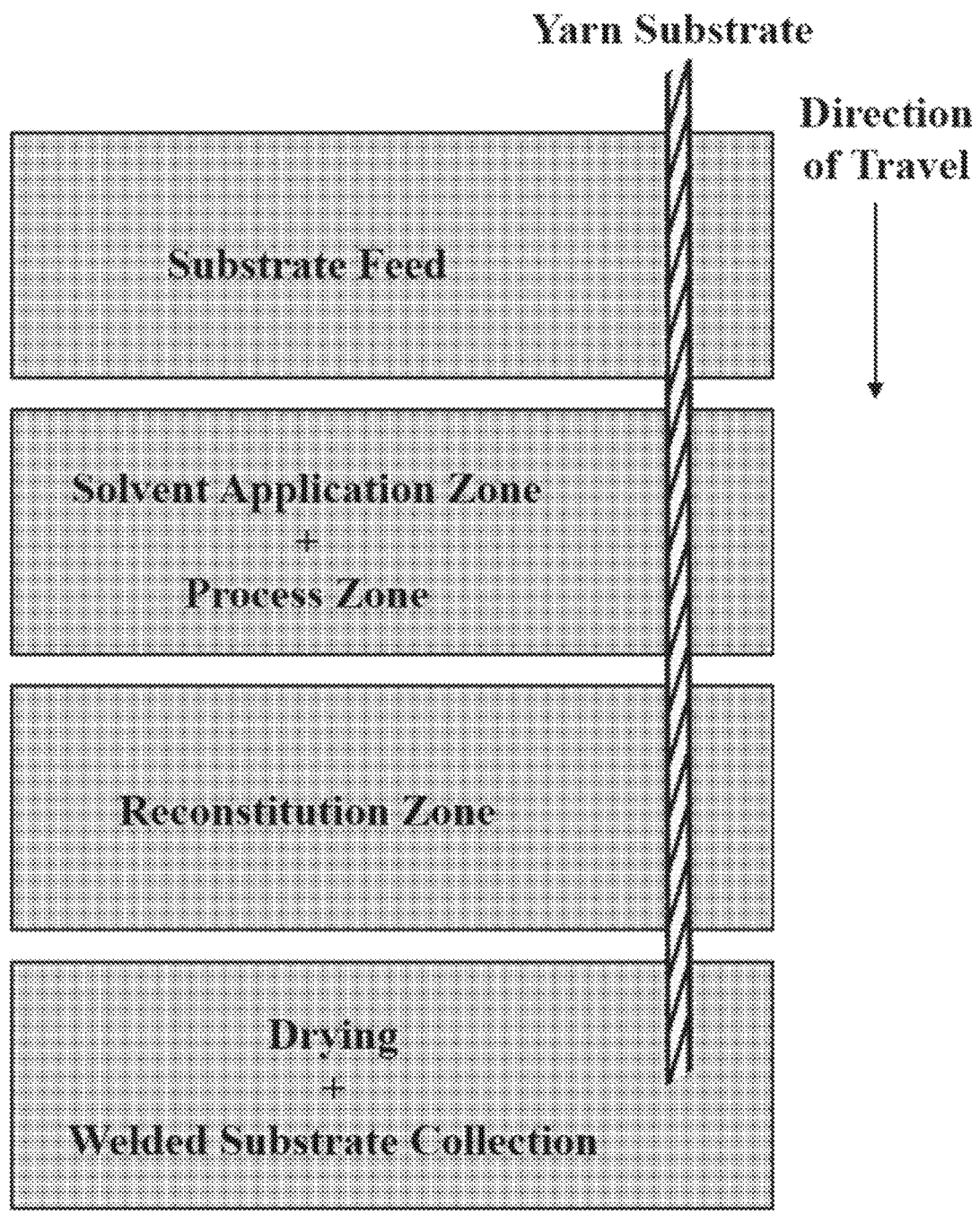
FIG. 7A is a schematic view of a welding process that may be used to produce the welded substrate shown in FIG. 7C.
Figure 7B:
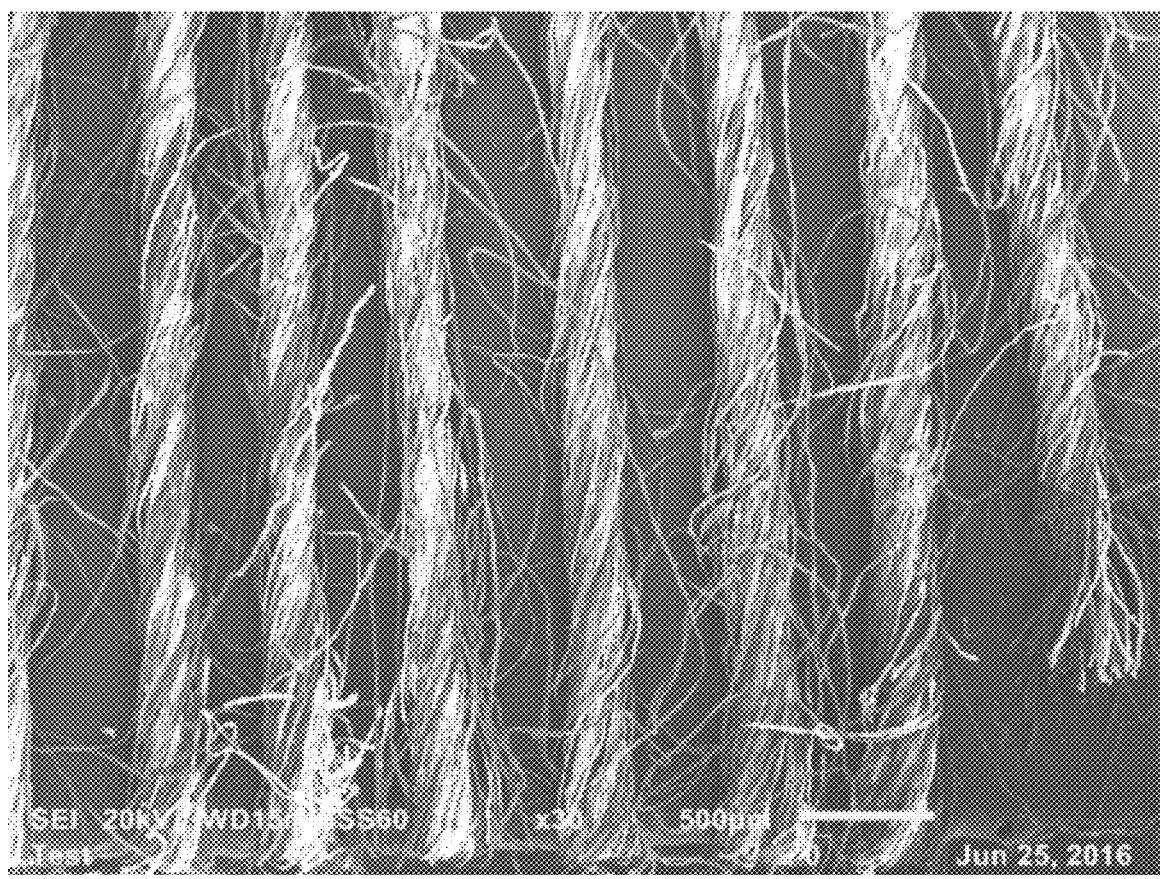
FIG. 7B provides a scanning-electron microscope image of raw, 1D substrate comprised of 30/1 ring-spun cotton yarn.
Figure 7C:
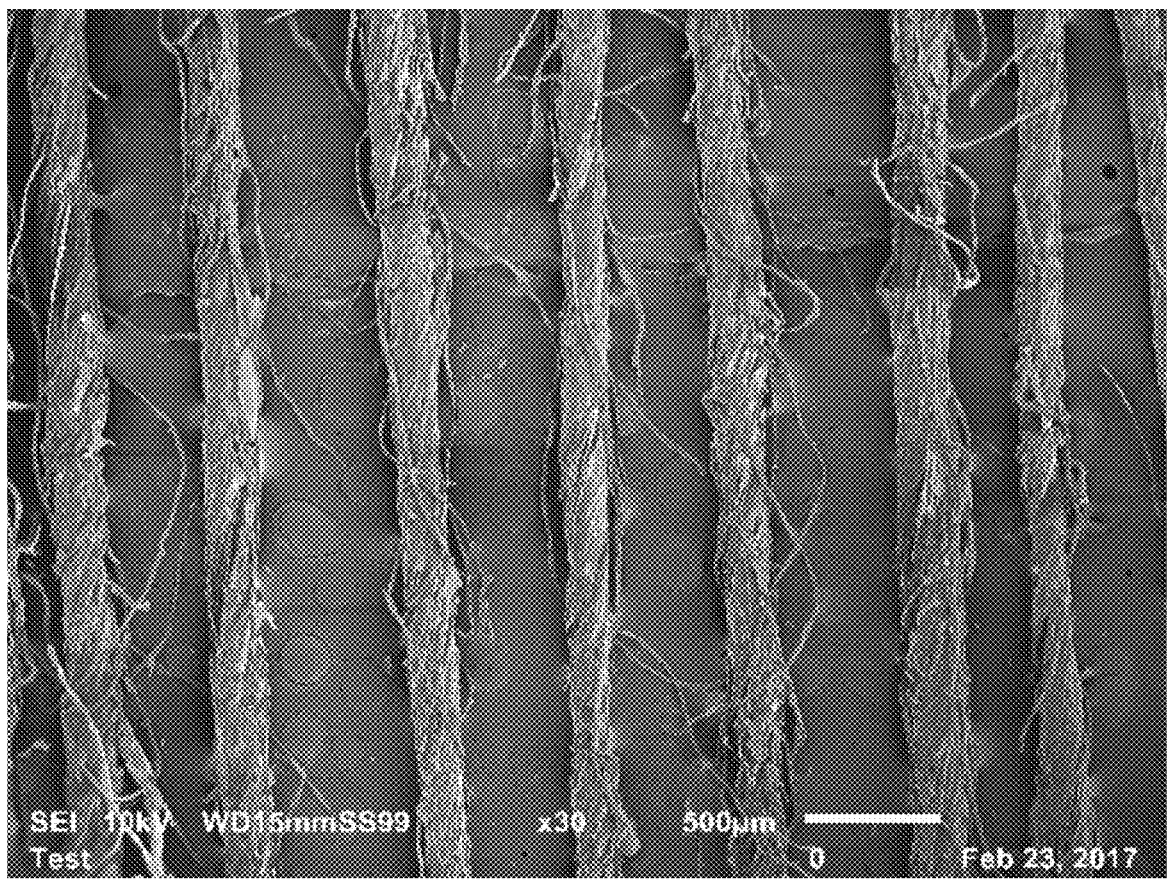
FIG. 7C provides a scanning-electron microscope image of the raw substrate shown in FIG. 7B after it has been processed in another welding process with a process solvent comprised of an ionic liquid to produce a welded substrate.

A schematic representation of a welding process is shown in FIG. 7A, and that welding process may be configured to produce the welded substrate shown in FIG. 7C. The welding process shown in FIG. 7A may be configured according to the various principles and concepts previously described herein related to FIGS. 1, 2, & 6A-6E regarding viscous drag, process solvent application, physical contact with process wetted substrate, etc. For brevity, the aspects of this welding process related to process solvent recovery zone 4, solvent collection zone 7, solvent recycling 8, mixed gas collection 9, and mixed gas recycling zones 10 are omitted. Note that viscous drag was achieved by co-optimization of the process solvent composition, the temperature, the flexibility and size of the squeegee orifice, et cetera. Volume controlled consolidation of the welded substrates was limited to yarn diameter reduction only by controlling the linear tension on the process welded substrate and/or reconstituted wetted substrate during drying thereof in the drying zone and by the collection method of winding the welded substrate under controlled tension conditions. However, with 2D or 3D substrates, volume controlled consolidation of the welded substrate may limit the tension on a process wetted substrate, reconstituted wetted substrate, etc. in other dimensions, which may require controlling at least a first linear tension, a second linear tension, and/or a third linear tension.

TABLE 1.1

| Temperatures (° C.) | Pull Rate (m/min) | Welding Zone Time (sec) | Solv. Ratio (g/g) | Solvent Type |
|---|---|---|---|---|
| Process solvent application zone/process pressure temperature zone: 65 | 5.3 | 10.0 | Approx. 4 | EMIm OAc:ACN 1:2 (Mole Ratio) |

Figure 7D:
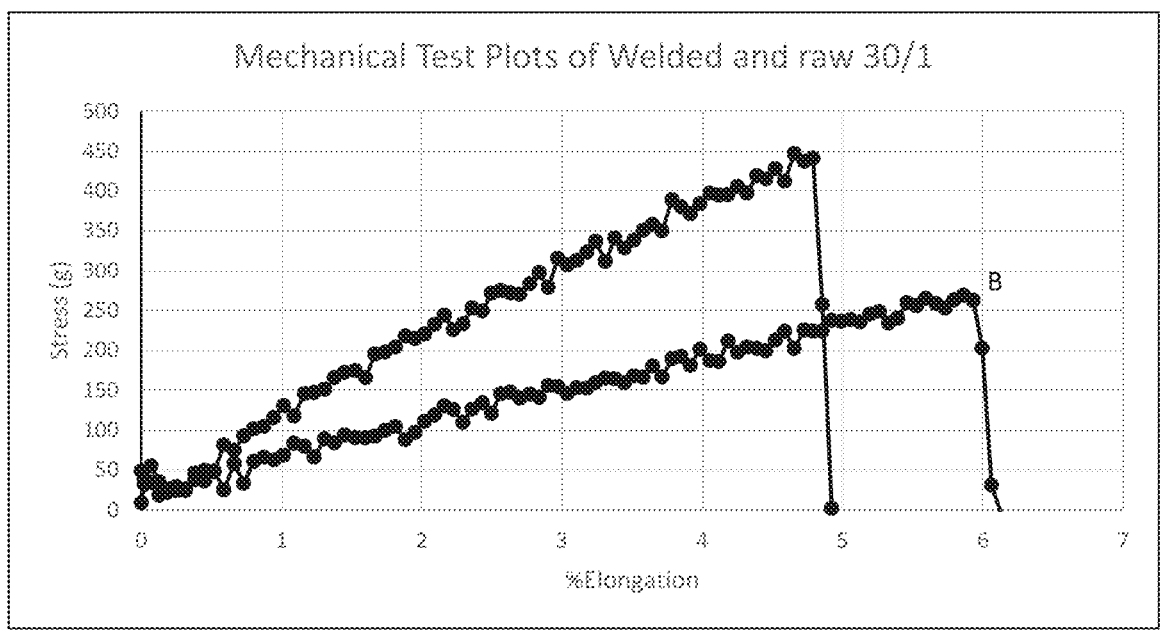
FIG. 7D provides a graphical representation of the stress (in grams) versus percent-elongation applied to both a representative raw yarn substrate sample and a representative welded yarn substrate sample from FIG. 7C, wherein the top curve is the welded yarn substrate and the bottom trace is the raw.

Table 1.1 shows some of the key processing parameters used to manufacture the welded substrate in FIG. 7C utilizing the welding process shown in FIG. 7A. Note that in Table 1.1, "welding zone time" refers to the duration in which the substrate was positioned in the process solvent application zone 2 and process temperature/pressure zone 3. This time represents roughly an order of magnitude reduction of welding time compared with the prior art. There are, of course, many processes that have been divulged for which samples are treated for minutes to hours. However, the prior art does not disclose partial solubilization-type processes that are able to achieve desired effects in such short durations. This significant reduction in welding time was only possible by co-optimizing process solvent chemistry with hardware and control systems engineered to achieve the desired effects. That is to say, by combining chemistry and hardware in ways that achieve the appropriate viscous drag and controlled volume consolidation to achieve surprising new effects in the finished welded yarn substrates. A plot of the stress in grams versus percent-elongation applied to both a representative raw yarn substrate sample and a representative welded yarn substrate is shown in FIG. 7D, wherein the top curve is the welded yarn substrate and the bottom trace is the raw.

Still referring to Table 1.1, "pull rate" refers to the linear rate at which the substrate moves through the welding process (which affects viscous drag), and "solvent ratio" refers to the mass ratio of process solvent to substrate.

Table 1.2 provides various attributes of the welded substrate shown in FIG. 7C (as performed on approximately 20 unique specimens of welded yarn substrate), which attributes were collected using an Instron brand mechanical properties tester operating in tensile testing mode approximating ASTM D2256. As used in Table 1.2, breaking strength denotes the average absolute force in grams at which the welded substrates. The normalized breaking strength is grams converted to centi-Newtons normalized by the weight of the raw yarn substrate (which for this sample was 19.69 tex). Percent elongation denotes displacement divided by gauge length times 100 at which breakage occurred.

TABLE 1.2

| Breaking Strength (g) | Norm. Breaking Strength (cN/dtex) | Elongation (%) |
|---|---|---|
| 375 | 1.86 | 4.2 |

Figure 8A:
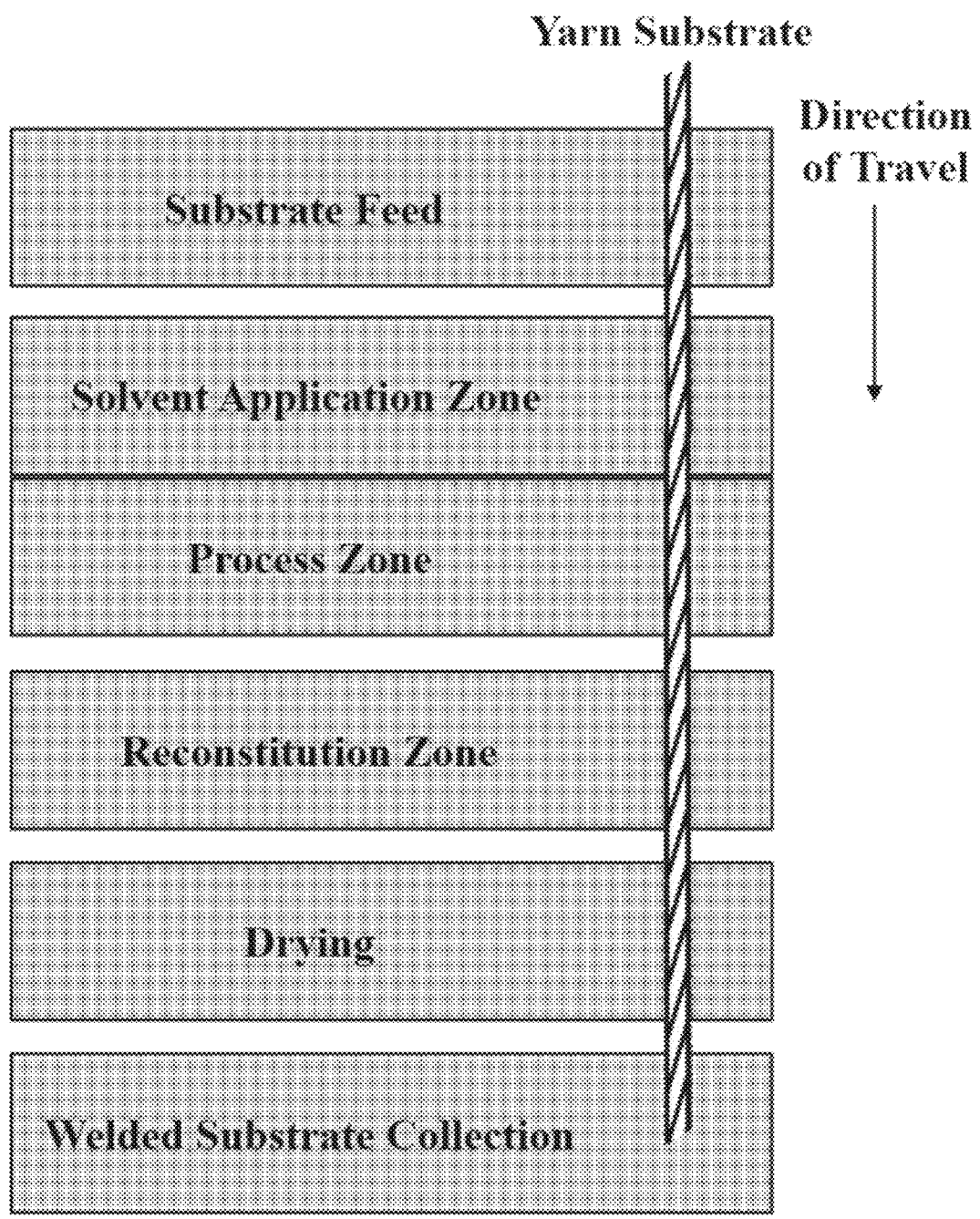
FIG. 8A is a schematic view of a welding process that may be used to produce the welded substrate shown in FIG. 8C.

Another process for producing a welded substrate may be configured to use a process solvent comprised of EMIm OAc with ACN for application to a substrate comprised of raw 30/1 ring spun cotton yarn. A schematic of such a welding process is shown in FIG. 8A. The welding process shown in FIG. 8A may be configured according to the various principles and concepts previously described herein related to FIGS. 1, 2, & 6A-6E regarding viscous drag, process solvent application, physical contact with process wetted substrate, etc. For brevity, the aspects of this welding process related to process solvent recovery zone 4, solvent collection zone 7, solvent recycling 8, mixed gas collection 9, and mixed gas recycling zones 10 are omitted. In this example, aspects of the apparatus for use with the welding process were specifically configured to increase the rate at which substrate comprised of yarn could be moved through the process. In specific, by separating the process solvent application 2 from the process temperature/pressure zone 3 using an injector 60 device analogous to that described in FIG. 6A.

Figure 8B:
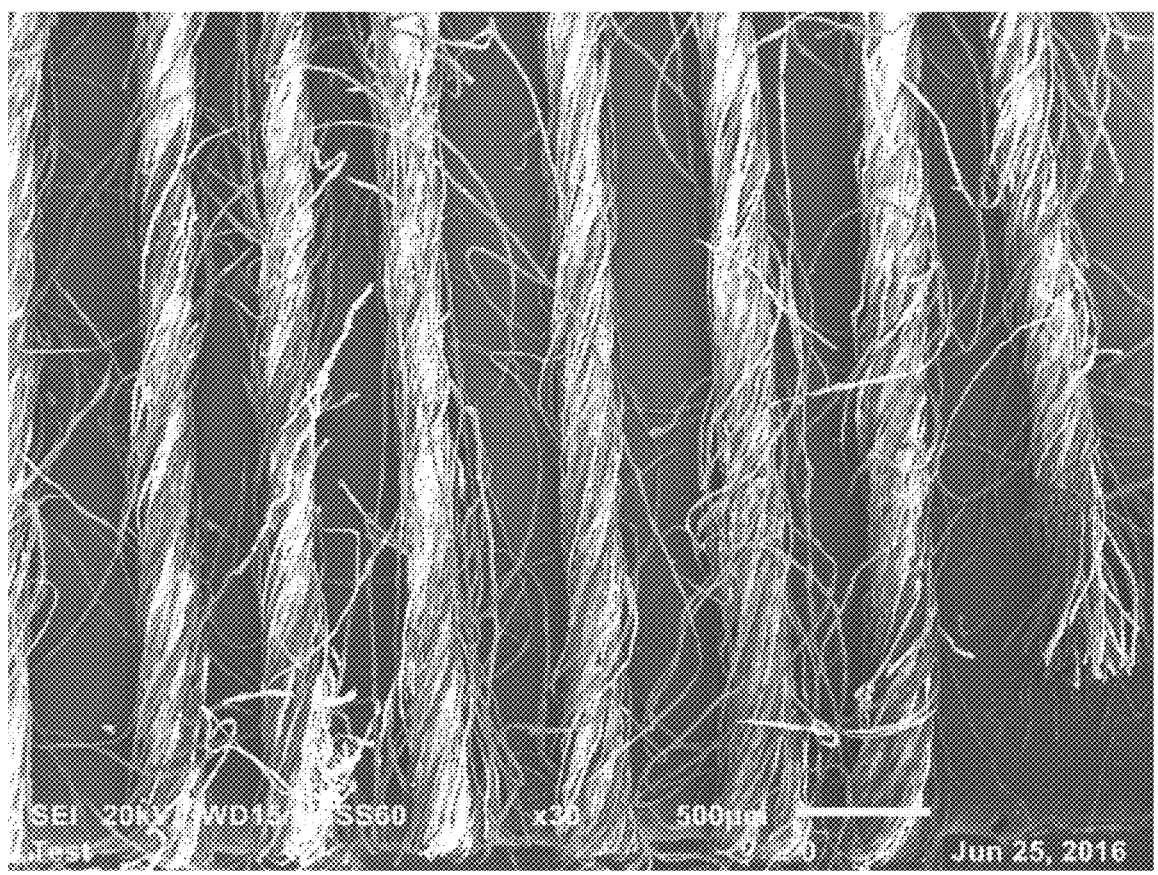
FIG. 8B provides a scanning-electron microscope image of raw, 1D substrate comprised of 30/1 ring-spun cotton yarn.
Figure 8C:
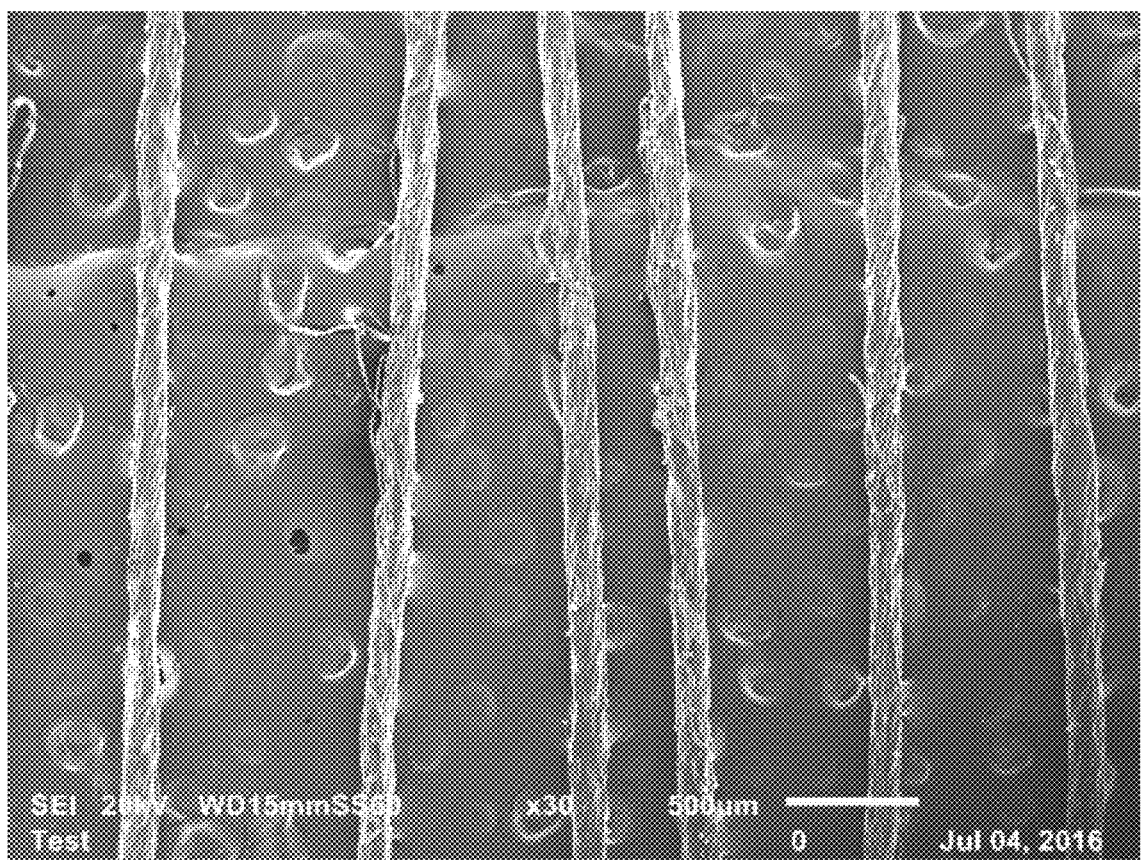
FIG. 8C provides a scanning-electron microscope image of the raw substrate shown in FIG. 8B after it has been processed in another welding process with a process solvent comprised of an ionic liquid to produce a welded substrate.

Table 2.1 shows some of the key processing parameters used to manufacture the welded substrate in FIG. 8C using the welding process depicted in FIG. 8A. The process parameters for each column heading in Table 2.1 are the same as those previously described regarding Table 1.1. In this welding process, the temperatures of the process solvent application zone 2 and process temperature/pressure zone 3 were held at different values to co-optimize both the desired amount of viscous drag and promote increased process solvent efficacy. In addition, by achieving process solvent application using a metering pump and applying viscous drag at key points throughout the process solvent application zone 2, it was possible to limit the frictional forces (e.g., shearing) on the yarn substrate to achieve greater tension control. This had the effect of additionally aiding the volume controlled reduction of the yarn substrate diameter. The overall design enabled faster total throughput than the previous example and is evident by comparing Table 1.1 with Table 2.1.

A scanning electron microscope (SEM) image of a substrate comprised of raw 30/1 ring spun cotton yarn that may be used with welding process of FIG. 8A is shown in FIG. 8B. An SEM image of the resulting welded substrate is shown in FIG. 8C. Table 2.1 shows some of the key processing parameters used to manufacture the welded substrate in FIG. 8C.

TABLE 2.1

| Temperatures (° C.) | Pull Rate (m/min) | Welding Zone Time (sec) | Solv. Ratio (g/g) | Solvent Type |
|---|---|---|---|---|
| Process solvent application zone: 78 process pressure temperature zone: 74 | 14.4 | 11.0 | 2.85 | EMIm OAc:ACN 1:2 (Mole Ratio) |

Figure 8D:
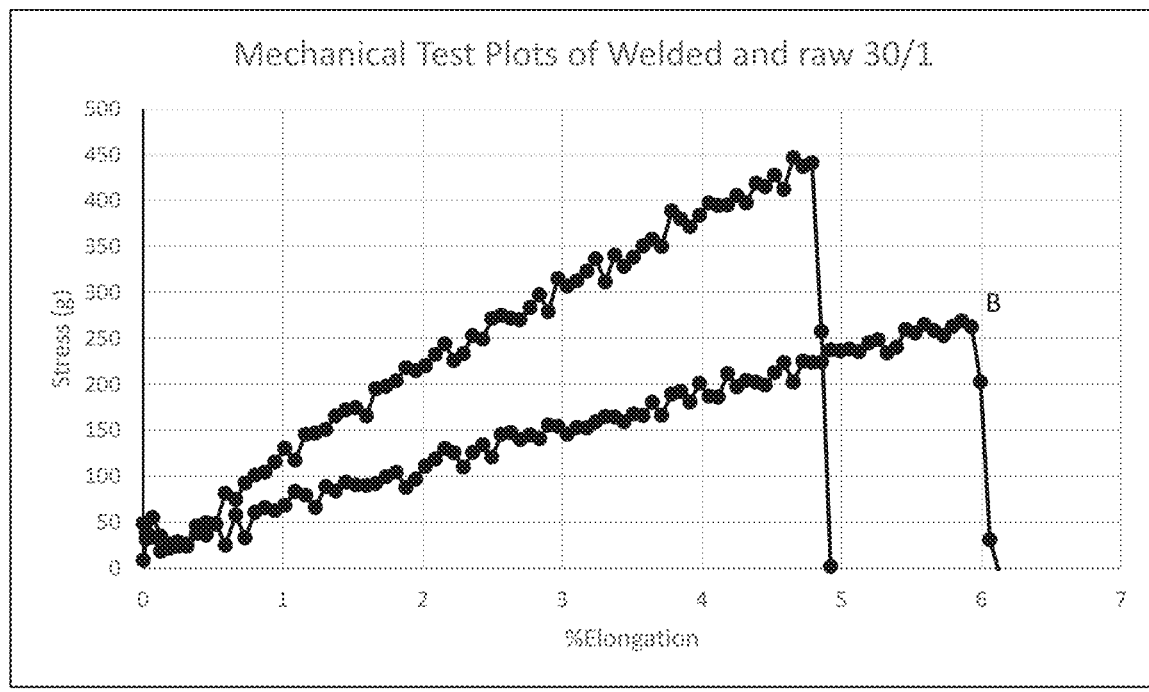
FIG. 8D provides a graphical representation of the stress (in grams) versus percent-elongation applied to both a representative raw yarn substrate sample and a representative welded yarn substrate sample from FIG. 8C, wherein the top curve is the welded yarn substrate and the bottom trace is the raw.

Table 2.2 provides various attributes of the welded substrate shown in FIG. 8C produced using the parameters described in Table 2.1. The attributes were averaged as performed on approximately 20 unique specimens of welded yarn substrates, which attributes were collected using an Instron brand mechanical properties tester operating in tensile testing mode approximating ASTM D2256. The mechanical property for each column heading in Table 2.2 are the same as those previously described regarding Table 1.2. A plot of the stress in grams versus percent-elongation applied to both a representative raw yarn substrate sample and a representative welded yarn substrate sample is shown in FIG. 8D, wherein the top curve is the welded yarn substrate and the bottom trace is the raw.

TABLE 2.2

| Breaking Strength (g) | Norm. Breaking Strength (cN/dtex) | Elongation (%) |
|---|---|---|
| 395 | 1.96 | 4.9 |

Another process for producing a welded substrate may be configured to use a process solvent comprised of EMIm OAc with ACN for application to a substrate comprised of raw 30/1 ring spun cotton yarn or 10/1 open end spun cotton yarn. Such a process may be analogous to that shown schematically in FIG. 8A. Table 3.1 shows some of the key processing parameters used to manufacture a welded substrate from a substrate comprised of 10/1 open end spun cotton yarn, and Table 3.2 provides various attributes of the welded substrate and the raw substrate using a welding process with the parameters shown in Table. 3.1. Of course, these data are illustrative for attributes of a welded substrate that may be accomplished via a welding process and are not meant to limit the type of yarn substrates that can be welded and/or attributes of welded substrates unless so indicated in the following claims.

Figure 9A:
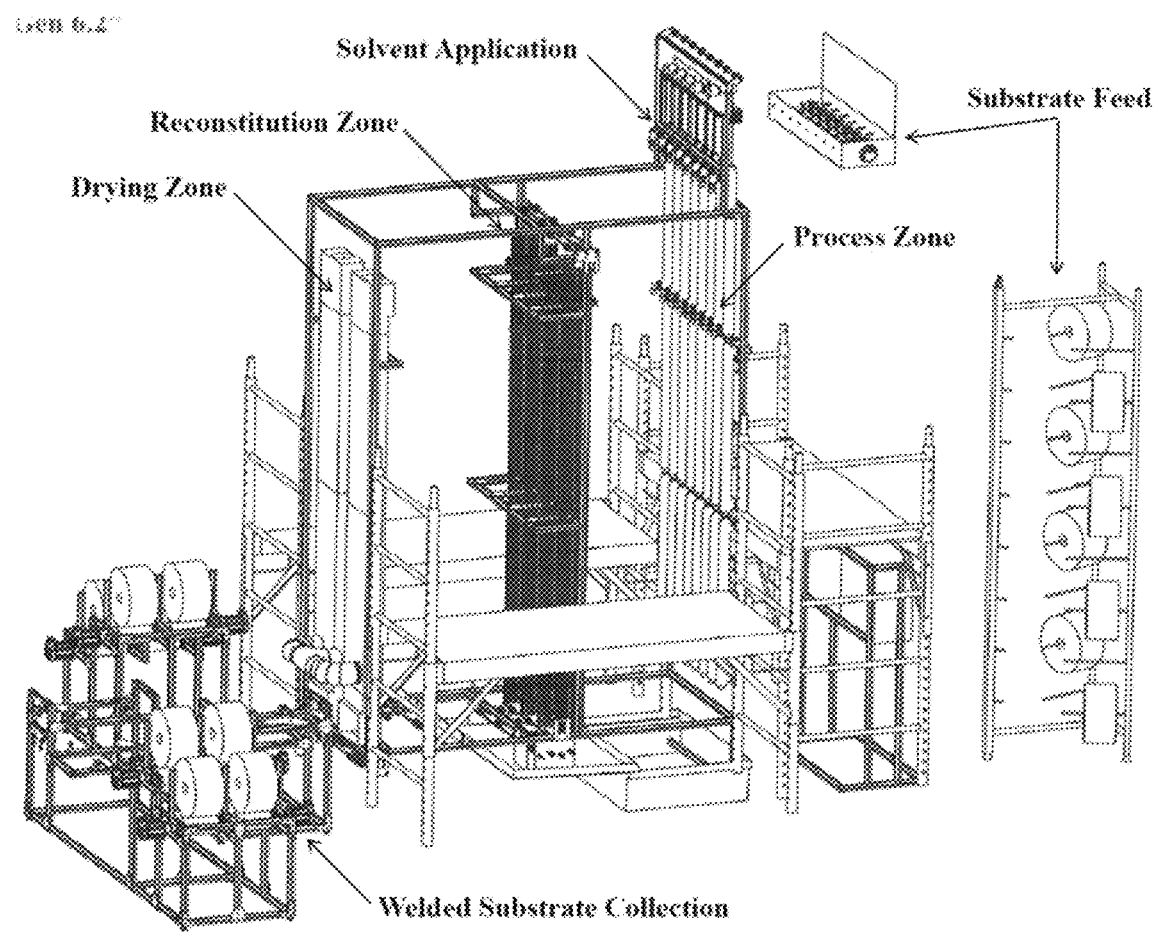
FIG. 9A is a perspective view of a welding process that may be configured to produce the welded substrate shown in FIGS. 9C-9E.

Another process for producing a welded substrate may be configured to use a process solvent comprised of EMIm OAc with ACN for application to a substrate comprised of raw yarn. A perspective view of various apparatuses that may be configured to perform such a welding process is shown in FIG. 9A. The welding process and apparatuses therefore shown in FIG. 9A may be configured according to the various principles and concepts previously described herein related to FIGS. 1, 2, & 6A-6E regarding viscous drag, process solvent application, physical contact with process wetted substrate, etc. For brevity, the aspects of this welding process related to process solvent recovery zone 4, solvent collection zone 7, solvent recycling 8, mixed gas collection 9, and mixed gas recycling zones 10 are omitted.

Figure 9B:
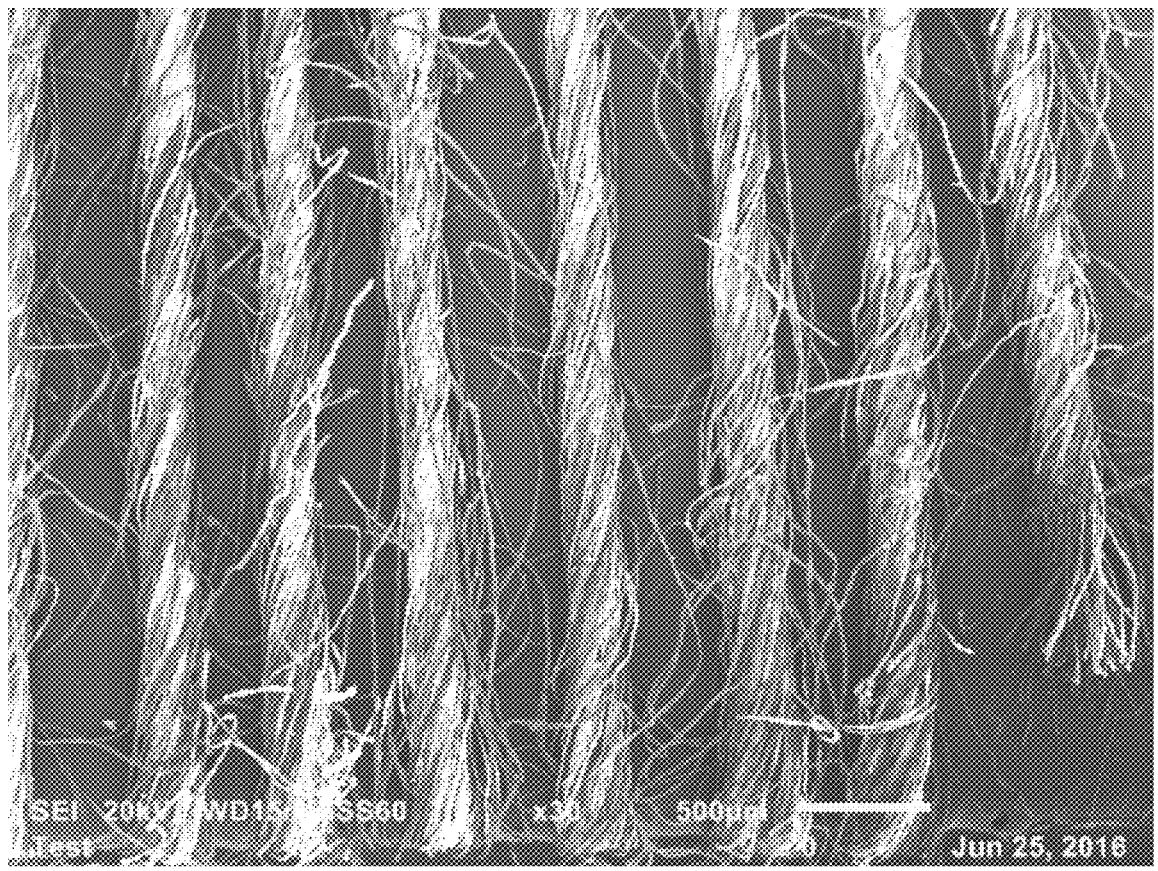
FIG. 9B provides a scanning-electron microscope image of raw, 1D substrate comprised of 30/1 ring-spun cotton yarn.
Figure 9C:
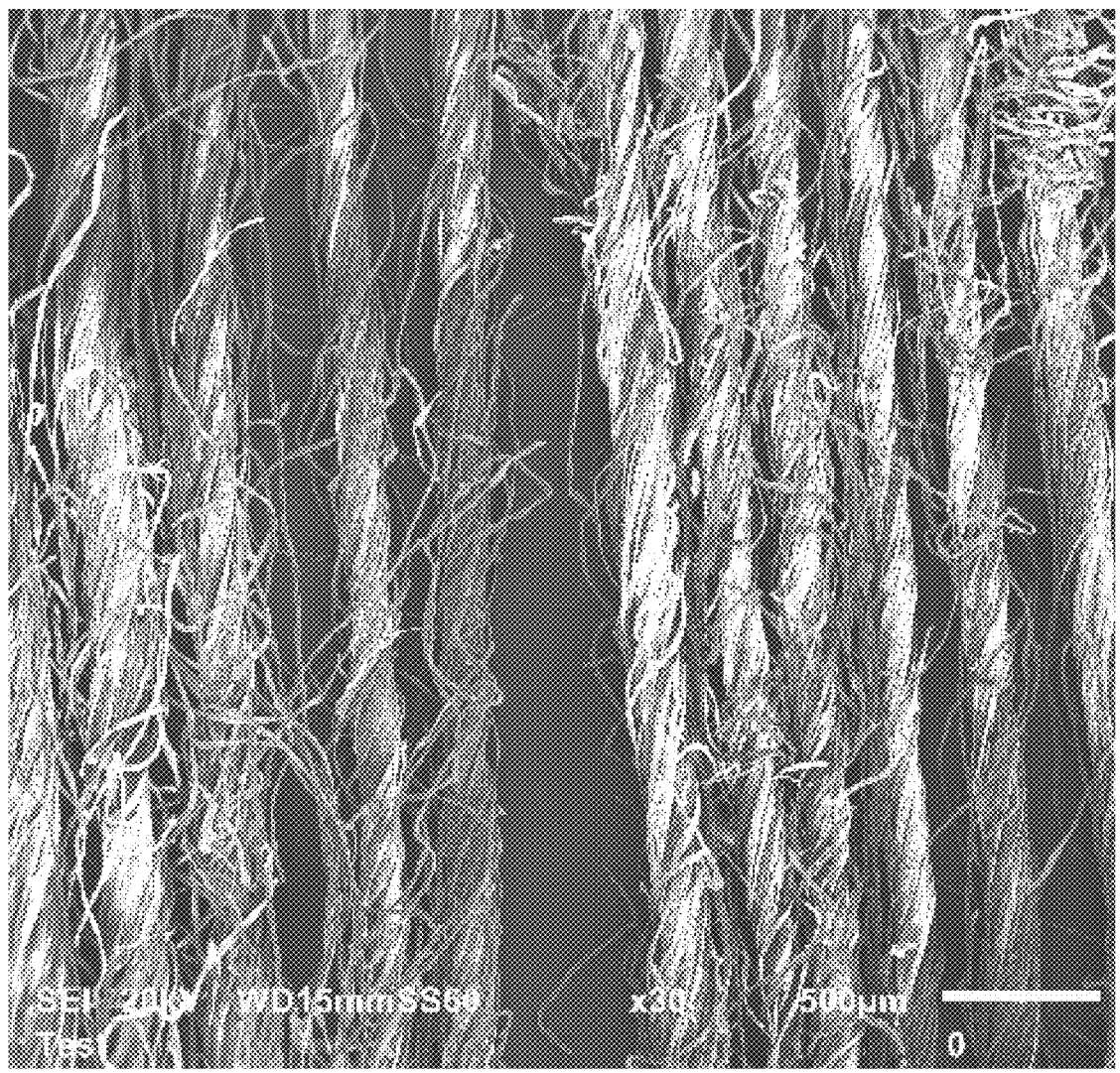
FIG. 9C provides a scanning-electron microscope image of the raw substrate shown in FIG. 9B after it has been processed in a welding process with a process solvent comprised of an ionic liquid, wherein the welded substrate is lightly welded.

A scanning electron microscope (SEM) image of a substrate that may be used with the welding process and apparatuses of FIG. 9A is shown in FIG. 9B, and an SEM image the resulting welded substrate is shown in FIG. 9C. Table 3.1 shows some of the key processing parameters used to manufacture the welded substrate using the welding process and apparatuses shown in FIG. 9A to produce the welded substrate in FIG. 9K (which is analogous to the welded substrate shown in FIG. 9C in that it is lightly welded). The process parameters for each column heading in Table 3.1 are the same as those previously described regarding Table 1.1.

Note that this welding process may configured to move multiple ends of yarn substrate simultaneously, and that virtually all important process parameters such as process solvent flow rate, temperature, substrate feed rate, substrate tension, etc. may be adjusted. In particular, this welding process and apparatuses may enable the co-optimization of viscous drag and controlled volume consolidation for particular welded substrates designed for specific products. A selected number of welded yarn substrates are shown in FIGS. 9C-9E and 9I-9M.

TABLE 3.1

| Temperatures (° C.) | Pull Rate (m/min) | Welding Zone Time (sec) | Solv. Ratio (g/g) | Solvent Type |
|---|---|---|---|---|
| Process solvent application zone: 77 process pressure temperature zone: 77 | 17.3 | 8.9 | 3.0 | EMIm OAc:ACN 1:2 (Mole Ratio) |

Figure 9D:
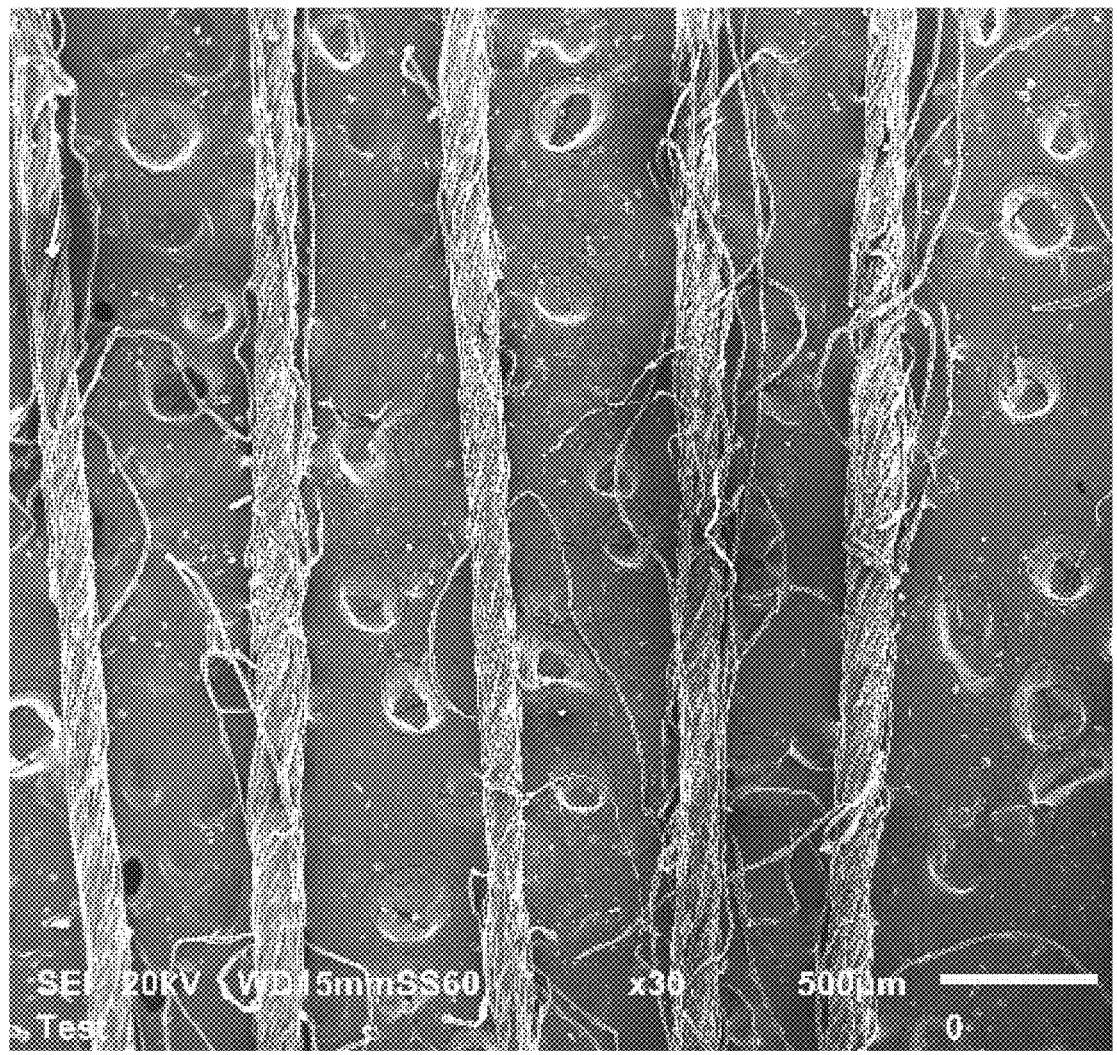
FIG. 9D provides a scanning-electron microscope image of the raw substrate shown in FIG. 9B after it has been processed in a welding process with a process solvent comprised of an ionic liquid, wherein the welded substrate is moderately welded.
Figure 9E:
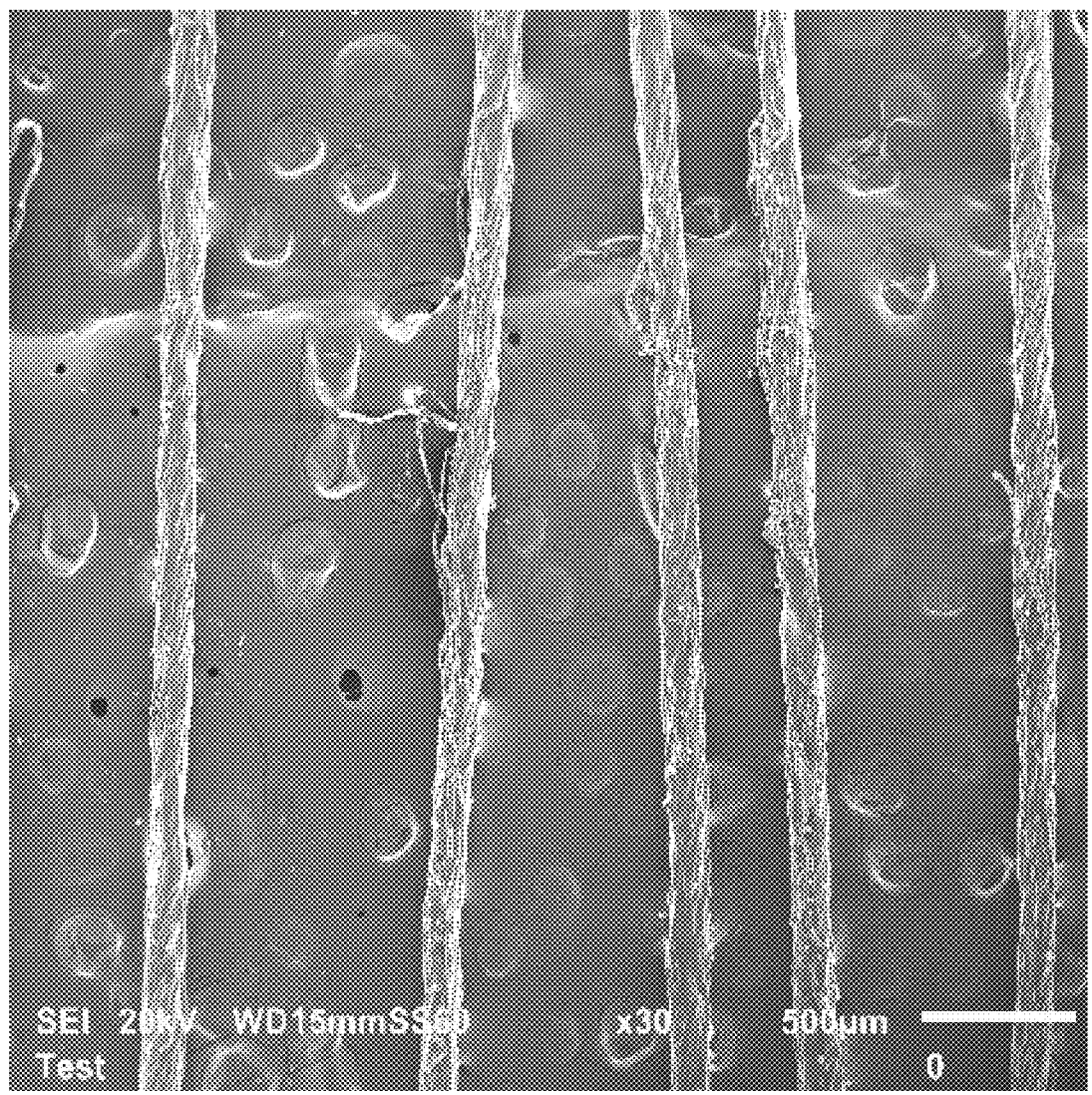
FIG. 9E provides a scanning-electron microscope image of the raw substrate shown in FIG. 9B after it has been processed in a welding process with a process solvent comprised of an ionic liquid, wherein the welded substrate is highly welded.
Figure 9F:
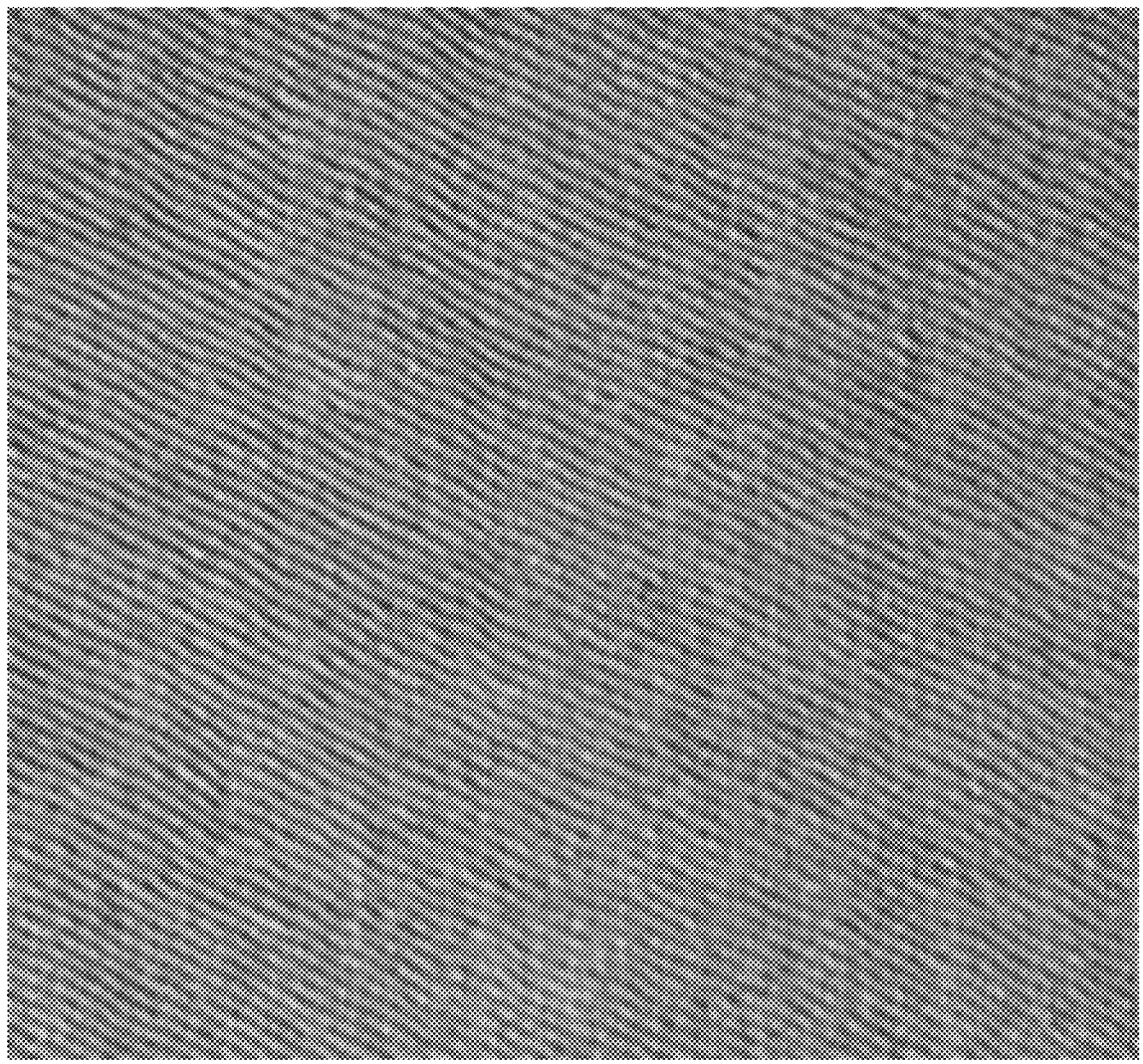
FIG. 9F provides an image of a fabric made from the welded substrate shown in FIG. 9D.
Figure 9G:
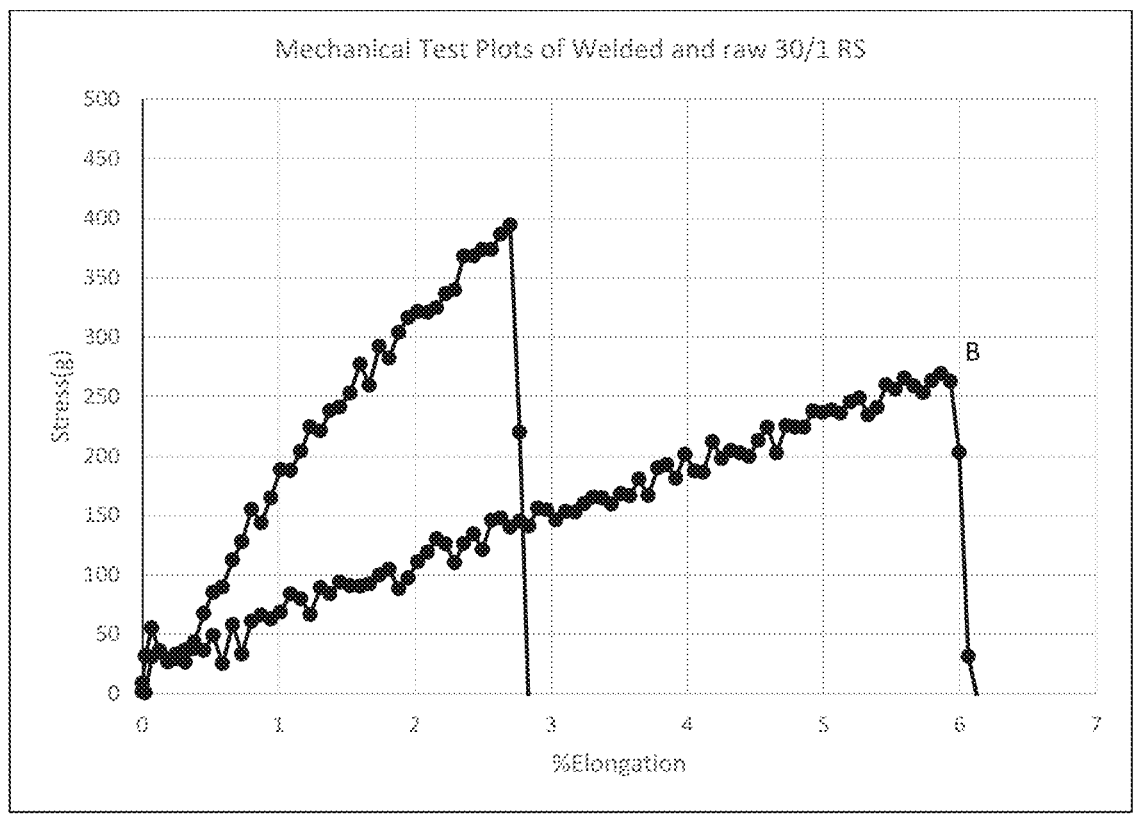
FIG. 9G provides a graphical representation of the stress (in grams) versus percent-elongation applied to both a representative raw yarn substrate sample and a representative welded yarn substrate sample from FIGS. 9C and 9K, wherein the top curve is the welded yarn substrate and the bottom trace is the raw.
Figure 9H:
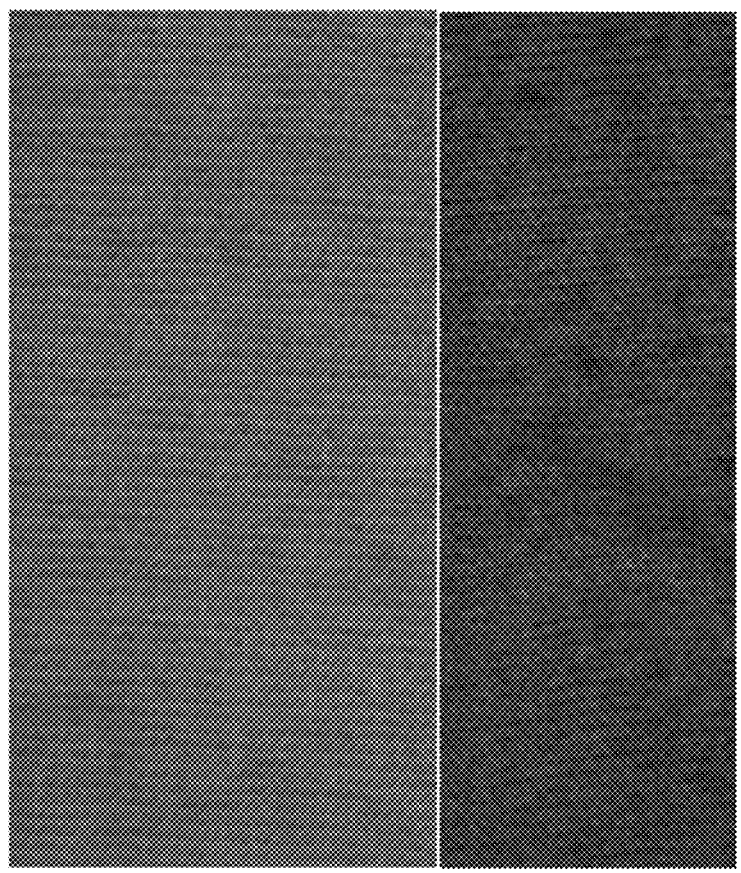
FIG. 9H provides an image of a fabric made from the raw substrate shown in FIG. 9B on the left side of the picture and a fabric made from the welded substrate shown in FIG. 9D on the right side of the picture.
Figure 91:
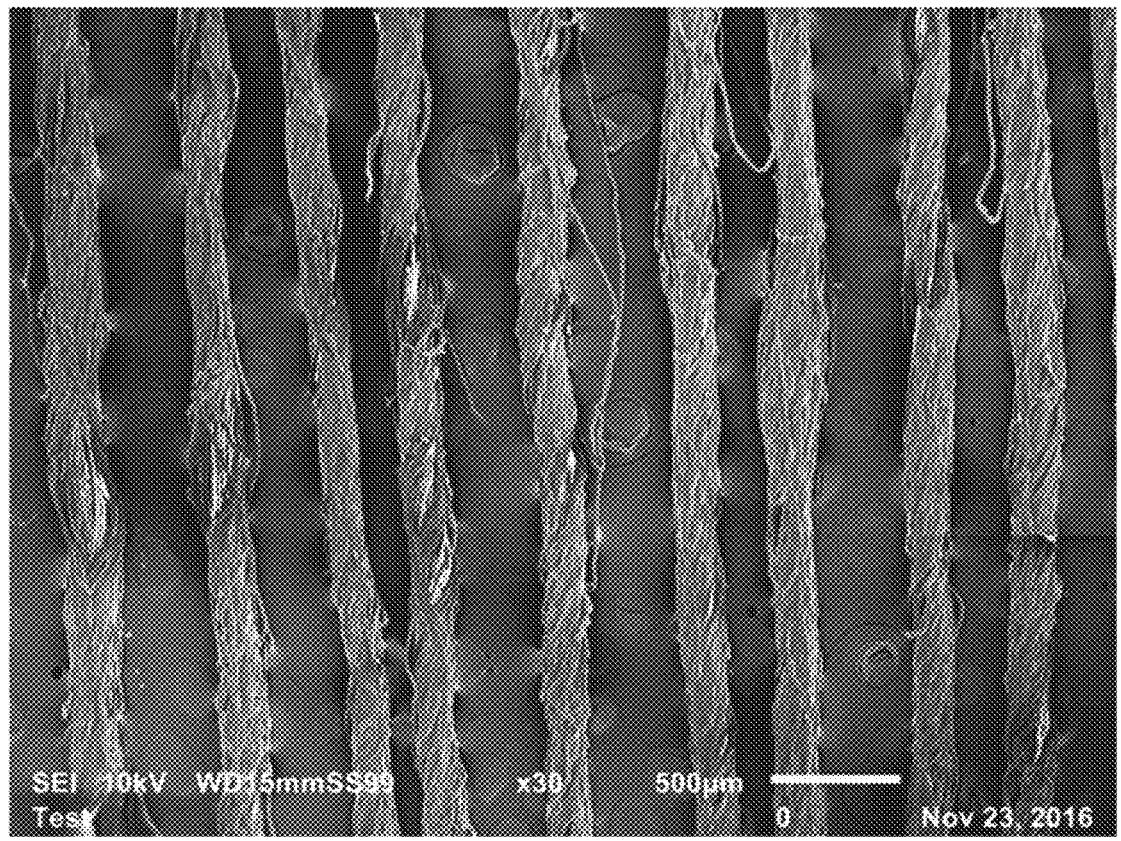
Figure 9J:
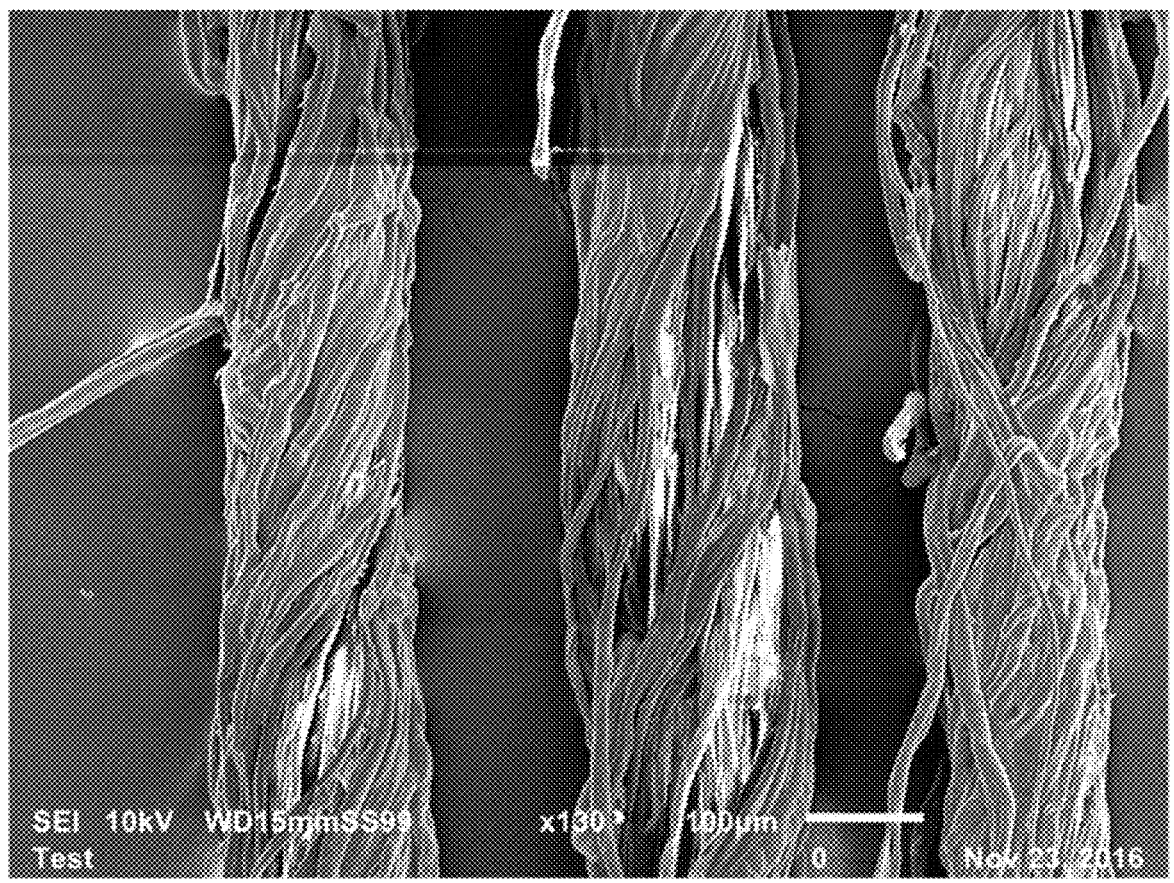
Figure 9K:
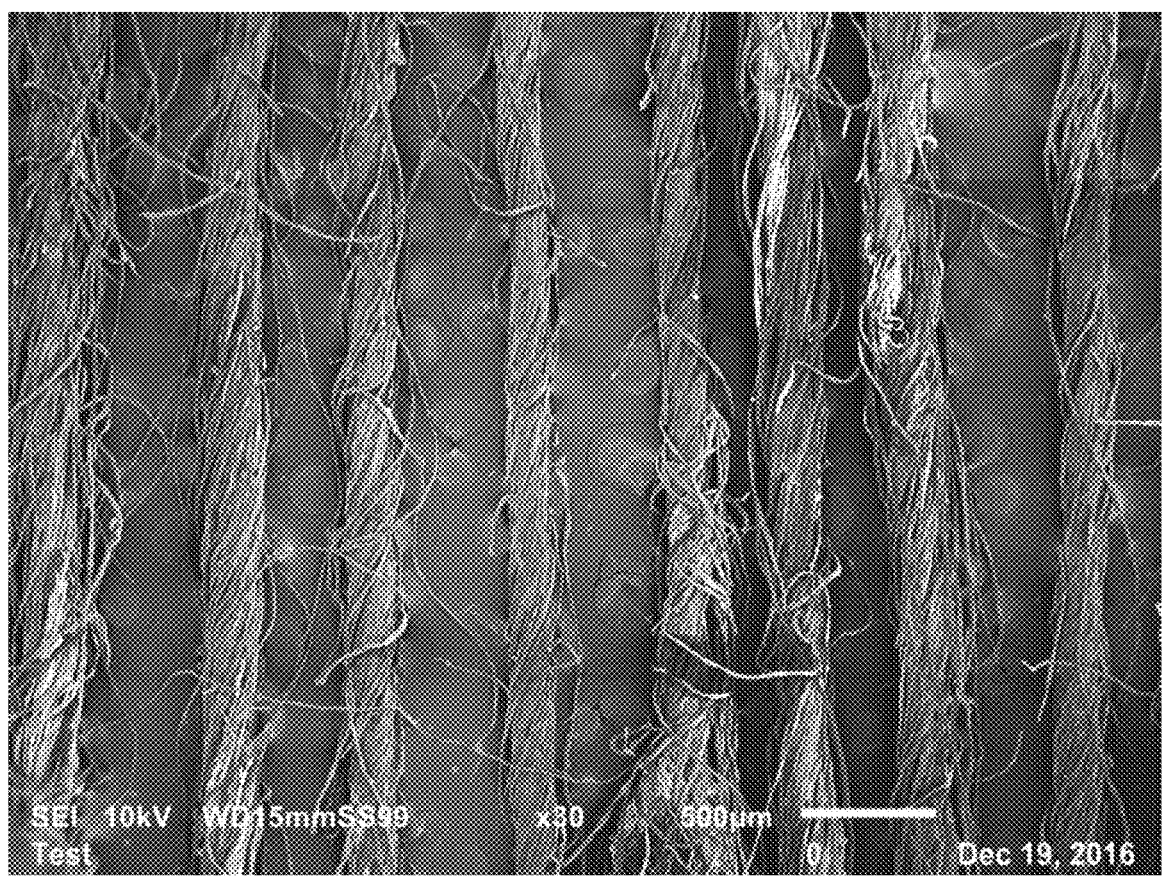
FIG. 9K provides a scanning-electron microscope image of the raw substrate shown in FIG. 9B after it has been processed in a welding process with a process solvent comprised of an ionic liquid, wherein the welded substrate is lightly welded.

Table 3.2 provides various attributes of the welded substrate shown in FIG. 9K produced using the parameters described in Table 3.1. The attributes were averaged as performed on approximately 20 unique specimens of welded yarn substrate, which attributes were collected using an Instron brand mechanical properties tester operating in tensile testing mode approximating ASTM D2256. The mechanical property for each column heading in Table 3.2 are the same as those previously described regarding Table 1.2. A plot of the stress in grams versus percent-elongation applied to both a representative raw yarn substrate sample and a representative welded yarn substrate sample (such as the welded substrate shown in FIGS. 9C and 9K that has been lightly welded) is shown in FIG. 9G, wherein the top curve is the welded yarn substrate and the bottom trace is the raw.

TABLE 3.2

| Breaking Strength (g) | Norm. Breaking Strength (cN/dtex) | Elongation (%) |
|---|---|---|
| 348 | 1.73 | 3.0 |

Figure 9L:
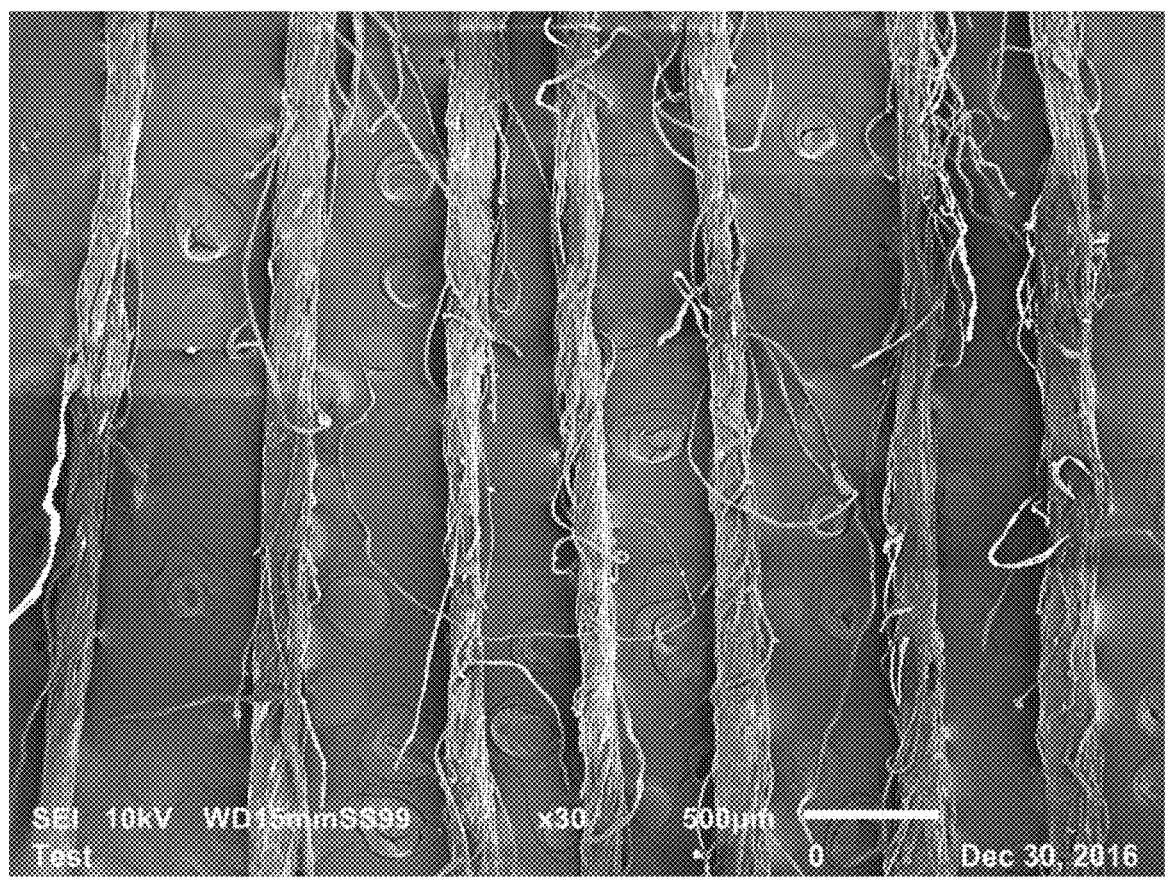
FIG. 9L provides a scanning-electron microscope image of the raw substrate shown in FIG. 9B after it has been processed in a welding process with a process solvent comprised of an ionic liquid, wherein the welded substrate is moderately welded.

Table 4.1 shows some of the key processing parameters used to manufacture the welded substrate using the welding process and apparatuses shown in FIG. 9A to produce the welded substrate in FIG. 9L (which is analogous to the welded substrate shown in FIG. 9D in that it is moderately welded). The process parameters for each column heading in Table 4.1 are the same as those previously described regarding Table 1.1.

Note that this welding process may configured to move multiple ends of yarn substrate simultaneously, and that virtually all important process parameters such as process solvent flow rate, temperature, substrate feed rate, substrate tension, etc. may be adjusted. In particular, this welding process and apparatuses may enable the co-optimization of viscous drag and controlled volume consolidation for particular welded substrates designed for specific products.

TABLE 4.1

| Temperatures (° C.) | Pull Rate (m/min) | Welding Zone Time (sec) | Solv. Ratio (g/g) | Solvent Type |
|---|---|---|---|---|
| Process solvent application zone: 90 process pressure temperature zone: 79 | 18.0 | 8.5 | 3.0 | EMIm OAc:ACN 1:2 (Mole Ratio) |

Table 4.2 provides various attributes of the welded substrate shown in FIG. 9L produced using the parameters described in Table 4.1. The attributes were averaged as performed on approximately 20 unique specimens of welded yarn substrate, which attributes were collected using an Instron brand mechanical properties tester operating in tensile testing mode approximating ASTM D2256. The mechanical property for each column heading in Table 4.2 are the same as those previously described regarding Table 1.2.

TABLE 4.2

| Breaking Strength (g) | Norm. Breaking Strength (cN/dtex) | Elongation (%) |
|---|---|---|
| 365 | 1.82 | 2.2 |

Figure 9M:
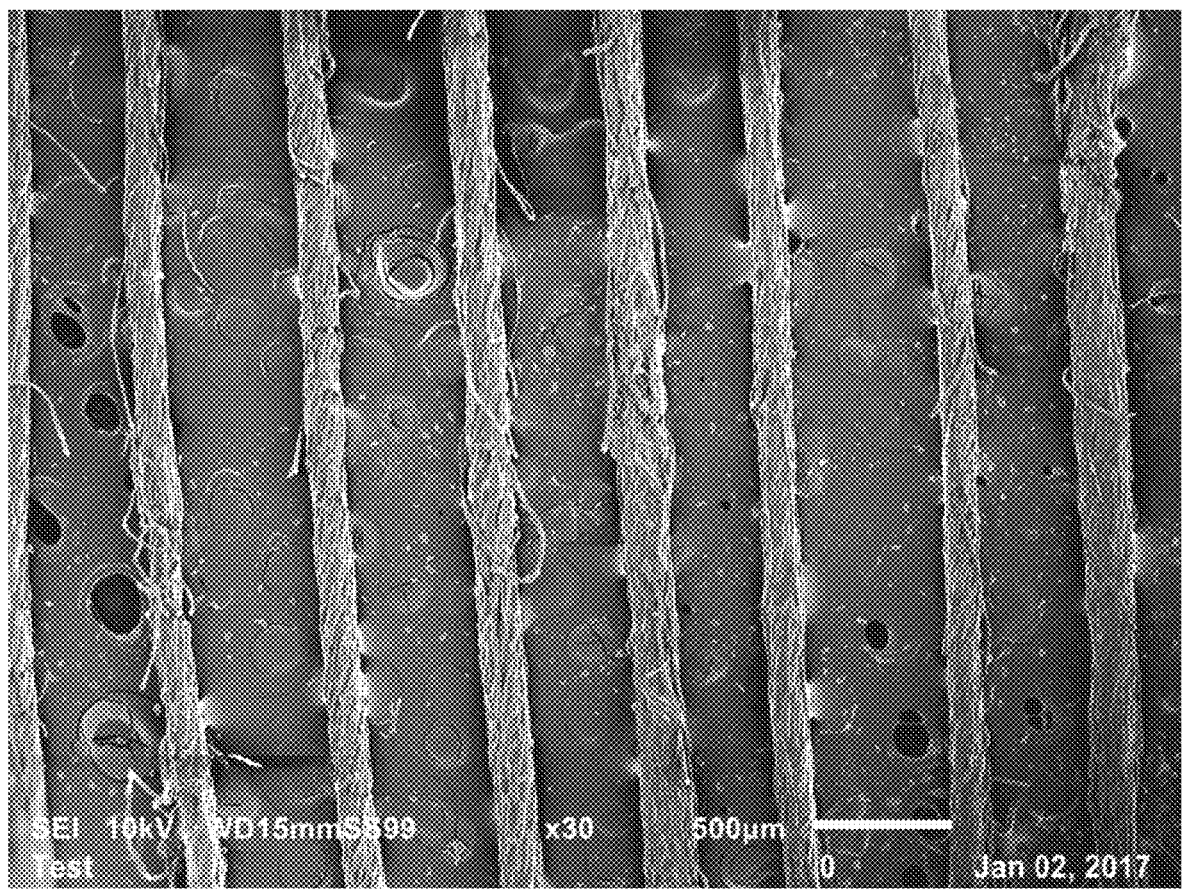
FIG. 9M provides a scanning-electron microscope image of the raw substrate shown in FIG. 9B after it has been processed in a welding process with a process solvent comprised of an ionic liquid, wherein the welded substrate is highly welded.

Table 5.1 shows some of the key processing parameters used to manufacture the welded substrate using the welding process and apparatuses shown in FIG. 9A to produce the welded substrate in FIG. 9M (which is analogous to the welded substrate shown in FIG. 9E in that it is highly welded). The process parameters for each column heading in Table 5.1 are the same as those previously described regarding Table 1.1.

Note that this welding process may configured to move multiple ends of yarn substrate simultaneously, and that virtually all important process parameters such as process solvent flow rate, temperature, substrate feed rate, substrate tension, etc. may be adjusted. In particular, this welding process and apparatuses may enable the co-optimization of viscous drag and controlled volume consolidation for particular welded substrates designed for specific products.

TABLE 5.1

| Temperatures (° C.) | Pull Rate (m/min) | Welding Zone Time (sec) | Solv. Ratio (g/g) | Solvent Type |
|---|---|---|---|---|
| Process solvent application zone: 110 process pressure temperature zone: 79 | 17.3 | 8.9 | 3.5 | EMIm OAc:ACN 1:2 (Mole Ratio) |

Table 5.2 provides various attributes of the welded substrate shown in FIG. 9M produced using the parameters described in Table 5.1. The attributes were averaged as performed on approximately 20 unique specimens of welded yarn substrate, which attributes were collected using an Instron brand mechanical properties tester operating in tensile testing mode approximating ASTM D2256. The mechanical property for each column heading in Table 5.2 are the same as those previously described regarding Table 1.2.

TABLE 5.2

| Breaking Strength (g) | Norm. Breaking Strength (cN/dtex) | Elongation (%) |
|---|---|---|
| 353 | 1.76 | 1.8 |

A progression of the degree to which a substrate is welded is shown in FIGS. 9C-9E, all of which welded substrates may be manufactured using the process and apparatuses shown in FIG. 9A by varying the process parameters. In particular, the SEM data show progressive elimination of loose hair on cotton yarns as well as varying degrees of controlled volume consolidation for a lightly welded substrate in FIG. 9C, moderately welded substrate in FIG. 9D, and highly welded substrate in FIG. 9E. All of these welded substrates were manufactured using a substrate comprised of raw 30/1 cotton yarn. The terms "lightly," "moderately," and "highly" are not meant to be limiting in any sense, but rather meant to convey a relative, qualitative aspect unless otherwise indicated herein or in the following claims.

A test fabric produced from a lightly welded substrate (which welded substrate may be analogous to those shown in FIG. 9C or 9K) is shown in FIG. 9F. The absolute attributes of fabrics knitted or woven from welded substrates may vary, and may be manipulated at least via the process parameters and degree of welding performed on the welded substrates comprising the fabric. Table 6.1 shows some of the key processing parameters used to manufacture the welded substrate using the welding process and apparatuses shown in FIG. 9A to produce the welded substrate used for the fabric shown in FIG. 9F. The process parameters for each column heading in Table 6.1 are the same as those previously described regarding Table 1.1.

TABLE 6.1

| Temperatures (° C.) | Pull Rate (m/min) | Welding Zone Time (sec) | Solv. Ratio (g/g) | Solvent Type |
|---|---|---|---|---|
| Process solvent application zone: 90 process pressure temperature zone: 79 | 18.0 | 8.5 | 3.0 | EMIm OAc:ACN 1:2 (Mole Ratio) |

Table 6.2 provides various attributes of the fabric comprised of three distinct samples of lightly welded substrates such as those from FIGS. 9C and 9K (using raw 30/1 ring spun yarn substrate) and for a corresponding fabric made using raw yarn substrate. The burst strengths were determined using ASTM D3786. The column heading "Burst Strength" refers to the absolute burst strength in pounds per square inch, and the column heading "Burst Strength Improve." refers to the percent improvement of the fabric comprised of welded yarn substrates compared to that comprised of raw yarn substrates, which is the control.

TABLE 6.2

| Yarn used in Fabric | Burst Strength (psi) | Burst Strength Improve. % |
|---|---|---|
| Control (raw substrate) | 60.0 | — |
| Welded A (lightly welded substrate) | 71.5 | +19% |
| Welded B (lightly welded substrate) | 72.5 | +21% |
| Welded C (lightly welded substrate) | 72.9 | +21% |

In addition to increased burst strength, fabric such as that shown in FIG. 9F may exhibit an enormous increase in the score of the fabric when tested using the Martindale Pill Test (ASTM D4970). For example, a fabric comprised of raw yarn substrate that would score 1.5 or 2 on this test would increase to 5 if that same raw yarn substrate was subjected to a welding process such that it was even moderately welded.

Another progression of the degree to which a substrate is welded is shown in FIGS. 9K-9M, all of which welded substrates may be manufactured using the process and apparatuses shown in FIG. 9A by varying the process parameters as described above related to the Tables associated with the welding process for producing each welded substrate. In particular, the SEM data show progressive elimination of loose hair on cotton yarns as well as varying degrees of controlled volume consolidation for a lightly welded substrate in FIG. 9K, moderately welded substrate in FIG. 9L, and highly welded substrate in FIG. 9M. All of these welded substrates were manufactured using a substrate comprised of raw 30/1 cotton yarn. Some mechanical properties of the yarns shown in FIGS. 9K-9M and that shown in FIGS. 9I & 9J are shown in Table 7.1, which provides a comparison of the same mechanical properties for the raw yarn substrate. In Table 7.1, "tenacity" refers to a weight normalized measure of strength, which is commonly used in the yarn and fiber industry.

TABLE 7.1

| Degree of Welding | Tenacity (cN/dtex) | Elongation |
|---|---|---|
| Raw yarn | 1.24 | 4.9% |
| Lightly welded | 1.73 | 3.0% |
| Medium welded | 1.82 | 2.2% |
| Highly welded | 1.76 | 1.8% |
| Core-shell type welding | 1.89 | 4.2% |

Generally, increased strength is observed for welded substrates as compared to their raw substrate counterparts. As previously discussed, the fabric shown in FIG. 9F has a burst strength that is approximately 30% greater than that of a similar knitted control fabric produced from raw yarn substrate. Other improvements such as decreased time of drying (after laundering), increased abrasion resistance, and greater vibrancy of dyeing compared to raw substrate counterparts are also observed and will be discussed in further detail below. The absolute degree to which these attributes are observed may be controlled at least via the process parameters (e.g., the degree and quality of the welding process). The degree and quality of the welding process, in turn, may be a function of at least the co-optimization of process solvent application and viscous drag as well as controlled volume consolidation that occurs during various steps of a welding process.

Referring again to FIG. 9G, which shows a comparison of percent-elongation as a function of linear tension (in grams) applied to both a raw substrate and welded substrate, welded substrates exhibit superior mechanical properties. The welded substrate shown in FIG. 9C may be considered a "core welded" substrate, wherein the term "core welded" refers to welded substrates in which process solvent application and welding action have permeated the substrate relatively evenly throughout the substrate diameter.

The welded substrate shown in FIGS. 9I and 9J may be considered a "shell welded" substrate, wherein the term "shell welded" refers to a welded substrate that has been preferentially welded on the outer exterior surface of the substrate (i.e., so as to create a welded shell). As clearly shown in the center portion of the centrally positioned welded substrate shown in FIG. 9J, the welded shell is distinct from a minimally/non-welded core.

This shell welded substrate may be manufactured from a substrate comprised of raw 30/1 ring spun cotton yarn utilizing the welding process and apparatuses shown in FIG. 9A. Table 8.1 shows some of the key processing parameters used to manufacture the shell welded substrate using the welding process and apparatuses shown in FIG. 9A to produce the welded substrate in FIGS. 9I & 9J. The process parameters for each column heading in Table 8.1 are the same as those previously described regarding Table 1.1.

Note that this welding process may configured to move multiple ends of yarn substrate simultaneously, and that virtually all important process parameters such as process solvent flow rate, temperature, substrate feed rate, substrate tension, etc. may be adjusted. In particular, this welding process and apparatuses may enable the co-optimization of viscous drag and controlled volume consolidation for particular welded substrates designed for specific products.

TABLE 8.1

| Temperatures (° C.) | Pull Rate (m/min) | Welding Zone Time (sec) | Solv. Ratio (g/g) | Solvent Type |
|---|---|---|---|---|
| Process solvent application zone: 105 process pressure temperature zone: 105 | 3.5 | 14.4 | 3.0 | BMIm Cl:ACN 1:1 (Mole Ratio) |

Table 8.2 provides various attributes of the welded substrate shown in FIGS. 9I & 9J produced using the parameters described in Table 8.1. The attributes were averaged as performed on approximately 20 unique specimens of welded yarn substrate, which attributes were collected using an Instron brand mechanical properties tester operating in tensile testing mode approximating ASTM D2256. The mechanical property for each column heading in Table 8.2 are the same as those previously described regarding Table 1.2.

TABLE 8.2

| Breaking Strength (g) | Norm. Breaking Strength (cN/dtex) | Elongation (%) |
|---|---|---|
| 380 | 1.89 | 4.2 |

By optimizing various process parameters (e.g., process solvent to substrate ratio, temperature, pressure, etc., and the resulting efficacy of the process solvent) and viscous drag, it is possible to control the depth to which the substrate is welded in a dimension from the exterior of the substrate to the interior thereof. That is, a welding process may be configured to preferentially weld the outer regions of the substrate such that the substrate core is not welded to the same degree as the exterior thereof. This has the effect of increasing strength compared to the raw substrate while also often retaining elongation properties of the raw substrate, and thus results in increased toughness (increased energy to break). Note that both core welded and shell welded substrates can display positive attributes such as faster drying, greater abrasion resistance, greater pilling resistance, more vibrant color, etc. when compared to their raw substrate counterparts.

A picture of a piece of fabric constructed from approximately 50% raw (not processed) cotton yarn substrate and 50% moderately welded yarn substrate is shown in FIG. 9H, wherein the left portion of the figure shows the raw cotton yarn and the right portion of the figure shows welded cotton substrate. The split fabric underwent a pot dye process and reveals the enhanced, rich, and deeper, more vibrant color for the side of the fabric knitted from welded yarn substrate. The welded yarn substrate and resulting fabric has less hair at least because of the co-optimized process solvent application methods, viscous drag, and solvent efficacy. Moreover, controlled volume reduction associated with the welding, reconstitution, and drying steps of a welding process may be configured to reduce the surface area and empty space within the welded yarn substrate. This reduces the number of interfaces for which light can scatter. The net result of these combined effects is that the dye colorant(s) are more able to be seen through the welded substrate, which is more transparent than the raw substrate.

It should be noted that the relative lack of hair and reduction of empty space within fiber welded substrates is also responsible for the surprising and dramatic reduction of time required to dry fiber welded substrates. Again, the lack of hair at the substrate surface and reduction of empty space within the welded substrate by controlled volume consolidation may be configured to limit the extent to which bulk water can be integrated within the welded substrate. This is the reason why welded substrates often dry greater than twice as fast (half as much energy required) as raw substrates. Lastly, it is observed that the same coatings and surface modification chemistries that help reduce water retention in raw cotton are even more effective with fiber welded cotton substrates. Similar results are also observed for silk, linen, and other natural substrates.

Figure 10A:
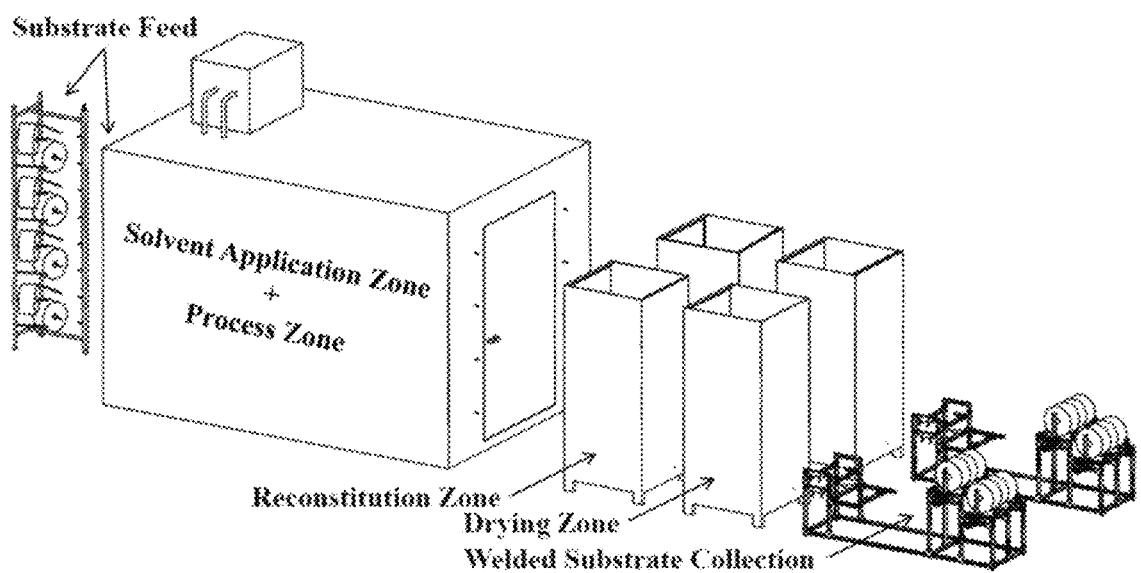
FIG. 10A is a perspective view of a welding process that may be configured to produce the welded substrate shown in FIGS. 10C-10F.

Another process for producing a welded substrate may be configured to use a process solvent comprised of lithium hydroxide and urea for application to a substrate comprised of raw 30/1 ring spun cotton yarn. A perspective view of various apparatuses that may be configured to perform such a welding process is shown in FIG. 10A. The welding process and apparatuses therefore shown in FIG. 10A may be configured according to the various principles and concepts previously described herein related to FIGS. 1, 2, & 6A-6F regarding viscous drag, process solvent application, physical contact with process wetted substrate, etc. In this configuration, the substrate (e.g., yarn in the specific configuration shown in FIG. 10A) is dragged multiple times through a grooved tray, such as that shown in FIG. 6B. Each pass through the tray contributes additional process solvent to the substrate. The entire welding path for the substrate may be contained within a temperature controlled environment (in one configuration operating between −17° C. and −12° C.). The welded yarn substrate generally may reach an optimized strength after 14 minutes of low temperature welding time. After this duration, the process wetted substrate may travel to a reconstitution zone. For brevity, the aspects of this welding process related to process solvent recovery zone 4, solvent collection zone 7, solvent recycling 8, mixed gas collection 9, and mixed gas recycling zones 10 are omitted.

Figure 10B:
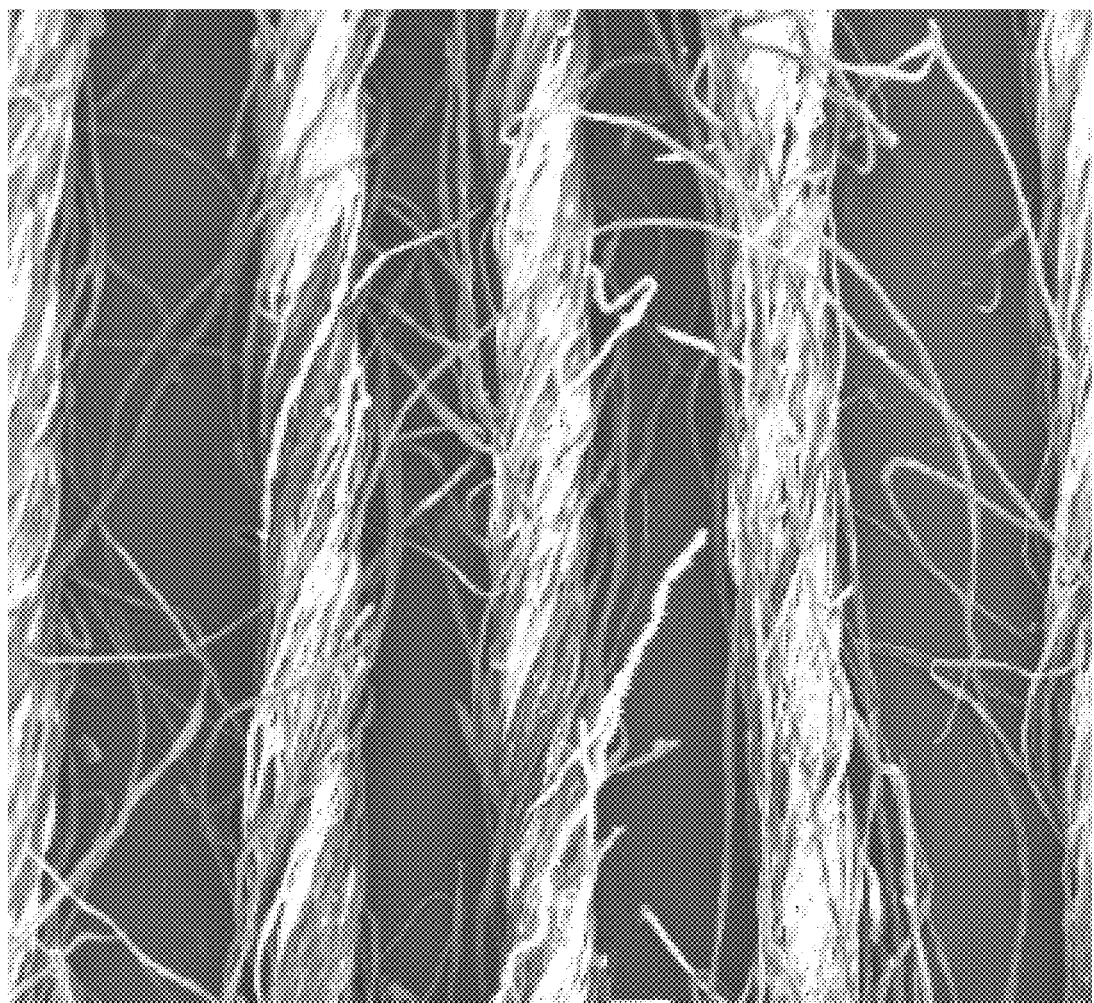
FIG. 10B provides a scanning-electron microscope image of multiple raw, 1D substrates comprised of 30/1 ring-spun cotton yarn.
Figure 10C:
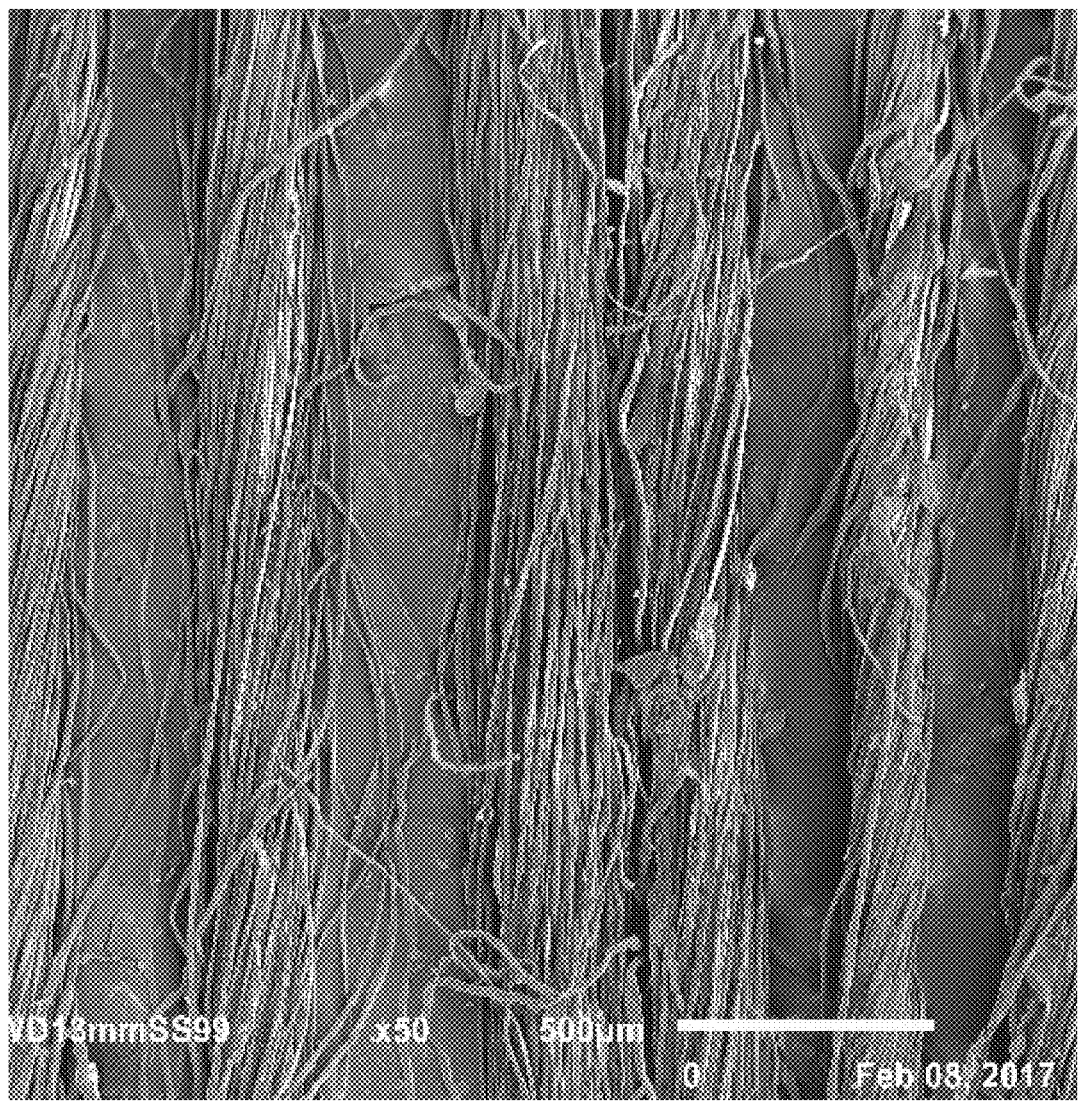
FIG. 10C provides a scanning-electron microscope image of the raw substrate shown in FIG. 10B after it has been processed in a welding process with a process solvent comprised of a hydroxide, wherein the welded substrate is lightly welded.
Figure 10D:
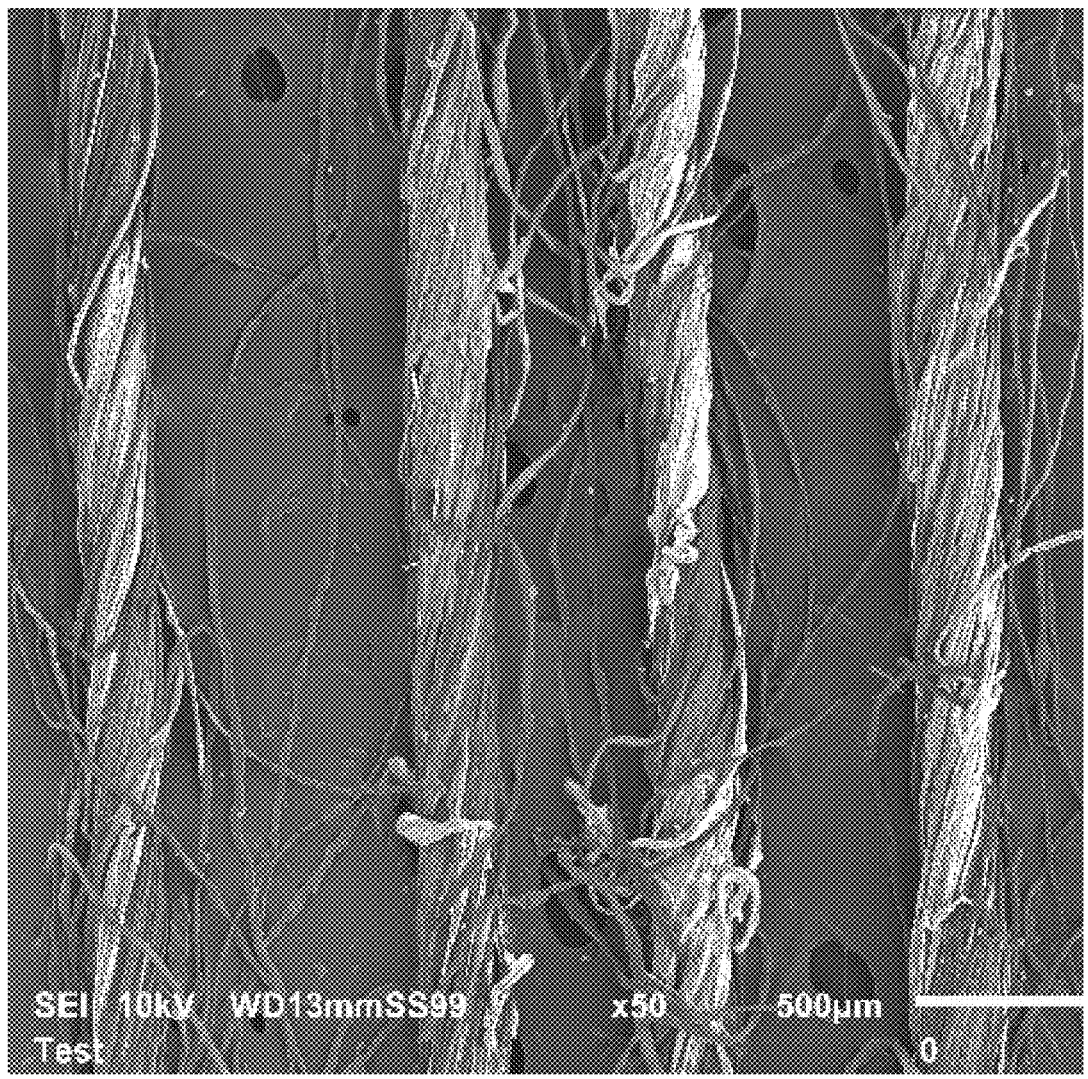
FIG. 10D provides a scanning-electron microscope image of the raw substrate shown in FIG. 10B after it has been processed in a welding process with a process solvent comprised of a hydroxide, wherein the welded substrate is moderately welded.
Figure 10E:
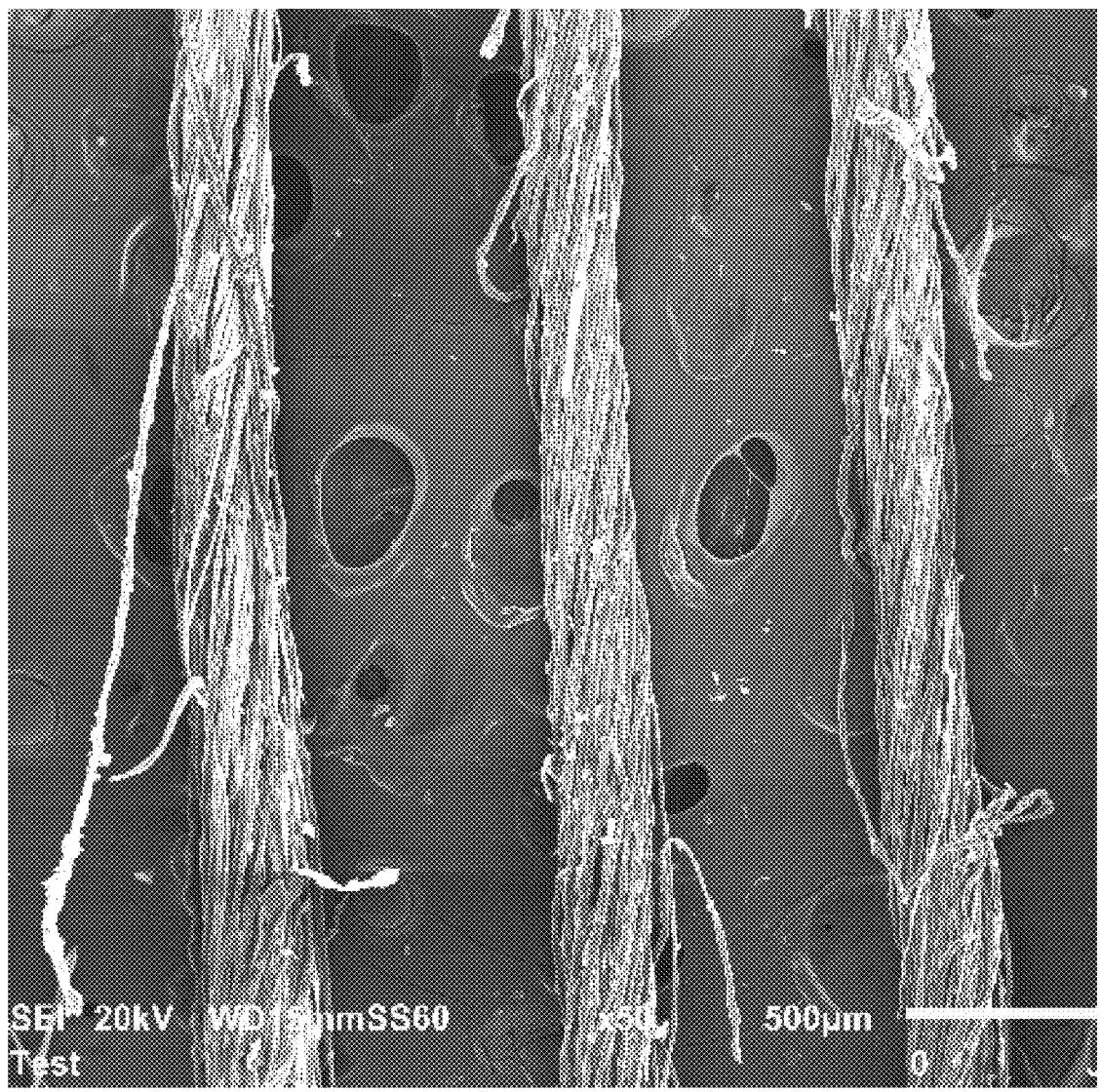
FIG. 10E provides a scanning-electron microscope image of the raw substrate shown in FIG. 10B after it has been processed in a welding process with a process solvent comprised of a hydroxide, wherein the welded substrate is highly welded.
Figure 10F:
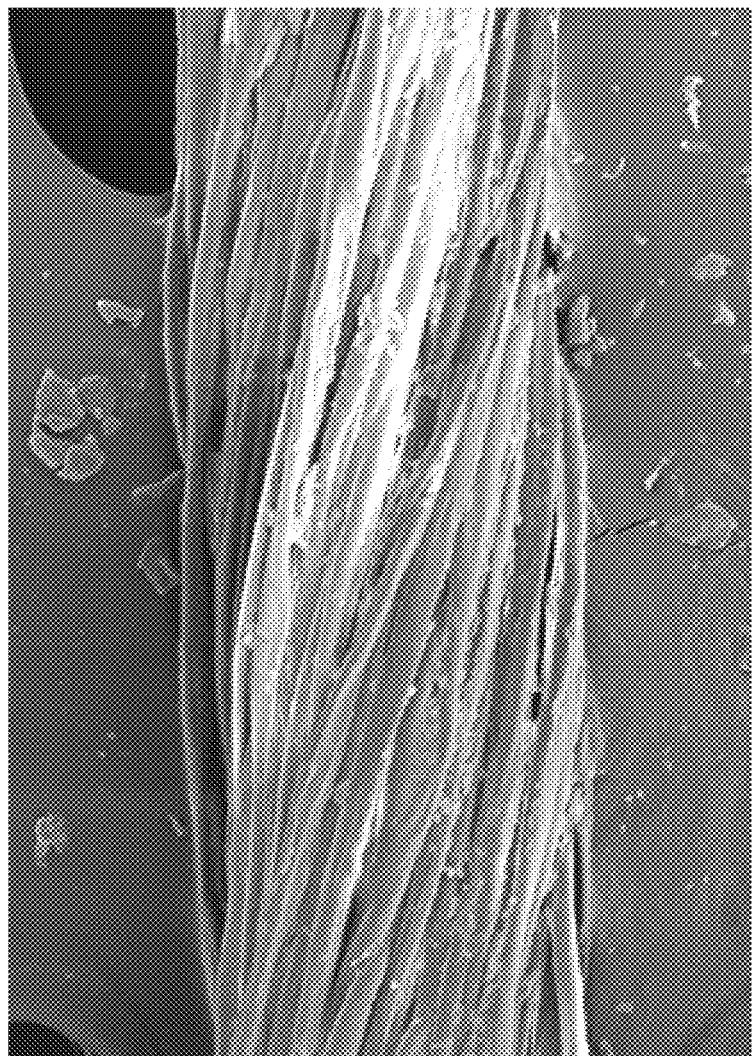
FIG. 10F provides a magnified image of a portion of the center welded substrate from FIG. 10E.

A scanning electron microscope (SEM) image of a substrate that may be used with the welding process and apparatuses of FIG. 10A is shown in FIG. 10B, and an SEM image the resulting welded substrate is shown in FIG. 10E. Table 9.1 shows some of the key processing parameters used to manufacture the welded substrate shown in FIG. 10E using the welding process and apparatuses shown in FIG. 10A. The process parameters for each column heading in Table 8.1 are the same as those previously described regarding Table 1.1. This welding process may be configured to move multiple ends of yarn substrate simultaneously, and that virtually all important process parameters such as process solvent flow rate, temperature, substrate feed rate, substrate tension, etc. may be adjusted. In particular, this welding process and apparatuses may enable the co-optimization of viscous drag and controlled volume consolidation for particular welded substrates designed for specific products. A selected number of welded yarn substrates are shown in FIGS. 10B-10F.

In other welding processes configured to use a process solvent comprised of LiOH with urea, the mass ratio of process solvent to substrate may be less than the value shown in Table 9.1. For example, in one welding process the ratio may be 0.5:1, and in another welding process it may be 1:1, in another welding process it may be 2:1, in still another welding process it may be 3:1 (which welding process and welded substrates produced thereby are discussed in detail below regarding at least Table 10.1), in another welding process it may be 4:1, and in yet another welding process it may be 5:1. Furthermore, the ratio may be values other than integers, such as 4.5:1. Accordingly, the scope of the present disclosure is not limited by the specific value of this ratio unless so indicated in the following claims.

TABLE 9.1

| Temperatures (° C.) | Pull Rate (m/min) | Welding Zone Time (sec) | Solv. Ratio (g/g) | Solvent Type |
|---|---|---|---|---|
| Process solvent application zone/process pressure temperature zone: −14 | 30 m/min | 135 | >7 (to the yarn saturation limit) | LiOH:Urea 8:15 Wt % in Sol'n |

Figure 10G:
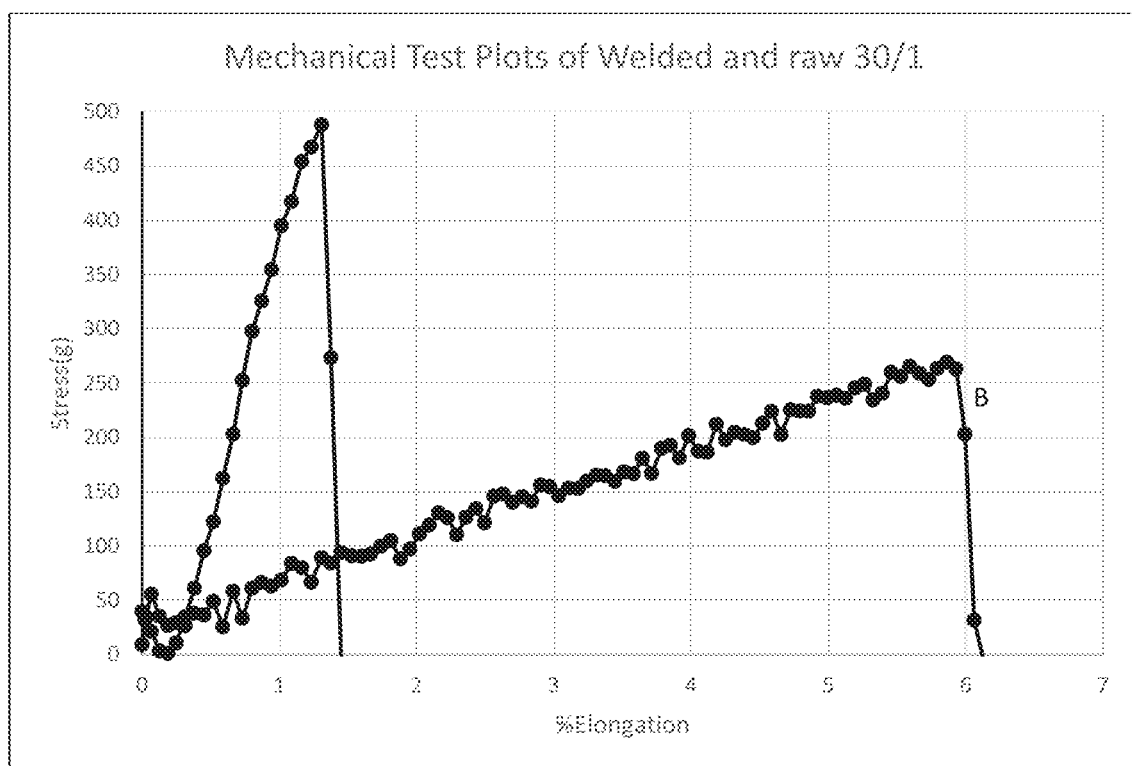
FIG. 10G provides a graphical representation of the stress (in grams) versus percent-elongation applied to both a representative raw yarn substrate sample and a representative welded yarn substrate sample from FIG. 10C, wherein the top curve is the welded yarn substrate and the bottom trace is the raw.

Table 9.2 provides various attributes of a welded substrate produced using the welding process and apparatuses of FIG. 10A using and the raw substrate shown in FIG. 10B using the parameters described in Table 9.1. The attributes were averaged as performed on approximately 20 unique specimens of welded yarn substrate, which attributes were collected using an Instron brand mechanical properties tester operating in tensile testing mode approximating ASTM D2256. The mechanical property for each column heading in Table 9.2 are the same as those previously described regarding Table 1.2. the stress (in grams) versus percent-elongation applied to both a representative raw yarn substrate sample and a representative welded yarn substrate is shown in FIG. 10G, wherein the top curve is the welded yarn substrate and the bottom trace is the raw.

TABLE 9.2

| Breaking Strength (g) | Norm. Breaking Strength (cN/dtex) | Elongation (%) |
| --- | --- | --- |
| 417 | 2.07 | 1.9 |

A progression of the degree to which a substrate is welded is shown in FIGS. 10C-10E, all of which welded substrates may be manufactured using the process and apparatuses shown in FIG. 10A by varying the process parameters. The chemistry of the process solvent used for the process and apparatuses shown in FIG. 10A may be fundamentally different and implicate various engineering consideration compared to the process and apparatus shown in FIG. 9A. That said, the overall welding process may be operated according to similar principles and design concepts as previously described for the welding processes and associated apparatuses shown FIGS. 7A, 8A, and 9A.

Moreover, the principles and concepts described regarding FIGS. 1 & 2 are relevant to understand the overarching process design. In a manner similar to that as previously described regarding FIGS. 9C-9E, the welding process and associated apparatuses shown in FIG. 10A may be configured such that the degree of welding is controllable. A progression of increased hair reduction and controlled volume consolidation of the cotton yarn substrate with various welding parameters is shown from 10C to 10E. All of these welded substrates were manufactured using a substrate comprised of raw 30/1 cotton yarn. The SEM data show progressive elimination of loose hair on cotton yarns as well as varying degrees of controlled volume consolidation for a lightly welded substrate in FIG. 10C, moderately welded substrate in FIG. 10D, and highly welded substrate in FIG. 10E. Again, the absolute attributes of welded fabrics knitted or woven from welded substrates may vary, and may be manipulated at least via the process parameters.

It is apparent that properly co-optimizing various process parameters (e.g., process solvent composition for efficacy and viscosity, by engineering the appropriate viscous drag, temperature, and time of the process zone, rate through the drying zone, etc.) that the welding process can be controlled to achieve a similar effect as detailed in FIGS. 9C-9E. These data show some of the surprising effects that can be achieved by co-optimizing processes using the concepts of viscous drag and controlled volume consolidation. Stated another way, these data show that co-optimized hardware, software, and chemistry can achieve desired outcomes and is the powerful new teaching demonstrated in this seminal work.

Figure 12E:
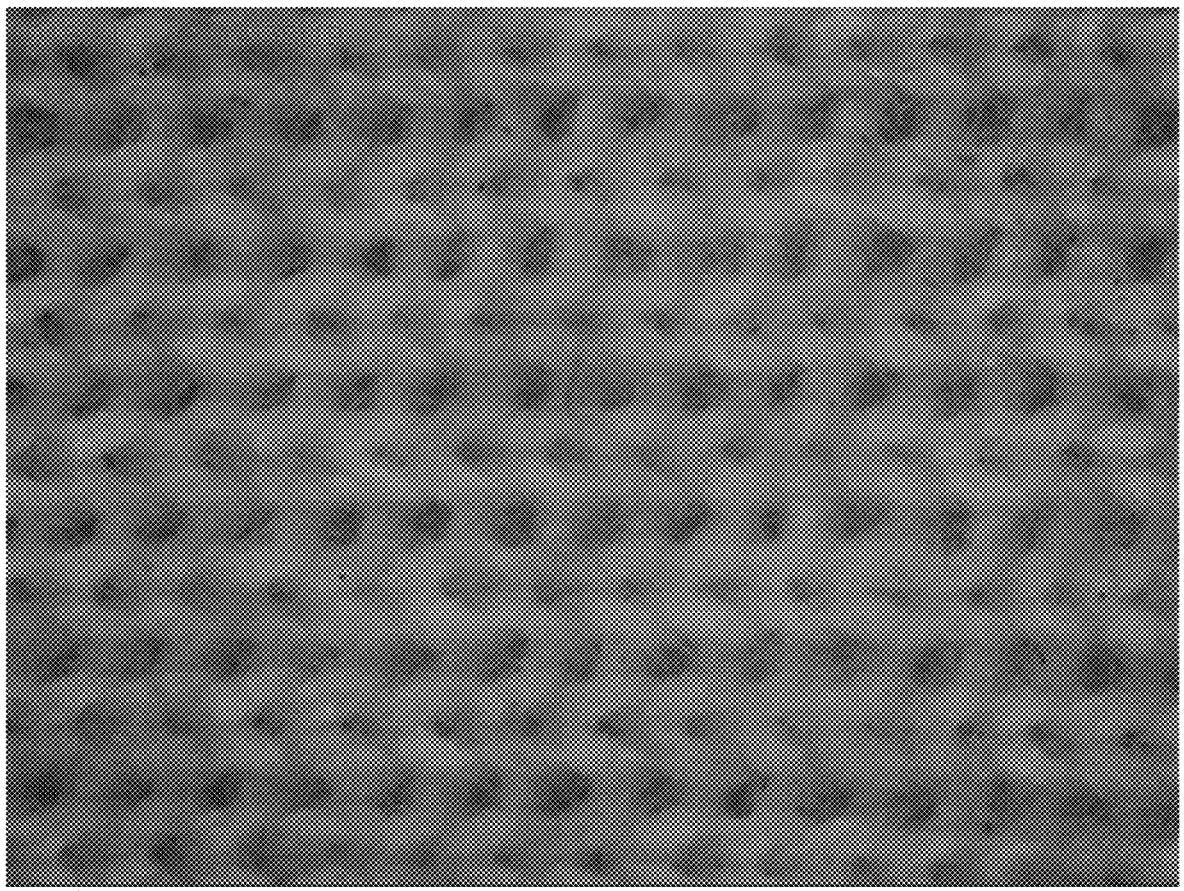
FIG. 12E provides a scanning-electron microscope image of a raw, 2D substrate comprised of a jersey knit cotton fabric.
Figure 12F:
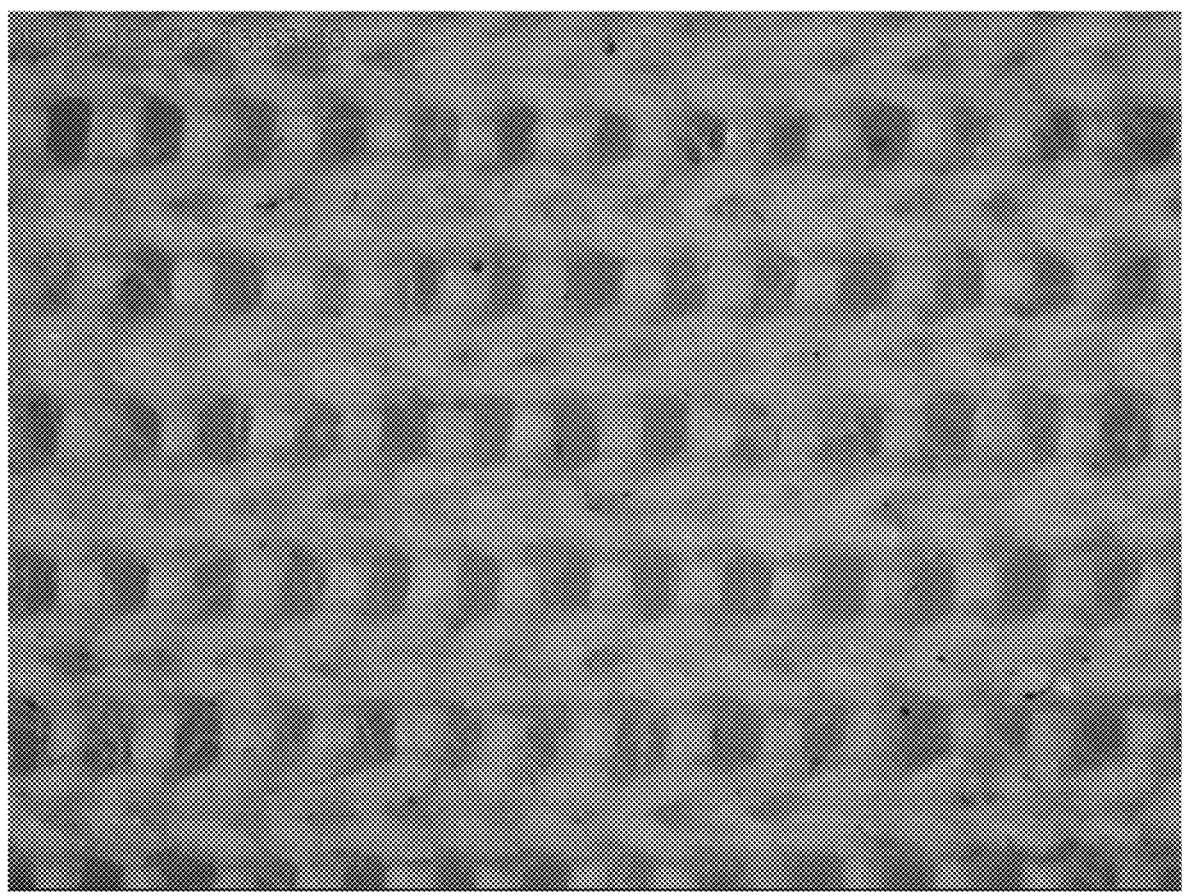
FIG. 12F provides a scanning-electron microscope image of raw substrate from FIG. 12E after it has been processed into a welded substrate that is lightly welded.
Figure 12G:
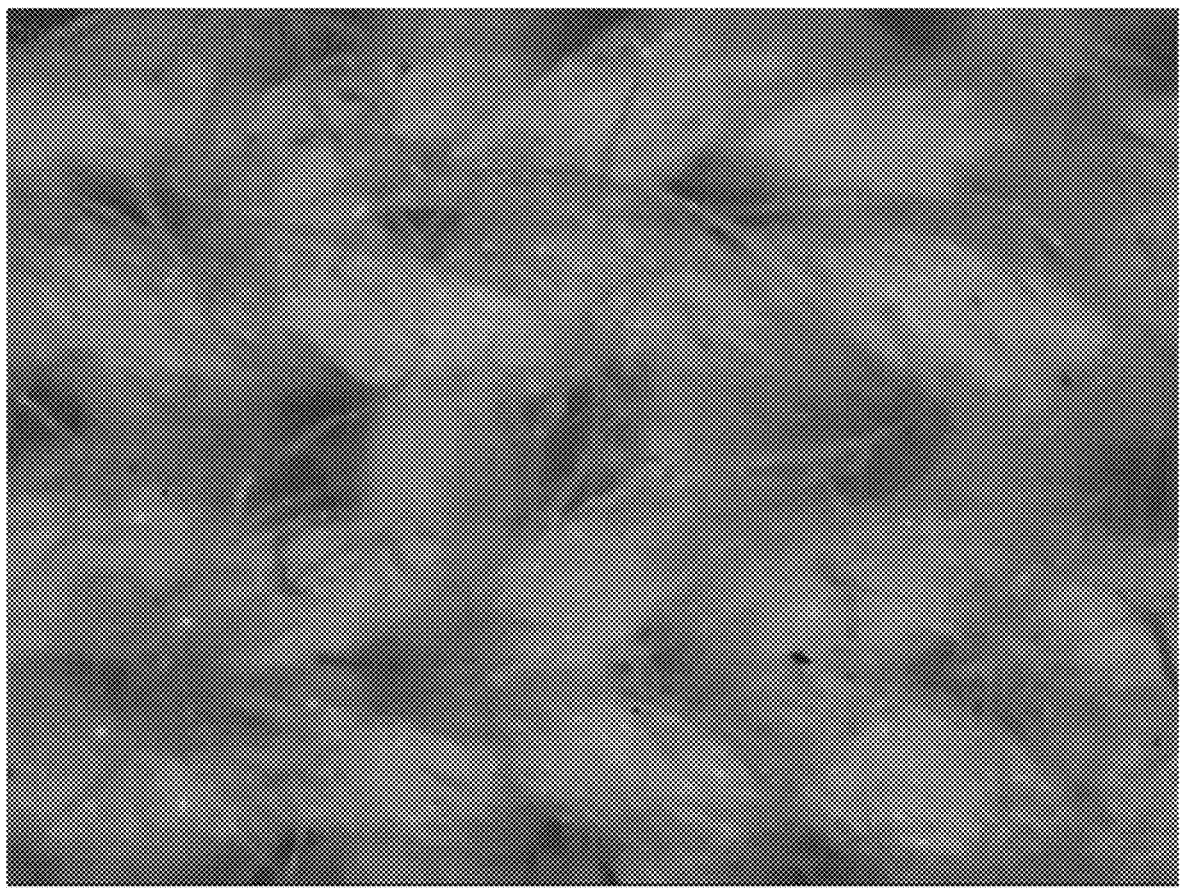
FIG. 12G provides a magnified scanning-electron microscope image of a raw, 2D substrate comprised of a jersey knit cotton fabric.
Figure 12H:
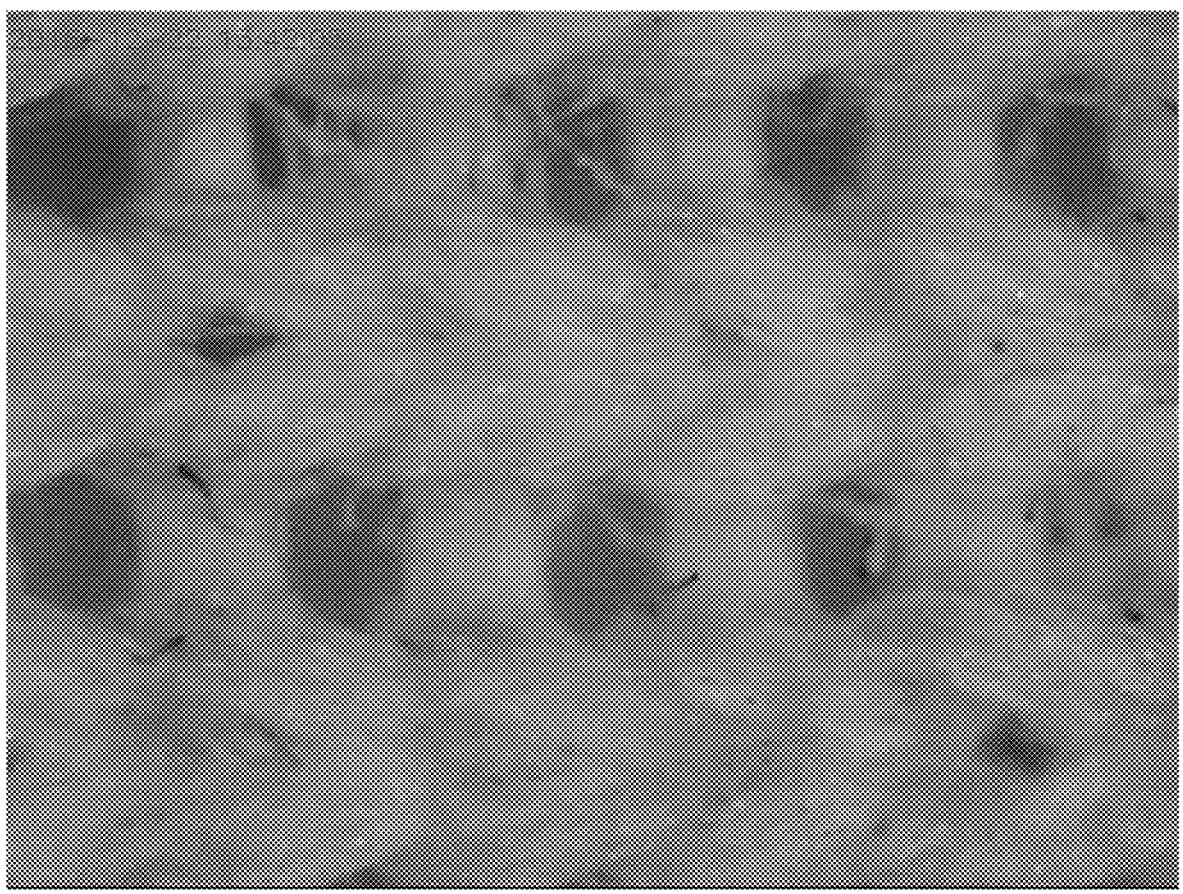
FIG. 12H provides a magnified scanning-electron microscope image of raw substrate from FIG. 12E after it has been processed into a welded substrate that is lightly welded.

An SEM image of a raw 2D substrate comprised of jersey knit cotton is shown in FIG. 12E, and a magnified image thereof is shown in FIG. 12G. An SEM image of the same fabric after it has been lightly welded is shown in FIG. 12F, and a magnified image thereof is shown in FIG. 12H. Table 10.1 shows some of the key processing parameters used to manufacture the welded 2D substrate shown in FIGS. 12F & 12H. This welding process may be configured such that virtually all important process parameters such as process solvent flow rate, temperature, substrate feed rate, substrate tension, etc. may be adjusted. For the specific example, the welding process was performed as a batch process, wherein process solvent was evenly applied to the raw substrate and allowed to act upon the substrate for seven minutes. Specific examples have been produced using greater or lower welding zone times with similar results, wherein a greater welding zone time generally corresponds to a higher degree of welding, and a lower welding zone time generally corresponds to a lower degree of welding. Water was used as a reconstitution solvent. During the process solvent application 2, process pressure/temperature zone 3, and process solvent recovery zone 4, and drying zone 5 the substrate was constrained for controlled volume consolidation so that the individual yarns did not strongly adhere to one another. As a result, the welded 2D substrate retains a relatively soft hand and the flexibility of the raw substrate, but exhibits superior burst strength (approximately 20% greater) and Martindale pill test scores (increasing from 1.5 or 2 to at least 4) as compared to the raw substrate.

TABLE 10.1

| Temperatures (C.) | Welding Zone Time (min) | Solv. Ratio (g/g) | Solvent Type |
| --- | --- | --- | --- |
| Process solvent application zone/process pressure temperature zone: −13 | 7 | 3.0 | LiOH:Urea 8:15 Wt % in Sol'n |

It is important to note that having multiple process solvent chemistries gives a great amount of flexibility when adding functional materials and additives to welded substrates, as well as configuring a specific welding process to produce welded substrates exhibit the desired attributes. Ionic liquid-based solvents (e.g., a welding process and apparatus as shown in FIG. 9A), for example tend to be slightly acidic especially when the cation utilized is imidazolium-based. The alkali metal urea-type process solvents (e.g., a welding process and apparatus as shown in FIG. 10A), on the other hand, are basic. Choice of process solvent is often dictated based on the suitability of the process solvent with a specific additive, and is an important new teaching to keep in mind as functional materials are entrapped by fiber welding processes as described in further detail below.

7. Functional Materials

As previously described, in an aspect of a welding process according to the present disclosure, a substrate may be exposed to a process solvent for the purpose of subsequent physical or chemical manipulation of the substrate and/or properties thereof. The process solvent may at least partially interrupt intermolecular bonding of the substrate to open and mobilize (solvate) the substrate for modification. Although the foregoing illustrations and descriptions relate to functional material incorporation via a welding process feature substrates comprised of natural fibers, the scope of the present disclosure is not so limited unless indicated in the following claims.

As previously mentioned, one or more functional materials, chemicals, and/or components may be integrated within a welded substrate for 1D, 2D, and 3D substrates and/or welded substrates. Generally, it is contemplated that the incorporation of functional material may impart new functionalities (e.g., magnetism, conductivity) without full denaturation of biopolymers that would otherwise be deleterious to the performance characteristics (physical and chemical properties) of the substrate.

Generally, it is contemplated that the optimal integration of a functional material(s) within a welded substrate may require optimizing the viscous drag (which may be primarily associated with the process solvent application zone 2 and/or process temperature/pressure zone 3) and/or adjusting volume controlled consolidation, both of which concepts are described in detail above. For example, if it is desired for a functional material to be evenly distributed across an entire surface area of a welded substrate, the viscous drag may be configured to facilitate even distribution of a process solvent having a functional material disposed therein across the substrate. If it is desired for a functional material to be concentrated at a specific location on the welded substrate, the viscous drag may be configured to facilitate uneven distribution of such a process solvent. Accordingly, a welding process configured to integrate functional materials into a welded substrate may be optimized according to the concepts, examples, methods, and/or apparatuses as previously described above, and/or those described in further detail below.

In an aspect of a welding process according to the present disclosure, a substrate (which may be comprised of but is not limited to cellulose, chitin, chitosan, collagen, hemicellulose, lignin, silk, other biopolymer component that is held together by hydrogen bonding and/or combinations thereof) may be swollen by an appropriate process solvent capable of disrupting intermolecular forces of the substrate, and in addition, functional materials including but not limited to, carbon powder, magnetic microparticles, and chemicals including dyes or combinations thereof may be introduced either before, in conjunction with, or after the application of the process solvent(s). In an aspect of one welding process according to the present disclosure, fibrous biopolymer substrates, functional materials, and the process solvent (which may be an ionic-based liquid or "organic electrolyte" but is not so limited unless indicated in the following claims) may be allowed to interact under controlled temperature—which may include laser-based or other directed energy heating, as well as specific atmosphere and pressure conditions. After a prescribed amount of time, the process solvent may be removed. Upon drying, the resulting functional material may be bonded to the substrate and may provide additional functional properties to the welded substrate compared to the properties of the original substrate material.

The successful and permanent integration of functional materials into fibrous materials may be enabled by a welding process according to the present disclosure. Functional materials may be introduced with a process solvent and/or engaged with a substrate prior to the welding. Generally, in one aspect of a welding process natural fibers may be likened to an envelope into which functional materials may be placed, and once all or a portion of the empty space is removed during the welding process, the functional material may trapped. For example, in an aspect of a welding process the welding process may be configured to embed a devices into the middle of a yarn, such as a micro RFID chip. In another process, the functional material is disposed in a material that acts as a substrate binder. For example, a welding process may be configured such that fibers of the substrate may be coated with a dissolved substrate binder during the welding process.

In one aspect of a welding process, a process solvent may be both active towards the biopolymers in the natural substrate and also compatible with the functional material. In one aspect, functional materials may include another biomaterial integrated with the substrate material—one example of such a configuration is using dissolved chitin as an antibacterial material in cellulose, or as a blood coagulant in a wound dressing. From the preceding it should be apparent that the scope of the present disclosure is not limtied by the specific substrate, process solvent, point in the welding process at which the functional material is introduced, method and/or vehicle for introducing the functional material, how the functional material is retained in the welded substrate, and/or type of functional material unless so indicated in the following claims.

The depth of solvent and/or functionals material penetration of the substrate and the degree to which substrate fibers may be welded together may be controlled at least by the amount of solvent, temperature, pressure, spacing of the fibers, form and/or partical size of functional material (e.g., molecules, polymers, RFID chip, etc.), residence time, other welding process steps, properties of substrate (e.g., moisture content and/or gradient) reconstitution method, and/or combinations thereof. After a period of time, the process solvent may be removed as previously discussed (e.g., with water, reconstitution solvent, etc.) to yield a welded substrate with incorporated (entrapped) functional materials, which may be retained via covalent bonding. In addition to polymer movement, chemical derivatization may also be undertaken during this process.

In one aspect of a welding process according to the present disclosure, the welding process may be configured to increase the material density (e.g., all or some of the open spaces between fibers may be removed) and decreases the surface area of a finished welded substrate comprised of a bundle of fibers compared to the material density and surface area of the substrate while simultaneously entrapping functional materials within the welded substrate. Generally, the degree to which the welding process affects the amount of empty space within a given substrate may be manipulated using at least the same variables as listed above regarding the depth of solvent and/or functional material penetration, which include but are not limtied to the amount of solvent, temperature, pressure, spacing of the fibers, form and/or partical size of functional material (e.g., molecules, polymers, RFID chip, etc.), residence time, other welding process steps, properties of substrate (e.g., moisture content and/or gradient) reconstitution method, and/or combinations thereof. In another aspect, the welding process may be configured to control the specific region of a given substrate at which the empty space is being removed, which is described in further detail below. Again, functional materials may be added directly to the substrate (before welding), with the process solvent, and/or at any point in time before the process solvent is removed.

In one aspect of a welding process according to the present disclosure, the welding process may be configured to allow for spatial control of the alteration of the physical and chemical properties of the substrate using concepts similar to those of multidimensional printing techniques. For example, by adding process solution to substrates with a device similar to an inkjet printer or by heating selected portions of the substrate with directed energy beams (e.g., from an infrared laser or any other means known in the art) to activate welding in that selected portion. Such welding processes are described in further detail below related to FIGS. 11A-11E regarding modulated welding processes.

In one aspect of a welding process, the amount of process solvent with respect to the amount of substrate may be kept relatively low to limit the degree to which the substrate is modified during the welding process. As previously described, the process solvent may be removed either by a second solvent system (e.g., a reconstitution solvent), by evaporation if the process solvent is sufficiently volatile, or by any other suitable method and/or apparatus without limitation unless so indicated in the following claims. A welding process may be configured to increase the evaporation rate of the process solvent by placing the process wetted substrate under vacuum and/or subjecting it to heat.

A welding process may be configured to produce welded substrates that may constitute "natural fiber functional composites" or "fiber-matrix composites" that exhibit functionalities (e.g., physical and/or chemical characteristics) not observed for the individual substrates and/or components that make up the welded substrate if observed separately prior to the welding process.

A welding process may be configured to produce welded substrates comprised of fiber-matrix composites that contain functional materials by utilizing a process solvent that is comprised of an ionic liquid-based solvent ("IL-based solvent") as discussed in further detail below. One or more molecular additives in the process solvent may either increase the efficacy of the process solvent as a swelling and mobilizing agent, and/or enhance the interaction of process solvent with one or more of the functional materials, and/or enhance the uptake of the process solvent and/or functional materials into natural fiber substrates. IL-based process solvents are generally removed from welded substrate (which may constitute a fiber-matrix composite) by a reconstitution solvent, which generally involves rinsing/washing the process wetted substrate with a reconstitution solvent, which reconstitution solvent may be comprised of excess molecular solvent(s). Upon drying, (which may be accomplished by subliming, evaporation, boiling away, or otherwise removing reconstitution solvent(s) or any other suitable method and/or apparatus without limitation unless so indicated in the following claims) the welded substrate may constitute a fiber-matrix composite that is finished and includes functional materials with the associated novel physical and chemical characteristics.

The substrate may be comprised of natural fibers, which natural fibers may be comprised of cellulose, lignocellulose, proteins and/or combinations thereof. The cellulose may be comprised of cotton, refined cellulose (such as kraft pulp), microcrystalline cellulose, and the like. In an aspect of a welding process, the welding process and apparatuses associated therewith may be configured for use with a substrate comprised of cellulose in the form of cotton or combinations thereof. Substrates comprised of lignocellulose may include bast fiber from flax, industrial hemp, and combinations thereof. Substrates comprises of proteins may include silk, keratin, and the like. Generally, the term "natural fibers" as it relates to substrates herein is meant to include any high aspect ratio, fiber-containing natural materials produced by living organisms and/or enzymes. Generally speaking, use of the term "fibers" indicates attention to the macroscopic (large scale) viewpoint of a material. Other examples of natural fibers include but are not limited to flax, silk, wool, and the like. In one aspect of a welded substrate that may be produced according to the present disclosure, natural fibers generally may be the reinforcing fiber component of fiber-matrix composites. Additionally, natural fibers may be utilized in formats such as non-woven mats, yarns, and/or textiles.

While natural fibers typically are mainly composed of biopolymers, there are biopolymer-containing materials that are not generally regarded as natural fibers. For example, crab shells are mainly chitin, which is a biopolymer composed of N-acetylglucosamine monomers (a derivative of glucose) but is not generally referred to as fibrous. Similarly, collagen and elastin are examples of protein biopolymers that provide structural support in many tissues that are not generally considered as fibrous.

The natural fibers that are produced by plants are generally mixtures of different biopolymers: cellulose, hemicellulose, and/or lignin. Cellulose and hemicellulose have monomer units that are sugars. Lignin has phenol-based monomers that are cross-linked. Because of cross-linking, lignin is generally not able to be solubilized (e.g., swelled or mobilized) by IL-based solvents. Natural fibers that contain significant amounts of lignin can, however, serve as structural support fibers in composites. Additionally, natural fiber substrates that contain significant amounts of lignin may be swelled or mobilized using a process solvent that is not IL-based.

The natural fibers that animals produce are often composed of protein(s) biopolymers. The monomer units in proteins are amino acids. There are, for example, many unique silk fibroin proteins that make up silks. Wool, horns, and feathers are composed primarily of structural proteins classified as keratin(s). The natural fibers may include cellulose, lignocellulose, proteins and/or combinations thereof. Generally, "natural fibers" may include but is not limited to unless so indicated in the following claims cellulose, chitin, chitosan, collagen, hemicellulose, lignin, silk, and/or combinations thereof.

In an aspect of a welding process according to the present disclosure, the welding process may be configured to combine and convert a substrate comprised of natural fibers and functional materials into a welded substrate that is a contiguous fiber-matrix composite. One purpose of the welding process may be to combine and convert a substrate comprised of natural fibers and functional materials into a welded substrate that constitutes a natural fiber functional composite, herein also referred to as a "contiguous fiber-matrix composite" or simply "fiber-matrix composite." Typically, functional materials are entrapped within the matrix portion of the fiber-matrix composite. A welding process may be configured such that natural fibers constitute the bulk of the fiber portion of welded substrate fiber-matrix composite and typically serve as the principle strengthening agent.

A. Ionic Liquid-Based Process Solvent Welding Processes

As previously discussed, a welding process may be configured to use a process solvent comprised of an ionic liquid. As used herein the term "ionic liquid" may be used to refer to a relatively pure ionic liquid (e.g., "pure process solvent" as defined herein above) and the term "ionic liquid-based solvent" ("IL-based solvent") generally may refer to a liquid that is comprised both of anions and cations and may include a molecular (e.g., water, alcohols, acetonitrile, etc.) species and (the solvent mixture) may be able to solubilize, mobilize, swell, and/or stabilize polymeric substrates. Ionic liquids are attractive solvents as they are non-volatile, non-flammable, have a high thermal stability, are relatively inexpensive to manufacture, are environmentally friendly, and can be used to provide greater control and flexibility in the overall processing methodology.

U.S. Pat. No. 7,671,178, contains numerous examples of suitable ionic liquid solvents that may be used with various welding processes according to the present disclosure. In one welding process, the welding process may be configured to use an ionic liquid solvent having a melting point less than about 200° C., 150° C. or 100° C. In one welding process, the welding process may be configured for use with an ionic liquid solvent comprised of imidazolium-based cations with acetate and/or chloride anions. In another aspect of a welding process, the anions may include chaotropic anions including acetate, formate, chloride, bromide and the like alone, or in combinations thereof.

In another aspect of a welding process, the welding process may be configured for use with an IL-based solvent that may include polar aprotic solvents as a molecular additive, such as acetonitrile, tetrahydrofuran ("THF"), ethyl acetate ("EtOAc"), acetone, dimethylformamide ("DMF"), dimethyl sulfoxide ("DMSO"), and the like. More generally, the molecular additive for an IL-based process solvent system may be a polar aprotic solvent with a relatively low boiling point (e.g., less than 80° C. at ambient pressure) and relatively high vapor pressure. In an aspect, IL-based solvent may be about 0.25 mole to about four mol polar aprotic solvents per one mole of ionic liquid. In another aspect a polar aprotic solvent may be added to the IL-based solvent in ranges from about 0.25 mole to about two moles of total polar aprotic solvents per 1 mole of ionic liquid. Polar protic solvents (e.g., water, methanol, ethanol, isopropanol) are typically present in ranges less than one mole total polar protic solvents to one mole of IL-based solvents. In another aspect an IL-based solvent may include about 0.25 to about two moles of a polar aprotic solvent for each mole of ionic liquid.

In an aspect of a welding process configured for use with an IL-based solvent as a process solvent, the amount of IL-based process solvent added may be about 0.25 parts to about four parts by mass of the process solvent with one part by mass of the substrate.

In one aspect, a welding process may be configured to use an IL-based solvent comprised of one or more polar protic solvents, which polar protic solvents include but are not limited to, water, methanol, ethanol, isopropanol and/or combinations thereof. In one aspect less than about one mole polar protic solvent may combined with up to about one mole of ionic liquid. A welding process may be configured to use an IL-based solvent comprised of one or more polar aprotic solvents (which may constitute a molecular additive to the process solvent system), which polar aprotic solvents include but are not limited to, acetonitrile, acetone, and ethyl acetate. Reasons for adding molecular additives to an IL-based process solvent include adjusting the efficacy of the process solvent as a swelling and mobilizing agent, and/or enhancing the interaction of the process solvent with functional materials, and/or enhancing the introduction of the process solvent and functional materials into the substrate(s). Such molecular additives may include, but are not limited to, low boiling point solvents that can both adjust efficacy of the IL as well as the rheology characteristics of the process solvent. That is, the molecular additive and relative amount thereof may be selected so as to result in at least the desired viscous drag and controlled volume consolidation.

Generally, molecular components alone are non-solvents for most of the biopolymer materials of interest. In one aspect of a welding process, the partial dissolution of biopolymers or synthetic polymer materials may be limited to instances in which there is an appropriate concentration of about one mole of ionic liquid (ions) present for up to about four moles maximum of molecular components. The molecular component may either reduce the overall ability for ionic liquid ions to solubilize, mobilize, and/or swell polymers in the substrate, or they may increase the overall efficacy of the IL-based process solvent, which may depend at least upon the hydrogen bond donating and accepting abilities of the molecular component(s).

Polymers present in biopolymer substrates as well as polymers in many synthetic polymer substrates are generally held together and organized at the molecular level by intermolecular and intramolecular hydrogen bonding. If molecular components decrease IL-based process solvent efficacy, these molecular components can be useful to slow welding processes and/or allow special spatial and temporal control not otherwise possible using pure ionic liquids. In one aspect of a welding process, if the molecular component increases IL-based process solvent efficacy, these molecular components can be useful to speed the welding process and/or allow special spatial and temporal control not possible using pure ionic liquids. Additionally, in another aspect, molecular components can significantly lower the overall cost of a welding process, particularly the cost associated with the process solvent. Acetonitrile, for example, costs less than 3-ethyl-1-methylimidazolium acetate. Thus, in addition to allowing manipulation of the welding process for a given substrate, acetonitrile also may reduce the cost of the process solvent per unit volume (or mass) utilized.

When relatively large amounts of IL-based process solvents are introduced to substrates comprised primarily of natural fibers (for reference "large" as used herein denotes roughly greater than 10 parts by mass process solvent to every 1 part by mass substrate) and with sufficient time and suitable temperature, the biopolymers within the substrate can be fully dissolved. In the present discussion, full dissolution indicates disruption of the intermolecular forces (e.g., disruption of hydrogen bonding due to the action of the solvent) and/or intramolecular forces that may be necessary to preserve natural structures, features, and/or characteristics within the substrate. Generally speaking, it is contemplated that for many welding processes according to the present disclosure, it will be advantageous to configure the welding process such that it does not involve full dissolution of major amounts of biopolymers. In particular, full dissolution often degrades natural fiber reinforcements by irreversibly denaturing embodied natural biopolymer structure. However, in certain aspects of a welding process, such as when biopolymers are utilized as functional materials, it may be advantageous to fully dissolve the biopolymer material. In a welding process so configured, the amount of fully dissolved polymer (functional material) utilized may be typically less than 1% by mass relative to mass of IL-based process solvent utilized. Given the relatively small amount of IL-based process solvent that is added to natural fibers, any fully dissolved biopolymer materials may be minor components of the resulting welded substrate.

As native structure is lost, the natural material may lose its native physical and chemical properties. Accordingly, a welding process may be configured to limit the amount of IL-based process solvent added relative to a substrate comprising natural fiber. Limiting the amount of process solvent introduced into the substrate may in turn limit the extent to which biopolymers are denatured from their natural structures, and thus may preserve the natural functionalities and/or characteristics of the substrate, such as strength.

Surprisingly, a welding process according to the present disclosure may facilitate the creation of welded substrates comprised of functional structures, which may be produced via the controlled fusion/welding of fibrous threads, woven materials, fibrous mats, and/or combinations thereof with the addition of functional materials. The physical and chemical properties of the welded substrates may be reproducibly manipulated by rigorous control of at least the amount of IL-based process solvent applied, the duration of exposure to IL-based process solvent, temperature, the temperature and pressure applied during the treatment, and/or combinations thereof. One or more substrates and/or functional materials may be welded to create laminate structures with proper control of process variables. The surface of these substrates and/or functional materials may be preferentially modified while leaving some of the substrate and/or functional material in the native state. Surface modifications may include but are not limited to manipulation of the material surface chemistry directly, or indirectly by the incorporation of additional functional materials to impart the desired physical or chemical properties. The functional materials may include but are not limited to drug and dye molecules, nanomaterials, magnetic microparticles, and the like that may be compatible with one or more substrates.

The functional material may be in suspension, dissolved or a combination thereof in an IL-based solvent. The functional material may include but is not limited to conductive carbons, activated carbons, and the like without limitation unless so indicated in the following claims. Activated carbons may include but are not limited to chars, graphene, nanotubes, and the like without limitation unless so indicated in the following claims. In one aspect, the welding process may be configured for use with a functional material that may include magnetic materials such as, NdFeB, SmCo, iron oxide, and the like without limitation unless so indicated in the following claims.

In an aspect of a welding process disclosed herein, the welding process may be configured for use with a functional material may comprised of quantum dots and/or other nanomaterials. In another configuration of the welding process the functional material may be comprised of mineral precipitates, such as but not limited to clay. In yet another configuration of the welding process, the functional material may include dyes, which dyes include but are not limited to UV-vis absorbing dyes, fluorescent dyes, phosphorescent dyes, and the like without limitation unless so indicated in the following claims. In still another configuration of a welding process according to the present disclosure, the welding process may be configured for use with a functional material comprised of pharmaceuticals, selected synthetic polymers (e.g., meta-aramid, which is also known as Nomex®), quantum dots, various allotropes of carbon (e.g., nanotubes, activated carbon, graphene and graphene-like materials), and may also include natural materials (e.g., crab shells, horns, etc.) and derivatives of natural materials (e.g., chitosan, microcrystalline cellulose, rubber), and/or combinations thereof without limitation unless so indicated in the following claims.

In one aspect, a welding process may be configured for use with a functional material comprised of a polymer. In such a configuration it is contemplated that it may be advantageous to select a polymer that is not a crosslinking polymer to achieve the desired functional properties. However, the scope of the present disclosure is not so limited unless indicated in the following claims. In one such configuration of a welding process the polymer may be comprised of a natural polymer or protein such as cellulose starch, silk, keratin, and the like. In one aspect of a welding process, polymer(s) constituting the functional material may be less than about 1% by mass of the IL-based process solvent. Additionally, various natural materials may be utilized as functional materials.

As previously mentioned, a welding process may be configured such that one or more functional materials are predispersed with the natural fibers of a substrate, which substrates may be in the form of non-woven mats and papers, yarns, woven textiles, etc. without limitation unless so indicated in the following claims. Alternatively, functional materials may be dissolved and/or suspended within IL-based process solvents prior to application of the IL-based process solvent on the natural fiber substrate. Upon swelling and mobilizing biopolymers in the natural fiber substrate(s), functional materials may be entrapped within the matrix of the resulting welded substrate, which may constitute a fiber-matrix composite.

The optimal values for the various process parameters will vary from one welding process to the next, and depend at least upon the desired characteristics of the welded substrate, the substrate chosen, the process solvent, the functional material, time the substrate is in the process solvent application zone 2 and/or process temperature/pressure zone 3, and/or combinations thereof. In one welding process it is contemplated that an optimal temperature for the process solvent (and consequently, a temperature for the process temperature/pressure zone 3) may be from about 0° C. to about 100° C.

A welding process may be configured so that the welding process comprises combining IL-based process solvent with the substrate for about one second to about one hour, or until the substrate is at least 1.5% saturated, between 2% and 5% saturated, and at least 10% saturated with the IL-based process solvent. Such a welding process may be configured so that the functional material may be mixed with the substrate at the same time as the IL-based process solvent and the substrate or subsequent thereto.

After adequate exposure to the IL-based process solvent and functional material, a portion of the IL-based process solvent may be subsequently removed from the process wetted substrate. In one aspect, the welding process may be configured such that the portion of IL-based process solvent is removed by rinsing with water, methanol, ethanol, isopropanol, acetonitrile, tetrahydrofuran (THF), ethyl acetate (EtOAc), acetone, dimethylformamide (DMF), or any other method and/or apparatus suitable for the particular welding process without limitation unless so indicated in the following claims.

In an aspect, a welding process may be configured such that it entraps the functional materials within a natural fibrous substrate by partially dissolving either biopolymers or synthetic polymers with an IL-based process solvent. In one configuration of a welding process, the welding process may be configured for use with an IL-based process solvent that contains cations and anions and has a melting point below 150° C., and the IL-based process solvent may include a molecular component as previously discussed. However, the scope of the present disclosure is not so limited unless indicated in the following claims. The welding process may be configured to form ionic bonds between the natural fibers of a substrate and the functional material.

In one aspect of a welding process configured according to the present disclosure, one or more functional materials may be incorporated into fibrous substrate prior to introduction of IL-based process solvent for partial dissolution of the fibrous substrate. In another aspect, the functional materials may be dispersed within the IL-based solvent for partial dissolution of fibrous substrate(s). In in another aspect one or more functional materials may be dispersed within IL-based solvents. In still another aspect of a welding process, the welding process may be configured to use heat to activate the partial dissolution of the natural fiber substrate and/or the functional material(s). In another aspect of a welding process, the functional material(s) partially dissolved may be biopolymers and/or synthetic polymers.

In one aspect of a welding process, the welding process may be configured to produce a natural fiber functional composite by using a natural fiber substrate, an IL-based solvent, and a functional material. First, the natural fiber substrate may be mixed with the IL-based process solvent, and this mixing may continue until the natural fiber is appropriately swollen. Next, functional material may be added to the swollen natural fiber substrate and IL-based process solvent mixture. In an aspect of a welding process, the welding process may be configured to apply a pressure and a temperature to the mixture for a period of time. Next, at least the pressure and removing at least a portion of the IL-based process solvent may result in a finished welded substrate configured as a natural fiber functional composite in one, two, or three dimensions.

In one aspect of a welding process, the welding process may be configured to use less than four parts by mass process solvent to every one part by mass substrate, which mass ratio may be sufficient to interrupt hydrogen bonding in only the outer sheath of natural fibers of the substrate. The degree to which hydrogen bonding is disrupted and natural structures are denatured may be dependent at least upon process solvent composition, as well as the time, temperature, and pressure conditions during which natural fiber substrates are exposed to IL-based process solvents.

The extent to which swelling and mobilization of biopolymer occurs can be qualitatively and, in some cases, quantitatively accessed at least by x-ray diffraction, infrared spectroscopy, confocal fluorescent microscopy, scanning electron microscopy, and other analytical methods. In one aspect of a welding process, the welding process may be configured to control certain variables to limit the amount of cellulose I to II conversion that occurs as described in further detail below at least as related to FIGS. 15A & 15B. This conversion may be important in so far as it demonstrates the creation of fiber-matrix composites in welded substrates, wherein natural fibers may retain some of their native structure and thus corresponding native chemical and physical properties. Swelling of substrate fibers is typically observed along a width rather than a length, and in one aspect of a welding process the welding process may be configured to increase the natural fiber diameter more than about 5%, 10%, or even 25%.

The mobilization of the outermost biopolymers in substrates comprised of natural fibers generally may be considered a characteristic of a welding process according to the present disclosure. Mobilized polymer may be swollen such that functional materials can be inserted and entrapped within the resulting matrix of fiber-matrix composites in the welded substrate. Because the primary mode of action of an IL-based process solvent may be to swell and mobilize biopolymers by disruption of hydrogen bonding, natural fiber substrates that contain relatively high amounts of lignin (roughly greater than 10% lignin) are not generally suitable to swell and mobilize with IL-based process solvents. These lignocellulosic natural fibers (e.g., wood fibers) can be incorporated as relatively inert fiber reinforcement, however, lignocellulosic fibers containing roughly greater than 10% lignin do not provide much in the way of cellulose or hemicellulose matrix. This is at least in part because the cellulose and hemicellulose biopolymers that would otherwise be swelled and mobilized by the IL-based process solvent are essentially locked within the cross-linked lignin biopolymer. As used herein, the term "mobilized" includes an action wherein the functional material moves from the outer surface of substrate fibers to merge with that from neighboring substrate fibers while material in the substrate fiber core is left in the native state. Upon swelling and mobilizing biopolymers and entrapping functional materials, IL-based process solvents are generally removed from the fledgling fiber-matrix composite welded substrate to be recycled.

As used herein, the term "reconstitution" is used to refer to the process by which process solvent(s) are rinsed/washed out of the process wetted substrate. This is typically accomplished by either flowing excess molecular solvent (e.g., water, acetonitrile, methanol) around and through the process wetted substrate or by soaking the process wetted substrate in a bath(s) of molecular solvent. The choice of reconstitution solvent depends on factors such as the type of biopolymers that compose the substrate as well as the composition for the process solvent and ease by which the process solvent can be recovered and purified for reuse.

After removal of the process solvent, the reconstitution solvent is typically removed. This may be typically accomplished by any combination of sublimation, evaporation, or boiling. Depending on the natural fiber substrate, choice of functional materials, and whether the substrate is physically constrained during all or a portion of the welding process, the substrate may undergo significant dimensional changes. For example, the diameter of yarns may be reduced by up to a factor of two as the empty space between individual natural fibers is consolidated to a continuous fiber-matrix composite in the welded substrate.

In aspect of a welding process, the welding process may be configured such that a portion of natural fibers in a substrate comprised of natural fibers is swollen about 2% to about 6% in diameter. More specifically, in an aspect of a welding process a portion of such natural fibers may be swollen more than about 3% in diameter.

In one aspect of a welding process, the mixture may be about 90% natural fiber substrate and functional material and about 10% IL-based process solvent by mas. Alternatively, the amount of IL-based process solvent added to the substrate and/or mixture of substrate and functional material may be about 0.25 parts to about four parts by mass of the process solvent with one part by mass of the natural fiber.

In an aspect of a welding process, the welding process may be configured such that the pressure in the process temperature/pressure zone 3 may be about a vacuum. Alternatively, the welding process may be configured such that the pressure in the process temperature/pressure zone 3 is about 1 atmosphere. In still another configuration, the pressure in the process temperature/pressure zone 3 may be between about one atmospheres to about ten atmospheres. As previously noted, the temperature and/or time that the substrate is exposed to the process solvent may also be controlled.

In one aspect of a welding process, the welding process may include providing a substrate comprised of a plurality of natural fibers, providing an IL-based process solvent, and providing at least one functional material. A welding process so configured may include mixing the substrate IL-based process solvent and functional material in a prescribed sequence creating a chemical reaction that produces a welded substrate constituting a natural fiber functional composite with the functional material penetrating the natural fibers and a plurality of the natural fibers and the functional material both may be covalently bonded together. In one aspect of a welding process, at least the temperature, pressure and time of the chemical reaction may be controlled. A welding process may be configured to remove a portion of the process solvent, and it is contemplated that in certain applications it may be advantageous to remove a large portion of the process solvent, or substantially all of the process solvent.

In one aspect of a welding process, the welding process may be configured such that the prescribed process sequence introduces the functional material after the natural fiber substrate is mixed with the process solvent and the natural fiber substrate has achieved a swollen state. In one aspect of such a welding process, the IL-based process solvent may be diluted by a molecular solvent component, and wherein the partial dissolution process of the biopolymers or synthetic polymer materials commences after removal of the molecular solvent component (which removal may be accomplished by any suitable method and/or apparatus without limitation unless so indicated in the following claims, including but not limited to either evaporation or distillation).

In one welding process, a carbon-cotton-process solvent mixture may be used to create a welded substrate having a thin-coat carbon/cotton bond that, when exposed to cotton fabric in solution with the process solvent, binds the carbon to the cotton fabric.

In one aspect of a welding process the process solvent and natural fiber substrate may be blended to create surface tension characteristics that allow the functional material (such as conductive carbon) to move into the natural fiber substrate and/or form a thin coat of carbon functional material on the natural fiber substrate such as cotton. The examples that follow are illustrative of welded substrates and/or welding processes for which functionalization is accomplished. The following examples are not meant to be read in a limiting sense, but rather as illustrative of the broader concepts and welding processes disclosed herein.

B. Functional Material Entrapment

The following illustrative examples details a welding process by which one or more functional materials may be entrapped in a substrate comprised of a natural fibrous material, and in which and IL-based process solvent may be introduced after the functional material has been incorporated into the substrate. Again, the following examples are in no way limiting to the scope of the present disclosure unless so indicated in the following claims. In one embodiment of the present invention entrapment involves the incorporation of functional materials into fibrous substrates prior to introducing ionic liquid based solvents.

Figure 3:
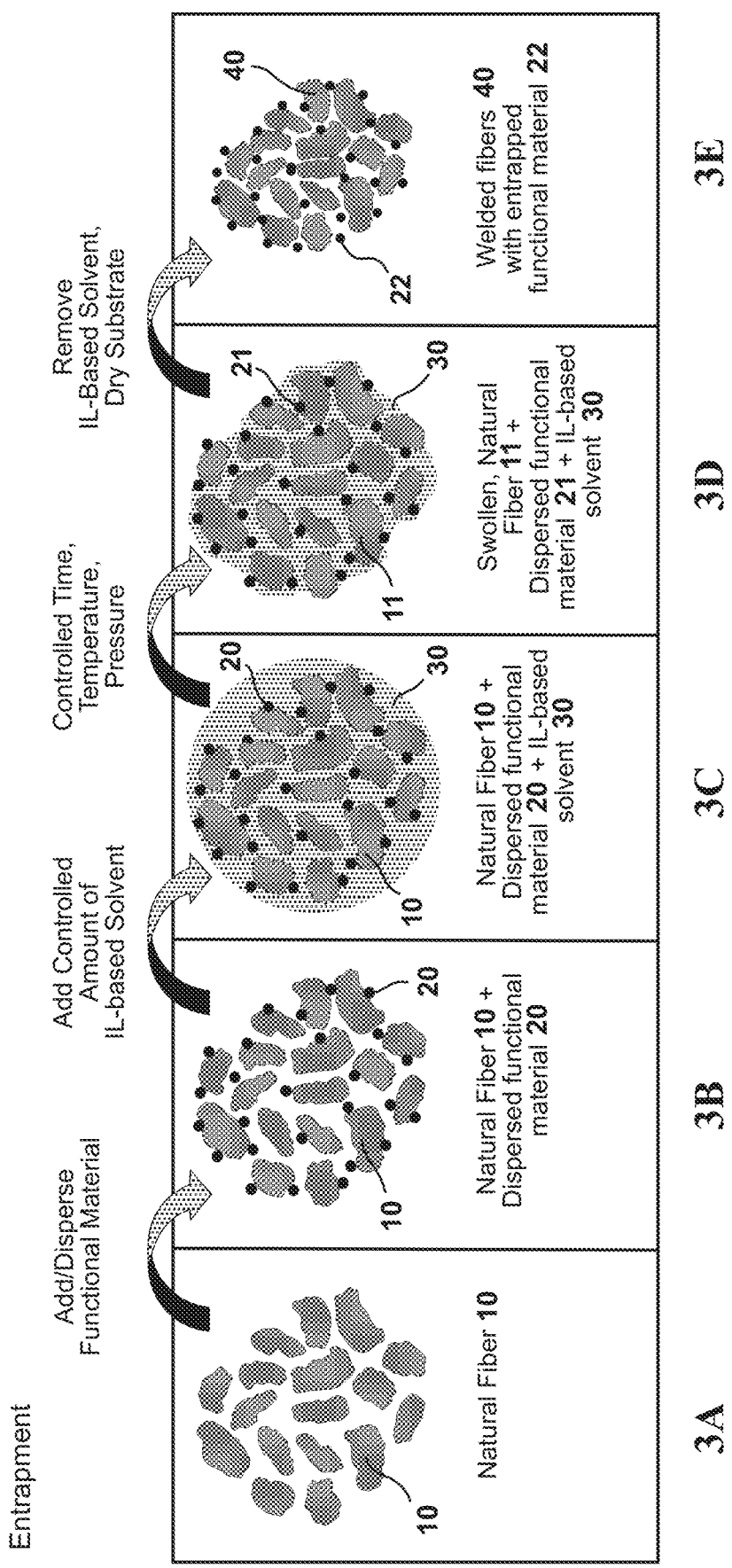
FIG. 3 illustrates a process for addition and physical entrapment of solid materials within a fiber-matrix composite with the sub-processes or components of FIG. 3 called-out as FIGS. 3A-3E. Functional materials are predispersed in the fiber matrix before welding.

FIG. 3 illustrates a process for addition and physical entrapment of solid materials within a fiber-matrix composite with the sub-processes or components of FIG. 3 called-out as FIGS. 3A-3E. As depicted in FIG. 3A, a natural fiber substrate 10 may include an amount of empty space. As shown in FIG. 3B, a disbursed functional material 20 may be incorporated into the natural fiber substrate 10. A point in time after which an IL-based process solvent 30 has been introduced to the natural fiber substrate 10 and functional material 20 (to create a process wetted substrate) is depicted in FIG. 3C. Controlled pressure, temperature, and time then may be used to create a swollen natural fiber substrate 11 (as depicted in FIG. 3D) with the dispersed & bonded functional material 21.

In one aspect of a welding process, all or a portion of the IL-based process solvent 30 then may be removed from the bonded functional material 21 and swollen natural fiber substrate 11 to yield welded fibers 40 with entrapped functional material 22 while simultaneously maintaining a plurality of the natural fiber substrate 10 functional characteristics and a plurality of the functional material 20 functional characteristics. Unless otherwise noted, any attribute, features, and/or characteristic described herein for a welded fiber 40, 42 may extend to a fabric, textile, and/or other article comprised of the welded fiber 40, 42.

In an aspect of a welding process, the welded fibers 40 may be a combination of covalently bonded functional material 21 and swollen natural fiber substrate 11. In an aspect of a welding process, the welding process may be configured such that the resulting welded substrate is comprised of cotton cloth functionalized with entrapped magnetic (NdFeB) microparticles as observed via scanning electron microscopy data. In one aspect of a welding process, the welding process may be configured for functional material 20 comprised of demagnetized microparticles that may be incorporated as a dry powder into a natural fiber substrate 10 comprised of cloth matrices. Surprisingly, the welding process may entrap magnetic particles within the biopolymers of the natural fiber substrate 10 such that the magnetic particles are observed to be strongly held within the welded fibers 40 and cannot be removed even by aggressive laundering. In an aspect of a welding process, the welding process may be configured such that similar procedures to those described above have yielded similar advantages and/or results in yarns and non-woven, fibrous mat natural fiber substrates 10, including cotton and silk yarn matrices.

As discussed, the welding process described in the immediately preceding examples may be configured such that suspensions of the nanomaterial functional materials 20 were added to biopolymer natural fiber substrates 10 prior to exposure of either the functional material or natural fiber substrate 10 to the IL-based process solvent. Different molecular solutions such as aqueous or organic (e.g., toluene) may be utilized alone or in conjunction with an IL-based process solvent 30 depending at least on the surface chemistry of the functional material 20, which may be comprised of quantum dots. The surface chemistry of the nanomaterial functional material 20 (i.e., hydrophobicity/hydrophilicity) in conjunction with the natural fiber substrate 10 may strongly impact the final location and dispersion of nanomaterial functional material 20 within the resulting welded fibers 40.

Surface chemistry may be used as a strategy for self-assembly of natural fiber substrates 10 and functional materials 20 with an IL-based process solvent to create microfabrication of functionality within composite materials. For example, in one aspect of a welding process, quantum dots may be comprised of semiconducting materials that have size-dependent properties. Their surfaces can be functionalized to be compatible with different chemical environments for use in medicine, sensing, and information storage applications without limitation unless so indicated in the following claims.

Figure 4:
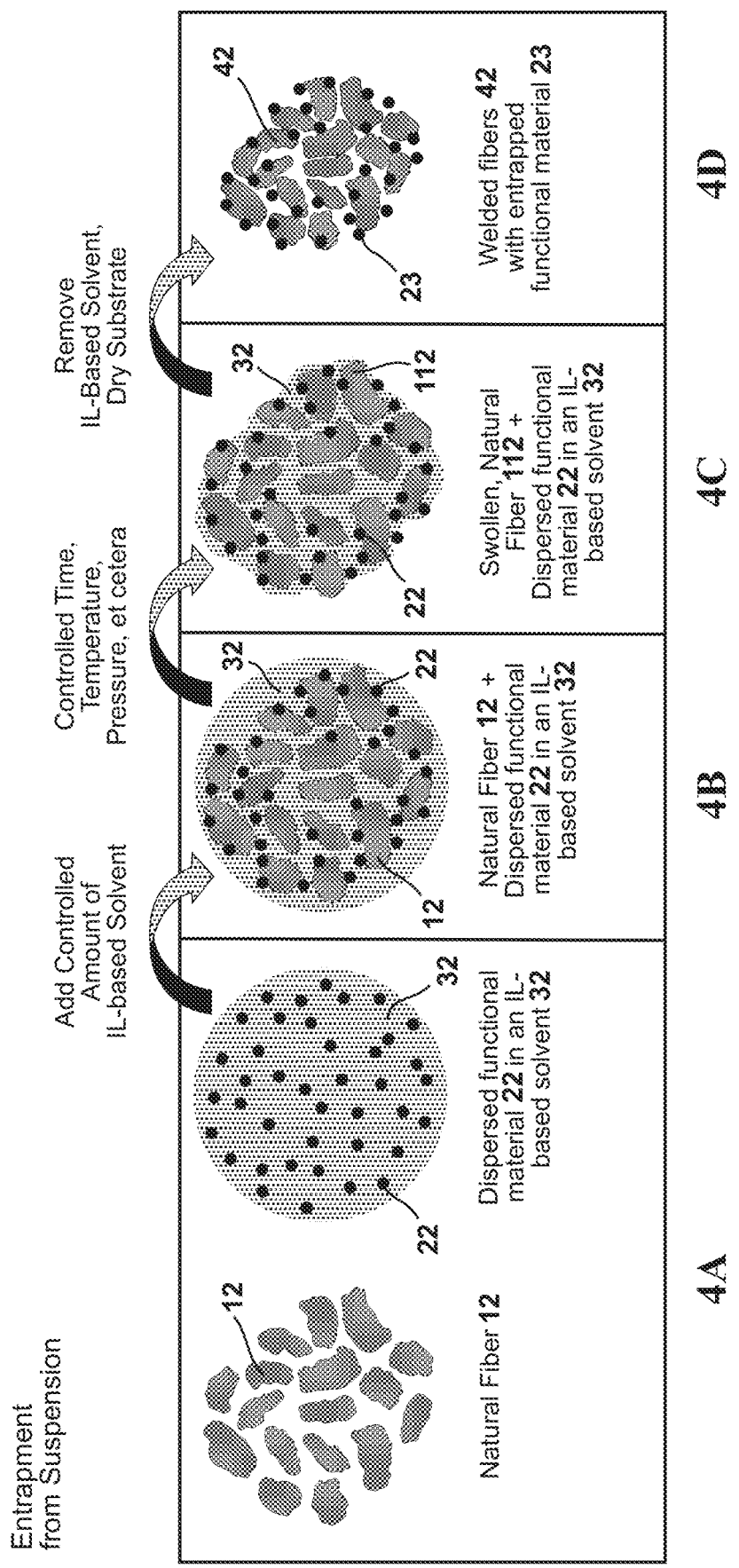
FIG. 4 illustrates a process for addition and physical entrapment of solid materials within a fiber-matrix composite with the sub-processes or components of FIG. 4 called-out as FIGS. 4A-4D utilizing materials (pre)dispersed in an IL-based solvent.

C. Functional Material Entrapment from Process Solvent/Functional Material Mixture FIG. 4 illustrates a process for addition and physical entrapment of solid materials within a fiber-matrix composite with the sub-processes or components of FIG. 4 called-out as FIGS. 4A-4D utilizing materials (pre)dispersed in an IL-based solvent. A beginning natural fiber substrate 10 with an IL-based process solvent 30 that has functional material 20 dispersed therein to make a process solvent/functional material mixture 32 is depicted in FIG. 4A. The functional material 20 may be predisposed in the IL-based process solvent 30 to create the process solvent/functional material mixture 32 before the introduction of the natural fiber 12 as illustrated in FIG. 4A.

The natural fiber substrate 10 and process solvent/functional material mixture 32 then may be combined as depicted in FIG. 4B (to create a process wetted substrate). At least controlled pressure, temperature, and/or time may be used to create a swollen natural fiber substrate 112 within the process solvent/functional material mixture 32 as depicted in FIG. 4C. In an aspect of a welding process, the welding process may be configured such that all or a portion of the IL-based process solvent 30 is then removed from swollen natural fiber substrate 112 to yield welded fibers 42 with entrapped functional material 22 while simultaneously maintaining a plurality of the natural fiber substrate 10 functional characteristics and a plurality of the functional material 20 functional characteristics as depicted in FIG. 4D.

In an aspect of a welding process, the welded fibers 42 may be a combination of covalently bonded functional material 20 and swollen natural fiber substrate 112. In one aspect of a welding process, the welding process may be configured such that the resulting welded substrate is comprised of a functional material 20 comprised of a molecular dye entrapped within a natural fiber substrate 10 comprised of cotton paper (fibrous mat), wherein the functional material 20 may be dispersed in an IL-based process solvent 30 (to create a process solvent/functional material mixture 32) prior to application to the natural fiber substrate 10. During a welding process, biopolymers (including, for example, cellulose in natural fiber substrate 10 comprised of cotton paper) may be swollen such that the functional material 20 comprised of dye can physically diffuse into and become entrapped within the polymer matrix by covalent bonding. After the welding process, the dye may remain visibly entrapped within the polymer matrix.

In one aspect of a welding process, the welding process may be configured such that certain information and/or chemical functionality may be controllably fused into natural fiber substrates 10 in the resulting welded fibers 40, 42. Such welded fibers 40, 42 may have application at least to anti-counterfeiting features for paper-based currency, dyeing (colorfast) of clothing, drug delivery devices, and other related technologies. In one aspect of a welding process, the welding process may be configured for use with a functional material 20 that may include molecular or ionic species able to be dispersed into IL-based process solvents 30 for incorporation into the natural fiber substrate 10.

Generally, the purpose of adding functional materials 20 may be application specific. For example, dyes with linkage chemistries that covalently bind with cellulose can be relatively expensive. In one aspect of a welding process, the welding process may be configured to entrap lower-cost alternative dyes that do not have special linkage chemistry within the welded fibers 40, 42. Functional material 20 comprised of one or more dyes that are entrapped within what was once swollen and mobilized biopolymers (e.g., swollen natural fiber substrate 11, 112) are not washed out as easily and may be applicable at least to textile and/or bar coding/information storage applications. In other aspects, conductive functional materials 20 can be entrapped within welded fibers 40, 42 for energy storage applications. Entrapment of functional materials 20 comprised of magnetic materials may be pertinent to textile-based actuators. The entrapment of functional materials 20 comprised of pharmaceuticals and/or quantum dots may be relevant to medical applications. The entrapment of functional materials 20 comprised of clays is germane to enhanced fire retardancy. The addition of the biopolymer chitin as a functional material 20 may find application due to its known antibacterial properties. In short, the number of possible applications is extremely large. Functional materials 20 include but are not limited to clays, all carbon allotropes, NdFeB, titanium dioxide, combinations thereof and the like as appropriate to affect electronic, spectroscopic, thermal conductivity, magnetism, organic and/or inorganic materials having antibacterial and/or antimicrobial properties (e.g., chitin, chitosan, silver nanoparticles, etc.), and/or combinations thereof. Accordingly, the scope of the present disclosure is in no way limited to a specific functional material 20 and/or the specific application of the resulting welded substrate and/or welded fibers 40, 42 unless so indicated in the following claims.

In an aspect of a welding process, the welding process may be configured such that no special covalent linkage chemistry is necessary to securely entrap the functional material 20 of interest but rather the functional material 20 may be physically entrapped within the welded fiber 40, 42. In one aspect of a welding process, functional material 20 may be incorporated with high spatial control for encoding information or creating color fast dyes, more generally, for integrating device functionality. Multidimensional printing and fabrication techniques enable the layering of many types of functionality within a single material or object.

D. Functional Material Entrapment from Process Solvent/Functional Material/Polymer Mixture As depicted in FIG. 5, with various sub-processes and components further called out in FIGS. 5A-5D, in one aspect a welding process may be configured to incorporate functional materials 20 into a natural fiber substrate 10 by introduction of the functional material 20 in a mixture of IL-based process solvent and that also contains additional solubilized polymer.

Figure 5:
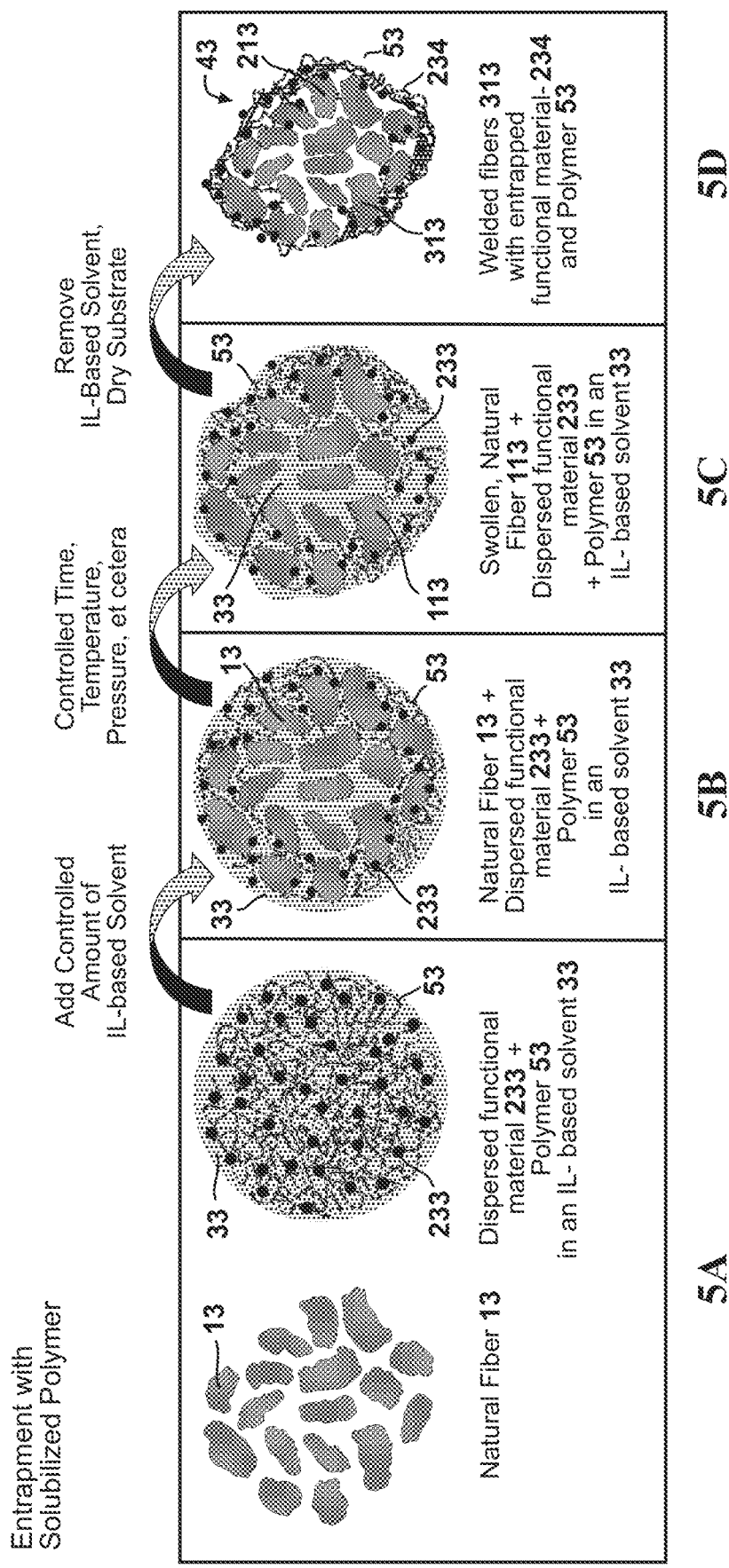
FIG. 5 illustrates a process for addition and physical entrapment of solid materials within a fiber-matrix composite with the sub-processes or components of FIG. 5 called-out as FIGS. 5A-5D utilizing materials (pre)dispersed in an IL-based solvent with additional solubilized polymer.

As shown in FIG. 5A, such a process may begin with a natural fiber substrate 10 and an IL-based process solvent 30 mixed with a functional material 20, such that the functional material 20 is dispersed in the IL-based process solvent 30 to constitute a process solvent/functional material mixture 32. A polymer 53 may be included in the process solvent/functional material mixture 32 such that the polymer 53 is dissolved and/or suspended in the process solvent functional material mixture 32. See also FIG. 5 illustrating a process for addition and physical entrapment of solid materials within a fiber-matrix composite with the sub-processes or components of FIG. 5 called-out as FIGS. 5A-5D. The process solvent/functional material mixture 32 mixed with the polymer 53 prior to application to the natural fiber substrate 10 is depicted in FIG. 5A. The process solvent/functional material mixture 32 having polymer 53 therein may then be introduced to the natural fiber substrate 10 to create a process wetted substrate as depicted in FIG. 5B. The welding process may be configured such that controlled pressure, temperature, and time are create a swollen natural fiber substrate 11, 112 within the combined process solvent/functional material mixture 32, polymer 53, and natural fiber substrate 10 as depicted in FIG. 5C.

In one aspect of a welding process, all or a portion of the IL-based process solvent 30 then may be removed from the process wetted substrate (which may be comprised of bonded functional material 21 and swollen natural fiber substrate 11, 112) to yield welded fibers 40 with entrapped functional material 22 and polymer 53 as shown in FIG. 5D while simultaneously maintaining a plurality of the natural fiber substrate 10 functional characteristics and a plurality of the functional material 20 functional characteristics.

In an aspect of a welding process, the welded fibers 40 may be a combination of covalently bonded functional material 21, polymer 53, and swollen natural fiber substrate 11. The polymer(s) may be comprised of biopolymers and/or synthetic polymers. In a welding process configured for use with certain polymers 53, additional polymers may act as both a binder (e.g., glue) as well as a rheological modifier to change solution viscosity. Additionally, such a welding process may allow additional spatial control over the final location of functional materials 20 within welded substrate. In one aspect of a welding process, the welding process may be configured for functional material 20 comprised of carbon materials and the natural fiber substrate 10 may be comprised of cotton yarn to yield a welded fiber 40, 42 that has been tested and verified as suitable for use as electrodes for high energy density supercapacitors in woven fabrics. These may be adapted to provide flexible, wearable energy storage devices.

A welding process may be configured to produce a welded fiber 40, 42 with a functional material 20 comprised of one or more conductive additives such as organic materials (e.g., carbon nanotubes, graphene, etc.) or inorganic materials (silver nanoparticles, stainless steel, nickel, including fibers coated with metals and metal oxides, etc.). Such welded fibers 40, 42 may exhibit enhanced conductivity characteristics, and when combined with an appropriate electrolyte (e.g., either gel, polymer electrolytes, etc.), these welded fibers 40, 42 (and/or fabrics and/or textiles produced therefrom) may be capable of performing electrochemical reactions and/or capacitive energy storage.

A welding process may be configured to produce a welded fiber 40, 42 with a functional material 20 comprised of capacitive additives (e.g., MnO2, etc.). Such welded fibers 40, 42 may exhibit enhanced energy storage characteristics when combined with an appropriate electrolyte including either gel or polymer 20 electrolytes.

A welding process may be configured to produce a welded fiber 40, 42 with a functional material 20 comprised of photoactive additives (e.g., TiO2, etc.). Such welded fibers 40, 42 may exhibit enhanced self-cleaning (e.g., in the case of a wide bandgap semiconductor such as TiO2) and/or ultra violet light resistance characteristics.

Other applications for welded fibers 40, 42 produced according to a welding process according to the present disclosure may include but are not limited to technologies ranging from anti-counterfeiting to drug delivery applications. Furthermore, the preceding list of functional materials is not meant to be exhaustive and/or limiting, and other functional materials may be used without limitation unless so indicated in the following claims.

8. Modulated Welding Processes

As previously described herein above, a welding process may be configured to allow for a wide variety of welded substrate finishes (e.g., yarn finishes) to be produced from conventional substrates (non-fiber welded), which substrates may be comprised of yarn and/or textile substrates in certain configurations of a welding process. For example, a welding process may be configured as a modulated welding process via the use of a process solvent that is pumped with a controlled, variable and/or modulated rate and/or by moving the substrate (e.g., yarn, thread, fabric, and/or textile) through the welding process at a variable rate and/or by varying the process solvent composition, and/or by varying the temperature and/or pressure in the process solvent application zone 2, process temperature/pressure zone 3, process solvent recovery zone 4, by varying tension (e.g., of the substrate, process wetted substrate, etc.), and/or combinations thereof.

In one aspect a welding process may be configured to allow for specific and precise control of the ratio of process solvent relative to a substrate comprised of fibers such that the welding process may convert a controllable amount of the fiber within the substrate to a welded state. The ratio of process solvent relative to substrate may be optimized at least depending on the particular process solvent and characteristics of the substrate. For example, in a welding process configured to use process solvent mixtures such as an ionic liquids (e.g., 3-ethyl-1-methylimidizolium acetate, 3-butyl-1-methylimidizolium chloride, etc.) mixed with a polar aprotic additive (e.g., acetonitrile) might utilize a process solvent ratio ranging from one part by mass process solvent added to one part by mass substrate to four parts by mass process solvent added to one part by mass substrate. Another aspect of a welding process may employ a process solvent that is comprised of a cold alkaline (sodium hydroxide and/or lithium hydroxide) with urea solution having process solvent ratios ranging from two parts by mass process solvent to one part by mass substrate to more than ten parts by mass process solvent to one part by mass substrate. Table 11.1 gives process parameter examples that have been used successfully for fabricating welded yarn utilizing welding systems with a process solvent comprised of both an ionic liquid and with a process solvent comprised of an aqueous hydroxide solution. The parameters shown in Table 11, but which parameters are not limiting to the scope of the present disclosure unless so indicated in the following claims.

In one welding process utilizing a process solvent comprising a hydroxide and urea in aqueous solution, the hydroxide may be comprised of NaOH and/or LiOH. In a welding process, the hydroxide may be comprised of LiOH at between 4 and 15 weight percent and urea at between 8 and 30 percent. In certain applications it may be advantageous to configure the process solvent such that it is comprised of LiOH at between 6 and 12 weight percent and urea at between 10 and 25 percent. In still another application it may be advantageous to configure the process solvent such that it is comprised of LiOH at between 8 and 10 weight percent and urea at between 12 and 16 percent.

TABLE 11.1

| Process Solvent | Process Temperature | Welding Time for yarn (s) | Reconstitution Solvent | Process Solvent To Substrate Ratio (wt solvent:wt substrate) |
| --- | --- | --- | --- | --- |
| EMIm OAc | 50° C.-100° C. | 5-15 | water, acetonitrile, or other aprotic solvent | 0.5-6 |
| 1 mol EMIm OAc + 2 mol ACN | 50° C.-100° C. | 5-15 | water, acetonitrile, or other aprotic solvent | 0.75-6 |

TABLE 11.1-continued

| Process Solvent | Process Temperature | Welding Time for yarn (s) | Reconstitution Solvent | Process Solvent To Substrate Ratio (wt solvent:wt substrate) |
|---|---|---|---|---|
| 1 mol EMIm OAc + 4 mol ACN | 50° C.-100° C. | 10-25 | water, acetonitrile, or other aprotic solvent | 1-6 |
| BMIm Cl | 90° C.-130° C. | 5-30 | Water, acetonitrile, or other aprotic solvent | 0.5-6 |
| 1 mol BMIm Cl + 1 mol ACN | 80° C.-130° C. | 5-45 | Water, acetonitrile, or other aprotic solvent | 0.75-6 |
| NaOH or LiOH (~7 wt %) + urea (~12 wt %) aqueous solution | −18° (freezing pt)-−10° C. | 60-300 | water | 2-10 |

With regard to the temperature ranges specified in Table 11.1, note that temperature may be optimized for the specific composition of the process solvent system. Moreover, the temperature and composition of the process solvent system may be co-optimized together at least with the solvent application zone 2 hardware and/or process control software and/or apparatuses in order to achieve the desired amount and location of welding on the substrate. That is, fiber welding that either provides consistent welded substrate attributes or modulated substrate attributes. This may also be achieved by applying viscous drag were appropriate during solvent application as well as the process temperature/pressure zone 3.

As shown in Table 11.1 and described herein above, a process solvent system may be configured as a mixture of an IL liquid and a molecular additive. The mole ratio of IL liquid to molecular additive may vary from one welding process to the next, and may affect the optimal temperature of the process solvent system during application thereof to the substrate. For example, in a welding process configured to utilize a process solvent system comprised of 1 mol BMIm Cl to 1 mol ACN, the vapor pressure of ACN may result in difficult processing conditions to control (related to health and safety) if the temperature is raised above 120° C. (which is where the rate of welding may be optimal). As a result of this constraint, the welding temperature is set to a lower temperature (e.g., 105° C.) but then requires a longer duration (>30 seconds) at such temperature. By contrast, in a welding process configured to utilize a process solvent system comprised of EMIm OAc, the optimal temperature may be between 80° C. and 100° C. because the effectivity of the process solvent is higher than BMIm Cl and thus the welding time with EMIm OAc in this temperature range can be 5-15 seconds. Accordingly, the optimal temperature for at least the process solvent application zone 2, process temperature/pressure zone 3, and other steps of a welding process may vary from one application thereof to the next, and is therefore in no way limiting to the scope of the present disclosure unless so indicated in the following claims.

Referring now to Tables 9.1, 10.1, and 11.1 (all of which provide key process parameters for a welding process configured to use a process solvent comprised of an aqueous hydroxide), the optimal ratio of process solvent to substrate (on a mass or weight basis) may vary at least based on the substrate format type. For example, a welding process configured for use with a 2D substrate may have a ratio of 0.5 to 7, and some welding processes may be optimally configured at a ratio of approximately 3.7. A welding process configured for use with a 1D substrate may have a ratio of 4 to 17, and some welding processes may be optimally configured at a ratio of approximately 10. It has been observed that a ratio of approximately 10 or higher, and specifically a ratio of 17, results in a condition in which the process wetted substrate is beyond saturation with respect to the process solvent, such that excess solvent is present at the exterior of the process wetted substrate that is not absorbed by the substrate and/or process wetted substrate. However, the specific ratio for a welding process utilizing an IL-based process solvent or an aqueous hydroxide process solvent in no way limit the scope of the present disclosure unless so indicated in the following claims.

TABLE 11.2

| Process Solvent | Process Temperature | Welding Time for yarn (s) | Reconstitution Solvent | Process Solvent To Substrate Ratio (wt solvent:wt substrate) |
|---|---|---|---|---|
| 1 mol EMIm OAc + 2 mol ACN + 1% (by wt.) Cellulose Additive | 50° C.-100° C. | 5-15 | water, acetonitrile, or other aprotic solvent | 0.75-6 |
| BMIm Cl + 0.5% (by wt.) Cellulose Additive | 90° C.-130° C. | 5-30 | Water, acetonitrile, or other aprotic solvent | 0.5-6 |

With regard to the values and compositions of process solvents shown in Table 11.2, note that the addition functional material additives allows for spatial modulation of welding and unique controlled volume consolidation. The addition of functional materials such as dissolved cellulose with the appropriate hardware and controls in the welding process may allows for the surprising effect of a shell welded yarn as previously described in detail above at least related to FIGS. 9I & 9J. That is, the amount of welding may be controlled through the substrate cross section (i.e., the yarn diameter in the specific examples of FIGS. 9I & 9J) and may create a welded substrate (i.e., welded yarn substrates in the specific example) that exhibit both improved toughness and elongation as compared to raw substrate control samples.

Figure 13:
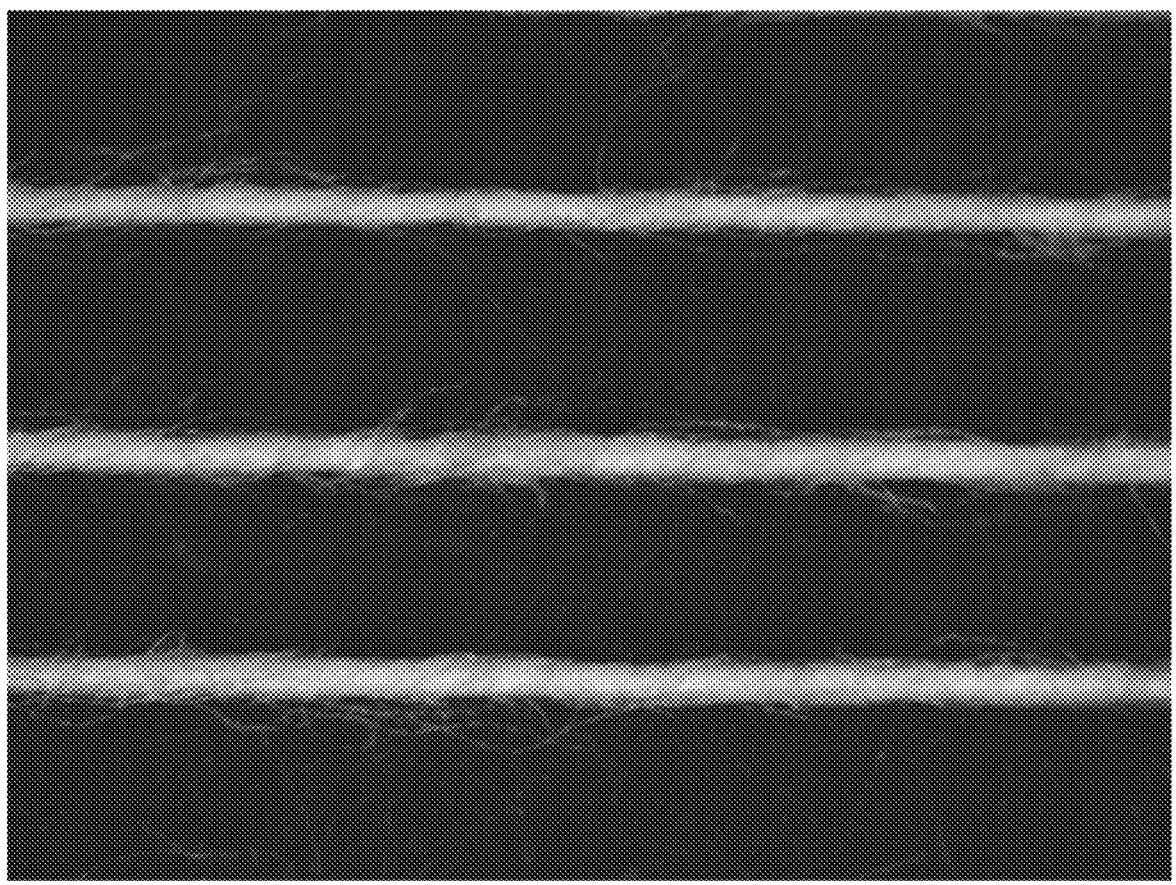
FIG. 13 provides a scanning-electron microscope image of a welded yarn substrate produced with a welding process having a reconstitution solvent at approximately 20° C.
Figure 14A:
FIG. 14A provides a scanning-electron microscope image of a welded yarn substrate produced with a welding process having a reconstitution solvent at approximately 22° C.
Figure 14B:
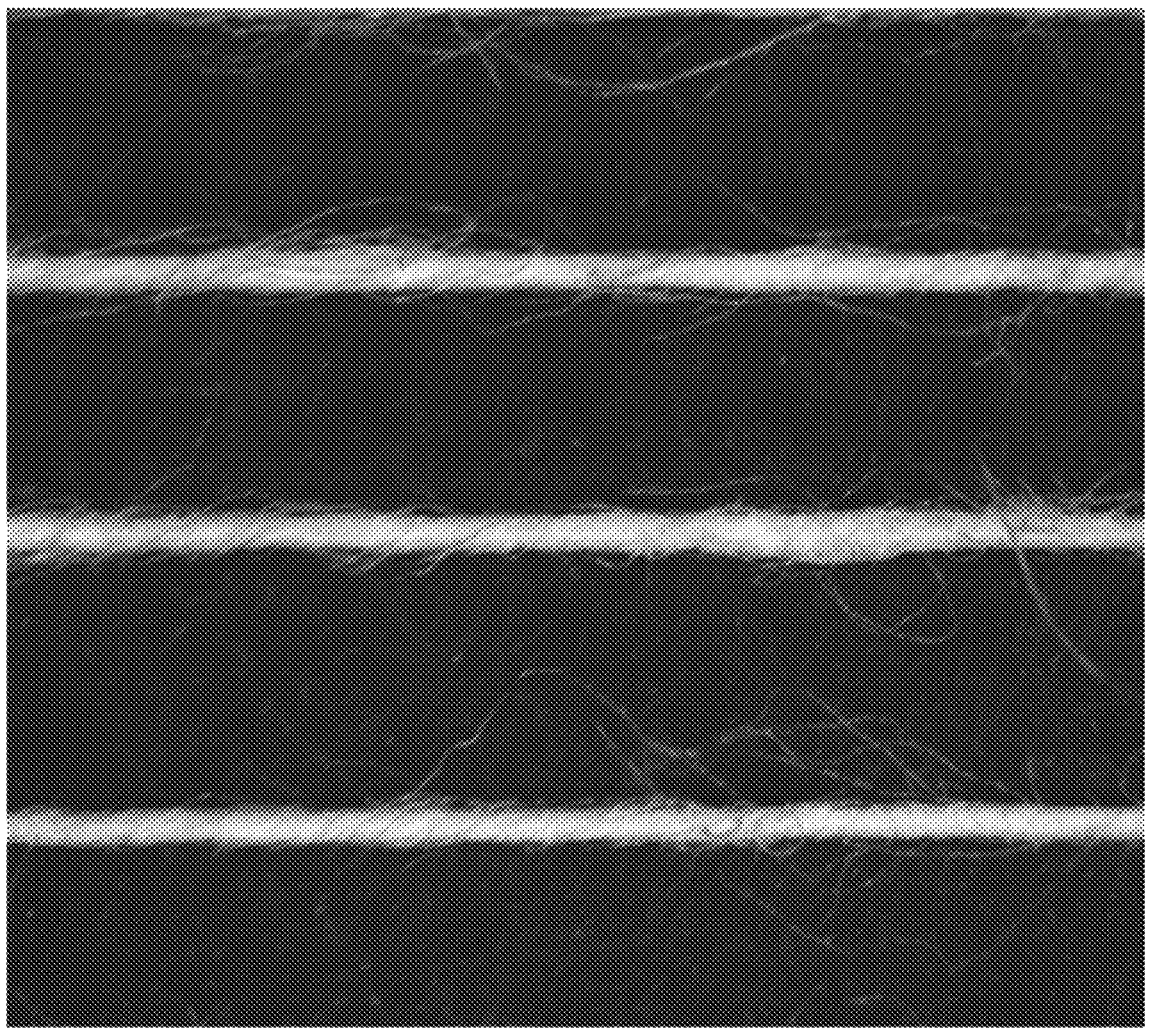
FIG. 14B provides a scanning-electron microscope image of a different welded yarn substrate produced with a welding process having a reconstitution solvent at approximately 40° C.

Note as well that the type of reconstitution solvent and temperature thereof in conjunction with the different values described in Table 11.1 can also yield surprising effects on the controlled volume consolidation as the reconstituted wetted substrate is dried. An SEM image of a raw 1D substrate comprised of 18/1 ring spun cotton yarn is shown in FIG. 13. One welded substrate is shown in FIG. 14A and another is shown in FIG. 14B, both of which were produced from the raw substrate shown in FIG. 13. The welded substrates shown in both FIGS. 14A & 14B were produced using the welding process and apparatuses shown in FIG. 9A.

TABLE 12.1

| Breaking Strength (g) | Norm. Breaking Strength (cN/dtex) | Elongation (%) |
|---|---|---|
| 453 | 1.38 | 5.7 |

Table 12.1 provides various attributes of the raw substrate shown in FIG. 13. The attributes were averaged as performed on approximately 20 unique specimens of welded yarn substrate, which attributes were collected using an Instron brand mechanical properties tester operating in tensile testing mode approximating ASTM D2256. The mechanical property for each column heading in Table 12.1 are the same as those previously described regarding Table 1.2. Table 13.1 shows some of the key processing parameters used to manufacture both the welded substrate shown in FIG. 14A and that shown in FIG. 14B. The process parameters for each column heading in Table 13.1 are the same as those previously described regarding Table 1.1.

TABLE 13.1

| Temperatures (° C.) | Pull Rate (m/min) | Welding Zone Time (sec) | Solv. Ratio (g/g) | Solvent Type |
|---|---|---|---|---|
| Process solvent application zone: 90 process pressure temperature zone: 90 | 18.0 | 8.5 | 2.0 | EMIm OAc:ACN 1:2 (Mole Ratio) |

Table 13.2 provides various attributes of the welded substrate shown in FIG. 14A produced using the parameters described in Table 13.1. The attributes were averaged as performed on approximately 20 unique specimens of welded yarn substrate, which attributes were collected using an Instron brand mechanical properties tester operating in tensile testing mode approximating ASTM D2256. The mechanical property for each column heading in Table 13.2 are the same as those previously described regarding Table 1.2.

TABLE 13.2

| Breaking Strength (g) | Norm. Breaking Strength (cN/dtex) | Elongation (%) |
|---|---|---|
| 556 | 1.69 | 2.4 |

Table 13.3 provides various attributes of the welded substrate shown in FIG. 14B produced using the parameters described in Table 13.1. The attributes were averaged as performed on approximately 20 unique specimens of welded yarn substrate, which attributes were collected using an Instron brand mechanical properties tester operating in tensile testing mode approximating ASTM D2256. The mechanical property for each column heading in Table 13.3 are the same as those previously described regarding Table 1.2.

TABLE 13.3

| Breaking Strength (g) | Norm. Breaking Strength (cN/dtex) | Elongation (%) |
|---|---|---|
| 521 | 1.58 | 2.4 |

In contrasting FIG. 14A with FIG. 14B, it is apparent how volume controlled consolidation may be manipulated to yield certain attributes of the welded yarn substrate. Specifically, a contrast of FIGS. 14A & 14B shows how the method, composition of reconstitution solvent, and/or configuration of the process solvent recovery zone 4 (and/or other step of a welding process) may impact the controlled volume consolidation of the welded yarn substrate, and, consequently, the mechanical properties and/or other important attributes of the welded substrate. One such attribute is the "hand" of the yarn (i.e., the way it feels to a person's touch) and resulting fabrics made therefrom.

Specifically, both the welded yarn substrate shown in FIG. 14A and that shown in FIG. 14B were produced using a welding process wherein the reconstitution solvent was comprised of water. However, for the welded yarn substrate of FIG. 14A the temperature of the water was 22° C. and for that in FIG. 14B it was 40° C. As is apparent from a contrast of FIGS. 14A & 14B, the welding process used to produce the welded substrate shown in FIG. 14A (colder reconstitution solvent) results in a welded substrate with significantly softer hand compared to the welded substrate shown in FIG. 14B (warmer reconstitution solvent). Fabrics made from welded yarn substrates that have been produced with a welding process having a reconstitution solvent above 40° C. can have significantly different hand characteristics than fabrics made from similar welded yarn substrates produced with a welding process having a reconstitution solvent at room temperature. The configuration of the process solvent recovery zone 4 (e.g., reconstitution method) and conditions thereof is thus an important new parameter.

Still referring to FIGS. 14A & 14B, which were produced from identical welding processes but for the temperature of the reconstitution solvent, it is apparent that the temperature of the reconstitution plays an important role in the controlled volume consolidation of the welded yarn substrate. Again, some mechanical properties of the welded yarn substrate of FIGS. 14A & 14B are shown in Table 13.2 and 13.3, respectively. Whereas both welded yarn substrates show significant improvement in the mechanical properties over the raw yarn substrate (e.g., a 15-23% improvement over the raw yarn substrate), the welded yarn substrate shown in FIG. 14B (see also Table 13.3) that was subjected to a reconstitution solvent at elevated temperature has a slightly larger diameter and more loose fiber/hair at its surface. Although the welded yarn substrates in FIG. 14B are slightly more fibrous than those shown in FIG. 14A, the amount of fiber in FIG. 14B is found to be less than that amount for a corresponding raw yarn substrate shown in FIG. 13. Moreover, the fiber on the welded yarn substrate in FIG. 14B is anchored to the welded yarn substrate in such a way as to resist separating from the welded yarn substrate away as lint. Modified fiber/hair structure at or near the surface of a welded yarn substrate through a welding process may be an important attribute that effects the hand of fabrics knitted or woven from welded yarn substrates.

Generally, particular values of the solvent ratios within the ranges mentioned in the immediately above can be utilized produce very consistent welded yarn for substrates comprised of yarn when the ratios are not varied, but rather held constant and so long as other critical variables such as temperature are also held constant during the welding process. In so doing the welding process may be configured to yield a welded substrate that exhibits a consistent amount of welding such that welded yarns may have a consistent amount of welded fiber along the length of the welded yarn.

Appropriate control of the dynamic process solvent ratio (herein defined as the ratio of the mass of process solvent relative to the mass of the substrate), the composition of the process solvent, the pressure and method by which the process solvent is applied yields novel effects. For example, proper dynamic control may be used in a welding process to yield a welded substrate with heather and/or space dye (multi-colored effect) appearance in which a welded substrate comprised of a yarn or textile may have a variable degree of coloration that may be due to the dynamic control of the welding process. Creating a heather and/or space dye effect may only be revealed upon dyeing and finishing if these textile manufacturing steps are accomplished after the welding process.

However, a modulated welding process is not limited to producing heather or space dye effects but also may be configured to produce "embossed" yarns having a variable diameter (with changing yarn weight, which is to say without needing a substrate of variable length and/or diameter) and any number of other unique effects that for which there do not yet exist textile industry terminologies to describe. The degree to which the effect is observed may also be a function of the yarn or textile substrate that is acted upon. For example, the type of spinning process (e.g., ring spinning, open end spinning, vortex spinning, etc.) that was utilized to produce a substrate comprised of a yarn may requires different welding conditions (e.g., different process solvent ratios and/or application methods) from one another.

A. Comparison of Modulated and Non-Modulated Welding Processes

One illustrative example of a modulated welding process will now be described and compared to a non-modulated welding process (such as previously described herein above). However, the foregoing illustration is not meant to be limiting in any manner, and accordingly the specific parameters thereof do not limit the scope of the present disclosure unless so indicated in the following claims.

In a non-modulated welding process, the welding process may be configured for a substrate comprised of 30/1 ring spun yarn, which substrate may be converted into an extremely consistent welded substrate with consistent coloration, consistent fell and finish, and consistent amount of visible exterior fiber 'hair' by operating the welding process consistently. For example, by configuring the welding process to utilize a stable process solvent to substrate mass ratio, steady yarn movement rate through the welding process, consistent temperature and pressure, etc. This welded substrate may also exhibit all of some of the welded substrate attributes previously described herein above.

Alternatively, if desired, a modulated welding process may be configured for a substrate comprised of 30/1 ring spun yarn to convert the substrate into a welded substrate comprised of a yarn that has a multi-colored heather or space dye appearance by dynamically varying certain parameters of the modulated welding process. This is a surprising and very useful result because the welding process can be automated to convert a substrate comprised of commodity ring spun 30/1 yarn (which is a generally uniform product produced at large scale) into a welded substrate comprised of welded yarn having a unique look, feel, and/or finish for a multitude of end uses and applications. In correlative modulated welding processes, the welding process may be configured for use with substrates comprised of heavier (including but not limited to Ne 18 yarn) and lighter (including but not limited to Ne 40 yarn) commodity and specialized yarns without limitation unless so indicated in the following claims.

Moreover, a modulated welding process is not limited to configurations thereof for creating specialized effects and finishes just with substrates comprised of yarns. For example, application of process solvents including but not limited to mixed inorganic solvents such as aqueous solutions of lithium and/or sodium hydroxide with urea can be applied to both substrates comprised of yarns and even to substrates comprised of an entire textile that has itself been produced from either conventional material (e.g., yarn that has not been through a welding processes) or welded substrates (e.g., welded yarn).

Treatment of fabrics using a welding process can be accomplished over a localized region or regions of a fabric or garment. For example, processes such as those used in inkjet and/or screen printing of process solvent can be a very useful method by which to accomplish area-specific welding processes for 2D and/or 3D substrates. Alternatively, a welding process may be configured to yield a 2D and/or 3D welded substrate of relative uniform characteristics over an entire piece of material or garment.

When a welding process is configured and employed with appropriate control of various parameters thereof (e.g., limited welding time, relatively low process solvent ratio, etc.), the welding process may yield welded substrates with improved strength and pilling characteristics of woven and knitted textiles compared to their conventional raw substrate counterparts without excessive welding of yarn junctions within textiles. Alternatively, a welding process differently configured (e.g., longer welding time, higher process solvent ratios, etc.), may yield a welded substrate comprised of a woven or knitted material with welded and/or partially welded yarn junctions in woven and knitted materials to provide much stiffer and/or more robust materials. An advantage of employing a welding process on a 2D and/or 3D substrate (e.g., fabric, textiles) compared to 1D substrates (e.g., yarn, thread) is that large amounts of materials be treated simultaneously. However, as previously described above, welding substrates comprised of yarn and/or thread prior to weaving and/or knitting may yield a number of manufacturing and performance synergies. The choice of when and how to apply a given welding process to a particular substrate is largely dependent on the type of intended outcome/end use application for the welded substrate, and is therefore in no way limiting to the scope of the present disclosure unless so indicated in the following claims.

In addition to the possibilities listed above, it is possible to configure a welding process to form the cross section of 1D (e.g., yarn and/or thread), 2D, and/or 3D substrates (e.g., fabric and/or textiles as applicable to either 2D and/or 3D substrates) and/or the components of the substrates (e.g., an individual yarn or thread of a 2D and/or 3D substrate) into shapes other than circular shapes or welded substrates having circular cross-sectional shapes. Possible shapes include but are not limited to flattened oval or ribbon-like shapes. This may be accomplished by configuring a welding process to utilize appropriately shaped dies and/or rollers positioned within the process solvent application zone 2, process temperature/pressure zone 3, process solvent recovery zone 4, drying zone 5, and/or combinations thereof.

Conventional yarns used as substrates normally yield welded substrates that exhibit cross-sectional shapes that are roughly circular after the welding process. Generally, this may be because potential energy may be minimized as capillary forces draw process solvent(s) toward the core of a yarn as fibers are welded/fused. A welding process may be configured to yield welded yarn substrates that have non-circular cross-sectional shapes by employing at least specific forming methods and/or apparatuses to manipulate the process wetted substrate and/or forming the reconstituted wetted substrate as it dries.

B. Modulated and Non-Modulated Welding Processes Using Spatially Controlled Heating and/or Spatially Controlled Process Solvent Application Spatial control of adding chemicals to substrates (e.g., inkjet printing of ionic liquids) has been previously disclosed, such as in U.S. Pat. No. 6,048,388. The spatial control of a welding process may also be directly controlled at least by heat activation in selected regions within the substrate (to manipulate any characteristic and/or attribute of the resulting welded substrate as described in detail above), wherein a welding process may be configured as a modulated welding process using spatially controlled heating. IL-based solvents typically do not appreciably weld (modify) natural fiber substrates 10 at room temperature (about 20° C.) for time frames on the order of minutes. Typically, it may be advantageous to apply heat to activate and/or speed the welding process. This may involve heating the entire substrate to temperatures greater than about 40° C. for at least several seconds.

A schematic representation of a welding process that may be configured as a modulated welding process is shown in FIG. 11A, which may utilize 2D substrates. The modulated welding process shown in FIG. 11A may be configured to use a beam of infrared (laser) light to heat specific locations of a substrate to which process solvent has been previously applied. Heat from the directed energy beam may activate the welding process in specific locations of the substrate and is evident in one configuration of a welding process by the conversion of cellulose I (for natural cotton substrate) to cellulose II (cotton substrate after welding) and controlled volume consolidation (i.e., the thickness of the substrate may be reduced while the area is unaffected).

Figure 11E:
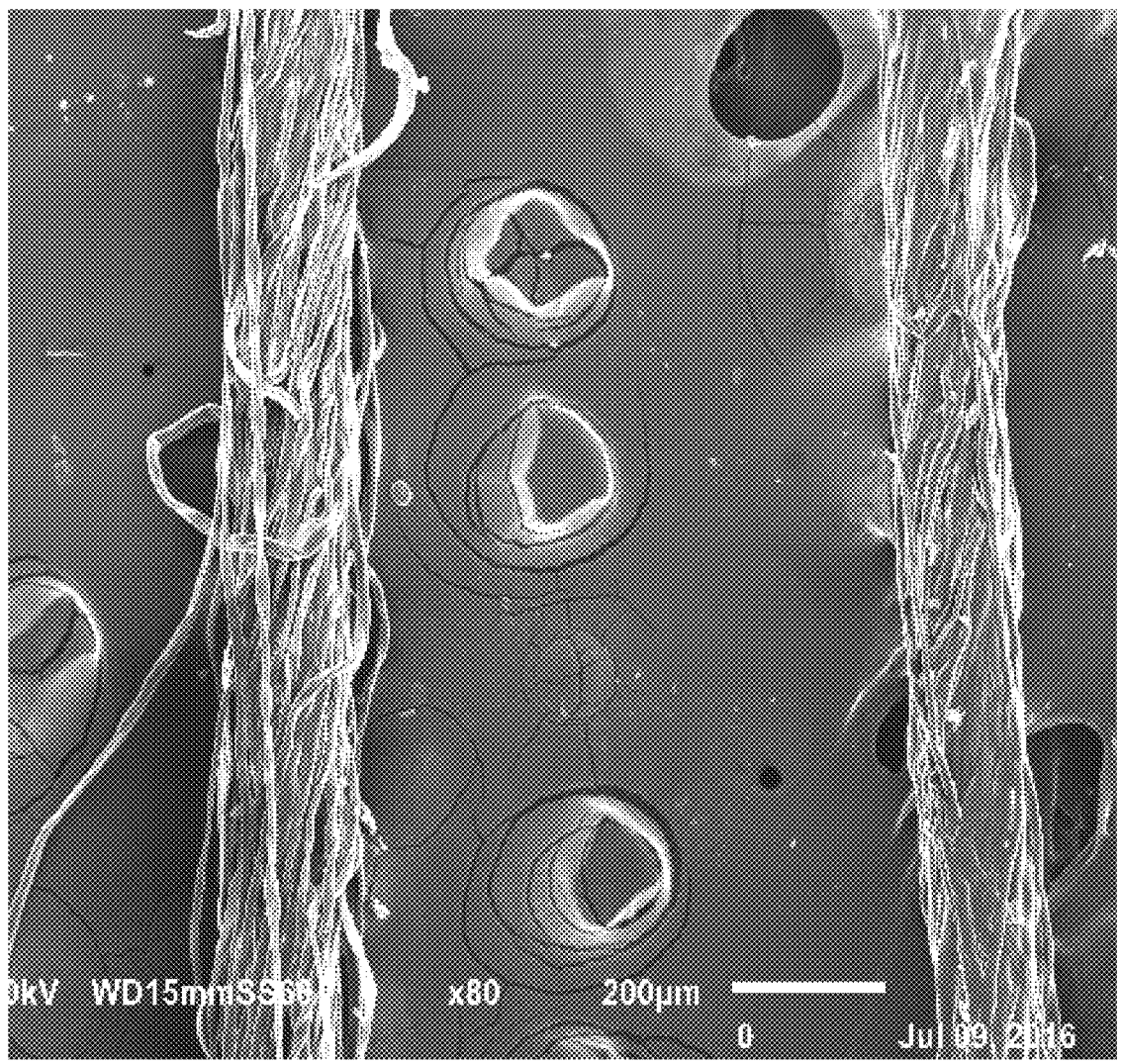
FIG. 11E provides an image of a welded substrate that has been produced via a modulated welding process, wherein the portion on the right side of the figure is lightly welded and the portion on the right side of the figure is highly welded.

As is evident by a comparison of FIGS. 10B and 11E, changes to the surface of the substrate are evident via visual inspection, which changes are a result of exposure from a directed energy source. Additionally, by controlling the power of the energy source (keeping the power sufficiently low), the substrate (cellulose in this example) was not ablated. A welding process may be configured to utilize any suitable wavelength of electromagnetic energy without limitation unless so indicated in the following claims including but not limited to visible light, microwaves, ultra violet light, and/or combinations thereof to achieve spatially controlled heating.

Referring now to both FIGS. 11A & 11B, which provide schematic representations of modulated welding processes applied to 2D substrates, FIG. 11A depicts spatially controlled heating and FIG. 11B depicts spatially controlled process solvent application. Again, FIG. 11A depicts the addition of heat to a substrate, process wetted substrate, and/or process solvent by a directed energy beam. The process solvent amount and/or composition may be modulated at specific locations or broadcast over the entire substrate. Referring to FIG. 11B, the amount of process solvent and/or composition thereof may be modulated at specific locations, and then large areas of the process wetted substrate may be heated by a broadcast energy source. Both modulated welding processes may result in volume controlled consolidation of the substrate after reconstitution and drying.

Referring now to both FIGS. 11C & 11D, which provide schematic representations of modulated welding processes applied to 1D substrates, FIG. 11C depicts spatially controlled heating and FIG. 11D depicts spatially controlled process solvent application. As shown in FIG. 11A, heat may be added to a substrate, process wetted substrate, and/or process solvent via a pulsed energy source. The process solvent amount and/or composition may be modulated at specific locations or broadcast over the entire substrate. Referring to FIG. 11D, the amount of process solvent and/or composition thereof may be modulated at specific locations, and then large areas of the process wetted substrate may be heated by a broadcast energy source and/or by a pulsed energy source. Both welding process may be configured to provide careful control over process solvent efficacy and rheology, and associated viscous drag in order to achieve the desired effect.

An image of a modulated welded yarn substrate that was produced via a modulated welding process wherein the flow rate of the process solvent was modulated (e.g., pulsed in a manner similar to that depicted in FIG. 11D) is shown in FIG. 11E. Configuring the modulated welding process to achieve the desired viscous drag (which in this example was done by physical contact with the process wetted substrate to spread the process solvent from the initial point of contact) resulted in alternating portions along the length of the welded substrate that were lightly welded and highly welded. In FIG. 11E, the portion on the right side of the figure is lightly welded and the portion on the right side of the figure is highly welded.

Figure 11F:
FIG. 11F provides another image of a fabric made from a modulated welded substrate, wherein the fabric exhibits a heathering effect.

An image of a fabric made from a welded substrate that has be subjected to a modulated welding process is shown in FIG. 11F. The welded substrate used to produce the fabric in FIG. 11F may be produced via the welding process and apparatuses shown in FIG. 9A and previously described herein. The modulated welding process was achieved via modulating process solvent pumping rate and viscous drag. By proper control of the welding process, a variable degree of controlled volume consolidation and specific degree of welding was achieved. The net effect was to modulate the amount of hair and empty space in the welded yarn substrate.

After this modulated welded yarn substrate was knit into a fabric and dyed, the depth of color was found to vary with the degree of welding. This yielded the surprising 'space dye' or 'heather' effect evident from FIG. 11F. Typically, in the fashion industry, this effect requires multiple yarns to be knitted into a single fabric. Modulated fiber welding not only provides the aforementioned benefits of quicker drying times and enhanced moisture management, but in this case, also adds a unique yet controllable color modulation that is of interest for a variety of fashion applications. Combining the modulated welding effect with a predetermined stitch length and/or with the tightness factor of a weave gives even further enhancement over the fabric color and texture. This is new result may find use in any number of conventional and functional products.

Figure 15A:
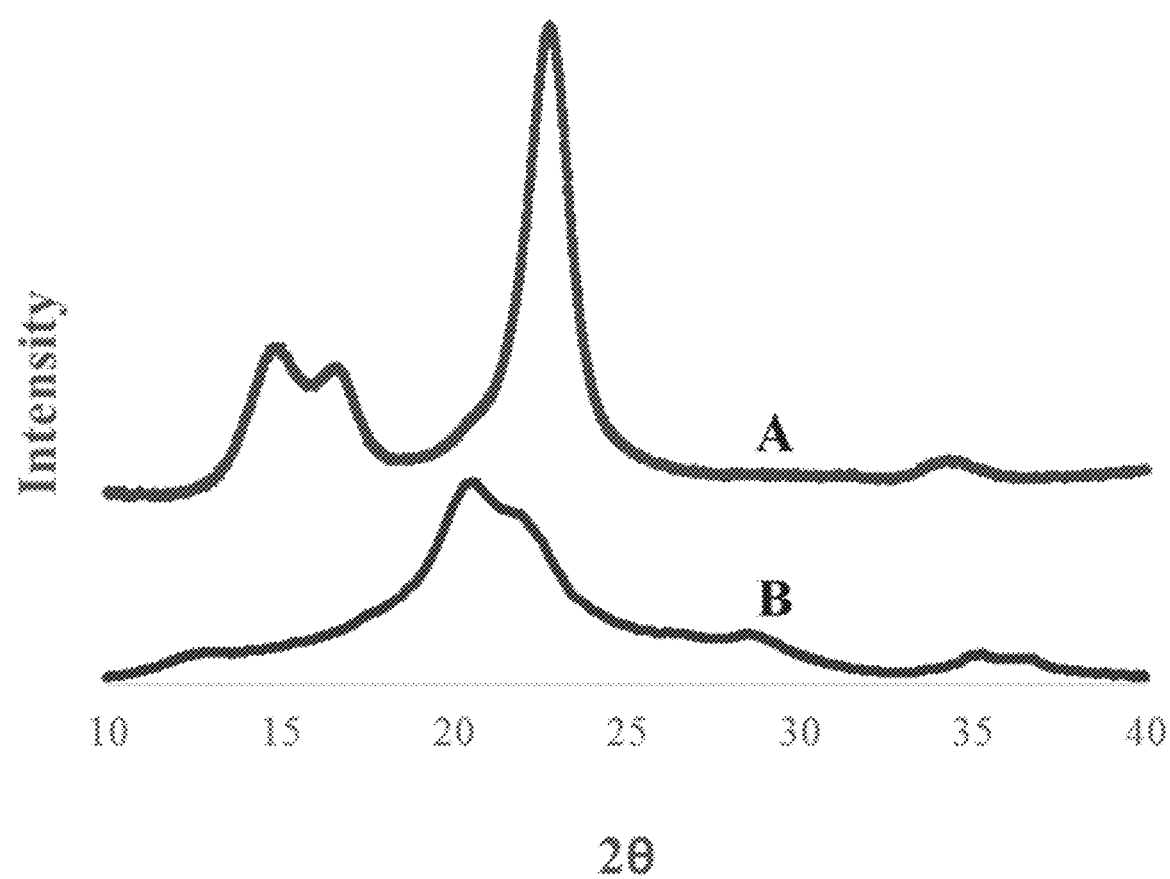
FIG. 15A provides x-ray diffraction data for a raw cotton yarn on plot A and a cotton yarn reconstituted from a raw cotton yarn substrate that was fully dissolved in ionic liquid.

As briefly mentioned above, a welding process may be configured to control the amount of cellulose I crystal that is converted to cellulose II crystal. Referring now to FIG. 15A, a graphical representation of x-ray diffraction data (XRD) for a raw cotton yarn substrate (plot A) and a cotton yarn that was fully dissolved with excess ionic liquid process solvent and then reconstituted (plot B) is shown therein. As used herein, plot B does not represent a "welded substrate" or "welded yarn substrate" or any other substrate produced according to the present disclosure because the entire raw yarn substrate was denatured and the native biopolymer structure was completely changed unless otherwise indicated in the following claims. In plot A, native cotton cellulose polymer is clearly shown in the cellulose I state. In plot B, there is clearly less crystalline character of cellulose II, which is present in cotton that has been fully dissolved and had its native structure wholly disrupted.

Table 14.1 shows some of the key processing parameters used to manufacture three separate welded substrates, wherein the processing parameters for the first two rows may be employed with the welding process and apparatuses shown in FIG. 9A, and wherein the processing parameters for the third row may be employed with the welding process and apparatuses shown in FIG. 10A. The process parameters for each column heading in Table 6.1 are the same as those previously described regarding Table 1.1.

TABLE 14.1

| Temperatures (° C.) | Pull Rate (m/min) | Welding Zone Time (sec) | Solv. Ratio (g/g) | Solvent Type |
|---|---|---|---|---|
| Process solvent application zone: 90 process pressure temperature zone: 80 | 18.0 | 8.5 | 2.0 | EMIm OAc:ACN 1:2 (Mole Ratio) |
| Process solvent application zone: 105 process pressure temperature zone: 105 | 18.0 | 8.5 | 3.0 | BMIm OAc:ACN 1:1 (Mole Ratio) + 0.5% (by wt.) Cellulose Additive |
| Process solvent application zone/ process pressure temperature zone: −14 | 30 | 135 | >7 (to the yarn saturation limit) | LiOH:Urea 8:15 Wt % in Sol'n |

Figure 15B:
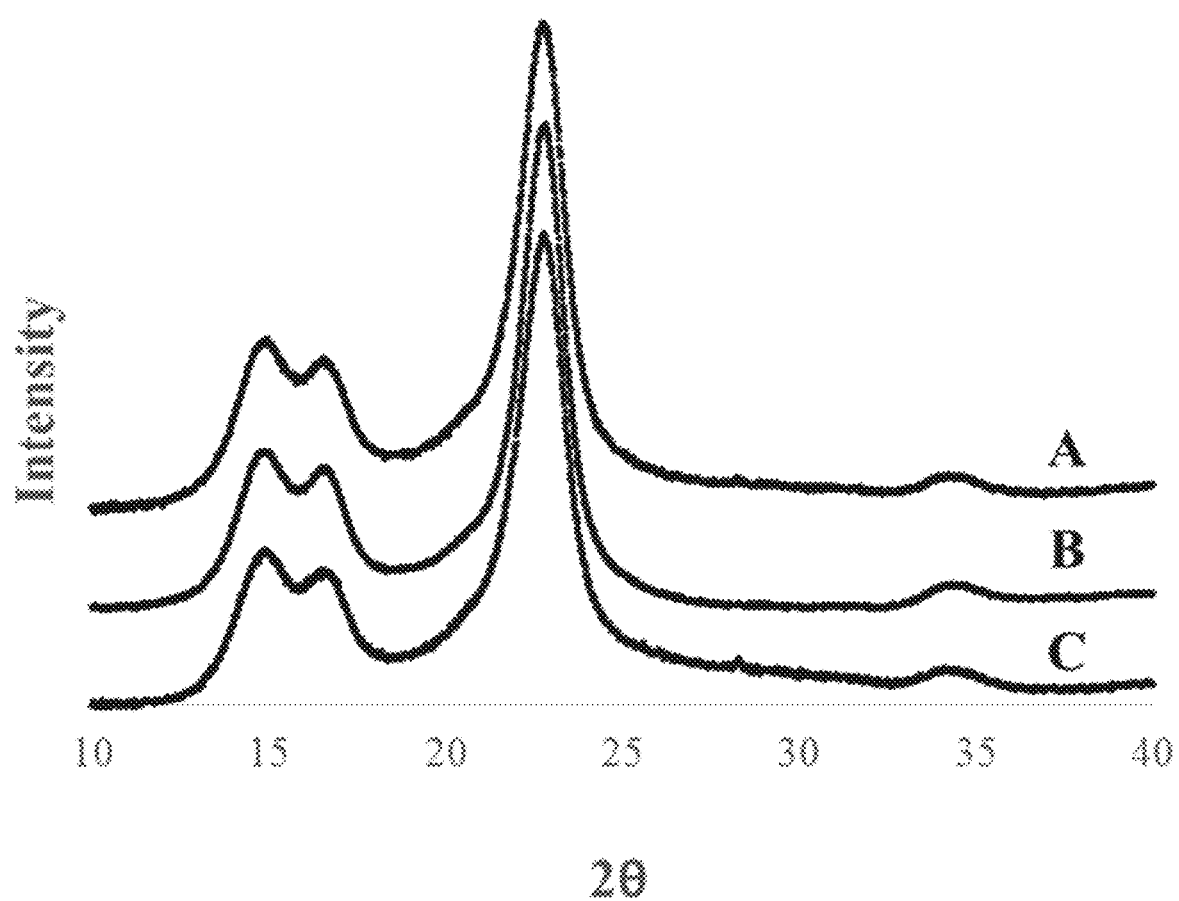
FIG. 15B provides x-ray diffraction data for three different welded yarn substrates produced from the same raw cotton yarn substrate shown in plot A of FIG. 15A FIG. 16A provides a depiction of a cross-section of a raw cotton yarn substrate showing various individual cotton fibers.

Referring now to FIG. 15B, which provides XRD data plots for the three welded yarn substrates produced using the process parameters shown in Table 14.1, plot A corresponds to the first row of Table 14.1, plot B corresponds to the second row thereof, and plot C corresponds to the last row of Table 14.1. In contrasting and comparing FIGS. 15A & 15B, it is apparent that the welded yarn substrates produced via the welding processes and apparatuses of FIGS. 9A and 10A utilizing the processing parameters from Table 14.1, respectively, retain native cellulose I structure of cotton while the welded yarn substrates are controllably modified to exhibit enhanced properties and/or attributes. The preservation of native cellulose I structure may be achieved utilizing various process solvent systems and various apparatuses as previously discussed in detail above. 9. Welding Processes For Dyeing And Resulting Products A. Indigo Dyeing Background Indigo dye is widely used in the treatment of cotton textiles. The indigo molecule, 2,2'-Bis(2,3-dihydro-3-oxoindolyliden), is generally water insoluble and thus not used for directly dyeing textiles. Instead, the reduced form, called leuco-indigo (or white indigo), which is water soluble, is used for dyeing textiles in the prior art and upon subsequent exposure to oxygen it reverts to the oxidized state that has the characteristic blue color. The prior art process for indigo dying is very water intensive and relies on large volumes of ancillary process chemicals such as sodium dithionite (sodium hydrosulfite), sodium hydroxide, and detergents (wetting and washing agents). In the prior art indigo dyeing technique, the dye can only penetrate a short distance into the yarn and thus multiple passes (dips) through dyeing vats are required to build-up the desired color intensity.

Techniques to improve dyeing processes have been proposed in the art but none have significantly reduced the water demand and requirement for acid and/or alkaline solutions. Bianchini et. al, *ACS Sustainable Chem. Eng.* 2015, 3, 2303-2308 propose the addition of 2 grams/liter ionic liquids to dye solutions to improve the uptake of disperse dyes in fabrics. This technology was shown to be effective for this class of dyes that have some level of water solubility but does not have applicability to dyes that are water insoluble (e.g., indigo).

U.S. Pat. No. 7,731,762 discloses the use of ionic liquids as carriers for dyes. The ionic liquids disclosed in that patent are not known to interact strongly with cellulosic materials and are not considered chaotropic. Furthermore, the patent does not disclose any ionic liquids selected specifically for use with indigo dye in dyeing a cellulosic product.

U.S. Pat. Pub. No. 20060090271 discloses the use of ionic liquids to partially dissolve the exterior of cellulosic fibers and applying, either simultaneously or sequentially, a benefit agent that may comprise a dye or dye fixative agent. Nowhere in the disclosure are specific embodiments of an ionic liquid and dye combination that is particularly suited for the process of indigo dyeing.

In traditional dyeing as defined herein, colorants such as molecular dyes are dissolved/dispersed at the molecular level within a solution. Upon exposure to such solutions, substrate (e.g., yarns, fabrics, etc.) absorb dyes and take on the color of the dye. Dyes can be reactive with special linking chemistry that creates covalent linkages between the dye and the substrate. Alternatively, dyes can be non-reactive and simply absorb and associate with the substrate through intermolecular associations (e.g., any combination of dispersion, dipole-dipole, hydrogen bonding, ion-dipole, ion-ion, and/or other attractions).

Figure 16A:
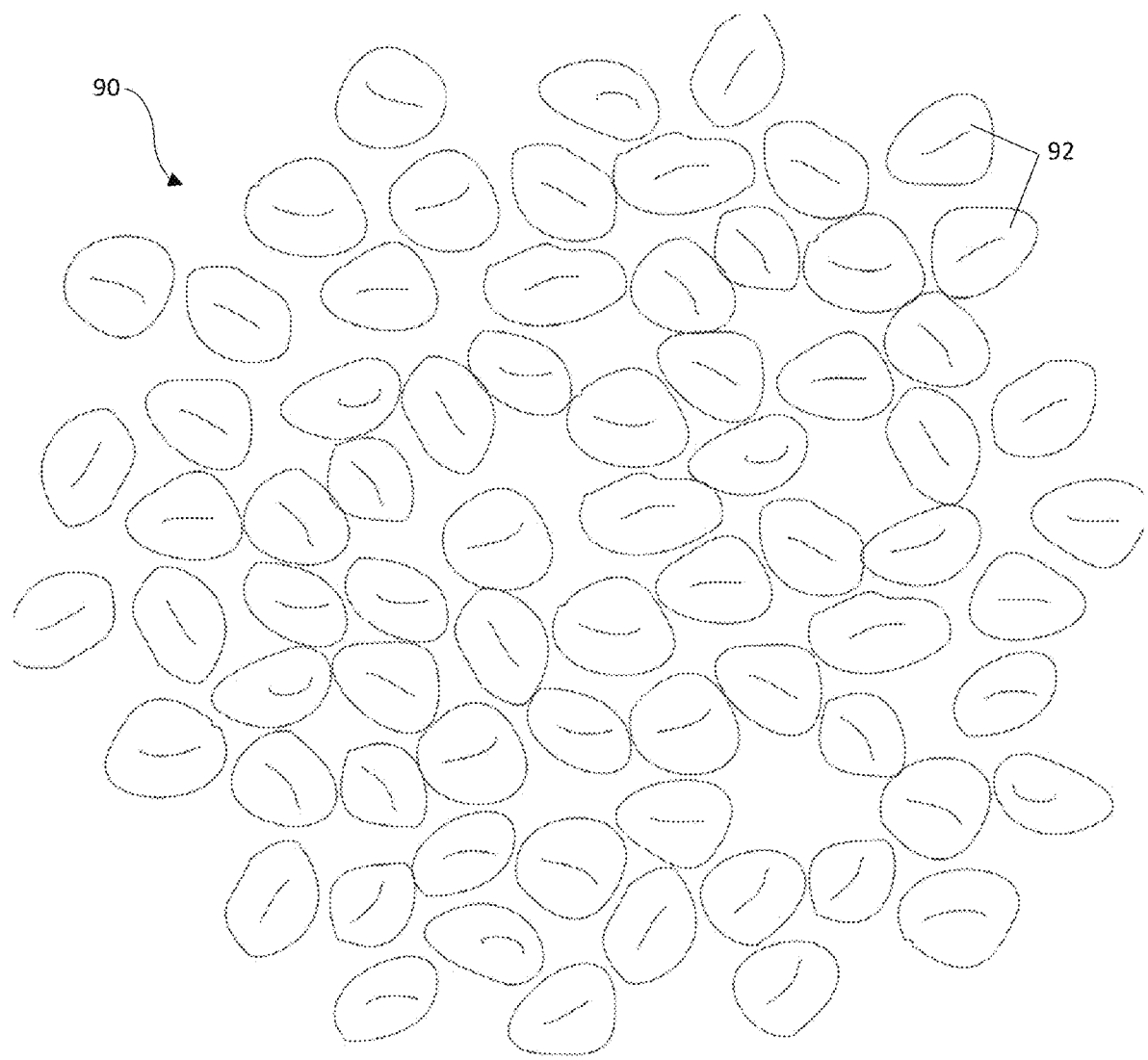
FIG. 16B provides a depiction of a cross-section of a raw cotton yarn substrate that has been ring dyed using prior art techniques.
Figure 16B:
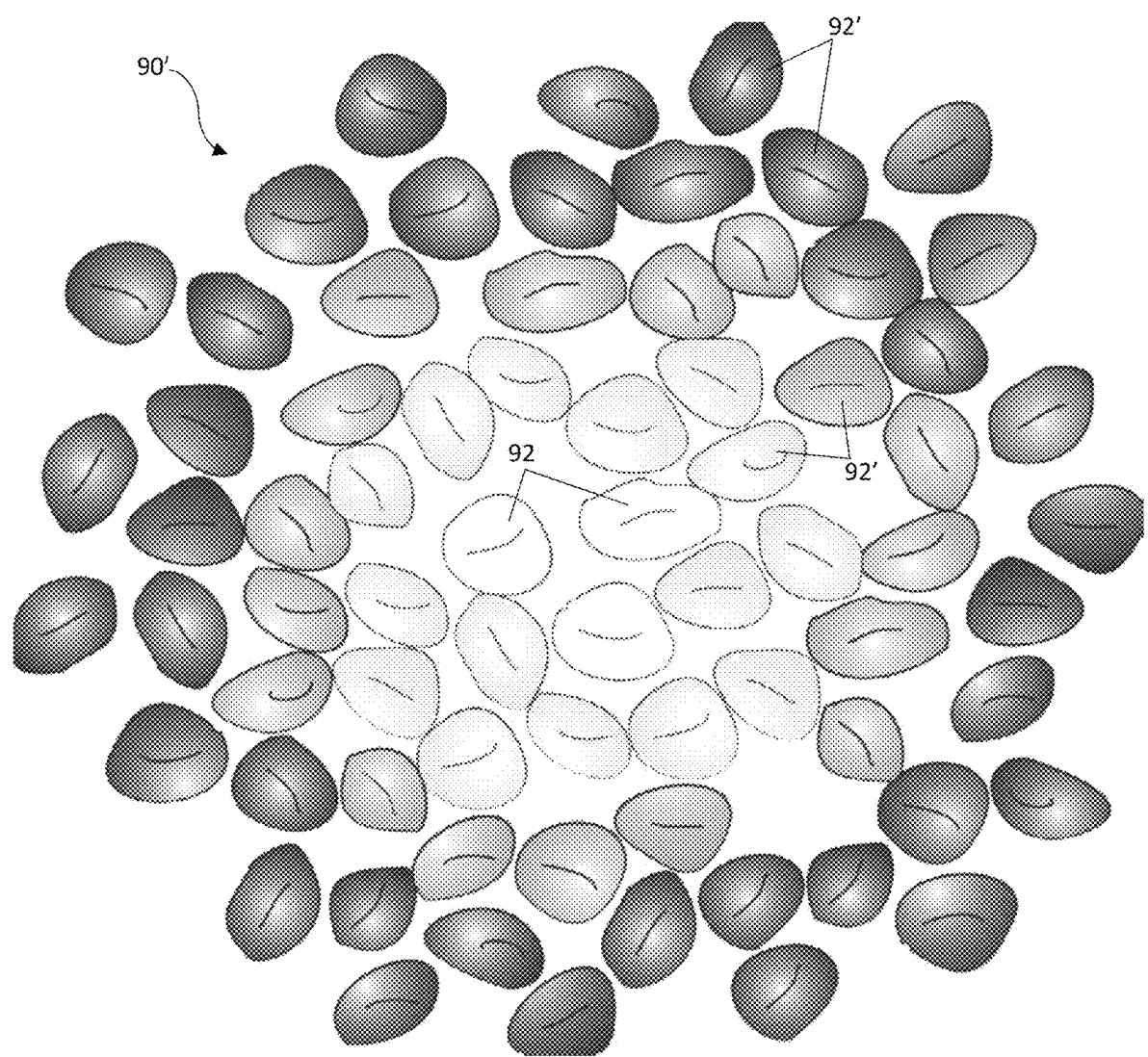

A cross-sectional depiction of a typical ring-spun undyed yarn substrate 90 shown in FIG. 16A wherein individual undyed fiber substrates 92 are shown, wherein the undyed yarn substrate 90 is depicted as uncolored (such that it would appear white under ambient conditions). A cross-sectional depiction of that same undyed yarn substrate 90 after it has been treated via a prior art indigo dyeing process is shown in FIG. 16B, such that is a dyed yarn substrate 90' wherein individual dyed fiber substrates 92' are shown. As shown in FIG. 16B, there is a color gradient going from the exterior of the dyed yarn substrate 90' to the interior thereof in the generally radial direction such that dyed fiber substrates 92' toward the exterior of the dyed yarn substrate 90' are more colored than those toward the interior of the dyed yarn substrate 90'.

In traditional pigment padding as defined herein, colorants including but not limited to micro to nanometer-sized pigment particles of the colorant (e.g., indigo) are dispersed in a solution that also contains a binder which is often a polymeric binder material. Upon exposure to such solutions, binder and pigment particles are deposited on the substrate fibers and the binder holds pigment particles to and within the substrate. Binders can be either reactive (create new chemical bonding) or non-reactive (associate through intermolecular interactions, included but not limited to those listed above) with the substrate.

B. Dyeing and Welding Process Generally

Dyeing and welding processes according to the present disclosure allow for surprising new pigment padding techniques for indigo. Specifically, a dyeing and welding process may be configured as a type of pigment padding process that adds indigo pigment particles to cellulosic substrates (e.g., cotton substrates). For example, in one dyeing and welding process disclosed herein, the process may be configured with an aqueous process solvent that may utilize alkali metal hydroxide with urea with dissolved cellulose and indigo pigment particles that may be utilized to add indigo to cotton yarns. The dyeing and welding process can be implemented to execute key aspects of the pigment padding technique. While accomplishing this, use of harsh chemicals that are today utilized in commercial indigo dyeing processes (and that are responsible to reduce indigo into anionic form) is avoided. This has important ramifications on process cost and specifically the amount of water utilized to achieve indigo dyeing. Because a welding process may be configured also to tune the physical characteristics of natural fiber substrates, the dyeing and welding processes described herein also allow additional tuning of textiles (i.e., fabrics) in ways never before possible utilizing traditional dyeing and/or pigment padding techniques.

In addition, the use of process solvents that are solvents for biopolymer materials (i.e., cellulose, silk, etc.), and which are also able to dissolve some amount of the pigment (molecules and/or ions) may allow for a new 'hybrid' dyeing techniques that not only adds pigment particles with binder, but also is able to introduce molecular and/or ionic dye species to and within the fiber substrate. Such hybrid techniques may incorporate elements of both traditional dyeing and pigment padding techniques. In one dyeing and welding process, indigo dye particles can be dispersed in process solvents that both contain solubilized polymer (e.g., cellulosic binder) and that also have additional efficacy to dissolving indigo dye molecules. In particular, ionic liquid-based solvents with certain molecular co-solvent additives are tunable for this hybrid methodology. Using welding processes such as those previously described herein above, process solvent is applied to yarns with appropriate viscous drag and materials either dissolved in or suspended in the process solvent, for example, cellulosic binders with indigo dye (both pigment particles and molecular indigo species), in new and unique ways.

In dyeing and welding processes configured with a process solvent comprised of an ionic liquid, molecular co-solvents such as acetonitrile ("CAN"), dimethyl sulfoxide ("DMSO"), dimethylformamide ("DMF"), etc. can be utilized as appropriate to tune the efficacy of the solvent towards, for example, cellulosic binder and molecular indigo dye/indigo pigment particles. Assuming proper viscous drag is employed throughout the dyeing and welding process (e.g., at least in the process solvent application zone 2, process temperature/pressure zone 3, and/or process solvent recovery zone 4), then the overall dyeing and welding process may be configured to yield a welded substrate with the desired color—either consistent, controllable shade of color and/or modulated color as appropriate. Moreover, by adding additional process solvent that contains additional binder (e.g., dissolved cellulose in an ionic liquid-based process solvent), an effect similar to that previously described herein (shown at least in FIGS. 9I and 9J and referred to as "shell welded") can be imparted that both tunes the degree to which dye is entrapped within the resulting welded substrate and simultaneously tunes the physical properties of the resulting welded substrate (e.g., controlled volume consolidation, amount of hair at the substrate surface, strength and other mechanical properties, etc.). That is, a dyeing and welding process may be configured to simultaneously deliver and tune the color of the resulting welded substrate (e.g., welded yarn substrate) while also simultaneously tuning the physical characteristics thereof.

The following description relates generally to a method for producing welded substrates in which the welding process may be configured such that the resulting welded substrate may also be colored and/or dyed concurrently with welding (generally referred to herein as a "dyeing and welding process"). Although the following description focuses primarily on indigo dye applied to a cellulosic substrate, the scope of the present disclosure is not so limited unless indicated in the following claims, and the general concepts may be applied to other coloring and/or dying agents and/or other substrates as applicable.

In an aspect of a dyeing and welding process, a process solvent system comprised of a chaotropic ionic liquid (i.e., an ionic liquid capable of at least partially dissolving cellulose) in solution with an aprotic solvent may carry indigo dye into a cellulosic substrate for effective dyeing. As used herein, "fiber," "cellulosic fiber," "cellulose," "yarn," and "thread" may all be used interchangeably, and the scope of the present disclosure extends to all such forms of cellulose-based material unless otherwise indicated in the following claims. In another aspect of a welding process configured for use with a coloring and/or dyeing agent, the substrate may be configured as a 2D substrate or 3D substrate without limitation unless so indicated in the following claims.

Unexpectedly, during reconstitution of the process wetted substrate (e.g., in the process solvent recovery zone 4, in which the ionic liquid and aprotic solvent are removed from the fiber) removal of the process solvent or a portion of the process solvent may be accomplished such that none or a negligible amount of the indigo dye molecule is removed. That is, the indigo dye molecule, once carried into the cellulose fiber, may be thereby strongly bound to the cellulose fiber such that the removal forces required to remove (wash out) the process solvent (in this case, ionic liquid and an aprotic solvent) are insufficient to dislodge the bound indigo dye.

In contrast to the prior art, a dyeing and welding process may also add the benefit of fiber modification that may occur concurrently with the dyeing step. This fiber modification may be configured to smoothen and/or strengthen the yarn through a welding process such as that disclosed in U.S. Pat. No. 8,202,379, which is incorporated by reference herein in its entirety, or any of the co-pending applications listed above. In a welding process configured to both result in dyeing the fiber and modify the fiber through the welding process, the ionic liquid may be both able to carry the indigo dye into the yarn and partially dissolve the exterior layer of the fibers to improve their strength and/or smoothness, and/or to add other functional materials to the fibers through the welding process.

As previously described in detail above regarding the entrapment of functional material via a welding process (and with reference at least to FIGS. 4A-D and 5A-D), a dyeing and welding process may be configured to entrap a coloring agent (e.g., indigo dye) with a biopolymer matrix. Such a dyeing and welding process may yield a welded substrate that is colored in a manner akin to pigment padding, wherein the biopolymer may act as a binder.

Additionally, a dyeing and welding process may be configured to impart any of the attributes for welded substrates previously described herein above to the welded substrate produced via the dyeing and welding process subject to various compatibility constraints (e.g., chemical compatibility, attribute compatibility, etc.) without limitation unless so indicated in the following claims.

C. Illustrative Dyeing and Welding Processes

Various illustrative examples of dyeing and welding processes configured for indigo dyeing of cellulose fibers will now be described in detail. However, the foregoing illustrations are not meant to be limiting in any manner, and accordingly the specific parameters, temperatures, pressures, ratios, etc. thereof do not limit the scope of the present disclosure unless so indicated in the following claims.

In an aspect of one dyeing and welding process, indigo dye powder may be suspended and partially solubilized in a process solvent comprised of a chaotropic ionic liquid solvent. Such solvents include but are not limited to 1-ethyl-3-methylimidazolium acetate ("EMIm OAc"), 1-butyl-3-methylimidazolium chloride ("BMIm Cl"), 1-propyl-3-methylimidazolium acetate ("PMIm OAc"), and others that are known chaotropic ionic liquid solvents (those capable of dissolving natural fibers) as disclosed in U.S. Pat. No. 7,671,178 (incorporated herein by reference in its entirety). However, the scope of the present disclosure is not limited by the specific ionic liquid used unless so indicated in the following claims. Moreover, process solvents utilized for delivery of indigo dye and/or other materials are rarely pure. In fact, process solvent are often mixtures of ionic species with molecular species (e.g., EMIm Ac+DMSO+ACN or LiOH+urea+water) or even process solvents composed entirely of molecular species. Generally, the smaller the individual particle size of indigo when in powder form, the greater the efficacy of the coloring using a dyeing and welding process. In one dyeing and coloring process, it may be advantageous to utilize indigo powder with particle sizes ranging from 0.01 to 10 microns. In other processes it may be advantageous to utilize indigo powder with particle sizes ranging from 0.1 to 1.0 microns. Accordingly, the specific particle size, physical characteristics, and/or other features of the indigo used in a dyeing and welding process in no way limit the scope of the present disclosure unless so indicated in the following claims.

It has been found particularly advantageous to use aprotic polar solvents (e.g. DMSO, DMF, etc.) as a co-solvent with the ionic liquid (to create a process solvent system) to aid in processing, as it may reduce the viscosity of the process solvent. However, other additives may be used with the ionic liquid without limitation unless so indicated in the following claims. Generally, the ionic liquid and any additives thereto are referred to herein as the "process solvent" but may also be referred to as a "process solvent system." Indigo dye is only somewhat soluble in DMSO and DMF. Accordingly, in certain dyeing and welding processes, the benefits of direct dyeing using a mixture of ionic liquid and DMSO or DMF is not primarily due to improved solubility of the indigo dye in the process solvent. However, in other dyeing and welding processes, a process solvent comprised of DMSO or DMF may result in a relatively greater amount of pigmentation for the welded substrate due to dyeing (as opposed to pigment padding).

Indigo dye has been found to slowly be reduced in EMIm OAc over time, and thus turn from the characteristic blue color to a green hue. Accordingly, it is contemplated that in many applications it may be advantageous to use the suspension within forty-eight hours of initial preparation.

In experiments, indigo dye has been successfully applied to yarn according to the following process steps. Indigo dye powder (0.5-3% by weight) is suspended in a 50:50 weight ratio solution of EMIm OAc and DMSO. This mixture is stirred to generate a fine fluid suspension. Subsequently, this suspension is filtered through a >50 mesh screen to remove unsuspended particles of dye that could result in inconsistencies in application or clogging of the process equipment. This process solvent is delivered to the injector for application to yarns. When using the EMIm OAc and DMSO blended process solvent, a preferred process solvent-to-fiber ratio is approximately 1-6 times the mass of process solvent to the mass of yarn that is treated. The welding and concurrent dyeing time is 5-15 seconds at a process temperature of 70° C.-100° C. The welded and dyed yarn then may be put through a rinsing and reconstitution step to halt the welding process. It has been found that removal of the process solvent from the yarn does not remove the indigo dye. The welded and dyed yarn then may be dried and packaged in a similar way as currently done in the industry.

Generally, raw 1D substrate comprised of cotton yarn may be partially dissolved in a welding process as disclosed above, specifically a welding process configured similarly to that shown in FIG. 9A, wherein indigo dye was included as part of the process solvent. The process solvent may comprise an ionic liquid (e.g., EMIm OAc), a co-solvent, indigo powder, and in some cases, dissolved cellulose. In these experiments, it was found that certain co-solvents (e.g., acetonitrile (ACN), DMSO, DMF, etc.) are ideally implemented in welding processes configured to have relatively short residence times in the process temperature/pressure zone 4 so as to not chemically alter the indigo dye. Such co-solvents may cause reduction of the indigo powder in cases of prolonged exposure thereto. In contrast, dimethyl sulfoxide (DMSO) may be an advantageous co-solvent for other dyeing and welding processes when used with EMIm OAc in that the indigo dye is not quickly reduced and DMSO (or DMF) is able to solubilize at least part of the indigo dye. Additionally, in certain dyeing and welding processes it may be advantageous to include some dissolved cellulose in the process solvent.

The resistance of a dyed yarn to crocking (wear-off of the dye) is measured using a crockmeter according to AATCC 8. In accordance with this procedure, yarn is wound on a rigid panel and mounted parallel to the travel of the arm of the machine. A clean white test fabric patch is rubbed against the yarn for a total of 20 strokes (10 reciprocal cycles) and the color of this test fabric patch is compared to a grey-scale control. A dyed sample that transfers no color is rated 5 (excellent) while a sample that stains the test fabric patch heavily is rated 1 (very poor). Samples of yarn were made according to various process conditions as explained in the experimental descriptions below and subsequently tested according to AATCC 8.

First Illustrative Dyeing and Welding Process

In this dyeing and welding process, a raw substrate comprised of 10/1 ring-spun cotton yarn was welded using a process solvent comprised of EMimOAc:ACN 67:33 weight ratio (1M:2M) to which 3% by-weight indigo powder was added. To ensure complete mixing of the process solvent, this mixture was subject to dual asymmetric centrifugal mixing in a FlackTek mixer. This process solvent was applied to the yarn substrate in a welding process wherein the yarn was not completely dissolved but where the properties of the yarn are improved by partially dissolving the yarn and thus fusing the yarn fibers together. Here, the process solvent application zone 2 was configured with an injector 60 (where the process solvent is impinged onto the yarn) held at 75° C. and the substrate outlet 64 (which may constitute all or a portion of the process temperature/pressure zone 3) was held at 100° C. The process solvent was applied to the yarn at an application rate of three times the yarn weight (that is, for every 10 grams of yarn that ran through the injector 30 grams of process solvent were pumped into the injector 60). The yarn was pulled through a welding column (i.e., the process temperature/pressure zone 3) at a rate that resulted in a total welding time of approximately 10 seconds. The yarn was then reconstituted in a counter-flow column of 70° C. ACN. The counter-flow rate was greater than 10 times the process solvent dosing rate. After winding this welded yarn substrate on a spool, the spool was rinsed in water and then subsequently dried. The resulting welded yarn substrate was then wound on a rigid holding device and tested according to AATCC 8. Testing showed very poor crocking resistance with a numerical rating of 1.5.

Second Illustrative Dyeing and Welding Process

In a dyeing and welding process very similar to that used in first illustrative dyeing and welding process discussed immediately above, in the second illustrative process the raw yarn substrate was prepared with a process solvent that included both dispersed indigo powder at 3% by-weight and dissolved cellulose at 0.3% by-weight. This yarn substrate was similarly welded and reconstituted before being rinsed and dried as described above for the first illustrative dyeing and welding process. The resulting welded yarn substrate was tested according to AATCC 8. Testing showed very poor crocking resistance with a numerical rating of 1.5.

Third Illustrative Dyeing and Welding Process

The welded yarn substrate that was made via the first illustrative dyeing and welding process was subjected to a second welding process in an attempt to better secure the dye to the yarn and minimize crocking. The second welding process utilized a process solvent that did not include an indigo powder but did include 0.5% by-weight dissolved cellulose. The process solvent application zone 2 and process temperature/pressure zones 3 for the second welding were configured as previously described for the first illustrative dyeing and welding processes. The twice-welded yarn was likewise reconstituted in 70° C. counter-flow ACN. This twice-welded yarn was rinsed in water and dried before being subject to AATCC 8 crocking testing. The crocking resistance of this twice-welded yarn was improved to a rating of 2.5 but the test fabric patch was also a green hue instead of indigo-blue color.

Fourth Illustrative Dyeing and Welding Process

The welded yarn substrate that was made via the second illustrative dyeing and welding process was subjected to a second welding process in an attempt to better secure the dye to the yarn and minimize crocking. The second welding process here utilized a process solvent that included 0.5% by-weight dissolved cellulose. The process solvent application zone 2 and process temperature/pressure zones 3 for the second welding were configured as previously described for the first illustrative dyeing and welding processes. The twice-welded yarn was likewise reconstituted in 70° C. counter-flow ACN. This twice-welded yarn was rinsed in water and dried before being subject to AATCC 8 crocking testing. The crocking resistance of this twice-welded yarn was improved to a rating of 2 but the test fabric patch had a green hue instead of being a true indigo-blue color.

Fifth Illustrative Dyeing and Welding Process

This welded yarn substrate was processed in all ways identical to that previously described in the fourth illustrative dyeing and welding process except that instead of using hot ACN as the reconstitution solvent, 70° C. water was utilized instead. This twice-welded yarn exhibited a modestly improved crocking resistance rating of 2.5; the test fabric patch was still not true indigo-blue but was less green than the test fabric patch used to test the twice-welded yarn substrate from the third illustrative dyeing and welding process.

Sixth Illustrative Dyeing and Welding Process

The twice-welded yarn that was produced using the fourth illustrative dyeing and welding process was subjected to a third welding process in an attempt to better secure the dye to the yarn and minimize crocking. The third welding process utilized a process solvent that included 0.5% by-weight dissolved cellulose. The thrice-welded yarn was reconstituted in 70° C. counter-flow water. This thrice-welded yarn was rinsed in water and dried before being subject to AATCC 8 crocking testing. The crocking resistance of this thrice-welded yarn was improved to a rating of 3.5; the test fabric patch was still not true indigo-blue but was less green than the test fabric patch used to test the twice-welded yarn substrate from the third illustrative dyeing and welding process.

Seventh Illustrative Dyeing and Welding Process

In this dyeing and welding process, a raw substrate comprised of 10/1 ring-spun cotton yarn was welded using a process solvent comprised of EMIm OAc:DMSO 50:50 weight ratio to which 2.5% by-weight indigo powder and 0.25% by-weight cellulose was added. To ensure complete mixing of the process solvent, this mixture was subject to dual asymmetric centrifugal mixing in a FlackTek mixer. This process solvent was applied to the yarn in a natural fiber welding process wherein the yarn was not completely dissolved but where the properties of the yarn are improved by partially dissolving the yarn and thus fusing the yarn fibers together. Here, the process solvent application zone 2 was configured with an injector 60 (where the process solvent is impinged onto the yarn) held at 75° C. and the substrate outlet 64 (which may constitute all or a portion of the process temperature/pressure zone 3) was held at 100° C. The process solvent was applied to the yarn at an application rate of four times the yarn weight (that is, for every 10 grams of yarn that ran through the injector 40 grams of process solvent were pumped into the injector 60). The yarn was pulled through a welding column (i.e., the process temperature/pressure zone 3) at a rate that resulted in a total welding time of approximately 10 seconds. The yarn was then reconstituted in a counter-flow channel of 70° C. water. The counter-flow rate was greater than 10 times the process solvent dosing rate. After winding this welded yarn substrate on a spool, the spool was rinsed in water and then subsequently dried. The welded yarn substrate was then wound on a rigid holding device and tested according to AATCC 8. Testing showed very poor crocking resistance with a numerical rating of 1.

Eighth Illustrative Dyeing and Welding Process

The welded yarn substrate that was made via the seventh illustrative dyeing and welding process was subjected to a second welding process in an attempt to better secure the dye to the yarn and minimize crocking. The second welding process utilized a process solvent comprised of EMIm OAc:DMSO 50:50 weight ratio without indigo powder, but which did include 0.5% by-weight dissolved cellulose. The twice-welded yarn was likewise reconstituted in 70° C. counter-flow water. This twice-welded yarn was rinsed in water and dried before being subject to AATCC 8 crocking testing. The crocking resistance of this twice-welded yarn was improved to a rating of 3 with the test fabric exhibiting characteristic indigo-blue color.

Ninth Illustrative Dyeing and Welding Process

Kevlar® yarn substrate was subjected to the second illustrative dyeing and welding process (i.e., a process solvent comprised of 3% by-weight dispersed indigo powder, 0.3% by-weight dissolved cotton, EMIm OAc:ACN 67:33 weight ratio) to see whether indigo-blue reconstituted cotton would adhere to the yellow Kevlar® yarn substrate. The resulting welded yarn substrate did not turn blue and any blue tint was easily removed by rinsing.

Tenth Illustrative Dyeing and Welding Process

In this dyeing and welding process, the dyeing and welding process may be configured to have more than one process solvent application zones 2, more than one process solvents, more than one process temperature/pressure zones 3, and/or more than one process solvent recovery zones 4 (which also may be referred to as a reconstitution zone). Accordingly, such a dyeing and welding process may be configured to yield a welded yarn substrate similar to the twice- and/or thrice-welded yarn substrates previously described, but realizing efficiencies resulting from a single substrate feed zone 1, a single process solvent recovery zone 4, a single drying zone 5, and/or a single welded substrate collection zone 7. Generally, the various zones of a dyeing and welding process (or steps thereof) may be discrete from one another, or one or more zones may be contiguous with one another such that the transition from one zone to the next is gradual, and such that a specific end point for one zone and the start of another zone is not determinable.

A dyeing and welding process may be configured such that two distinct process solvents are applied in series to a substrate such that two process solvent application zones 2 and two process temperature/pressure zones 3 are utilized. However, that dyeing and welding process may be configured such that only one process solvent recovery zone 4 is required, which process solvent recovery zone 4 removes all or a portion of both process solvents. Alternatively, a dyeing and welding process may be configured with two distinct process solvents and a single process solvent application zone 2 and process temperature/pressure zone 3.

In yet another dyeing and welding process, two distinct process solvents may be applied in series to a substrate such that two process solvent application zones 2 and two process temperature/pressure zones 3 are utilized, and wherein the dyeing and welding process utilizes two process solvent recovery zones 4. A first process solvent recovery zone 4 may be associated with the first process solvent (and, accordingly, the first process solvent application zone 2 and first process temperature/pressure zone 3) and a second process solvent recovery zone 4 may be associated with the second process solvent (and, accordingly, the second process solvent application zone 2 and second process temperature/pressure zone 3). The composition, temperature, flow characteristics, etc. of the process solvent recovery zone(s) 4 may differ for each process solvent and/or dyeing and welding process based at least upon the desired attributes for the resulting welded substrate. Accordingly, those parameters do not limit the scope of the present disclosure unless so indicated in the following claims. In light of the present disclosure, those of ordinary skill in the art will appreciate that the scope of the present disclosure is not limited to two process solvents, two process solvent application zones 2 and two process temperature/pressure zones 3, and/or two process solvent recovery zones 4, but extends to any number thereof without limitation unless so indicated in the following claims.

Eleventh Illustrative Dyeing and Welding Process

In another dyeing and welding process, the process solvent may be comprised of an aqueous hydroxide salt. Such a dyeing and welding process may be configured to use the machinery and/or apparatuses shown in FIG. 10A. For example, a process solvent comprised of 8 percent-by-weight lithium hydroxide, 15 percent-by-weight urea, and 2.5 percent-by-weight indigo powder may be applied to a substrate comprised of 30/1 ring spun cotton yarn in such a manner that the indigo powder was not reduced (i.e., the process solvent only suspended the indigo powder, it did not dissolve it nor chemically alter it). The process solvent application zone 2 and process temperature/pressure zone 3 may be configured such that the ratio of mass of process solvent to substrate is 7:1. The temperatures of the process solvent application zone 2 and process temperature/pressure zone may be held at −12° C., and the process solvent may be allowed to interact with the substrate for between 3 and 4 minutes, after which water may be applied to the substrate to recover the process solvent to yield a welded substrate that is pigmented with indigo. This welded yarn was rinsed in water and dried before being subject to AATCC 8 crocking testing. The crocking resistance of this welded yarn had a rating of 1 with the test fabric exhibiting characteristic indigo-blue color.

Figure 17A:
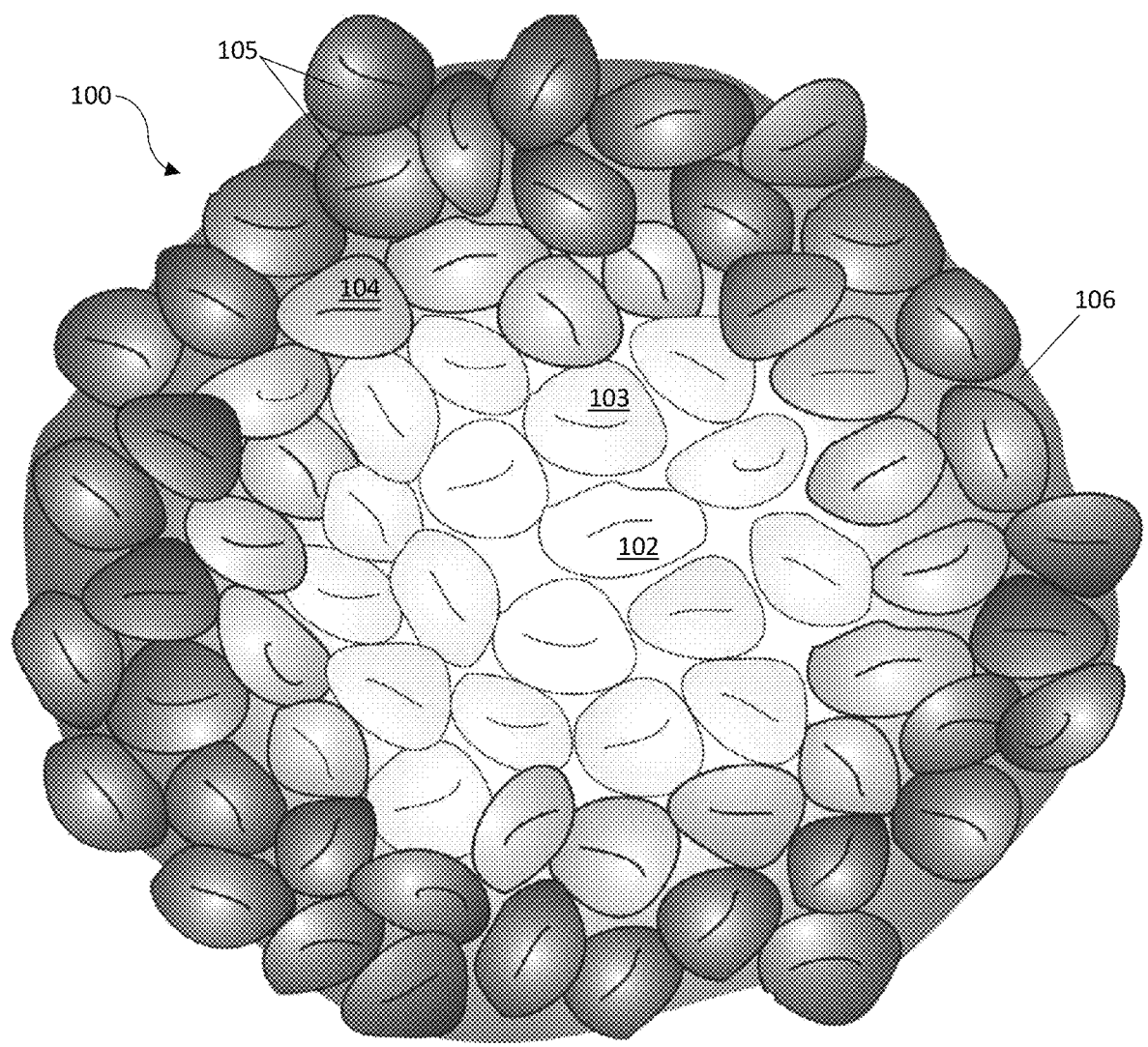
FIG. 17A provides a depiction of a cross-section of a welded yarn substrate that may be produced via one dyeing and welding process.
Figure 17B:
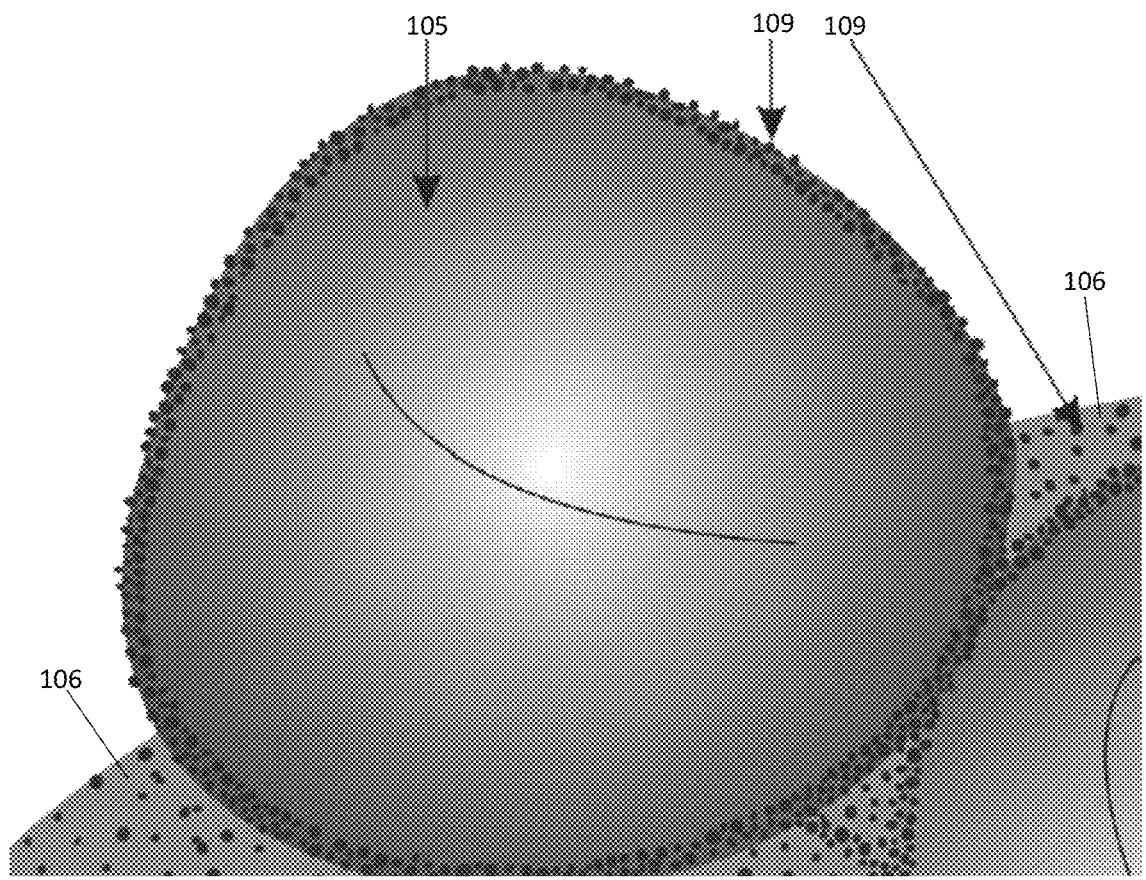
FIG. 17B provides a depiction of a cross-section of a single welded fiber from the welded yarn substrate shown in FIG. 17A.

A depiction of a welded yarn substrate 100 that may be produced using a single process solvent is shown in FIG. 17A, and an individual highly welded substrate fiber 105 from that welded yarn substrate 100 is shown in FIG. 17B. It is contemplated that the dyeing and welding process may be configured such that the degree of welding of the welded yarn substrate 100 will decrease in the radial dimension thereof in a direction from the exterior to the interior of the welded yarn substrate 100. Accordingly, moving from the exterior to the interior thereof, there may be one or more layers of highly welded substrate fibers 105, moderately welded substrate fibers 104, lightly welded substrate fibers 103, and substrate fibers 102 (generally near the center of the welded yarn substrate 100). The degree of welding on the welded yarn substrate 100 may be manipulated via adjusting various process parameters are previously described above.

Dye and/or a coloring agent may be trapped within individual welded substrate fibers 103, 104, 105 and/or in an area between those welded substrate fibers 103, 104, 105 via a binder 106. The optimal chemical composition of the binder 106 may vary from one dyeing and welding process to the next, and may be dependent at least on the chemical composition of the substrate. In a dyeing and welding process wherein the substrate is comprised of a cotton yarn it has been found advantageous to configure the binder such that it comprises biopolymer, and specifically advantageous if the biopolymer comprises cellulose. The binder 106 may be applied to the welded yarn substrate 100 via dissolution of the binder 106 in an appropriate solvent, which solvent may then be applied to the substrate or welded substrate. In one dyeing and welding process, the solvent may be a process solvent having dissolved cellulose therein such that in the process solvent recovery zone 4 (e.g., reconstitution zone) the binder 106 is deposited on and/or within the welded substrate.

Referring now to FIG. 17B, individual pigment particles 109 are shown on the exterior of individual welded substrate fibers 103, 104, 105 as well as entrapped within a binder 106. As well as a color gradient among individual welded substrate fibers 103, 104, 105 moving in a radial direction from the exterior of the welded yarn substrate 100 to the interior thereof, there may be a color gradient within the individual welded substrate fiber 103, 104, 105 moving in a radial direction from the exterior of the individual welded substrate fiber 103, 104, 105 to the interior thereof. The concentration of pigment particles 109 engaged with an individual welded substrate fiber 103, 104, 105 may be greatest adjacent the exterior surface thereof, as depicted in FIG. 17B. Generally, a portion of pigment particles 109 may be entrapped within a welded substrate fiber 103, 104, 105, a second portion thereof may be entrapped between welded substrate fibers 103, 104, 105, and a third portion thereof may be entrapped within a binder 106. It is contemplated that pigment particles 109 positioned in the most radially distal location on an individual substrate fiber 103, 104, 105, which individual substrate fiber 103, 104, 105 is positioned at the most radial distal location of the welded yarn substrate 100 may exhibit relatively less colorfastness when compared to other pigment particles 109.

Figure 18A:
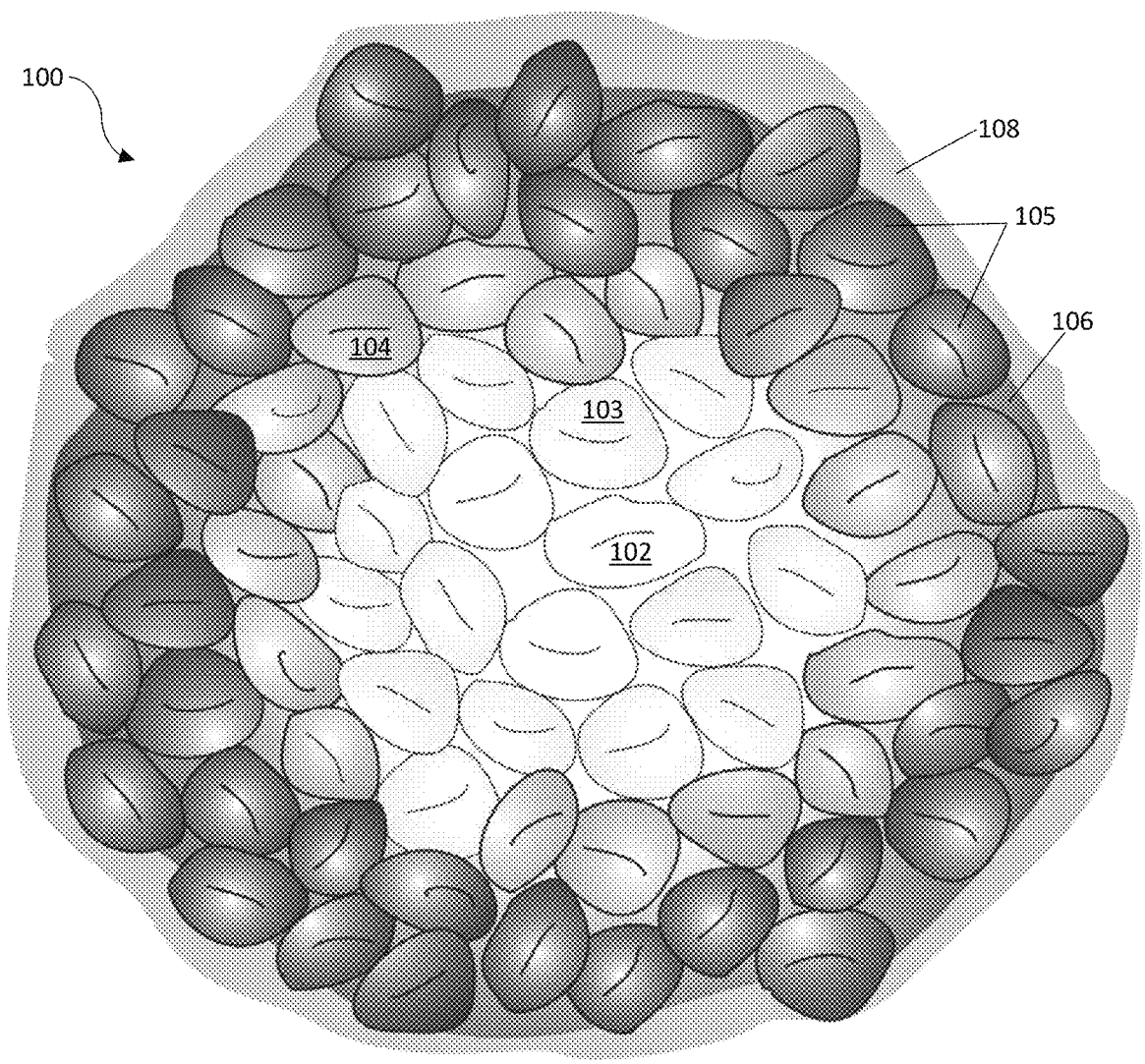
FIG. 18A provides a depiction of a cross-section of a welded yarn substrate that may be produced via another dyeing and welding process.
Figure 18B:
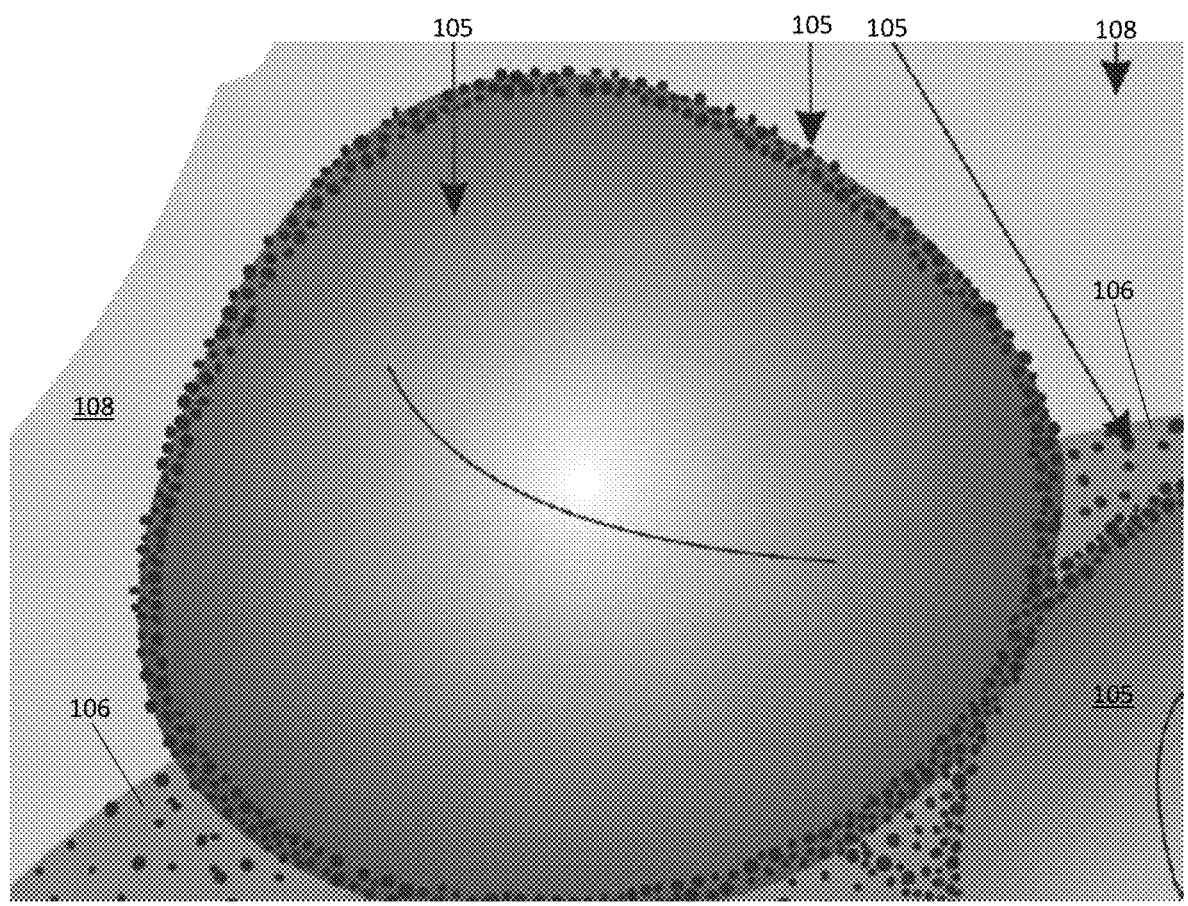
FIG. 18B provides a depiction of a cross-section of a single welded fiber from the welded yarn substrate shown in FIG. 18A.

A depiction of a welded yarn substrate 100 that may be produced using multiple process solvents is shown in FIG. 18A, and an individual highly welded substrate fiber 105 from that welded yarn substrate 100 is shown in FIG. 18B. Again, it is contemplated that the dyeing and welding process may be configured such that the degree of welding of the welded yarn substrate 100 will decrease in the radial dimension thereof in a direction from the exterior to the interior of the welded yarn substrate 100. Accordingly, moving from the exterior to the interior thereof, there may be one or more layers of highly welded substrate fibers 105, moderately welded substrate fibers 104, lightly welded substrate fibers 103, and substrate fibers 102 (generally near the center of the welded yarn substrate 100). The degree of welding on the welded yarn substrate 100 may be manipulated via adjusting various process parameters are previously described above.

As with the welded yarn substrate 100 in FIG. 17A, in FIG. 18A dye and/or a coloring agent may be trapped within individual welded substrate fibers 103, 104, 105 and/or in an area between those welded substrate fibers 103, 104, 105 via a binder 106. The optimal chemical composition of the binder 106 may vary from one dyeing and welding process to the next, and may be dependent at least on the chemical composition of the substrate. In a dyeing and welding process wherein the substrate is comprised of a cotton yarn it has been found advantageous to configure the binder such that it comprises biopolymer, and specifically advantageous if the biopolymer comprises cellulose. The binder 106 may be applied to the substrate via dissolution of the binder 106 in an appropriate solvent, which solvent may then be applied to the substrate or welded substrate. The binder 106 may be applied to the substrate in the same step as the dye and/or coloring agent (e.g., via mixing indigo powder the process solvent). In one dyeing and welding process, the solvent may be a process solvent having dissolved cellulose therein such that in the process solvent recovery zone 4 (e.g., reconstitution zone) the binder 106 is deposited on and/or within the welded substrate.

The welded yarn substrate 100 shown in FIG. 18A may also comprise a binder shell 108 positioned on the radially exterior portion thereof. The binder shell 108 may be applied to a welded yarn substrate 100 that has already had the dye and/or coloring agent and/or binder 106 applied to it, which application of dye and/or coloring agent and/or binder 106 may be via application of one or more process solvents to the substrate. In one dyeing and welding process the binder shell 108 may be applied via dissolution of the binder 106 in an appropriate solvent, which solvent may then be applied to the substrate or welded substrate yarn substrate 100. Generally, it has been found that for some dyeing and welding processes it may be advantageous for colorfastness of the welded yarn substrate 100 to omit any dye and/or coloring agent from the process solvent when applying the binder shell 108.

Referring now to FIG. 18B, individual pigment particles 109 are shown on the exterior of individual welded substrate fibers 103, 104, 105 as well as entrapped within a binder 106. A binder shell 108 without any pigment particles 109 entrapped therein may be positioned around the exterior of the welded yarn substrate 100. It is contemplated that such a binder shell 108 may increase the colorfastness of such a welded yarn substrate 100 relative to the prior art. As well as a color gradient among individual welded substrate fibers 103, 104, 105 moving in a radial direction from the exterior of the welded yarn substrate to the interior thereof, there may be a color gradient within the individual welded substrate fiber 103, 104, 105 moving in a radial direction from the exterior of the individual welded substrate fiber 103, 104, 105 to the interior thereof. The concentration of pigment particles 109 engaged with an individual welded substrate fiber 103, 104, 105 may be greatest adjacent the exterior surface thereof, as depicted in FIG. 18B.

In some dyeing and welding processes, the chemical composition of the binder 106 and binder shell 108 may be similar or identical (e.g., cellulose polymer). However, in other dyeing and welding processes the binder 106 and binder shell 108 may have different chemical compositions, which chemical compositions may depend at least upon the pigment particles, substrate, etc.

It is contemplated that if the welded yarn substrate 100 from FIG. 17A were produced via a dyeing and welding process utilizing an injector 60 for process solvent application, the injector 60 may be configured in a manner similar to that shown in FIG. 6A. Similarly, a welded yarn substrate 100 like that shown in FIG. 18A may be produced via a dyeing and welding process utilizing an injector 60 for process solvent application. However, it is contemplated that such an injector 60 may be configured with more than one process solvent inputs 62 and application interfaces 63 because the dyeing and welding process configured to produce the welded yarn substrate 100 shown in FIG. 18A may use two separate process solvents (e.g., one with a dye and/or coloring agent for first application and a second without dye and/or a coloring agent for subsequent application to apply the binder shell 108). However, other structures and/or methods for applying one or more process solvents may be used without departing from the spirit or scope of the present application unless so indicated in the following claims.

Figure 19B:
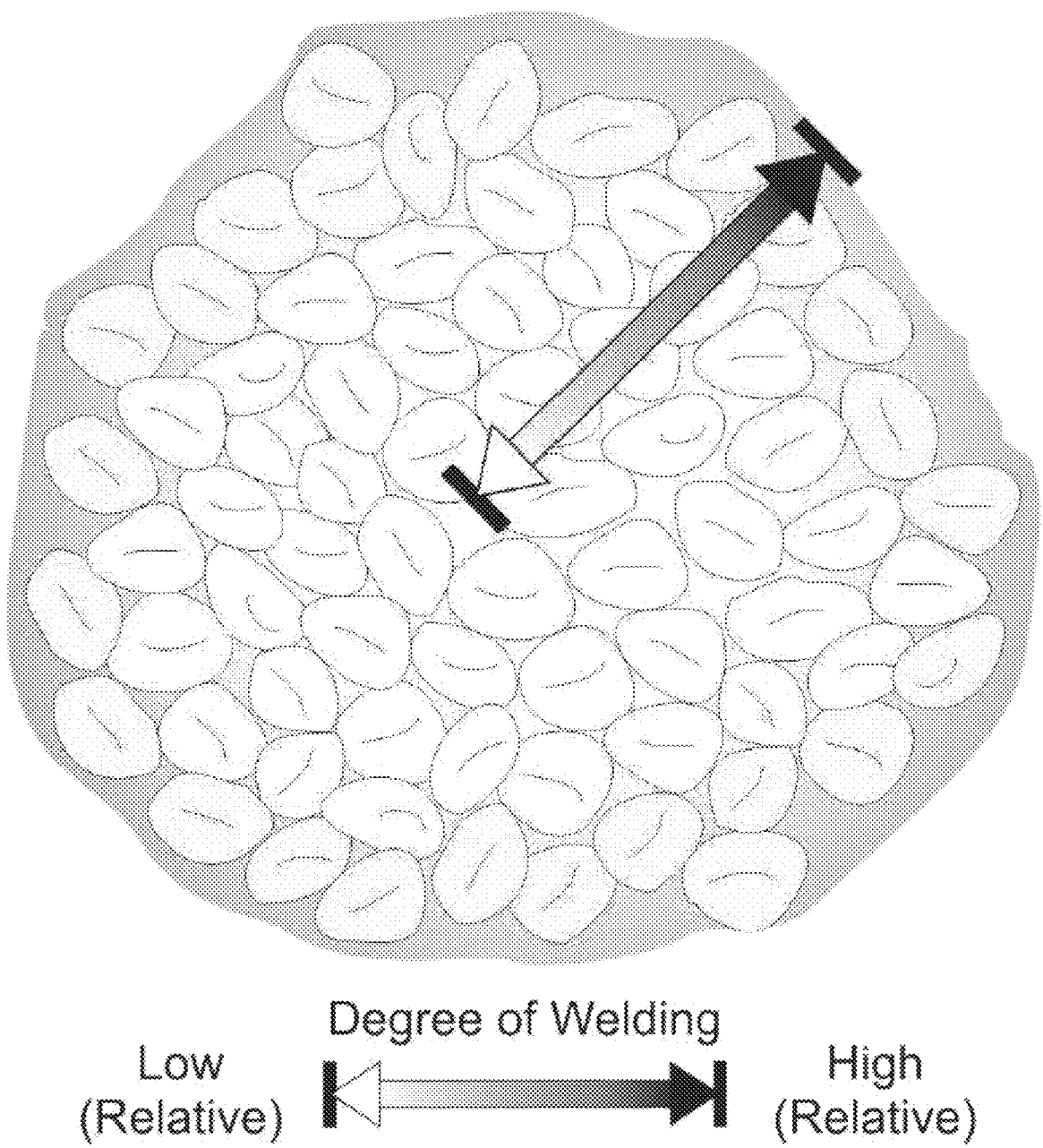
FIG. 19B provides a depiction of a cross-section of a welded yarn substrate that may be produced via another welding process.

Depictions of cross sections of several possible welded yarn substrates that may be produced via a welding process or dyeing and welding process are depicted in FIGS. 19A-19C. For brevity, the term "welding process" as used when referring to FIGS. 19A-19C includes but is not limited to dyeing and welding processes as well as welding processes as previously disclosed herein above. An evenly welded yarn substrate is shown in FIG. 19A. As used herein, the term "evenly welded" is used to denote a spatially consistent controlled volume consolidation throughout the cross section of a welded yarn substrate.

A shell welded yarn substrate is shown in FIG. 19B. In contrast to the evenly welded yarn substrate, the shell welded yarn substrate may be a result of a welding process where polymers are swollen and mobilized such that the outermost fibers of a given substrate achieve intimate molecular-level welding interactions and effects. As such there may be a ring-like gradient of fiber welded substrate that is distinct from core fibers in the substrate, which core fibers may be largely unperturbed by the welding process.

A core welded yarn substrate is shown in FIG. 19C. In a core welded substrate (which again may be produced according to a welding process as disclosed herein), the biopolymers of the innermost fibers may be swollen and mobilized such that the core of the welded substrate exhibits a gradient of intimate molecular-level interactions but an outer ring of fibers are primarily left in their native states. In FIGS. 19A-19C, the darker shades of gray are intended to represent relatively greater molecular-level interactions between fibers.

It is important to note that the degree to which a welded substrate is even, shell, or core welded has important influence and consequences on the physical attributes of the welded substrate. For example, evenly welded yarn substrates may exhibit significantly reduced hairiness while simultaneously having increased modulus (which may be calculated by dividing strength/tenacity by elongation as shown in at least Tables 2.2, 3.2, etc.). For example, a welded substrate produced via a dyeing and welding process may have a modulus 100% greater than that of its raw yarn substrate counterpart while reducing the hairiness by approximately 30% to 99% compared to its raw yarn substrate counterpart (as measured by Uster Hairiness Index). In contrast, shell welded yarn substrates may exhibit significantly reduced hairiness but not have as large of a modulus increase as for evenly welded substrates since there is a core of fibers that are not welded and can slip with respect to other yarns and/or welded yarn substrates. Conversely, core welded yarn substrates may exhibit increased modulus but simultaneously retain a desired amount of hairiness. The ability to select or even modulate between even, shell, or core welded substrate attributes is a critical aspect to producing welded substrate yarns with optimized properties for fabrics. Surprising new fabrics can be constructed from yarns containing natural fibers by using welded yarn substrates optimized with spatially controlled volume consolidation of the welded yarn substrate.

A welding process may be configured to produce an evenly welded yarn substrate via appropriate control of the combination of process solvent efficacy and rheology with the application method including the amount of solvent with any viscous drag that may occur at various appropriate points during the substrate travel through the process solvent application zone 2, process temperature/pressure zone 3, and the process solvent recovery zone 4. The degree to which consistent welding results are obtained may also be a function of the process conditions including but not limited to the temperature as well as the method by which temperature is applied (i.e., radiative or non-radiative heat transfer or the combination thereof) as well as the atmospheric pressure, the atmospheric composition, the type and method of process solvent reclamation during the process solvent recovery zone 4 (e.g., choice of reconstitution solvent type, temperature, flow characteristics, etc.) and also the type and method of drying process that is utilized to remove the reconstitution solvent from the substrate.

Referring again to FIGS. 19B and 19C, which depict shell welded yarn substrates and core welded yarn substrates, respectively, a welding process may be configured to produce these alternative welded substrates via careful manipulation and control of the welding process parameters. Moreover, modulated fiber welding processes, as previously described in detail above, allow a substrate to be modulated among at least even, shell, and/or core welding outcomes as key process variables are modulated in real time.

Generally speaking, shell welding may be accomplished by spatially limiting welding conditions to the outside of the yarn substrate by any combination of (not limited to) process solvent composition (which effects either solvent efficacy, rheology, or both), process solvent application temperature and pressure, residence time in the process temperature/pressure zone 3, method of temperature control including heat transfer methodology, configuration of the process solvent recovery zone 4 (including but not limited to reconstitution solvent composition, flow characteristics, temperature, etc.), and/or the methodologies employed to remove the reconstitution solvent, etc.

For example, shell welding may be accomplished by increasing the solvent viscosity such that process solvent is deposited primarily on the exterior of a yarn substrate and the duration and temperature of the process solvent application zone 2 and/or process temperature/pressure zone 3 may be tuned to limit the degree to which process solvent wicks into the substrate and is effective at swelling and mobilizing biopolymers in the fibrous substrate. In particular, a relatively small (0.02% to 1% by mass) amount of solubilized biopolymer may be added to the process solvent to achieve various degrees and/or thicknesses of the shell-welded effect.

Core welding may be accomplished by alternative conditions of all of the aforementioned conditions and/or process parameters including but not limited to variation in viscous drag conditions. For example, the process solvent application may be tuned with an appropriate process solvent delivery system that limits the amount of process solvent applied and with conditions that allow, for example, an appropriate length of time for the process solvent to wick into the core of the substrate before welding occurs. Particular in this case, it may be beneficial to formulate the process solvent and separately control the temperatures of the process solvent application zone 2 and/or process temperature/pressure zone 3 such that welding conditions are not achieved until temperature is brought to an appropriate range.

In another example, a welding retardant (e.g., water, water vapor, etc.) may be applied to a process wetted substrate (either at the end of the process solvent application zone 2 and/or in the process temperature/pressure zone 4) to alter the composition of the process solvent at the exterior of the process wetted substrate (via diffusion) so as to affect the degree of welding throughout the cross-section of the substrate. That is, the diffusion of the welding retardant into the process solvent adjacent the exterior of the process wetted substrate may retard and/or stop welding at that position while welding may still be occurring at a more interior location of the process wetted substrate.

Although the welded yarn substrates 100 depicted in FIGS. 17A-19C show discrete boundaries for each individual welded substrate fiber 103, 104, 105 therein, it is contemplated that a welding process or dyeing and welding process used to produce that welded yarn substrate 100 may actually cause the boundaries between adjacent welded substrate fibers 103, 104, 105 to blend together. That is, the biopolymers of individual welded substrate fibers 103, 104, 105 may be swollen and mobilized such that individual boundaries thereof no longer exist. Accordingly, in a welded yarn substrate 100 adjacent welded substrate fibers 103, 104, 105 may be fused together as previously discussed in detail above.

A dyeing and welding process configured to at least partially dye the substrate and to at least partially engage one or more pigment particles 109 to the substrate utilizing a binder 106 may be referred to as a hybrid dyeing and welding process as previously briefly described. It is contemplated that such a dyeing and welding process may be configured with a process solvent comprised of DMSO or DMF, wherein the process solvent may simultaneously swell and mobilize biopolymers and dissolve a desired dye and/or coloring agent. A process solvent comprised of DMSO or DMF may provide the needed solubility of indigo dye within the process solvent such that some of the substrate is dyed in a traditional sense of the term. Furthermore, it is contemplated that in such a dyeing and welding process, the amount of dye and/or coloring agent within the process solvent may be such that the process solvent is beyond the saturation point for that particular dye and/or coloring agent. That is, the process solvent is fully saturated with the dye and/or coloring agent such that a portion of the dye and/or coloring agent may be suspended in the fully saturated process solvent.

In another dyeing and welding process, the indigo dye may be entirely solubilized within the process solvent. In such a dyeing and welding process, the resulting welded substrate may exhibit no discernible pigment particles 109 entrapped within the binder 106. That is, the welded substrate may exclusively attributes of a dyeing, such that there is homogeneous color on the exterior of each welded substrate fiber 103, 104, 105 and each welded yarn substrate 100. In a dyeing and welding process so configured, the reconstitution solvent used in the process solvent recovery zone 4 may retain less than 10% of the amount of indigo dye solubilized in the process solvent. More specifically, the reconstitution solvent may retain less than 5% of the amount of indigo dye solubilized in the process solvent. Again, the dyeing and welding process may be configured to impart any of the previously disclosed attributes to the welded substrate 100. It is contemplated that a welded substrate 100 produced via such a process may exhibit relatively high resistance to crocking.

Summary of Dyeing and Welding Process

Indigo powder may be affixed to cotton yarn substrates using a dyeing and welding process. This indigo powder may be bound onto the cotton yarn substrate through a dyeing and welding process, and the solubility of the substrate with respect to the process solvent may be key to the retention of the pigment in the resulting welded substrate. The fact that Kevlar® yarn was not appreciably dyed using the dyeing and welding process shows that the pigment is not simply adhered to only the surface of the yarn substrate. Indigo powder can be worn away (mechanically) from the surface of the welded yarn substrate through rubbing regardless of whether dissolved cellulose was in the process solvent utilized for the dyeing and welding process. Subsequent process solvent applications (e.g., subjecting a welded yarn substrate to another welding process) using colorless process solvents containing dissolved cellulose may effectively lock-in indigo powder pigment and reduce crocking (see Table 15.1 below). In certain dyeing and welding processes, DMSO may be a preferred co-solvent for welding as it does not chemically reduce indigo and cause green-hues in the yarn even with prolonged exposure of the indigo to the co-solvent.

TABLE 15.1

| Crocking resistance from first through sixth dyeing and welding processes (1 = very poor, 5 = excellent) | No dissolved cellulose in pigmenting stage | Dissolved Cellulose contained in process solution in pigmenting stage |
|---|---|---|
| Single pigmented welding stage | 1.5 | 1.5 |
| Second non-pigmented welding stage | 2.5 | 2 |
| Third non-pigmented welding stage | not measured | 3.5 |
| Commercial Denim | | 4 |

Generally, the optimal percentage-by-weight of indigo powder in a given process solvent for use with a dyeing and welding process may vary from one application to the next, as may the percentage-by-weight of dissolved cellulose therein (or other binding agent without limitation unless so indicated in the following claims). In some dyeing and welding processes, an optimal percentage-by-weight of indigo powder in a process solvent may be between 0.25 and 8.5 and an optimal percentage-by-weight of dissolved cellulose may be between 0.01 and 1.5. In other dyeing and welding processes an optimal percentage-by-weight of indigo powder in a process solvent may be between 1.0 and 4.0 and an optimal percentage-by-weight of dissolved cellulose may be between 0.1 and 1.0. Accordingly, the scope of the present disclosure is in no way limited by the percentage-by-weight of indigo powder in a process solvent or the percentage-by-weight of dissolved cellulose therein unless so indicated in the following claims.

D. Reconstitution Solvent Considerations

As disclosed above, for certain dyeing and welding processes ACN may not be an ideal reconstitution solvent as it may result in chemical changes to the indigo that create green hues in the welded yarn substrate in instances of prolonged exposure. Generally, utilizing water as a reconstitution solvent does not result in similar color shifts, but water may exhibit other undesirable effects, such as high drag forces.

Pulling yarn through the process solvent recovery zone 4 (which may be referred to as the reconstitution zone) may create a high drag force on the yarn that may exceed the breaking strength thereof. In one dyeing and welding process, a seven-foot-long reconstitution zone resulted in up to 80 gram-force (gf) of drag experienced by the yarn when using water as a reconstitution solvent (dragging through ¼ inch PFA tubing). In comparative experiments, the addition of soap (0.5% by-weight Murphy Oil Soap) to the water reduced drag force to approximately 55 gf. Using pure ACN as a reconstitution solvent reduced drag to approximately 45 gf while using pure ethyl acetate as a reconstitution solvent reduced drag force to approximately 35 gf. However, in certain dyeing and welding processes pure ethyl acetate may be relatively ineffective for removing ionic liquid from the yarn. Accordingly, a reconstitution solvent comprised of roughly 5% by-weight ethyl acetate in water may be ideal for certain dyeing and welding processes, as such a reconstitution solvent is nearly equally effective at reducing drag as pure ethyl acetate while retaining the reconstitution properties of water.

E. Benefits and Applications

Yarn dyed utilizing a method configured according to the present disclosure may exhibit various benefits over yarn produced by traditional means. The indigo dye that is welded into the yarn in a method configured according to the present disclosure has less tendency to "crock" (i.e., be removed by subsequent washings and/or be removed due to rubbing or other physical contact). Yarn produced according to the present disclosure may be configured to exhibit beneficial physical attributes associated with the welded exterior; including but not limited to: improved strength, improved smoothness (less hair), reduced drying times, and better knitting properties. The combined benefits of color retention and yarn physical attributes result in improved fabrics that can be utilized widely in at least the denim industry.

Commercial dyeing processes consume roughly 125 liters of water for every kilogram of fiber dyed. A manufacturing process configured according to the present disclosure may greatly reduce the water demand for the dyeing process. In addition, the rinsing and reconstitution steps of such a manufacturing process may be designed to recover greater than 98% of the ionic liquid, which may reduce the cost and environmental impact of the concurrent welding and dyeing process.

An additional benefit of concurrently welding and dyeing yarn is that the presence of dye verifies consistent welding of the yarn. Whereas welding without dye is known and has mechanical benefits, the welding process may be inconsistent without an easy means of detection. Including dye within the process solvent creates a yarn where any inconsistencies in the welding process are easily detectable by variations in color.

Although the methods described and disclosed herein may be configured to utilize a substrate comprised of a natural fiber, the scope of the present disclosure, any discrete process step and/or parameters therefore, and/or any apparatus for use therewith is not limited so limited and extends to any beneficial and/or advantageous use thereof without limitation unless so indicated in the following claims.

The materials used to construct the apparatuses and/or components thereof for a specific process will vary depending on the specific application thereof, but it is contemplated that polymers, synthetic materials, metals, metal alloys, natural materials, and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various processes and apparatuses, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all processes, apparatuses, and/or structures for providing the various benefits and/or features of the present disclosure unless so indicated in the following claims.

While the welding process, process steps, components thereof, apparatuses therefore, and welded substrates according to the present disclosure have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the processes and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the welding processes, apparatuses and/or equipment therefore, and/or welded substrates produced thereby are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, process steps, process parameters, etc. of a welding process, a process step, a substrate, and/or a welded substrate, may be used alone or in combination with one another depending on the compatibility of the features, components, functionalities, advantages, aspects, configurations, process steps, process parameters, etc. Accordingly, an infinite number of variations of the present disclosure exist. Modifications and/or substitutions of one feature, component, functionality, aspect, configuration, process step, process parameter, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

Although the welding processes (and welding and dyeing processes without limitation unless so indicated in the following claims) described and disclosed herein may be configured to utilize a substrate comprised of a natural fiber, the scope of the present disclosure, any discrete process step and/or parameters therefore, and/or any apparatus for use therewith is not so limited so and extends to any beneficial and/or advantageous use thereof without limitation unless so indicated in the following claims.

The materials used to construct the apparatuses and/or components thereof for a specific process will vary depending on the specific application thereof, but it is contemplated that polymers, synthetic materials, metals, metal alloys, natural materials, and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various processes and apparatuses, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all processes, apparatuses, and/or structures for providing the various benefits and/or features of the present disclosure unless so indicated in the following claims.

While the welding process, dyeing and welding processes, process steps, components thereof, apparatuses therefore, and welded substrates according to the present disclosure have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the processes and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the welding processes, apparatuses and/or equipment therefore, and/or welded substrates produced thereby are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, process steps, process parameters, etc. of a welding process, a process step, a substrate, and/or a welded substrate, may be used alone or in combination with one another depending on the compatibility of the features, components, functionalities, advantages, aspects, configurations, process steps, process parameters, etc. Accordingly, a nearly infinite number of variations of the present disclosure exist. Modifications and/or substitutions of one feature, component, functionality, aspect, configuration, process step, process parameter, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The invention claimed is:

1. A yarn comprising:
   a) a plurality of cellulose fiber substrates twisted together and adjacent to one another to form said yarn, wherein said plurality of cellulose fiber substrates contain a biopolymer;
   b) an indigo dye dispersed throughout at least an exterior portion a first cellulose fiber substrate of said plurality, wherein said first cellulose fiber substrate is positioned adjacent an exterior of said yarn, wherein said indigo dye comprises a plurality of indigo dye molecules, wherein a first portion of said indigo dye molecules is entrapped within said first cellulose fiber substrate such that it dyes at least said first cellulose fiber substrate, and wherein said indigo dye molecules are in a molecular form; and,
   c) wherein said first cellulose fiber substrate and a second cellulose fiber substrate of said plurality are fused together via interaction of said biopolymer between said first cellulose fiber substrate and said second cellulose fiber substrate, and wherein a second portion of said plurality of indigo dye molecules are entrapped between said first cellulose fiber substrate and said second cellulose fiber substrate.

2. The yarn according to claim 1 further comprising a binder shell surrounding a portion of said yarn.

3. The yarn according to claim 2 wherein said binder shell does not include any of said plurality of indigo dye molecules therein.

4. The yarn according to claim 1 wherein a modulus of said yarn is at least 50% greater than a modulus of a raw yarn substrate counterpart.

5. The yarn according to claim 1 wherein a modulus of said yarn is at least 100% greater than a modulus of a raw yarn substrate counterpart.

6. The yarn according to claim 1 wherein a hairiness of said yarn is reduced by at least 30% compared to a raw yarn substrate counterpart.

7. The yarn according to claim 1 wherein a hairiness of said yarn is reduced by at least 65% compared to a raw yarn substrate counterpart.

8. The yarn according to claim 1 wherein said molecular form is further defined as neither anionic or cationic.

9. The yarn according to claim 2 wherein said binder shell includes a third portion of said plurality of indigo dye molecules are entrapped therein.

\* \* \* \* \*